(12) United States Patent
Adcock et al.

(10) Patent No.: US 10,354,323 B2
(45) Date of Patent: Jul. 16, 2019

(54) DIVERSE OPTIONS ORDER TYPES IN AN ELECTRONIC GUARANTEED ENTITLEMENT ENVIRONMENT

(71) Applicant: NYSE Group, Inc., New York, NY (US)

(72) Inventors: Paul D Adcock, Burr Ridge, IL (US); Michael A Cormack, Vancouver (CA); Amy Farnstrom, Oakland, CA (US); Robert A Hill, LaGrange, IL (US)

(73) Assignee: NYSE Group, Inc., New York, NY (US)

( * ) Notice: Subject to any disclaimer, the term of this patent is extended or adjusted under 35 U.S.C. 154(b) by 1176 days.

(21) Appl. No.: 14/029,087

(22) Filed: Sep. 17, 2013

(65) Prior Publication Data

US 2014/0019328 A1 Jan. 16, 2014

Related U.S. Application Data

(62) Division of application No. 13/659,676, filed on Oct. 24, 2012, now Pat. No. 8,566,225, which is a division of application No. 13/068,881, filed on May 23, 2011, now Pat. No. 8,311,930, which is a division of application No. 11/881,788, filed on Jul. 27, 2007, now Pat. No. 7,949,596.

(60) Provisional application No. 60/834,327, filed on Jul. 28, 2006.

(51) Int. Cl.
| | |
|---|---|
| *G06Q 40/04* | (2012.01) |
| *G06Q 30/06* | (2012.01) |
| *G06Q 40/00* | (2012.01) |
| *G06Q 40/06* | (2012.01) |

(52) U.S. Cl.
CPC ............ *G06Q 40/04* (2013.01); *G06Q 30/06* (2013.01); *G06Q 40/00* (2013.01); *G06Q 40/06* (2013.01)

(58) Field of Classification Search
CPC ...................................................... G06Q 40/04
USPC ..................................................... 705/37, 35
See application file for complete search history.

(56) References Cited

U.S. PATENT DOCUMENTS

| | | | |
|---|---|---|---|
| 7,908,201 | B2 | 3/2011 | Addock et al. |
| 8,799,131 | B2 | 8/2014 | Cormack et al. |
| 2002/0091624 | A1 | 7/2002 | Glodjo et al. |
| 2004/0030630 | A1 | 2/2004 | Tilfors et al. |
| 2005/0131802 | A1 | 6/2005 | Glodjo |
| 2006/0106707 | A1 | 5/2006 | Shetty et al. |
| 2006/0253374 | A1 | 11/2006 | Addock et al. |
| 2006/0253379 | A1* | 11/2006 | Adcock ................. G06Q 40/04 705/37 |

(Continued)

*Primary Examiner* — Hao Fu
(74) *Attorney, Agent, or Firm* — DLA Piper LLP (US)

(57) ABSTRACT

An enhanced system and method for handling, matching and executing a diverse group of limit-priced orders in an electronic options environment is disclosed. Most of the order types disclosed are automatically repriced and reposted as the NBBO changes to increase their execution opportunities. Market maker entitlements are integrated with the order processing, so that the market maker is guaranteed an allocation of the trade if the market maker is at the NBBO when an order priced at or better than the NBBO is received. Once posted to the order book, the displayed price of an order may be eligible for preferential execution in a market maker entitlement process, regardless of whether the displayed price is original or has been automatically repriced.

12 Claims, 35 Drawing Sheets

(56) References Cited

U.S. PATENT DOCUMENTS

2007/0078753 A1* 4/2007 Cormack et al. ............... 705/37

* cited by examiner

Highest Priority → → → → → → → → → Lowest Priority

| Display Order Process | Reserve Process | Liquidity Process | Discretionary Process | Tracking Process | Routing Process |
|---|---|---|---|---|---|
| 1. Best Displayed Order or Quote at the NBBO | 4. Best Reserve Portion of an Order at the NBBO | 7. Best Passive Liquidity Order at the NBBO | 10. Best Discretionary Order that can Step Up to the NBBO | 13. Best Tracking Liquidity Order at the NBBO | 16. Best Away Market Quote at the NBBO |
| 2. 2nd-best Displayed Order or Quote at the NBBO | 5. 2nd-best Reserve Portion of an Order at the NBBO | 8. 2nd-best Passive Liquidity Order at the NBBO | 11. 2nd-best Discretionary Order that can Step Up to the NBBO | 14. 2nd-best Tracking Liquidity Order at the NBBO | 17. 2nd-best Away Market Quote at the NBBO |
| 3. 3rd-best Displayed Order or Quote at the NBBO | 6. 3rd-best Reserve Portion of an Order at the NBBO | 9. 3rd-best Passive Liquidity Order at the NBBO | 12. 3rd-best Discretionary Order that can Step Up to the NBBO | 15. 3rd-best Tracking Liquidity Order at the NBBO | 18. 3rd-best Away Market Quote at the NBBO |
| 19. Best Displayed Order or Quote at One Tick Inferior to the NBBO | 22. Best Reserve Portion of an Order at One Tick Inferior to the NBBO | 25. Best Passive Liquidity Order at One Tick Inferior to the NBBO | 28. Best Discretionary Order that can Step Up to One Tick Inferior to the NBBO | | 31. Best Away Market Quote at One Tick Inferior to the NBBO |
| 20. 2nd-best Displayed Order or Quote at One Tick Inferior to the NBBO | 23. 2nd-best Reserve Portion of an Order at One Tick Inferior to the NBBO | 26. 2nd-best Passive Liquidity Order at One Tick Inferior to the NBBO | 29. 2nd-best Discretionary Order that can Step Up to One Tick Inferior to the NBBO | | 32. 2nd-best Away Market Quote at One Tick Inferior to the NBBO |
| 21. 3rd-best Displayed Order or Quote at One Tick Inferior to the NBBO | 24. 3rd-best Reserve Portion of an Order at One Tick Inferior to the NBBO | 27. 3rd-best Passive Liquidity Order at One Tick Inferior to the NBBO | 30. 3rd-best Discretionary Order that can Step Up to One Tick Inferior to the NBBO | | 33. 3rd-best Away Market Quote at One Tick Inferior to the NBBO |

FIG. 3

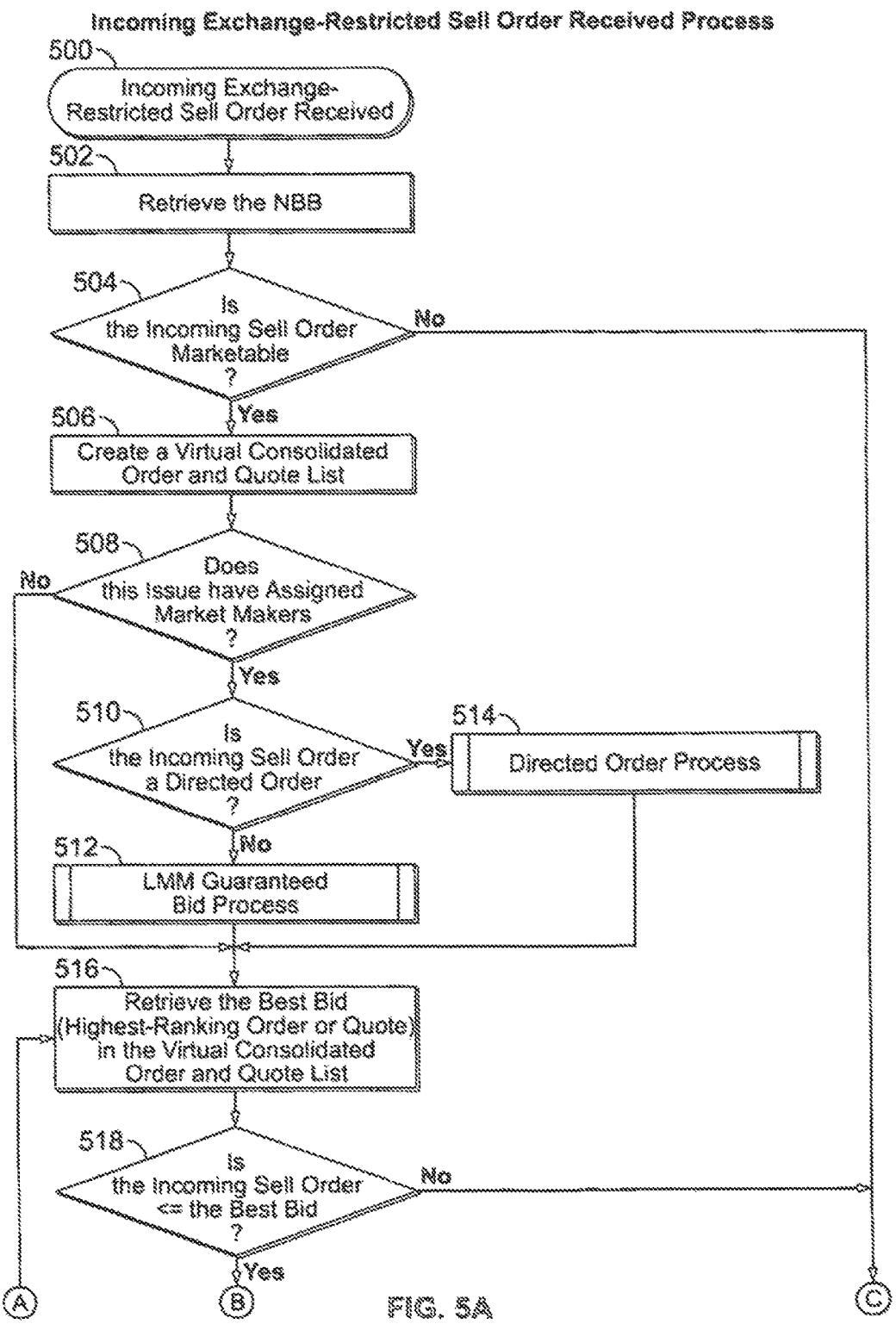

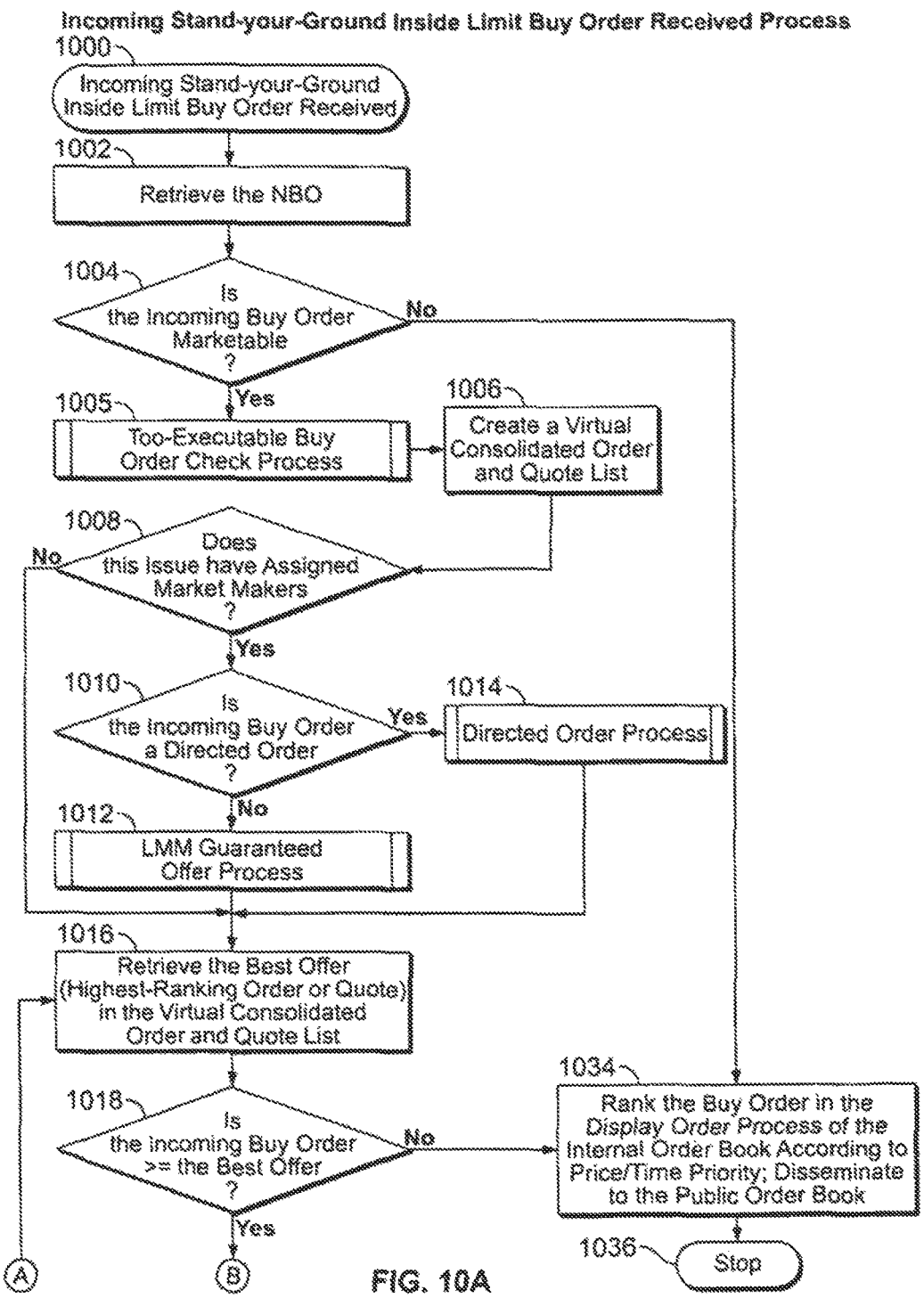

Directed Order Permissions Table

Example of a DMM / OSF Permissions Table

| Issue | Designated Market Maker Firm (DMM) | Default MM? | Order Sending Firm (OSF) |
|---|---|---|---|
| XYZ | Firm A |   | Firm B |
| XYZ | Firm A | Y | Firm C |
| XYZ | Firm B | Y | Firm B |
| XYZ | Firm B |   | Firm A |

According to this Table:

* Firm B can Direct Orders to Firm A and Firm B
* Firm C can Direct Orders to Firm A Only
* Firm A can Direct Orders to Firm B Only
* If Firm B does not Specify a DMM, the Route Defaults to Firm B
* If Firm C does not Specify a DMM, the Route Defaults to Firm A
* If Firm A does not Specify a DMM, there is no Default Route

FIG. 20B

DIVERSE OPTIONS ORDER TYPES IN AN ELECTRONIC GUARANTEED ENTITLEMENT ENVIRONMENT

CROSS-REFERENCE TO RELATED APPLICATIONS

This application is a divisional of U.S. patent application Ser. No. 13/659,676, filed Oct. 24, 2012, co-pending as of the date of filing of this application, which claims priority from and claims the benefit of U.S. patent application Ser. No. 13/068,881, filed May 23, 2011, entitled "Diverse Options Order Types in an Electronic Guaranteed Entitlement Environment" now U.S. Pat. No. 8,311,930, which claims priority from and claims the benefit of U.S. patent application Ser. No. 11/881,788, filed Jul. 27, 2007, entitled "Diverse Options Order Types in an Electronic Guaranteed Entitlement Environment" now U.S. Pat. No. 7,949,596, which claims priority from and claims the benefit of U.S. Provisional Application No. 60/834,327, filed Jul. 28, 2006, entitled "Electronic Equity Options Order Execution and Routing System," each of which is hereby incorporated by reference.

BACKGROUND

The options marketplace has only become highly automated within the past few years, and only a few exchanges are fully electronic. As specialists and market makers have historically provided most of the liquidity on the options marketplace, it has generally been a quote-driven rather than an order-driven market. When sending single-leg orders, users have traditionally been limited to market orders or simple limit orders.

As the options marketplace increasingly resembles the order-driven equities marketplace, there is a need for a trading platform that allows users to send a more diverse body of order types than has historically been utilized on the options exchanges. The equities marketplace allows orders to route contemporaneously to multiple market centers at multiple price levels. However, trading on the options marketplace is still generally restricted to executing at the NBBO only, with a few exceptions.

There is a need for a system and method that allows users to send orders at their most aggressive prices to enhance their execution opportunities. To ensure that orders execute at or near the NBBO, there is a need for new order types that are automatically capped at or near the NBBO price, but may be automatically repriced as the NBBO changes. Such capping and repricing models allow the orders to conform to the general practice in the options marketplace of executing at the NBBO, but also allows the orders the opportunity to execute further when the NBBO price changes. Additionally, there is a need for the new order types to simultaneously respect both traditional specialist/market maker guaranteed entitlements, when they are applicable, and price/time priority matching principles.

There is a need for more sophisticated order types that are publicly displayed at the most aggressive price allowed, unlike the "working" orders and "dark" orders of prior systems, which are permanently or temporarily hidden from the marketplace. Such order types are automatically repriced to lock or cross the NBBO after satisfying all trading interest at the NBBO, unlike existing order types such as pegged orders, which generally track the movements of the NBBO but maintain a fixed interval away to prevent them from becoming immediately executable. By providing a diverse variety of limit order types with such different and sophisticated behaviors, a user can choose an order type that accommodates his trading strategy and encourages market participants to execute against his displayed order.

Additionally, there is a need for a quote engine that receives and analyzes disseminated away market best bid and offer quotation prices, notifies the order matching engine when any quote price touches (i.e., equals or overlaps with) any order price, and continues to notify the order matching engine of quote price changes so that posted orders can be repriced to take advantage of additional execution opportunities. Accordingly, there is a need for a system and method that minimizes the impact of away market best bid and offer quote traffic on the other components of the system, especially in regard to the ability to display and execute orders and quotes with maximum speed and efficiency.

SUMMARY

According to one aspect of the present invention, a method for enhancing quote and order integration includes providing a market center which lists a plurality of options series, wherein the market center has an order book for each option series, has a market maker quote book for each option series, and receives the top-of-book best bid and offer disseminated quotation from each away market center for each option series, and wherein the order book, the market maker quote book, and the best bid and offer quotations are separate until an execution opportunity is presented.

The method further includes receiving an incoming exchange-restricted order; a NOW order; a reprice-and-ship inside limit order; a stand-your-ground inside limit order; a sweep limit order; or an intermarket sweep limit order; retrieving the side of the NBBO opposite the incoming exchange-restricted order, and determining if the incoming order price is equal to or overlaps with the retrieved side of the NBBO. If the incoming order price is equal to or overlaps with the retrieved side of the NBBO, the method further includes determining if the incoming order is for an option series that has a lead market maker and, if so, determining if the lead market maker has a quote at the NBBO. Wherein if the incoming order is marketable and the lead market maker has a quote at the NBBO, the method further includes computing an allocation percentage for the lead market maker and matching the incoming order up to the lesser of the total size of the incoming order or the computed allocation percentage amount for the lead market maker.

According to another aspect of the present invention, the method may include, prior to computing the lead market maker allocation percentage, determining if the order book has a displayed customer order at the NBBO that was posted earlier than the lead market maker's quote, and matching the incoming order with the at least one customer order. According to yet another aspect of the invention, the method may also have a market maker appointed in the option series in addition to the lead market maker. Wherein if the incoming order is from a specified order sending firm and is directed to and designates the appointed market maker and if the order sending firm does have permission to direct orders to the designated market maker, the designated market maker receives the same privileges as the lead market maker for the purpose of executing with the incoming order up to the computed allocation percentage amount, if the designated market maker has a quote at the NBBO. According to another aspect of the present invention, the market center may include a display order process and a working order process, wherein, after an incoming order is matched with the lead market maker quote, the method may process the incoming order in the display order process and the working order process. According to another aspect of the present invention, if the incoming order executes with all resident interest but still has quantity remaining to trade, then its price may need to be automatically adjusted to a less aggressive price if it cannot be posted at its user-specified limit price.

The order types described in this embodiment of the invention allow users to send orders at the most aggressive prices possible, relying on the order matching engine to cancel or reprice the orders if they are "too" executable. To prevent an order from being "too" executable, the order is generally checked to ensure that its user-specified price does not exceed a configurable percentage through the NBBO. Before an order is posted, its displayed price is capped, if necessary, at the most aggressive price allowed by the rules of its order type. Once posted, a capped order may be automatically repriced as the NBBO price changes.

According to another aspect of the present invention, the best bid and offer disseminated quotation from each away market center and the consolidated national best bid and offer ("NBBO") quotations are stored in a separate structure from the order book and the market maker quote book, and are evaluated and retrieved by a separate quote engine. Whereas the quote engine is able to see order prices in the order book whether they are displayed or not to the marketplace, it determines when an away market disseminated quotation price touches the price of any contra-side order. Wherein, if a disseminated best bid or offer quotation moves into the price of a previously touched order, the quote engine notifies the order matching engine. The order matching engine is then able to evaluate whether any posted reprice-and-ship inside limit order must be repriced less aggressively, and then attempts to execute the order further. Wherein, if a disseminated best bid or offer quotation moves away from the price of a previously touched order, the quote engine also notifies the order matching engine. The order matching engine is then able to evaluate whether any posted stand-your-ground inside limit order, sweep limit order, or intermarket sweep limit order can be repriced more aggressively, and then attempts to execute the order further. Wherein, the order matching engine is not notified of changes to the disseminated best bids and offers that do not affect the order book in this embodiment.

DESCRIPTION OF THE DRAWINGS

These and other features, aspects and advantages of the present invention will become better understood with regard to the following description, appended claims and accompanying drawings where:

FIG. 3 illustrates an order execution hierarchy of the equity options electronic order book of the present invention;

FIGS. 5A-5B are flow diagrams illustrating a process for receiving an incoming exchange-restricted sell order in an embodiment of the present invention;

FIGS. 10A-10B are flow diagrams illustrating a process for receiving an incoming stand-your-ground inside limit buy order in an embodiment of the present invention;

FIG. 20B is an exemplary designated market maker/order sending firm permissions table;

DETAILED DESCRIPTION

Figure 1:
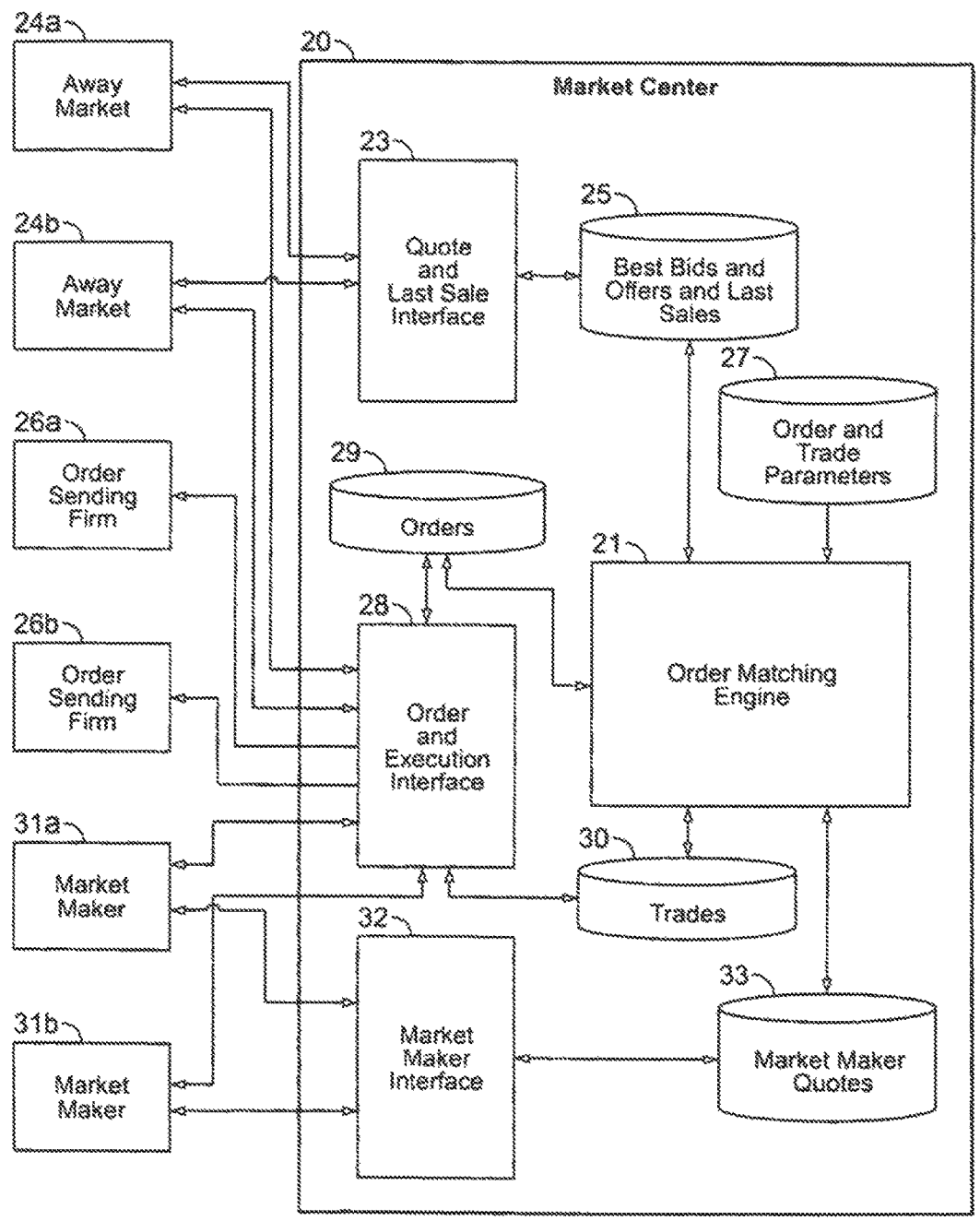
FIG. 1 is a block diagram illustrating the trading environment in which an embodiment of the present invention operates.

Referring to FIG. 1, a trading environment in which an embodiment of the system and method of the present invention operates is depicted. The examples discussed herein describe the use and application of the present invention in an equity options market center environment, but it should be understood that the present invention could be used in any type of financial instrument market center environment (e.g., equities, futures, bonds, etc.). This embodiment of the invention describes the use of multiply listed single-leg equity options, wherein contracts for a specified underlying security can be bought (if the option type is a call) or sold (if the option type is a put) at a specific strike price prior to a specific exercise date. The functionality described herein is generally applicable to all standard options products (including near-term options and LEAPs) in all underlying securities, including but not limited to exchange-listed stocks, Exchange-Traded Funds (ETFs), Holding Company Depositary Receipts (HOLDRs), American Depositary Receipts (ADRs), and commonly traded indices.

The trading environment of this embodiment includes a market center 20 which interacts with a number of other market centers 24 (i.e. away markets) and traders at order sending firms 26 and market makers 31. It should also be understood that the market center 20 referred to herein refers to a computing system having sufficient processing and memory capabilities and does not refer to a specific physical location. In fact, in certain embodiments, the computing system may be distributed over several physical locations. It should also be understood that any number of traders 26 or market makers 31 or away market centers 24 can interact with the market center 20. The market center 20 is the market center on which a specific trader 26 posts a specific order, and on which a specific market maker 31 posts a specific quote. The market center 20 includes an order matching engine 21, which validates, maintains, ranks, executes and/or routes all orders on the market center 20, and which executes marketable quotes on the market center 20. In this embodiment, the code for the order matching engine 21 is stored in the market center 20's memory.

The market center 20 may also include a quote and last sale interface 23 that interacts with the away market centers 24 to capture quote and last sale information. This information is stored to a best bids and offers and last sales data structure 25. This data structure 25 is where the market best bid and offer information is stored. This data structure 25 is also where the market trade reports (prints) are stored. The market center 20 may also include an order and trade parameters data structure 27. The order and trade parameters data structure 27 stores pre-defined trading parameters and rules that are used by the order matching engine 21 in matching orders and executing trades. The market center 20 may also include an order and execution interface 28 which interacts with the traders 26, the market makers 31, the away market centers 24 and the order matching engine 21 in the order execution process.

The market center 20 may also include an order information data structure 29 where order information is stored and a trade information data structure 30 where completed trade information is stored. The market center 20 may also include a market maker interface 32 that interacts with market makers 31 to capture market maker bids and offers in assigned issues. These bids and offers are depicted in a market maker quote structure 33 in this illustration.

Throughout the discussion herein, it should be understood that the details regarding the operating environment, data structures, and other technological elements surrounding the market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Figure 2:
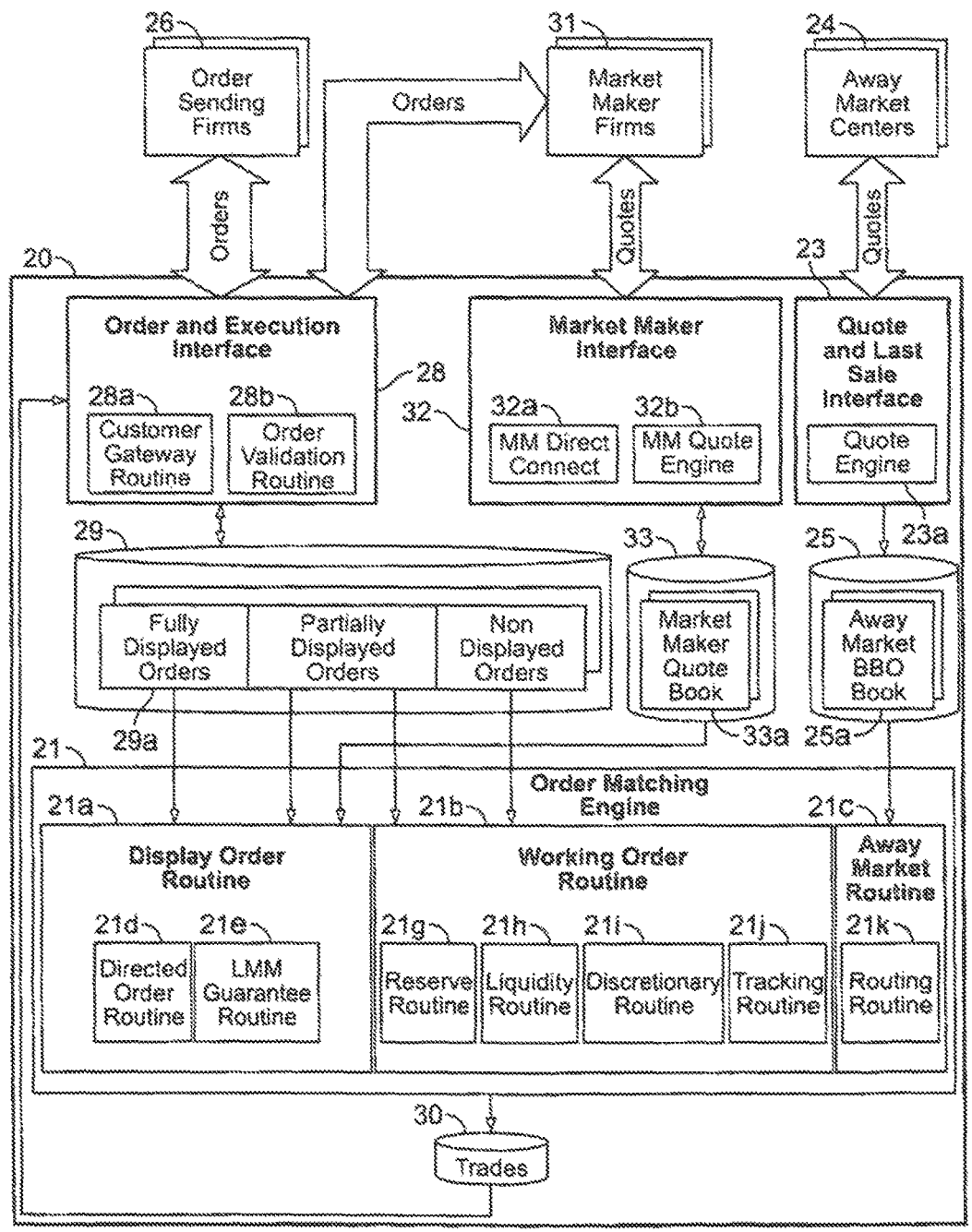
FIG. 2 is a block diagram illustrating an overview of the architecture involved in the equity options electronic order book of the present invention.

Referring now to FIG. 2, a trading environment in which orders and quotes are ranked and executed is depicted. Because the market center 20 disclosed in this embodiment is order-driven, which encourages orders and quotes to compete equally, the market center 20 is designed to allow users to send a very diverse and sophisticated body of order types. For example, with the disclosed market center 20, a user may, as described in detail below, use the sophisticated order types available to mask their trading intentions from the marketplace by using order types that do not display all or part of an order's size or price.

The market center 20 disclosed in this embodiment also ranks all resting orders in such a manner as to give preference to displayed trading interest over nondisplayed trading interest at the same price so that users are encouraged to send displayed limit orders at the best possible prices. The market center 20 disclosed in this embodiment can be used in a non-competing market maker environment, a competing market maker environment and in an environment that does not use market makers in some or all of the issues. In a preferred embodiment, described herein, the market center 20 has a non-competing market maker environment. The market center order books are largely flat and open based on price/time principles. As described below, lead market makers are guaranteed participation entitlements, but only when they are already on the NBBO in their assignments, which encourages tighter spreads and faster executions.

In the non-competing market maker embodiment, described herein, market maker quotes cannot be automatically or manually improved for the purpose of participating with a specific incoming order, nor can a market maker send a price-improving order for the purpose of intercepting a specific incoming order. In this embodiment, market makers do not see an incoming order at all. As a result, a user of this system that sends an order is able to trade anonymously without divulging his or her trading intentions. Another characteristic of this non-competing market maker embodiment, as described below, is that only the lead market maker (or alternatively, a specific, designated non-lead market maker who is temporarily granted lead market maker privileges in a directed order process) is entitled to guaranteed participation with an incoming order, and therefore complex market maker pro rata allocations, as used in prior systems, are not necessary in this embodiment.

Referring specifically to FIG. 2, in this embodiment, market makers 31 can send orders and quotes to the market center 20, and order sending firms 26 can send orders to the market center 20. Away market centers 24 also route orders to the market center 20 and receive routed orders from the market center 20. Such "linkage" processing, however, is known and is not described herein. The order and execution interface 28 includes a customer gateway routine 28a, which, when executed, initiates a process that determines whether and by what means a specific order sending firm 26 is eligible to send orders to the market center 20, and also includes an order validation routine 28b which, when executed, initiates a process that determines whether the specific order meets all the business requirements of the market center 20. If an order is determined to be valid, then the order and execution interface 28 releases the order to the order matching engine 21 for further processing. Marketable orders are executed immediately, whereas nonmarketable orders that can execute later are posted to an order book 29a on the order data structure 29. The order book 29a includes all active nonmarketable orders resident on the market center 20, including fully-displayed orders, partially-displayed order and nondisplayed orders.

As illustrated in FIG. 2, market makers 31 may send orders as well. If a market maker's order is determined to be valid, as with an order sending firm's order, then the order and execution interface 28 releases the order to the order matching engine 21 for further processing. As with order sending firm orders, marketable orders are executed immediately, whereas nonmarketable orders are posted to the same order book 29a as are orders from order sending firms 26.

The market maker interface 32 includes a market maker direct connect routine 32a, and also includes a market maker quote engine 32b, which, when executed, initiates a process that receives and analyzes market maker quotes. The quote and last sale interface 23 includes a quote engine 23a, which, when executed, initiates a process that receives and analyzes away market BBO quotes and receives and analyzes the consolidated NBBO quote.

In this embodiment, the order matching engine 21 includes a display order routine 21a, a working order routine 21b and an away market routine 21c. When executed, the display order routine 21a implements a process that maintains and ranks displayed orders. As indicated in FIG. 2, market maker quotes are integrated with the display order routine 21a. The working order routine 21b, when executed, implements a process that maintains and ranks working orders. Working orders are orders having a conditional or undisplayed price and/or size that is not disclosed to the marketplace, but is electronically accessible for matching, e.g., a discretionary order. Working orders are described in detail elsewhere. The order types of this invention are all considered to be fully-displayed orders, even if their limit prices are sometimes temporarily capped at or near the NBBO, because the orders may ultimately be displayed at their original user-specified prices when the NBBO moves to a price that allows this. In contrast, the discretionary price of a discretionary order is never displayed publicly, by definition.

The display order routine 21a receives and processes fully-displayed orders and partially-displayed orders. When presented with a marketable incoming order, the display order routine 21a ranks disseminated market maker quotes and resting displayed orders or portions thereof according to strict price/time priority. The display order routine 21a, in this embodiment, includes the following sub-routines: a directed order routine 21d and a lead market maker guarantee routine 21e. The directed order routine 21d is a routine that, when initiated, guarantees a specified percentage of an incoming directed order to a designated market maker after customer orders ranked ahead of the designated market maker's quote execute first. The lead market maker routine 21e is a routine that, when initiated, guarantees a specified percentage of an incoming non-directed order to a lead market maker after customer orders ranked ahead of the lead market maker's quote execute first.

The working order routine 21b receives and processes partially-displayed orders and nondisplayed orders. The working order routine 21b, in this embodiment, includes the following sub-routines: a reserve routine 21g, a liquidity routine 21h, a discretionary routine 21i and a tracking routine 21j. The reserve routine 21g is a routine that, when initiated, ranks and maintains reserve orders, which display a portion of the size to the marketplace but keep another undisplayed portion in reserve. The liquidity routine 21h is a routine that, when initiated, ranks and maintains passive liquidity orders, which are completely nondisclosed limit orders that grant price improvement to incoming orders. The discretionary routine 21i is a routine that, when initiated, ranks discretionary orders, which display a price to the marketplace but include a superior undisplayed price. The tracking routine 21j is a routine that, when initiated, ranks and maintains tracking liquidity orders, which are completely nondisclosed orders whose prices automatically track the NBBO and execute only if they can prevent an incoming order from routing.

As illustrated in FIG. 2, although market maker quotes are maintained in a separate market maker quote book 33a, they are retrieved and integrated with displayed orders and partially-displayed orders in the processes initiated when the display order routine 21a is activated ("Display Order Process"), which includes the directed order routine 21d and the lead market maker guarantee routine 21e, when the order matching engine 21 evaluates matching opportunities. As also illustrated in FIG. 2, although away market quotes are maintained in a separate away market BBO book 25a, they are retrieved and integrated with displayed orders, partially-displayed orders, nondisclosed orders and market maker quotes when the order matching engine 21 evaluates matching opportunities and routing opportunities.

FIG. 2 shows the relative rankings of various order execution routines initiated by the order matching engine 21. As described above, the order matching engine 21 has a display order routine 21a, a working order routine 21b, and an away market routine 21c. The sequence of the subroutines 21d, 21e and 21g through 21k generally correspond to the sequence in which the order matching engine 21, in this embodiment, attempts to process an incoming marketable order. The order matching engine 21 attempts to execute an incoming marketable order as fully as possible in a given routine before continuing to the next-highest ranking routine.

In this embodiment, upon receiving an incoming marketable order, the display order routine 21a is typically initiated first, which activates the Display Order Process. The Display Order Process initiates the directed order routine 21d if the incoming order is a directed order and initiates the lead market maker guarantee routine 21e if the incoming order is unable to execute in the directed order routine 21d. Any remaining quantity of the incoming order is released to the Display Order Process. After the Display Order Process has completed, if the incoming order still has quantity available to trade, then the working order routine 21b is initiated next. It attempts to execute the remainder of the incoming order in the reserve routine 21g first; in the liquidity routine 21h second; in the discretionary routine 21i third; and in the tracking routine 21j fourth. If the incoming order still has quantity remaining and is eligible to route off the market center 20, then the away market routine 21c is initiated next.

Referring now to FIG. 3, the sequence in which resting orders and quotes are ranked for execution in a preferred embodiment is shown in greater detail. In the example depicted in FIG. 3, there are three orders or quotes that have been ranked by each of the order execution routine processes, at two price levels: the NBBO, and one tick inferior to the NBBO. When the order matching engine 21 evaluates matching and pricing opportunities for a given issue, it retrieves the order book 29a, the market maker quote book 33a, and the away market BBO book 25a and momentarily combines them into a single ranked list of bids and a single ranked list of offers in local memory. All the bids (buy orders and bid quotations) are ranked on one side of the list, and all the offers (sell orders and offer quotations) are ranked on the opposite side of the list. The ranked list of bids combined with the ranked list of offers is referred to as the "virtual consolidated order and quote list." FIG. 3 illustrates one side of an exemplary virtual consolidated order and quote list for a given issue.

The order matching engine 21 ranks each side of the virtual consolidated order and quote list according to price/time priority principles, but with a preference for displayed orders and quotes over working orders at the same price. This method of ranking is referred to as "price/display/time priority" in this document to indicate that an order's display characteristics (i.e., displayed versus not displayed) trumps the time that an order is received. Simply put, at a given price level, a nondisplayed order has a lower priority than a displayed order that was received later. As also shown in FIG. 3, resident orders and quotes always have priority over away market quotes at the same price, regardless of the time received.

Each order execution routine is responsible for ranking a subset of the resting orders and/or quotes in the virtual consolidated order and quote list. Resting orders and quotes are generally ranked in the sequence shown in the example of FIG. 3. Beginning with the first column of FIG. 3, all market maker quotes (e.g., lead market maker quotes and non-lead market maker quotes) and all displayed orders (e.g., exchange-restricted orders, inside limit orders, sweep limit orders, intermarket orders and pegged orders) are consolidated together and ranked in strict price/time priority in the Display Order Process, regardless of the order type or quote type. The displayed portions of partially-displayed orders (for example, the displayed portion of a reserve order, and the displayed portion of a discretionary order) are also combined with the other fully-displayed order types and market maker quotes and ranked in strict price/time priority in the Display Order Process.

The process initiated by the directed order routine 21*d* ("Directed Order Process") and the process initiated by the lead market maker guarantee routine 21*e* ("LMM Guarantee Process") match a marketable incoming order against a subset of the resting displayed orders and market maker quotes that are combined and ranked in the Display Order Process. In this embodiment, all displayed customer orders that are ranked ahead of a lead market maker's quote are eligible to execute in the LMM Guarantee Process. Similarly, all displayed customer orders that are ranked ahead of a designated market maker's quote are eligible to execute in the Directed Order Process. Accordingly, the displayed portion of a customer reserve order is eligible to execute in the Directed Order Process or in the LMM Guarantee Process, but its nondisclosed reserve portion is not eligible. Similarly, the displayed price of a customer discretionary order is eligible to execute in the Directed Order Process or the LMM Guarantee Process, but its nondisclosed discretionary price is not eligible. If a marketable incoming order still has quantity available to trade after it has completed executing in the Directed Order Process or in the LMM Guarantee Process (or alternatively, if it is unable to execute in either process), then the order matching engine 21 attempts to execute the order in the Display Order Process next, i.e., in strict price/time priority, with no preference granted to customers or market makers.

Continuing to the second column, the process initiated by the reserve routine 21*g* ("Reserve Process") executes the reserve portions of resting orders only after all eligible orders and quotes at the same price have been executed in the Display Order Process. Reserve portions of orders are ranked in the Reserve Process according to the price/time priority assigned to their displayed portions in the Display Order Process.

Continuing to the third column, the process initiated by the liquidity routine 21*h* ("Liquidity Process") executes passive liquidity orders only after any eligible reserve portions at the same price have been executed in the Reserve Process. Passive liquidity orders are ranked in price/time priority in the Liquidity Process.

Continuing to the fourth column, the process initiated by the discretionary routine 21*i* ("Discretionary Process") executes discretionary orders only after any eligible passive liquidity orders at the same price have been executed in the Liquidity Process. Discretionary prices are ranked according to the price/time priority assigned to their displayed prices in the Display Order Process. It should be noted that an order executes using discretion in the Discretionary Process only if it cannot execute at its displayed price in the Display Order Process.

Continuing to the fifth column, the process initiated by the tracking routine 21*j* ("Tracking Process") executes tracking orders only after any eligible discretionary orders that can "step up" to the same price have been executed in the Discretionary Process, and the incoming order is about to route off the market center 20. Tracking liquidity orders are ranked in price/time priority in the Tracking Process.

Continuing to the last column, the process initiated by the routing routine 21*k* ("Routing Process") routes orders to eligible away markets if the order cannot execute at the best price on the market center 20.

After executing against all eligible orders and quotes at the NBBO in the sequence of their ranking (from 1 through 18 in this example), if an incoming order is allowed to execute at a price inferior to the NBBO, then it would continue to execute against all eligible orders (and quotes, if allowed) at the next-best price level, i.e., at one minimum price increment (tick) inferior to the NBBO, in the sequence of their ranking (from 19 through 30 in this example). As tracking orders can only execute at the NBBO by definition, they are not shown in FIG. 3 at one tick inferior to the NBBO. If an order type (e.g., an intermarket sweep order) is also allowed to contemporaneously route to away markets inferior to the NBBO, then the incoming order would continue to execute against the eligible away market quotes at one tick inferior to the NBBO, in the sequence of their ranking (from 31 through 33 in this example).

It should also be noted that certain working order types (e.g., discretionary orders and passive liquidity orders) can execute at prices between the spread (i.e., higher than the national best bid and lower than the national best offer) under certain conditions. A discretionary order is allowed to execute against an incoming order at a price between the spread only if the incoming order is not priced at or better than the opposite side of the NBBO. Accordingly, an incoming order never executes in the Discretionary Process prior to executing in the Directed Order Process or the LMM Guarantee Process. In contrast, in a preferred embodiment, a passive liquidity order whose price is superior to the NBBO is allowed to execute in the Liquidity Process with an incoming marketable order, granting price improvement to the incoming order, before the remaining quantity of the incoming order attempts to execute in the Directed Order Process or the LMM Guarantee Process. This is because price priority always trumps order execution routine priority in this embodiment. The rules regarding the execution of passive liquidity orders at prices between the spread is described and disclosed in co-pending and co-owned U.S. patent application Ser. No. 11/416,756, filed May 3, 2006, entitled "Passive Liquidity Order," which is incorporated by reference herein. It should be understood that this list of working orders is exemplary and that other embodiments of the invention may not utilize the working orders described above or may use differing combinations of them.

Detailed Descriptions and Examples of the Order Types

The following section describes each order type, and provides detailed descriptions and illustrations of the processing steps for each order type. The examples show a marketable incoming order that participates in the lead market maker guarantee process before executing with other orders in the order book, and routing to one or more away markets if allowed by the rules of the order type. It should be noted that the order and quote prices and volumes used in these examples is by way of illustration.

Exchange-Restricted Orders

A limit-priced order may be designated as "exchange-restricted" to indicate that it can only execute on the market center 20 and cannot be routed. For example, an exchange-restricted sell order that is priced at or through the NBB would execute in the sequence shown below and any remaining portion would be immediately canceled, repriced, or hidden, as described later:

| Bid Side of the Virtual Consolidated Order and Quote List | | | | |
|---|---|---|---|---|
| Price Point | Display Order Process | | Working Order Process | |
| Highest price (NBB) | 1. Displayed orders and quotes at the NBB | 2. Reserve order quantity at the NBB | 3. Passive Liquidity orders at the NBB | 4. Discretionary orders that can step up to the NBB |

An incoming exchange-restricted order that cannot execute when it is received is immediately posted. The nonmarketable exchange-restricted order is inserted in the internal order book 29a and ranked according to price/time priority in the Display Order Process. The order is also disseminated to the public order book. Posted customer exchange-restricted orders that are priced at the NBBO are eligible to execute against incoming marketable orders in the LMM Guarantee Process or the Directed Order Process, like any other displayed order type, if they have time priority over the eligible market maker quote.

An incoming exchange-restricted order that is marketable at the opposite side of the NBBO will participate in the LMM Guarantee Process if the lead market maker is quoting at the opposite side of the NBBO. Similarly, if the business rules of the market center 20 allow exchange-restricted orders to be directed to a specific market maker, then an incoming exchange-restricted order that is marketable at the opposite side of the NBBO will participate in the Directed Order Process if the designated market maker is quoting at the opposite side of the NBBO.

Once an incoming exchange-restricted order executes all resident interest at the NBBO, then the process must determine how to handle any excess quantity. If the exchange-restricted order would lock or cross the NBBO if it were to be posted, then in this embodiment, the order must either be canceled or repriced, depending on the business rules of the market center 20. If the order should be repriced, then the process changes its price to one tick inferior to the NBBO before posting the order. Although an exchange-restricted order cannot proactively lock or cross the market, once posted it will "stand its ground," i.e., will neither route nor reprice, if another market center 24 should lock or cross it.

In a different embodiment, if an exchange-restricted order would lock or cross the NBBO if it were to be posted, then the order is automatically pegged at a tick inferior to the NBBO, and continues to reprice more aggressively as the NBBO changes. This order type is referred to as a "Tick Back-and-Post" Order. Once the order is displayed at its original specified price, it ceases pegging and is never repriced again. The rules regarding the execution of Tick Back-and-Post orders are described and disclosed in co-pending and co-owned U.S. patent application Ser. No. 11/122,689, filed May 5, 2005, entitled "Method and System for Maintaining An Order on a Selected Market Center," which is incorporated by reference herein. An incoming marketable Tick Back-and-Post exchange-restricted order implemented in this embodiment is eligible to participate in the LMM Guarantee Process or the Directed Order Process. Similarly, a posted Tick Back-and-Post exchange-restricted order is eligible to participate in the LMM Guarantee Process or the Directed Order Process if it is a customer order and is currently displayed at the NBBO price.

In a different embodiment, if an exchange-restricted order would lock or cross the NBBO if it were to be posted, then the order is automatically hidden from the marketplace. This order type is referred to as a "Hide-or-Post" order. Hide-or-Post orders can trade through the NBBO by a specified price increment if allowed by marketplace rules. While hidden, the order retains the same price/time priority as if it were disclosed, executing in the Display Order Process with incoming marketable orders. The hidden order is disclosed to the marketplace when the NBBO moves to a price where posting the hidden order would not cause it to lock or cross the market. The rules regarding the execution of Hide-or-Post orders are described and disclosed in co-pending and co-owned U.S. patent application Ser. No. 11/122,679, filed May 5, 2005, entitled "Method and System for Maintaining An Order on a Selected Market Center," which is incorporated by reference herein. An incoming marketable Hide-or-Post exchange-restricted order implemented in this embodiment is eligible to participate in the LMM Guarantee Process or the Directed Order Process. Similarly, a posted Hide-or-Post exchange-restricted order is eligible to participate in the LMM Guarantee Process or the Directed Order Process if it is a customer order and is currently displayed at the NBBO price. If the Hide-or-Post exchange-restricted order is hidden and its price is superior to the NBBO, then it is eligible to execute ahead of the LMM Guarantee Process or the Directed Order Process, regardless of whether the order is a customer order or not, because it has price priority.

Incoming Exchange-Restricted Buy Order Received Process

Figure 4A:
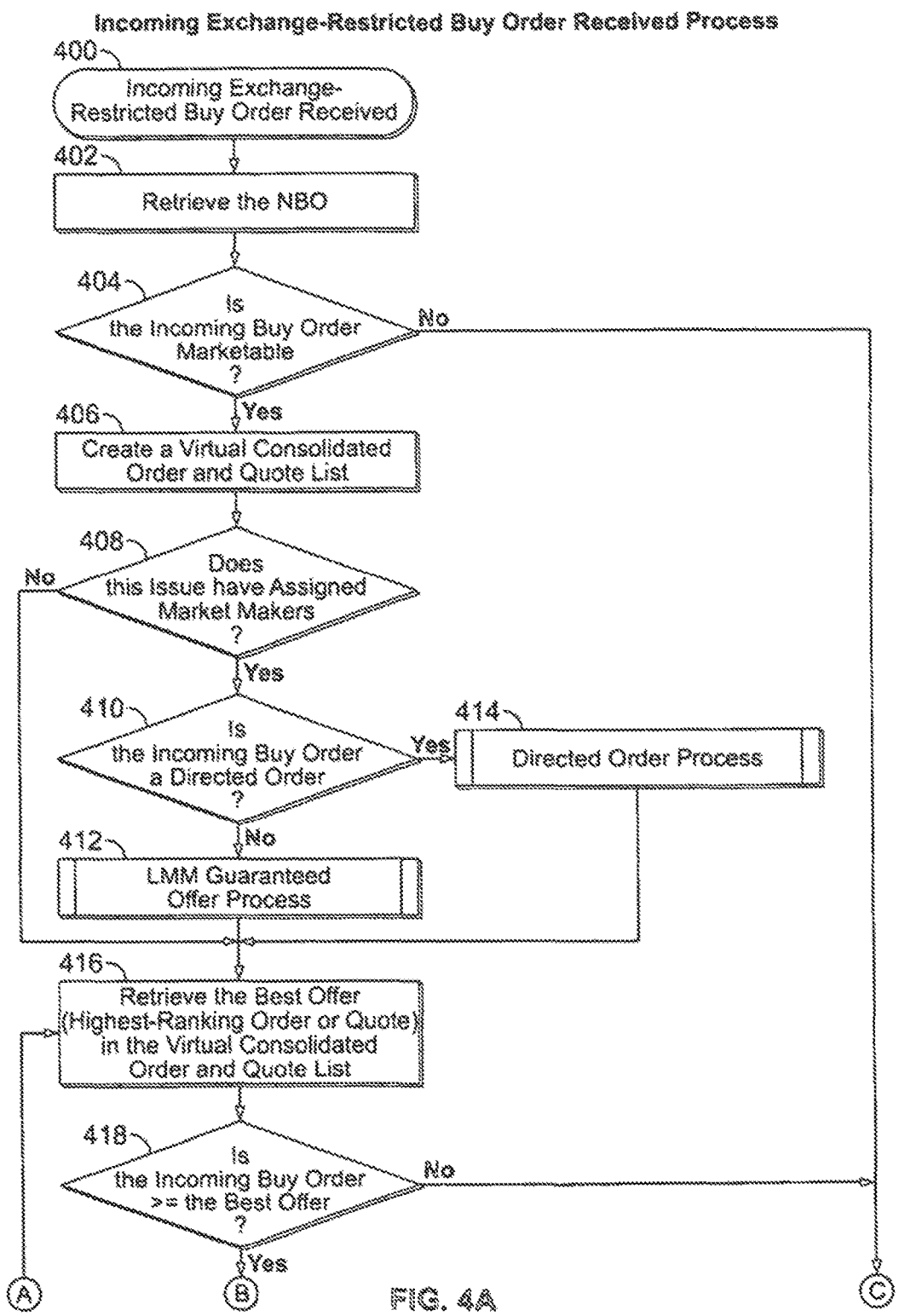
FIGS. 4A-4B are flow diagrams illustrating a process for receiving an incoming exchange-restricted buy order in an embodiment of the present invention.
Figure 4B:
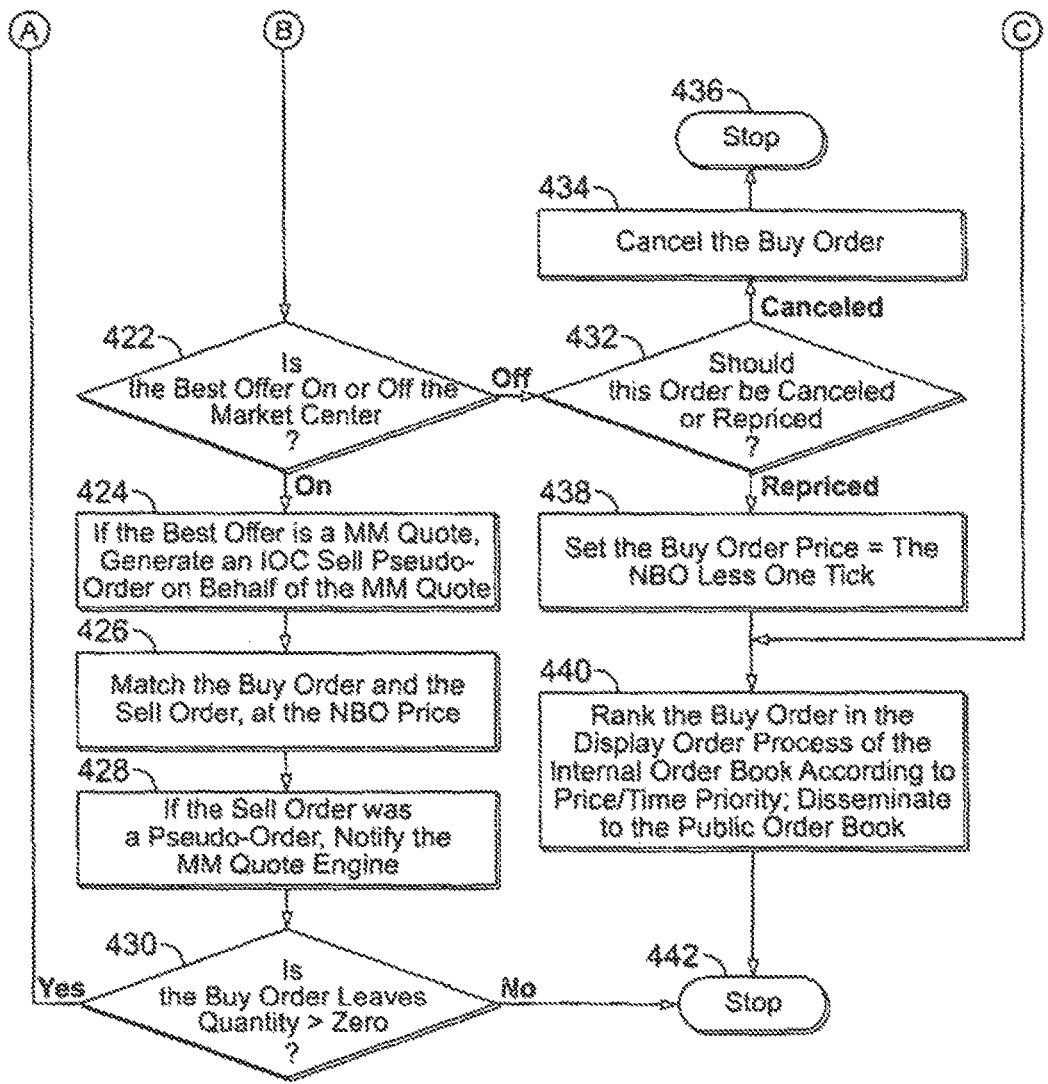

Referring now to FIGS. 4A-4B, the process is illustrated where the order matching engine 21 receives an incoming exchange-restricted buy order. As an exchange-restricted order cannot be routed, any excess quantity that cannot execute on the market center 20 cannot lock or cross the NBBO. Accordingly, in this embodiment, the excess quantity must either be repriced or canceled, depending on the business rules of the market center 20. It should be noted that the repricing of an exchange-restricted order in this embodiment is a permanent repricing, i.e., once the order is repriced, it is not automatically adjusted as the NBO price changes, unlike other order types described in this embodiment.

In step 402, the process retrieves the NBO, and in step 404, the process determines if the incoming exchange-restricted buy order is marketable. If the incoming exchange-restricted buy order is marketable, then the process continues to step 406, where it creates a virtual consolidated order and quote list for the option series by combining the away market BBO book 25a, the market maker quote book 33a, and the internal order book 29a, and ranking the orders and quotes according to price/display/time priority, but with a preference for resident trading interest over away market quotes at the same price. The process continues to step 408, where it checks if the option series has any assigned market makers. If it does, then the process continues to step 410, where it checks if the incoming exchange-restricted buy order is a directed order or not. If the incoming exchange-restricted buy order is a directed order, then the process continues to step 414 where the "Directed Order Process" is initiated in step 2000 in FIG. 20A. If, however, the incoming exchange-restricted buy order is not a directed order, then the process proceeds to step 412 where the "LMM Guaranteed Offer Process" is initiated instead in step 1900 in FIG. 19.

Regardless of whether the incoming exchange-restricted buy order executes in the Directed Order Process, in the LMM Guaranteed Offer Process, or in neither process (if the applicable market maker is not quoting at the NBO and is therefore ineligible for a guaranteed entitlement, or else if the issue does not have any assigned market makers), if the incoming exchange-restricted buy order still has quantity available to trade, then the process continues to step 416, where it retrieves the best offer in the virtual consolidated order and quote list, i.e., the sell order, market maker quote, or disseminated away market quote with the highest ranking. In step 418, the process checks if the incoming exchange-restricted buy order is still marketable (by way of explanation, if it partially executed in the Directed Order Process or the LMM Guaranteed Offer Process then it is possible that it is no longer marketable if the quotes and orders at the NBO were exhausted).

If at step 418 the process determines that the incoming exchange-restricted buy order is still marketable, then it continues to step 422, where it checks if the retrieved best offer is on or off the market center 20. If the retrieved best offer is on the market center 20, then the process continues to step 424, where if the retrieved best offer is a market maker quote, the process automatically generates an IOC sell pseudo-order on behalf of the underlying market maker quote. The process continues to step 426, where it matches the incoming exchange-restricted buy order against the retrieved sell order or the generated sell pseudo-order, at the NBO price. If the matched sell order is a pseudo-order, then in step 428, the process notifies the market maker quote engine 32*b* of the quantity that was executed so that the market maker quote engine 32*b* can decrement the underlying market maker quote.

The process continues to step 430, where it checks if the incoming exchange-restricted buy order still has quantity available to trade. If it does not, then the process continues to step 442, where it terminates as indicated. If, however, the incoming exchange-restricted buy order does still have remaining quantity, then the process returns to step 416, where it retrieves the next-best offer in the virtual consolidated order and quote list and continues to step 418, where it checks if the incoming exchange-restricted buy order is still marketable. The process continues to execute the incoming exchange-restricted buy order against all resident trading interest at the NBO as described above, until the incoming exchange-restricted buy order is depleted, or else until the retrieved best offer is an away market quote, as described next.

Returning to step 422, if the retrieved best offer is an away market quote, then the incoming exchange-restricted buy order can execute no further, as it can neither route nor trade through the away market's quote. As the order type can never be routed by definition, the incoming exchange-restricted buy order is not allowed to lock or cross the NBO either. The process continues to step 432, where it checks if the business rules of the market center 20 specify that exchange-restricted orders should be canceled or repriced. If the order should be canceled, then the process continues to step 434, where it cancels the incoming exchange-restricted buy order and terminates in step 436 as indicated.

Returning to step 432, if, however, the business rules specify that exchange-restricted orders should be repriced instead, then the process continues to step 438, where the process subtracts one minimum price increment from the NBO and reprices the incoming exchange-restricted buy order at the "ticked back" price. The process continues to step 440, where it ranks the remaining quantity of the incoming exchange-restricted buy order in the Display Order Process of the internal order book 29*a* according to the price/time priority of its "ticked back" price, and disseminates the order to the public order book. The process then terminates in step 442 as indicated. In this embodiment, the "ticked back" exchange-restricted buy order is never automatically repriced again, regardless of how the NBO price changes.

Returning to step 418, if the incoming exchange-restricted buy order is no longer marketable, then the process continues to step 440, where it ranks the remaining quantity of the order in the Display Order Process of the internal order book 29*a* according to price/time priority, and disseminates the order to the public order book. As the order is not marketable, it can be posted at its original price without locking or crossing the market. The process then terminates in step 442 as indicated.

Returning to step 404, if the incoming exchange-restricted buy order was never marketable, then the process continues to step 440 and 442 as described above, posting the order at its original price.

Incoming Exchange-Restricted Sell Order Received Process

Figure 5B:
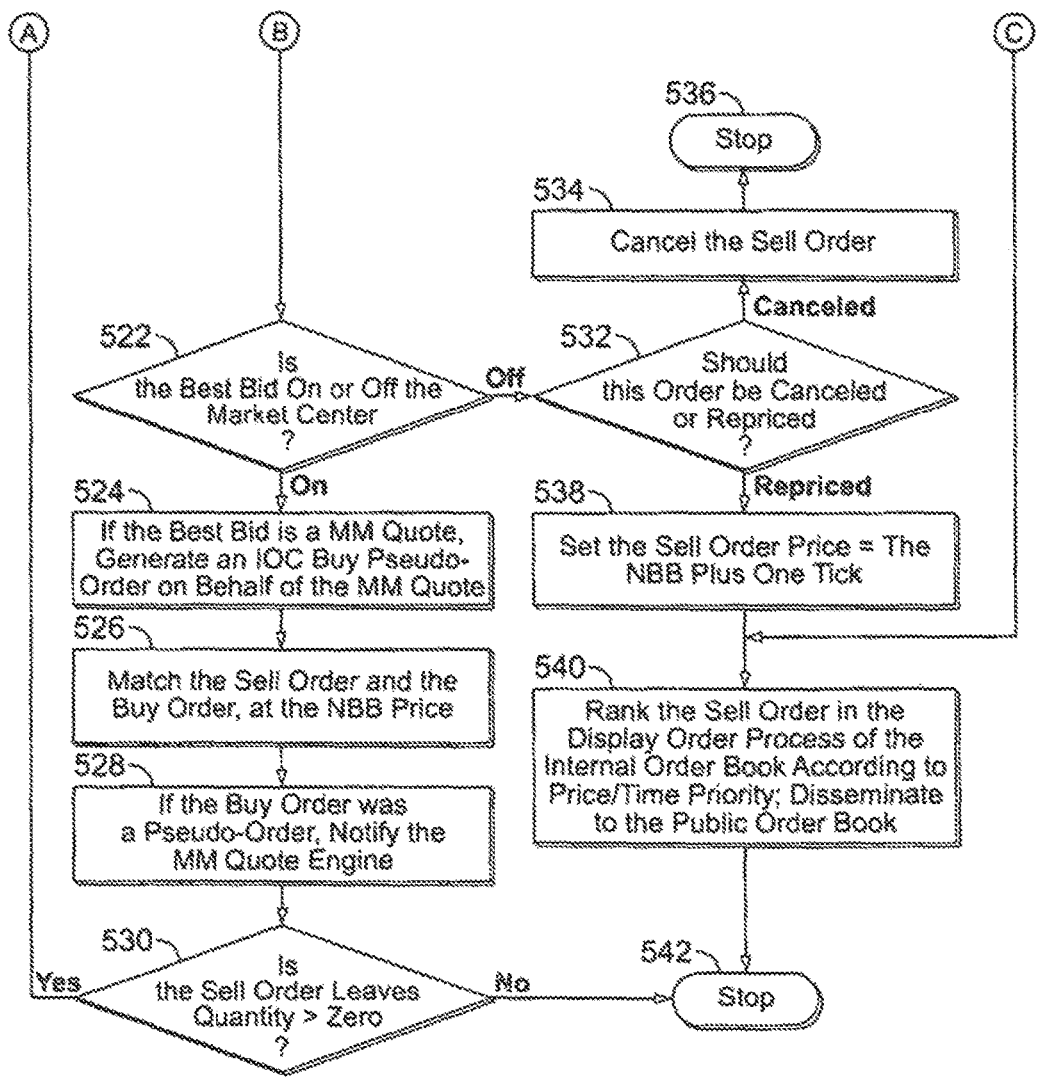

Referring now to FIGS. 5A-5B, the process is illustrated where the order matching engine 21 receives an incoming exchange-restricted sell order. This routine is very similar to the process described above in FIGS. 4A-4B for receiving an incoming exchange-restricted buy order.

In step 502, the process retrieves the NBB, and in step 504, the process determines if the incoming exchange-restricted sell order is marketable. If the incoming exchange-restricted sell order is marketable, then the process continues to step 506, where it creates a virtual consolidated order and quote list for the option series. The process continues to step 508, where it checks if the option series has any assigned market makers. If it does, then the process continues to step 510, where it checks if the incoming exchange-restricted sell order is a directed order or not. If the incoming exchange-restricted sell order is a directed order, then the process continues to step 514 where the "Directed Order Process" is initiated in step 2000 in FIG. 20A. If, however, the incoming exchange-restricted sell order is not a directed order, then the process proceeds to step 512 where the "LMM Guaranteed Bid Process" is initiated instead in step 1800 in FIG. 18.

Regardless of whether the incoming exchange-restricted sell order executes in the Directed Order Process, in the LMM Guaranteed Bid Process, or in neither process (if the applicable market maker is not quoting at the NBB and is therefore ineligible for a guaranteed entitlement, or else if the issue does not have any assigned market makers), if the incoming exchange-restricted sell order still has quantity available to trade, then the process continues to step 516, where it retrieves the best bid in the virtual consolidated order and quote list, i.e., the buy order, market maker quote, or disseminated away market quote with the highest ranking. In step 518, the process checks if the incoming exchange-restricted sell order is still marketable (by way of explanation, if it partially executed in the Directed Order Process or the LMM Guaranteed Bid Process then it is possible that it is no longer marketable if the quotes and orders at the NBB were exhausted).

If at step 518 the process determines that the incoming exchange-restricted sell order is still marketable, then it continues to step 522, where it checks if the retrieved best bid is on or off the market center 20. If the retrieved best bid is on the market center 20, then the process continues to step 524, where if the retrieved best bid is a market maker quote, the process automatically generates an IOC buy pseudo-order on behalf of the underlying market maker quote. The process continues to step 526, where it matches the incoming exchange-restricted sell order against the retrieved buy order or the generated buy pseudo-order, at the NBB price. If the matched buy order is a pseudo-order, then in step 528, the process notifies the market maker quote engine 32b of the quantity that was executed so that the market maker quote engine 32b can decrement the underlying market maker quote.

The process continues to step 530, where it checks if the incoming exchange-restricted sell order still has quantity available to trade. If it does not, then the process continues to step 542, where it terminates as indicated. If, however, the incoming exchange-restricted sell order does still have remaining quantity, then the process returns to step 516, where it retrieves the next-best bid in the virtual consolidated order and quote list and continues to step 518, where it checks if the incoming exchange-restricted sell order is still marketable. The process continues to execute the incoming exchange-restricted sell order against all resident trading interest at the NBB as described above, until the incoming exchange-restricted sell order is depleted, or else until the retrieved best bid is an away market quote, as described next.

Returning to step 522, if the retrieved best bid is an away market quote, then the incoming exchange-restricted sell order can execute no further, as it can neither route nor trade through the away market's quote. As the order type can never be routed by definition, the incoming exchange-restricted sell order is not allowed to lock or cross the NBB either. The process continues to step 532, where it checks if the business rules of the market center 20 specify that exchange-restricted orders should be canceled or repriced. If the order should be canceled, then the process continues to step 534, where it cancels the incoming exchange-restricted sell order and terminates in step 536 as indicated.

Returning to step 532, if, however, the business rules specify that exchange-restricted orders should be repriced instead, then the process continues to step 538, where the process adds one minimum price increment to the NBB and reprices the incoming exchange-restricted sell order at the "ticked back" price. The process continues to step 540, where it ranks the remaining quantity of the incoming exchange-restricted sell order in the Display Order Process of the internal order book 29a according to the price/time priority of its "ticked back" price, and disseminates the order to the public order book. The process then terminates in step 542 as indicated. In this embodiment, the "ticked back" exchange-restricted sell order is never automatically repriced again, regardless of how the NBB price changes.

Returning to step 518, if the incoming exchange-restricted sell order is no longer marketable, then the process continues to step 540, where it ranks the remaining quantity of the order in the Display Order Process of the internal order book 29a according to price/time priority, and disseminates the order to the public order book. As the order is not marketable, it can be posted at its original price without locking or crossing the market. The process then terminates in step 542 as indicated.

Returning to step 504, if the incoming exchange-restricted sell order was never marketable, then the process continues to step 540 and 542 as described above, posting the order at its original price.

Exchange-Restricted Order Trading Example

In this example, the issue has an assigned lead market maker (LMM) that is quoting at the NBO when a marketable incoming exchange-restricted buy order is received. The exchange-restricted buy order executes in the LMM Guaranteed Offer Process and the Display Order Process before the remainder of the order is repriced at one tick inferior to the NBO and posted to the books.

The NBBO is 2.50 to 2.60 (70×1.50).
The away market BBO book 25a looks like this:

| Bids | | Offers | |
|---|---|---|---|
| Away Market C: | Bid 30 @ 2.50 | Away Market A: | Offer 50 @ 2.60 |
| Away Market B: | Bid 40 @ 2.45 | Away Market B: | Offer 40 @ 2.60 |
| Away Market A: | Bid 50 @ 2.40 | Away Market C: | Offer 30 @ 2.65 |
| Away Market D: | Bid 20 @ 2.40 | Away Market D: | Offer 20 @ 2.70 |

The market maker quote book 33a looks like this:

| Bids | | Offers | |
|---|---|---|---|
| MM2: | Bid 30 @ 2.50 | LMM: | Offer 40 @ 2.60 |
| LMM: | Bid 40 @ 2.45 | MM2: | Offer 30 @ 2.70 |

The internal order book 29a looks like this. Order D is on behalf of a customer, whereas Order E is not:

| Bids | | Offers | |
|---|---|---|---|
| Order A: | Buy 10 @ 2.50 | Order D: | Sell 10 @ 2.60 |
| Order B: | Buy 10 @ 2.40 | Order E: | Sell 10 @ 2.60 |
| Order C: | Buy 10 @ 2.35 | Order F: | Sell 10 @ 2.65 |

The market center BBO is 2.50 to 2.60 (40×60)
The public order book looks like this:

| Bids | Offers |
|---|---|
| 40 @ 2.50 | 60 @ 2.60 |
| 40 @ 2.45 | 10 @ 2.65 |
| 10 @ 2.40 | 30 @ 2.70 |
| 10 @ 2.35 | |

Incoming Marketable Exchange-Restricted Buy Order is Received

In step 400, the order matching engine 21 receives the following order:

Order G: Buy 150 @ 2.60, Exchange-Restricted

In step 402, the process retrieves the NBO (2.60). In step 404, the process checks if incoming Buy Order G is marketable, i.e., is priced at or better than the NBO. As it is, the process continues to step 406, where it creates a virtual consolidated order and quote list. In this example, Sell Orders D and E were received before the LMM Offer was quoted.

The virtual consolidated order and quote list looks like this:

| Bids | | Offers | |
|---|---|---|---|
| MM2: | Bid 30 @ 2.50 | Order D: | Sell 10 @ 2.60 |
| Order A: | Buy 10 @ 2.50 | Order E: | Sell 10 @ 2.60 |
| Away Market C: | Bid 30 @ 2.50 | LMM: | Offer 40 @ 2.60 |
| LMM: | Bid 40 @ 2.45 | Away Market A: | Offer 50 @ 2.60 |
| Away Market B: | Bid 40 @ 2.45 | Away Market B: | Offer 40 @ 2.60 |
| Order B: | Buy 10 @ 2.40 | Order F: | Sell 10 @ 2.65 |
| Away Market A: | Bid 50 @ 2.40 | Away Market C: | Offer 30 @ 2.65 |
| Away Market D: | Bid 20 @ 2.40 | MM2: | Offer 30 @ 2.70 |
| Order C: | Buy 10 @ 2.35 | Away Market D: | Offer 20 @ 2.70 |

The process continues to step 408, where it checks if this issue has any assigned market makers. As it does, the process continues to step 410, where it checks if incoming Buy Order G is a directed order or not. As it is not a directed order, the process continues to step 412, where it initiates the "LMM Guaranteed Offer Process," and proceeds to step 1900 in FIG. 19.

LMM Guarantee Process is in Effect for this Issue

In step 1902, the process retrieves the LMM Offer (40 @ 2.60). In step 1904, it checks if the LMM Offer is at the NBO (2.60). As it is, the lead market maker is entitled to guaranteed participation with incoming Buy Order G, after any superior displayed customer orders are executed first. The process continues to step 1908, where it checks if incoming Buy Order G's order size (150) is greater than two contracts. As it is, the process continues to step 1914.

Incoming Exchange-Restricted Buy Order Matches the Displayed Customer Sell Order with Time Priority Over the LMM Offer In step 1914, the process checks if there are any customer sell orders displayed at the NBO, and finds posted Sell Order D. The process continues to step 1916, where it stores the timestamp on the LMM Offer in the parameter "LMMOfferTimestamp." In step 1918, the process retrieves the earliest displayed customer sell order at the NBO, Sell Order D, and in step 1920, the process compares the timestamp of posted Sell Order D to the LMMOfferTimestamp. As posted Sell Order D was received earlier than the LMM Offer, the process continues to step 1922, where it matches 10 contracts of incoming Buy Order G with posted Sell Order D, completely depleting posted Sell Order D and removing it from the books.

The process continues to step 1924, where it checks if incoming Buy Order G still has quantity available to trade. As it still has 140 contracts remaining, the process continues to step 1928, where it checks if there are any additional customer sell orders at the NBO. As there are none (Sell Order E is not on behalf of a customer), the process continues to step 1932.

Incoming Exchange-Restricted Buy Order Matches the LMM Offer

In step 1932, the process retrieves the LMMGuaranteedPercent parameter, which is configured to 40% in this example. In step 1934, the process derives the LMMGuaranteedAllocation (56 contracts) by multiplying the LMMGuaranteedPercent (40%) by the remaining portion of incoming Buy Order G (140 contracts). The LMMGuaranteedAllocation is the maximum quantity of contracts that can execute in the LMM Guarantee Process.

In step 1938, the process matches 40 contracts of incoming Buy Order G against the LMM Offer, the lesser of the LMMGuaranteedAllocation (56 contracts) and the LMM Offer size (40 contracts), at the NBO price of 2.60. It does this by generating an IOC pseudo-order to Sell 40 @ 2.60 on behalf of the LMM Offer, and executing incoming Buy Order G against the sell pseudo-order. The LMM Offer at 2.60 is completely depleted, and is removed from the virtual consolidated order and quote list. The process notifies the market maker quote engine 32*b* to decrement the LMM Offer by the 40 contracts executed. The LMM Guaranteed Offer Process has completed.

The virtual consolidated order and quote list now looks like this:

| Bids | | Offers | |
|---|---|---|---|
| MM2: | Bid 30 @ 2.50 | Order E: | Sell 10 @ 2.60 |
| Order A: | Buy 10 @ 2.50 | Away Market A: | Offer 50 @ 2.60 |
| Away Market C: | Bid 30 @ 2.50 | Away Market B: | Offer 40 @ 2.60 |
| LMM: | Bid 40 @ 2.45 | Order F: | Sell 10 @ 2.65 |
| Away Market B: | Bid 40 @ 2.45 | Away Market C: | Offer 30 @ 2.65 |
| Order B: | Buy 10 @ 2.40 | MM2: | Offer 30 @ 2.70 |
| Away Market A: | Bid 50 @ 2.40 | Away Market D: | Offer 20 @ 2.70 |
| Away Market D: | Bid 20 @ 2.40 | | |
| Order C: | Buy 10 @ 2.35 | | |

The market maker quote engine 32*b* decrements the LMM Offer by the 40 contracts executed, completely depleting it. The market maker quote book 33*a* now looks like this (the lead market maker will manually replenish its offer, but this is not illustrated to simplify the example):

| Bids | | Offers | |
|---|---|---|---|
| MM2: | Bid 30 @ 2.50 | MM2: | Offer 30 @ 2.70 |
| LMM: | Bid 40 @ 2.45 | | |

The internal order book 29*a* now looks like this:

| Bids | | Offers | |
|---|---|---|---|
| Order A: | Buy 10 @ 2.50 | Order E: | Sell 10 @ 2.60 |
| Order B: | Buy 10 @ 2.40 | Order F: | Sell 10 @ 2.65 |
| Order C: | Buy 10 @ 2.35 | | |

The market center BBO is now 2.50 to 2.60 (40×10)
The public order book looks like this:

| Bids | Offers |
|---|---|
| 40 @ 2.50 | 10 @ 2.60 ← |
| 40 @ 2.45 | 10 @ 2.65 |
| 10 @ 2.40 | 30 @ 2.70 |
| 10 @ 2.35 | |

The process continues to step 1942, where it checks if incoming Buy Order G still has any quantity available to trade. As it still has 100 contracts remaining, the process continues to step 1946, where it returns to the step where the routine was originally invoked, back to step 412 of FIG. 4A.

Incoming Exchange-Restricted Buy Order Matches the Non-Customer Sell Order

The process continues to step 416, where it retrieves the best offer in the virtual consolidated order and quote list, which is posted Sell Order E. In step 418, the process checks if incoming Buy Order G's price (2.60) is greater than or equal to posted Sell Order E's price (2.60). As the prices are equal, the process continues to step 422, where it checks if posted Sell Order E is on or off the market center 20. As it is a resident book order, the process bypasses step 424 and continues to step 426, where it matches 10 contracts of incoming Buy Order G against posted Sell Order E, at the NBO price of 2.60. Posted Sell Order E is completely depleted and is removed from the books.

The NBBO is now 2.50 to 2.60 (70×90)

The virtual consolidated order and quote list now looks like this:

| | Bids | | Offers |
|---|---|---|---|
| MM2: | Bid 30 @ 2.50 | Away Market A: | Offer 50 @ 2.60 |
| Order A: | Buy 10 @ 2.50 | Away Market B: | Offer 40 @ 2.60 |
| Away Market C: | Bid 30 @ 2.50 | Order F: | Sell 10 @ 2.65 |
| LMM: | Bid 40 @ 2.45 | Away Market C: | Offer 30 @ 2.65 |
| Away Market B: | Bid 40 @ 2.45 | MM2: | Offer 30 @ 2.70 |
| Order B: | Buy 10 @ 2.40 | Away Market D: | Offer 20 @ 2.70 |
| Away Market A: | Bid 50 @ 2.40 | | |
| Away Market D: | Bid 20 @ 2.40 | | |
| Order C: | Buy 10 @ 2.35 | | |

The internal order book 29a now looks like this:

| | Bids | | Offers |
|---|---|---|---|
| Order A: | Buy 10 @ 2.50 | Order F: | Sell 10 @ 2.65 |
| Order B: | Buy 10 @ 2.40 | | |
| Order C: | Buy 10 @ 2.35 | | |

The market center BBO is now 2.50 to 2.65 (40×10)
The public order book looks like this:

| Bids | Offers |
|---|---|
| 40 @ 2.50 | 10 @ 2.65 ← |
| 40 @ 2.45 | 30 @ 2.70 |
| 10 @ 2.40 | |
| 10 @ 2.35 | |

The process bypasses step 428 and continues to step 430, where it checks if incoming Buy Order G still has any quantity available to trade. As it still has 90 contracts remaining, the process returns to step 416 and retrieves the best offer in the virtual consolidated order and quote list, which is Away Market A's offer. In step 418, the process checks if incoming Buy Order G's price (2.60) is greater than or equal to Away Market A's offer (2.60). As the prices are equal, the process continues to step 422, where it checks if Away Market A's offer is on or off the market center 20. As it is an away market quote, incoming Buy Order G can execute no further, as it cannot route.
Incoming Exchange-Restricted Buy Order can Execute No Further, and is Repriced to Prevent it From Locking the NBO The process continues to step 432, where it checks if incoming Buy Order G should be canceled or repriced, as it is not allowed to lock the market. In this example, the business rules of the market center 20 determine that it should be repriced. In this example, the minimum price increment (tick) for this issue is 0.05. Accordingly, the process continues to step 438, where it reprices incoming Buy Order G at 2.55, one tick less than the NBO (2.60). Its original user-specified limit price of 2.60 is retained for audit purposes, but the order is displayed at the price of 2.55 from this point forward. In step 440, the process ranks Buy Order G in the Display Order Process of the internal order book 29a according to its new "ticked back" price of 2.55, and disseminates Buy Order G to the public order book. The process then terminates in step 442 as indicated.

The NBBO is now 2.55 to 2.60 (90×90)

The virtual consolidated order and quote list now looks like this:

| | Bids | | Offers |
|---|---|---|---|
| Order G: | Buy 90 @ 2.55 ← | Away Market A: | Offer 50 @ 2.60 |
| MM2: | Bid 30 @ 2.50 | Away Market B: | Offer 40 @ 2.60 |
| Order A: | Buy 10 @ 2.50 | Order F: | Sell 10 @ 2.65 |
| Away Market C: | Bid 30 @ 2.50 | Away Market C: | Offer 30 @ 2.65 |
| LMM: | Bid 40 @ 2.45 | MM2: | Offer 30 @ 2.70 |
| Away Market B: | Bid 40 @ 2.45 | Away Market D: | Offer 20 @ 2.70 |
| Order B: | Buy 10 @ 2.40 | | |
| Away Market A: | Bid 50 @ 2.40 | | |
| Away Market D: | Bid 20 @ 2.40 | | |
| Order C: | Buy 10 @ 2.35 | | |

The internal order book 29a now looks like this:

| | Bids | | Offers |
|---|---|---|---|
| Order G: | Buy 90 @ 2.55 ← | Order F: | Sell 10 @ 2.65 |
| Order A: | Buy 10 @ 2.50 | | |
| Order B: | Buy 10 @ 2.40 | | |
| Order C: | Buy 10 @ 2.35 | | |

The market center BBO is now 2.55 to 2.65 (90×10)
The public order book looks like this:

| Bids | Offers |
|---|---|
| 90 @ 2.55 ← | 10 @ 2.65 |
| 40 @ 2.50 | 30 @ 2.70 |
| 40 @ 2.45 | |
| 10 @ 2.40 | |
| 10 @ 2.35 | |

The virtual consolidated order and quote list is deleted from local memory.

NOW Orders

A NOW order executes like an IOC order, but can also route off the market center 20 to away markets 24 that have been designated as "NOW-eligible" according to the business rules implemented in the Routing Process. Only fully-electronic "fast execution" away markets qualify for NOW order routing. A NOW-eligible away market must be quoting at the NBBO at the time an incoming NOW order is received, as the order must be eligible for immediate execution. For example, a NOW sell order that is priced at or better than the NBB would execute in the sequence shown below:

| Bid Side of the Virtual Consolidated Order and Quote List | | | | | | |
|---|---|---|---|---|---|---|
| Price Point | Display Order Process | | | Working Order Process | | Routing Process |
| Highest Price (NBB) | 1. Displayed orders and quotes | 2. Reserve order quantity | 3. Passive Liquidity Orders | 4. Discretionary Orders that can step up to the NBB | 5. Tracking Liquidity Orders | 6. NOW-eligible Away Market Bids |

An incoming NOW order that cannot execute when it is received is immediately canceled. An incoming NOW order that is executable at the NBBO will participate in the LMM Guarantee Process if the lead market maker is quoting at the NBBO. Similarly, if the business rules of the market center 20 allow NOW orders to be directed to a specific market maker, then an incoming NOW order will participate in the Directed Order Process if the designated market maker is quoting at the NBBO.

An incoming NOW order routes to NOW-eligible away markets in the sequence of their ranking, which is determined by the Routing Process. A higher-ranking away market that is not NOW-eligible is bypassed in favor of a lower-ranking away market that is NOW-eligible. If none of the away markets at the NBBO are NOW-eligible, then the incoming NOW order will not route, and any remaining quantity is immediately canceled. Any quantity of a NOW order that is routed to a NOW-eligible away market and is subsequently declined, or times out, is also immediately canceled instead of being re-routed.

Incoming NOW Buy Order Received Process

Figure 6A:
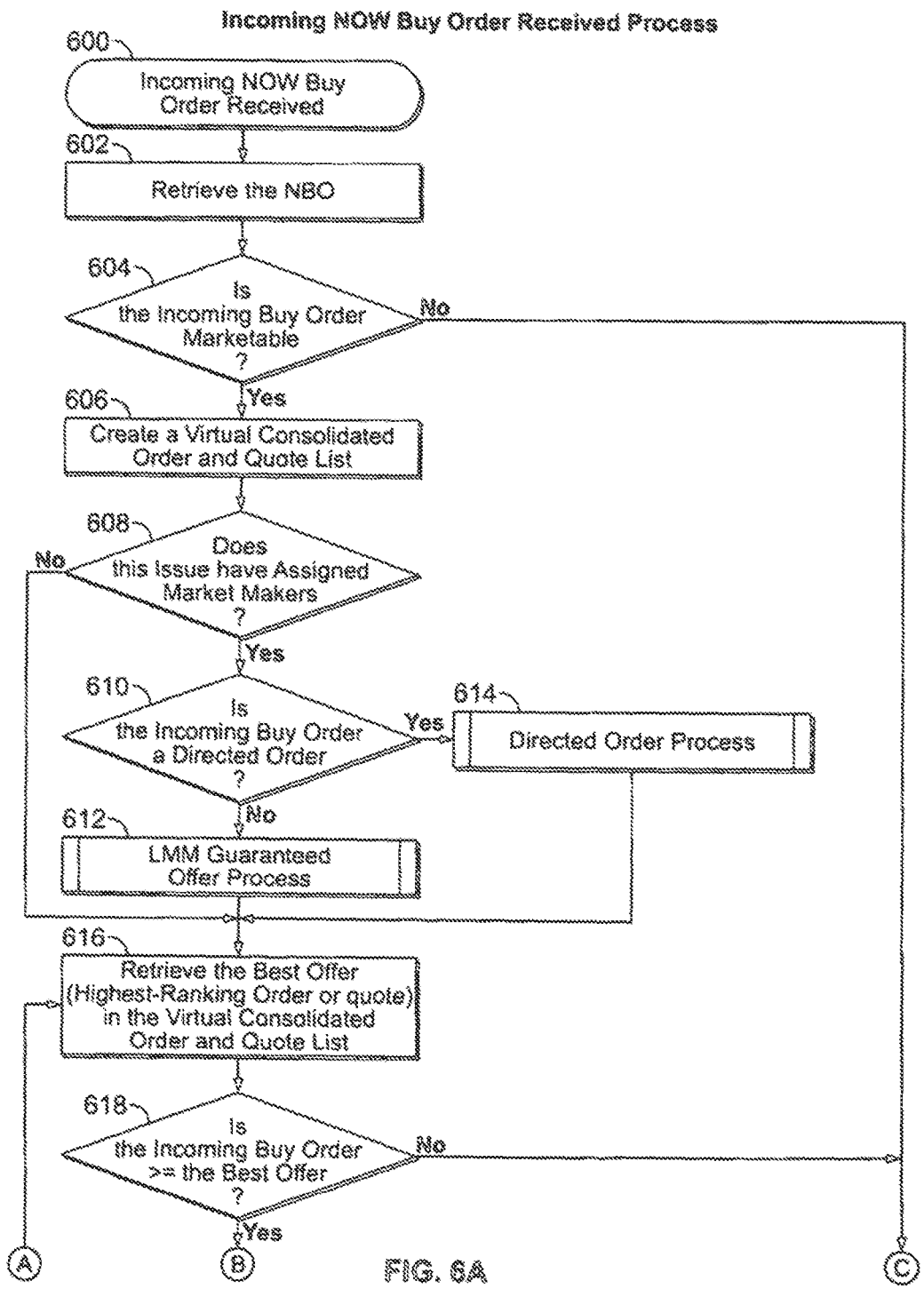
FIGS. 6A-6B are flow diagrams illustrating a process for receiving an incoming NOW buy order in an embodiment of the present invention.
Figure 6B:
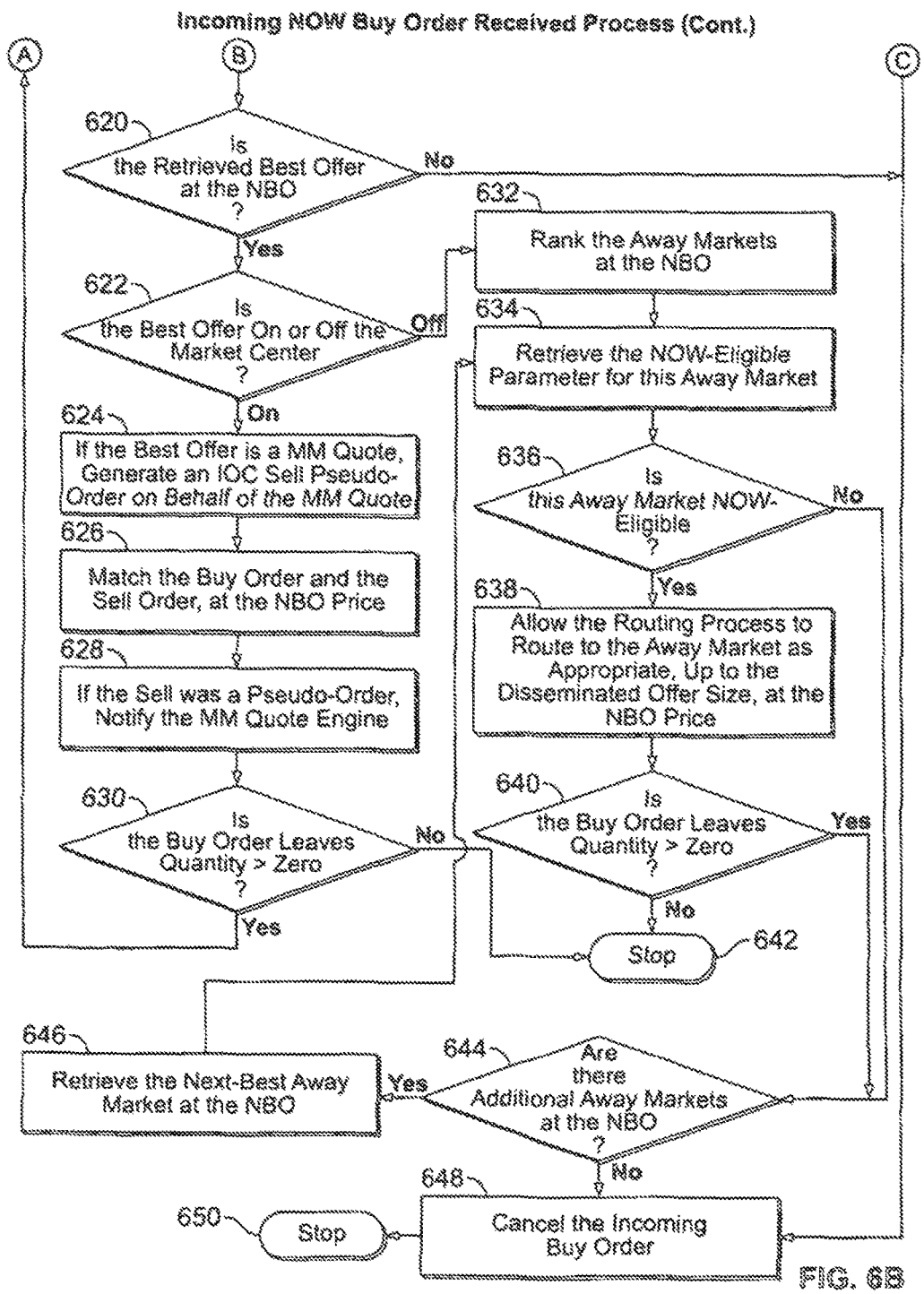

Referring now to FIGS. 6A-6B, the process is illustrated where the order matching engine 21 receives an incoming NOW buy order. In this embodiment, a NOW order can route off the market center 20 only to NOW-eligible away markets 24 quoting at the NBBO.

In step 602, the process retrieves the NBO, and in step 604, the process determines if the incoming NOW buy order is marketable. If the process determines that the incoming NOW buy order is marketable, then the process continues to step 606, where it creates a virtual consolidated order and quote list for the option series.

The process continues to step 608, where it checks if the option series has any assigned market makers. If it does, then the process continues to step 610, where it checks if the incoming NOW buy order is a directed order or not. If the incoming NOW buy order is a directed order, then the process continues to step 614 where the "Directed Order Process" is initiated in step 2000 in FIG. 20A. If, however, the incoming NOW buy order is not a directed order, then the process proceeds to step 612 where the "LMM Guaranteed Offer Process" is initiated instead in step 1900 in FIG. 19.

Regardless of whether the incoming NOW buy order executes in the Directed Order Process, in the LMM Guaranteed Offer Process, or in neither process (if the applicable market maker is not quoting at the NBO and is therefore ineligible for a guaranteed entitlement, or else if the issue does not have any assigned market makers), if the incoming NOW buy order still has quantity available to trade, then the process continues to step 616, where it retrieves the best offer in the virtual consolidated order and quote list, i.e., the sell order, market maker quote, or disseminated away market quote with the highest ranking. In step 618, the process checks if the incoming NOW buy order is still marketable (by way of explanation, it is possible that it is no longer marketable if the quotes and orders at the NBO were exhausted).

At step 618, if the process determines that the incoming NOW buy order is still marketable, then it continues to step 620, where it checks if the retrieved best offer is at the NBO. If the retrieved best offer is at the NBO, then the process continues to step 622, where it checks if the retrieved best offer is on or off the market center 20. If the retrieved best offer is on the market center 20, then the process continues to step 624, where if the retrieved best offer is a market maker quote, the process automatically generates an IOC sell pseudo-order on behalf of the underlying market maker quote. The process continues to step 626, where it matches the incoming NOW buy order against the retrieved sell order or pseudo-order, at the NBO price. If the matched sell order is a pseudo-order, then in step 628, the process notifies the market maker quote engine 32b of the quantity that was executed so that the market maker quote engine 32b can decrement the underlying market maker quote.

The process continues to step 630, where it checks if the incoming NOW buy order still has quantity available to trade. If it does not, then the process continues to step 642, where it terminates as indicated. If, however, the incoming NOW buy order does still have remaining quantity, then the process returns to step 616, where it retrieves the next-best offer in the virtual consolidated order and quote list and continues to step 618, where it checks if the incoming NOW buy order is still marketable. The process continues to execute the incoming NOW buy order against all resident trading interest at the NBO as described above, until the incoming NOW buy order is depleted, or else until the retrieved best offer is an away market quote, as described next.

Returning to step 622, if the retrieved best offer is an away market quote, then in step 632, the Routing Process ranks all the away markets at the NBO according to the business rules of the market center 20. In step 634, the Routing Process retrieves the "NOW-eligible" parameter for the highest-ranking away market. In step 636, it checks if the highest-ranking away market is NOW-eligible or not. If the highest-ranking away market is eligible to receive orders routed on behalf of underlying NOW orders, then in step 638, the Routing Process routes to the away market as appropriate, up to its disseminated offer size, at the NBO price. After routing to the highest-ranking away market, the process continues to step 640, where it checks if the incoming NOW buy order still has quantity available to trade. If the order is depleted, then the process terminates in step 642 as indicated.

If, however, the incoming NOW buy order still has remaining quantity, then it continues to step 644, where it checks if there are any additional away markets offering at the NBO. If there are, then the process continues to step 646, where it retrieves the next-highest ranking away market at the NBO. The process then returns to step 634, where it retrieves the NOW-eligible parameter for the next-highest ranking away market. If this away market is also eligible to receive NOW orders, then the process routes to it as described in step 638 above. The process continues until the incoming NOW buy order is depleted, or else until there are no additional NOW-eligible away markets at the NBO.

Returning to step 636, if the away market being evaluated is not eligible to receive NOW orders, then the process continues to step 644, where it checks if there are any additional away markets offering at the NBO.

Returning to step 644, if there are no additional away markets at the NBO, then the process continues to step 648, where it cancels the remaining quantity of the incoming NOW buy order. The process then terminates in step 650 as indicated.

Returning to step 604, if the incoming NOW buy order is not marketable when it is first received, then the process continues to step 648, where it cancels the incoming NOW buy order and terminates in step 650.

Returning to step 618, if the incoming NOW buy order's price is no longer greater than or equal to the retrieved best offer in the virtual consolidated order and quote list, then the process also continues to step 648, where it cancels the remainder of the incoming NOW buy order and terminates in step 650.

Returning to step 620, if the retrieved best offer in the virtual consolidated order and quote list is not at the NBO, then the process also continues to step 648, where it cancels the remainder of the incoming NOW buy order and terminates in step 650.

Incoming NOW Sell Order Received Process

Figure 7A:
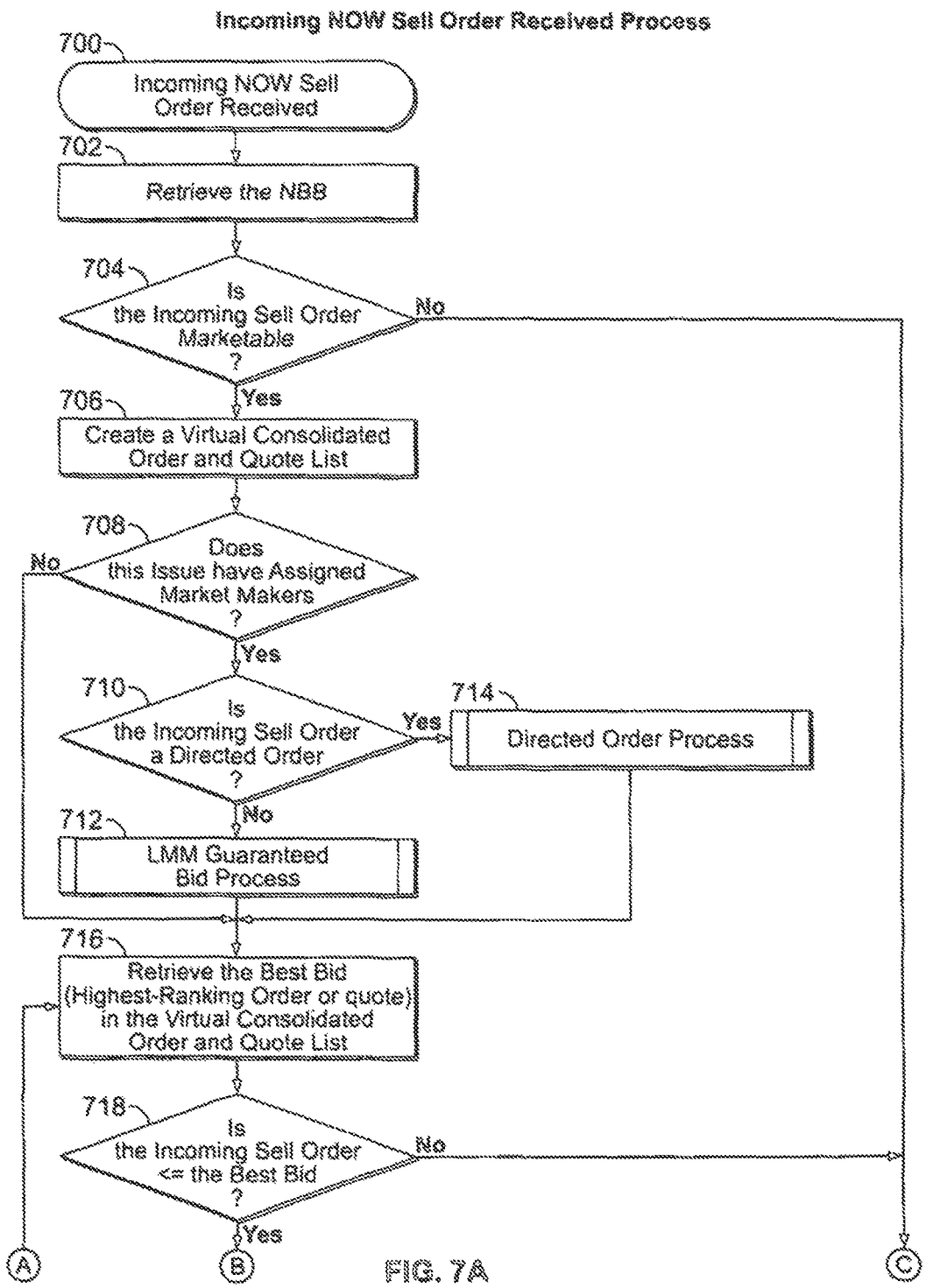
FIGS. 7A-7B are flow diagrams illustrating a process for receiving an incoming NOW sell order in an embodiment of the present invention.
Figure 7B:
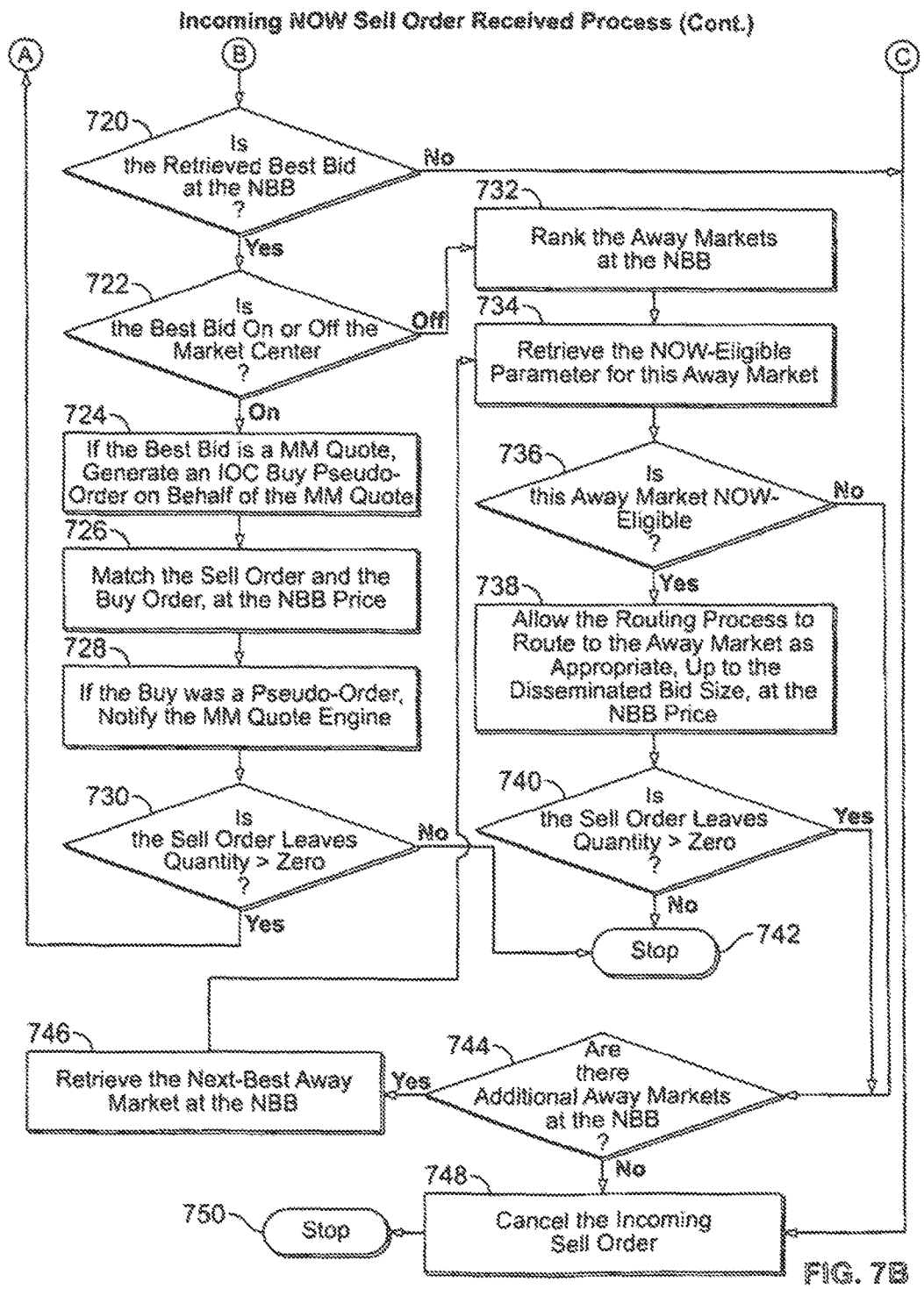

Referring now to FIGS. 7A-7B, the process is illustrated where the order matching engine 21 receives an incoming NOW sell order. This routine is very similar to the process described above in FIGS. 6A-6B for receiving an incoming NOW buy order.

In step 702, the process retrieves the NBB, and in step 704, the process determines if the incoming NOW sell order is marketable. If the process determines that the incoming NOW sell order is marketable, then the process continues to step 706, where it creates a virtual consolidated order and quote list for the option series.

The process continues to step 708, where it checks if the option series has any assigned market makers. If it does, then the process continues to step 710, where it checks if the incoming NOW sell order is a directed order or not. If the incoming NOW sell order is a directed order, then the process continues to step 714 where the "Directed Order Process" is initiated in step 2000 in FIG. 20A. If, however, the incoming NOW sell order is not a directed order, then the process proceeds to step 712 where the "LMM Guaranteed Bid Process" is initiated instead in step 1800 in FIG. 18.

Regardless of whether the incoming NOW sell order executes in the Directed Order Process, in the LMM Guaranteed Bid Process, or in neither process (if the applicable market maker is not quoting at the NBB and is therefore ineligible for a guaranteed entitlement, or else if the issue does not have any assigned market makers), if the incoming NOW sell order still has quantity available to trade, then the process continues to step 716, where it retrieves the best bid in the virtual consolidated order and quote list, i.e., the buy order, market maker quote, or disseminated away market quote with the highest ranking. In step 718, the process checks if the incoming NOW sell order is still marketable (by way of explanation, it is possible that it is no longer marketable if the quotes and orders at the NBB were exhausted).

At step 718, if the process determines that the incoming NOW sell order is still marketable, then it continues to step 720, where it checks if the retrieved best bid is at the NBB. If the retrieved best bid is at the NBB, then the process continues to step 722, where it checks if the retrieved best bid is on or off the market center 20. If the retrieved best bid is on the market center 20, then the process continues to step 724, where if the retrieved best bid is a market maker quote, the process automatically generates an IOC buy pseudo-order on behalf of the underlying market maker quote. The process continues to step 726, where it matches the incoming NOW sell order against the retrieved buy order or pseudo-order, at the NBB price. If the matched buy order is a pseudo-order, then in step 728, the process notifies the market maker quote engine 32*b* of the quantity that was executed so that the market maker quote engine 32*b* can decrement the underlying market maker quote.

The process continues to step 730, where it checks if the incoming NOW sell order still has quantity available to trade. If it does not, then the process continues to step 742, where it terminates as indicated. If, however, the incoming NOW sell order does still have remaining quantity, then the process returns to step 716, where it retrieves the next-best bid in the virtual consolidated order and quote list and continues to step 718, where it checks if the incoming NOW sell order is still marketable. The process continues to execute the incoming NOW sell order against all resident trading interest at the NBB as described above, until the incoming NOW sell order is depleted, or else until the retrieved best bid is an away market quote, as described next.

Returning to step 722, if the retrieved best bid is an away market quote, then in step 732, the Routing Process ranks all the away markets at the NBB according to the business rules of the market center 20. In step 734, the Routing Process retrieves the "NOW-eligible" parameter for the highest-ranking away market. In step 736, it checks if the highest-ranking away market is NOW-eligible or not. If the highest-ranking away market is eligible to receive orders routed on behalf of underlying NOW orders, then in step 738, the Routing Process routes to the away market as appropriate, up to its disseminated bid size, at the NBB price. After routing to the highest-ranking away market, the process continues to step 740, where it checks if the incoming NOW sell order still has quantity available to trade. If the order is depleted, then the process terminates in step 742 as indicated.

If, however, the incoming NOW sell order still has remaining quantity, then it continues to step 744, where it checks if there are any additional away markets bidding at the NBB. If there are, then the process continues to step 746, where it retrieves the next-highest ranking away market at the NBB. The process then returns to step 734, where it retrieves the NOW-eligible parameter for the next-highest ranking away market. If this away market is also eligible to receive NOW orders, then the process routes to it as described in step 738 above. The process continues until the incoming NOW sell order is depleted, or else until there are no additional NOW-eligible away markets at the NBB.

Returning to step 736, if the away market being evaluated is not eligible to receive NOW orders, then the process continues to step 744, where it checks if there are any additional away markets bidding at the NBB.

Returning to step 744, if there are no additional away markets at the NBB, then the process continues to step 748, where it cancels the remaining quantity of the incoming NOW sell order. The process then terminates in step 750 as indicated.

Returning to step 704, if the incoming NOW sell order is not marketable when it is first received, then the process continues to step 748, where it cancels the incoming NOW sell order and terminates in step 750.

Returning to step 718, if the incoming NOW sell order's price is no longer less than or equal to the retrieved best bid in the virtual consolidated order and quote list, then the process also continues to step 748, where it cancels the remainder of the incoming NOW sell order and terminates in step 750.

Returning to step 720, if the retrieved best bid in the virtual consolidated order and quote list is not at the NBB, then the process also continues to step 748, where it cancels the remainder of the incoming NOW sell order and terminates in step 750.

NOW Order Trading Example

In this example, the issue has an assigned lead market maker (LMM) that is quoting at the NBO when a marketable incoming NOW buy order is received. The NOW buy order executes in the LMM Guaranteed Offer Process and the Display Order Process and then routes to an away market at the NBO that is eligible to receive NOW orders. A higher-ranking away market at the NBO that is not eligible to receive NOW orders is bypassed. After routing to the NOW-eligible away market, the remaining quantity of the NOW order is canceled immediately. The NOW-eligible away market fills a portion of the routed order and declines a portion. The declined portion is canceled immediately.

The NBBO is 2.50 to 2.60 (70×150).

The away market BBO book 25a looks like this:

| | Bids | | Offers |
|---|---|---|---|
| Away Market C: | Bid 30 @ 2.50 | Away Market A: | Offer 50 @ 2.60 |
| Away Market B: | Bid 40 @ 2.45 | Away Market B: | Offer 40 @ 2.60 |
| Away Market A: | Bid 50 @ 2.40 | Away Market C: | Offer 30 @ 2.65 |
| Away Market D: | Bid 20 @ 2.40 | Away Market D: | Offer 20 @ 2.70 |

The market maker quote book 33a looks like this:

| | Bids | | Offers |
|---|---|---|---|
| MM2: | Bid 30 @ 2.50 | LMM: | Offer 40 @ 2.60 |
| LMM: | Bid 40 @ 2.45 | MM2: | Offer 30 @ 2.70 |

The internal order book 29a looks like this. Order D is on behalf of a customer, whereas Order E is not:

| | Bids | | Offers |
|---|---|---|---|
| Order A: | Buy 10 @ 2.50 | Order D: | Sell 10 @ 2.60 |
| Order B: | Buy 10 @ 2.40 | Order E: | Sell 10 @ 2.60 |
| Order C: | Buy 10 @ 2.35 | Order F: | Sell 10 @ 2.65 |

The market center BBO is 2.50 to 2.60 (40×60)

The public order book looks like this:

| Bids | Offers |
|---|---|
| 40 @ 2.50 | 60 @ 2.60 |
| 40 @ 2.45 | 10 @ 2.65 |
| 10 @ 2.40 | 30 @ 2.70 |
| 10 @ 2.35 | |

Incoming Marketable NOW Buy Order is Received

In step 600, the order matching engine 21 receives the following order:
Order L: Buy 150 @ 2.65, NOW
In step 602, the process retrieves the NBO (2.60). In step 604, the process checks if incoming Buy Order L is marketable, i.e., is priced at or better than the NBO. As it is, the process continues to step 606, where it combines the away market BBO book 25a, the market maker quote book 33a, and the internal order book 29a together in a virtual consolidated order and quote list. In this example, Sell Orders D and E were received before the LMM Offer was quoted.

The virtual consolidated order and quote list looks like this:

| | Bids | | Offers |
|---|---|---|---|
| MM2: | Bid 30 @ 2.50 | Order D: | Sell 10 @ 2.60 |
| Order A: | Buy 10 @ 2.50 | Order E: | Sell 10 @ 2.60 |
| Away Market C: | Bid 30 @ 2.50 | LMM: | Offer 40 @ 2.60 |
| LMM: | Bid 40 @ 2.45 | Away Market A: | Offer 50 @ 2.60 |
| Away Market B: | Bid 40 @ 2.45 | Away Market B: | Offer 40 @ 2.60 |
| Order B: | Buy 10 @ 2.40 | Order F: | Sell 10 @ 2.65 |
| Away Market A: | Bid 50 @ 2.40 | Away Market C: | Offer 30 @ 2.65 |
| Away Market D: | Bid 20 @ 2.40 | MM2: | Offer 30 @ 2.70 |
| Order C: | Buy 10 @ 2.35 | Away Market D: | Offer 20 @ 2.70 |

The process continues to step 608, where it checks if this issue has any assigned market makers. As it does, the process continues to step 610, where it checks if incoming Buy Order L is a directed order or not. As it is not a directed order, the process continues to step 612, where it initiates the "LMM Guaranteed Offer Process," and proceeds to step 1900 in FIG. 19.

LMM Guarantee Process is in Effect for this Issue

In step 1902, the process retrieves the LMM Offer (40 @ 2.60). In step 1904, it checks if the LMM Offer is at the NBO (2.60). As it is, the lead market maker is entitled to guaranteed participation with incoming Buy Order L, after any superior displayed customer orders are executed first. The process continues to step 1908, where it checks if incoming Buy Order L's order size (150) is greater than two contracts. As it is, the process continues to step 1914.

Incoming NOW Buy Order Matches the Displayed Customer Sell Order with Time Priority Over the LMM Offer In step 1914, the process checks if there are any customer sell orders displayed at the NBO, and finds posted Sell Order D. The process continues to step 1916, where it stores the timestamp on the LMM Offer in the parameter "LMMOfferTimestamp." In step 1918, the process retrieves the earliest displayed customer sell order at the NBO, Sell Order D, and in step 1920, the process compares the timestamp of posted Sell Order D to the LMMOfferTimestamp. As posted Sell Order D was received earlier than the LMM Offer, the process continues to step 1922, where it matches 10 contracts of incoming Buy Order L with posted Sell Order D, completely depleting posted Sell Order D and removing it from the books.

The process continues to step 1924, where it checks if incoming Buy Order L still has quantity available to trade.

As it still has 140 contracts remaining, the process continues to step 1928, where it checks if there are any additional customer sell orders at the NBO. As there are none (Sell Order E is not on behalf of a customer), the process continues to step 1932.

Incoming NOW Buy Order Matches the LMM Offer

In step 1932, the process retrieves the LMMGuaranteedPercent parameter, which is configured to 40% in this example. In step 1934, the process derives the LMMGuaranteedAllocation (56 contracts) by multiplying the LMMGuaranteedPercent (40%) by the remaining portion of incoming Buy Order L (140 contracts). The LMMGuaranteedAllocation is the maximum quantity of contracts that can execute in the LMM Guarantee Process.

In step 1938, the process matches 40 contracts of incoming Buy Order L against the LMM Offer, the lesser of the LMMGuaranteedAllocation (56 contracts) and the LMM Offer size (40 contracts), at the NBO price of 2.60. It does this by generating an IOC pseudo-order to Sell 40 @ 2.60 on behalf of the LMM Offer, and executing incoming Buy Order L against the sell pseudo-order. The LMM Offer at 2.60 is completely depleted, and is removed from the virtual consolidated order and quote list. The process notifies the market maker quote engine 32b to decrement the LMM Offer by the 40 contracts executed. The LMM Guaranteed Offer Process has completed.

The virtual consolidated order and quote list now looks like this:

| Bids | | Offers | |
|---|---|---|---|
| MM2: | Bid 30 @ 2.50 | Order E: | Sell 10 @ 2.60 |
| Order A: | Buy 10 @ 2.50 | Away Market A: | Offer 50 @ 2.60 |
| Away Market C: | Bid 30 @ 2.50 | Away Market B: | Offer 40 @ 2.60 |
| LMM: | Bid 40 @ 2.45 | Order F: | Sell 10 @ 2.65 |
| Away Market B: | Bid 40 @ 2.45 | Away Market C: | Offer 30 @ 2.65 |
| Order B: | Buy 10 @ 2.40 | MM2: | Offer 30 @ 2.70 |
| Away Market A: | Bid 50 @ 2.40 | Away Market D: | Offer 20 @ 2.70 |
| Away Market D: | Bid 20 @ 2.40 | | |
| Order C: | Buy 10 @ 2.35 | | |

The market maker quote engine 32b decrements the LMM Offer by the 40 contracts executed, completely depleting it. The market maker quote book 33a now looks like this (the LMM will manually replenish its offer, but this is not illustrated to simplify the example):

| Bids | | Offers | |
|---|---|---|---|
| MM2: | Bid 30 @ 2.50 | MM2: | Offer 30 @ 2.70 |
| LMM: | Bid 40 @ 2.45 | | |

The internal order book 29a now looks like this:

| Bids | | Offers | |
|---|---|---|---|
| Order A: | Buy 10 @ 2.50 | Order E: | Sell 10 @ 2.60 |
| Order B: | Buy 10 @ 2.40 | Order F: | Sell 10 @ 2.65 |
| Order C: | Buy 10 @ 2.35 | | |

The market center BBO is now 2.50 to 2.60 (40×10)
The public order book looks like this:

| Bids | Offers |
|---|---|
| 40 @ 2.50 | 10 @ 2.60 ← |
| 40 @ 2.45 | 10 @ 2.65 |

-continued

| Bids | Offers |
|---|---|
| 10 @ 2.40 | 30 @ 2.70 |
| 10 @ 2.35 | |

The process continues to step 1942, where it checks if incoming Buy Order L still has any quantity available to trade. As it still has 100 contracts remaining, the process continues to step 1946, where it returns to the step where the routine was originally invoked, back to step 612 of FIG. 6A.

Incoming NOW Buy Order Matches the Non-Customer Sell Order

The process continues to step 616, where it retrieves the best offer in the virtual consolidated order and quote list, which is posted Sell Order E. In step 618, the process checks if incoming Buy Order L's price (2.65) is greater than or equal to posted Sell Order E's price (2.60). As incoming Buy Order L's price is higher, the process continues to step 620, where it checks if posted Sell Order E's price (2.60) is at the NBO (2.60). As Sell Order E is at the NBO, the process continues to step 622, where it checks if posted Sell Order E is on or off the market center 20. As it is a resident book order, the process bypasses step 624 and continues to step 626, where it matches 10 contracts of incoming Buy Order L against posted Sell Order E, at the NBO price of 2.60. Posted Sell Order E is completely depleted and is removed from the books.

The NBBO is now 2.50 to 2.60 (70×90)

The virtual consolidated order and quote list now looks like this:

| Bids | | Offers | |
|---|---|---|---|
| MM2: | Bid 30 @ 2.50 | Away Market A: | Offer 50 @ 2.60 |
| Order A: | Buy 10 @ 2.50 | Away Market B: | Offer 40 @ 2.60 |
| Away Market C: | Bid 30 @ 2.50 | Order F: | Sell 10 @ 2.65 |
| LMM: | Bid 40 @ 2.45 | Away Market C: | Offer 30 @ 2.65 |
| Away Market B: | Bid 40 @ 2.45 | MM2: | Offer 30 @ 2.70 |
| Order B: | Buy 10 @ 2.40 | Away Market D: | Offer 20 @ 2.70 |
| Away Market A: | Bid 50 @ 2.40 | | |
| Away Market D: | Bid 20 @ 2.40 | | |
| Order C: | Buy 10 @ 2.35 | | |

The internal order book 29a now looks like this:

| Bids | | Offers | |
|---|---|---|---|
| Order A: | Buy 10 @ 2.50 | Order F: | Sell 10 @ 2.65 |
| Order B: | Buy 10 @ 2.40 | | |
| Order C: | Buy 10 @ 2.35 | | |

The market center BBO is now 2.50 to 2.65 (40×10)
The public order book looks like this:

| Bids | Offers |
|---|---|
| 40 @ 2.50 | 10 @ 2.65 ← |
| 40 @ 2.45 | 30 @ 2.70 |
| 10 @ 2.40 | |
| 10 @ 2.35 | |

The process bypasses step 628 and continues to step 630, where it checks if incoming Buy Order L still has any quantity available to trade. As it still has 90 contracts remaining, the process returns to step 616 and retrieves the best offer in the virtual consolidated order and quote list, which is Away Market A's offer. In step 618, the process checks if incoming Buy Order L's price (2.65) is greater than or equal to Away Market A's offer (2.60). As incoming Buy Order L's price is higher, the process continues to step 620, where it checks if Away Market A's offer (2.60) is at the NBO (2.60). As it is indeed at the NBO, the process match or route the declined quantity. The virtual consolidated order and quote list is deleted from local memory.

Reprice-And-Ship Inside Limit Orders

A reprice-and-ship inside limit order is capped at the inside price, and will not execute at a price that is inferior to the NBBO. Accordingly, it can route to away markets only if they are quoting at the NBBO, and any remaining quantity cannot route to the next-best price level until all the quotes at the current NBBO are exhausted. For example, a reprice-and-ship inside limit order sell order that is priced at or better than the NBB would execute in the sequence shown below:

| | Bid Side of the Virtual Consolidated Order and Quote List | | | | | |
|---|---|---|---|---|---|---|
| Price Point | Display Order Process | | Working Order Process | | | Routing Process |
| Highest Price (NBB) | 1. Displayed orders and quotes at the NBB | 2. Reserve order quantity at the NBB | 3. Passive Liquidity Orders at the NBB | 4. Discretionary Orders that can step up to the NBB | 5. Tracking Liquidity Orders at the NBB | 6. Away Market Bids at the NBB | continues to step 622, where it checks if Away Market A's offer is on or off the market center 20. As it is an away market quote, the process continues to step 632.

Highest-Ranking Away Market is Not Eligible to Receive NOW Orders

In step 632, the Routing Process determines that Away Market A has a higher priority for routing than Away Market B. In step 634, it retrieves the "NOW-eligible" parameter for Away Market A from the Routing Process. In step 636, it determines that Away Market A is not eligible to receive routed NOW orders. Accordingly, the process continues to step 644, where it checks if there are additional away markets offering at the NBO.

Incoming NOW Buy Order Routes to the Best Away Market Eligible to Receive NOW Orders As Away Market B is also offering at the NBO, the process continues to step 646, where it retrieves Away Market B's offer. The process returns to step 634, where it retrieves the "NOW-eligible" parameter for Away Market B. In step 636, it determines that Away Market B is indeed eligible to receive routed NOW orders. The process continues to step 638. As no prior orders have been routed to Away Market B in this example, the process satisfies its full disseminated offer size by routing 40 contracts to Away Market B, at the NBO price of 2.60.

After routing to Away Market B, the process continues to step 640, where it checks if incoming Buy Order L has any quantity still available to trade. As it still has 50 contracts remaining, the process continues to step 644, where it checks if there are any additional away markets at the NBO (2.60). As there are none, the process continues to step 648.

Remainder of the Incoming NOW Buy Order is Canceled Immediately

In step 648, the process cancels the remaining 50 contracts of incoming Buy Order L. The process terminates in step 650 as indicated.

Away Market Partially Fills the Routed Order; Declined Quantity is Canceled Immediately Away Market B fills 30 contracts and declines 10 contracts According to the business rules for NOW orders, if an away market declines any portion of an order that is routed on behalf of an underlying NOW order, the declined quantity is canceled immediately. The process does not attempt to An incoming reprice-and-ship inside limit order that cannot execute when it is received is immediately posted. The nonmarketable reprice-and-ship inside limit order is inserted in the internal order book 29a and ranked according to price/time priority in the Display Order Process. The order is also disseminated to the public order book. Posted customer reprice-and-ship inside limit orders that are priced at the NBBO are eligible to execute against incoming marketable orders in the LMM Guarantee Process or the Directed Order Process, like any other displayed order type, if they have time priority over the eligible market maker quote.

An incoming reprice-and-ship inside limit order that is marketable at the opposite side of the NBBO will participate in the LMM Guarantee Process if the lead market maker is quoting at the opposite side of the NBBO. Similarly, if the business rules of the market center 20 allow reprice-and-ship inside limit orders to be directed to a specific market maker, then an incoming reprice-and-ship inside limit order that is marketable at the opposite side of the NBBO will participate in the Directed Order Process if the designated market maker is quoting at the opposite side of the NBBO.

Once an incoming reprice-and-ship inside limit order executes all resident interest and routes to all away markets quoting at the NBBO, then the process must determine how to handle any excess quantity. If a reprice-and-ship inside limit order's price would cross the NBBO if it were to be posted, it is automatically repriced at the NBBO before it is posted, i.e., the order will lock the market but it will not cross the market. Once posted, a reprice-and-ship inside limit order does NOT stand its ground if it is locked or crossed by an away market 24, and routes instead. As long as an away market 24 completely fills all contracts routed to it, remains at the NBBO, and remains marketable against the posted reprice-and-ship inside limit order, then additional contracts will continue to be routed to it until the posted order is depleted.

If an away market center 24 disseminates a new quote that crosses the price of the posted reprice-and-ship inside limit order, then the process reprices the posted reprice-and-ship inside limit order at the new NBBO price while contemporaneously routing to the away market center 24. Accordingly, in this embodiment, a posted reprice-and-ship inside limit order may be automatically repriced less aggressively, but it will not be automatically repriced more aggressively. If a posted reprice-and-ship inside limit order is repriced, it loses its standing in the internal order book 29a and is processed as if it were a new, incoming order.

Before routing to the away market center 24 that locked or crossed the posted reprice-and-ship inside limit order, the process first attempts to execute the repriced order in the LMM Guarantee Process, the Display Order Process, and the Working Order Process if possible. The process continues to ship to all away markets at the NBBO, repricing the order less aggressively away from any crossing markets, until the reprice-and-ship inside limit order is depleted or until the away markets decline the routed orders.

Incoming Reprice-And-Ship Inside Limit Buy Order Received Process

Figure 8A:
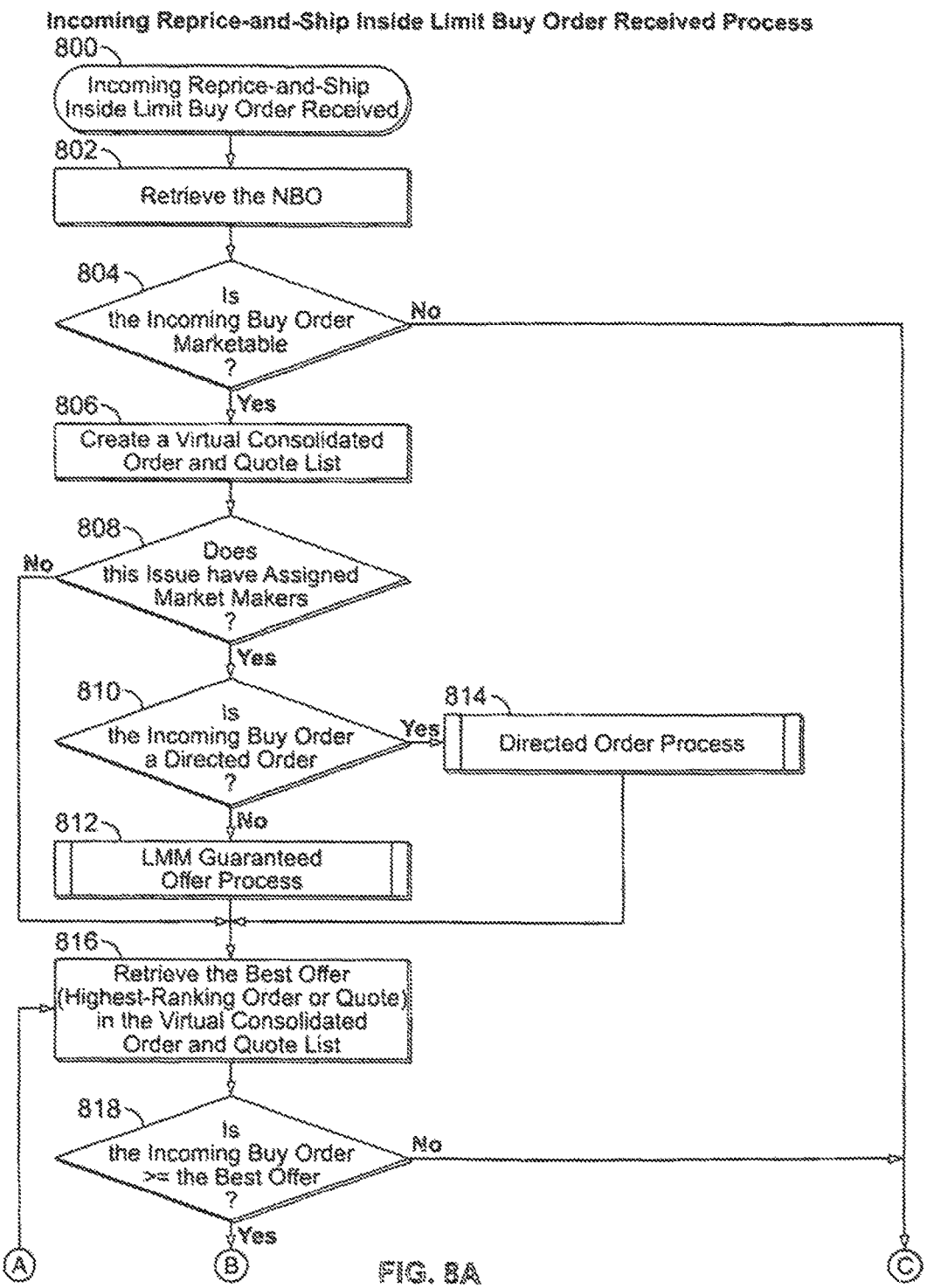
FIGS. 8A-8B are flow diagrams illustrating a process for receiving an incoming reprice-and-ship inside limit buy order in an embodiment of the present invention.
Figure 8B:
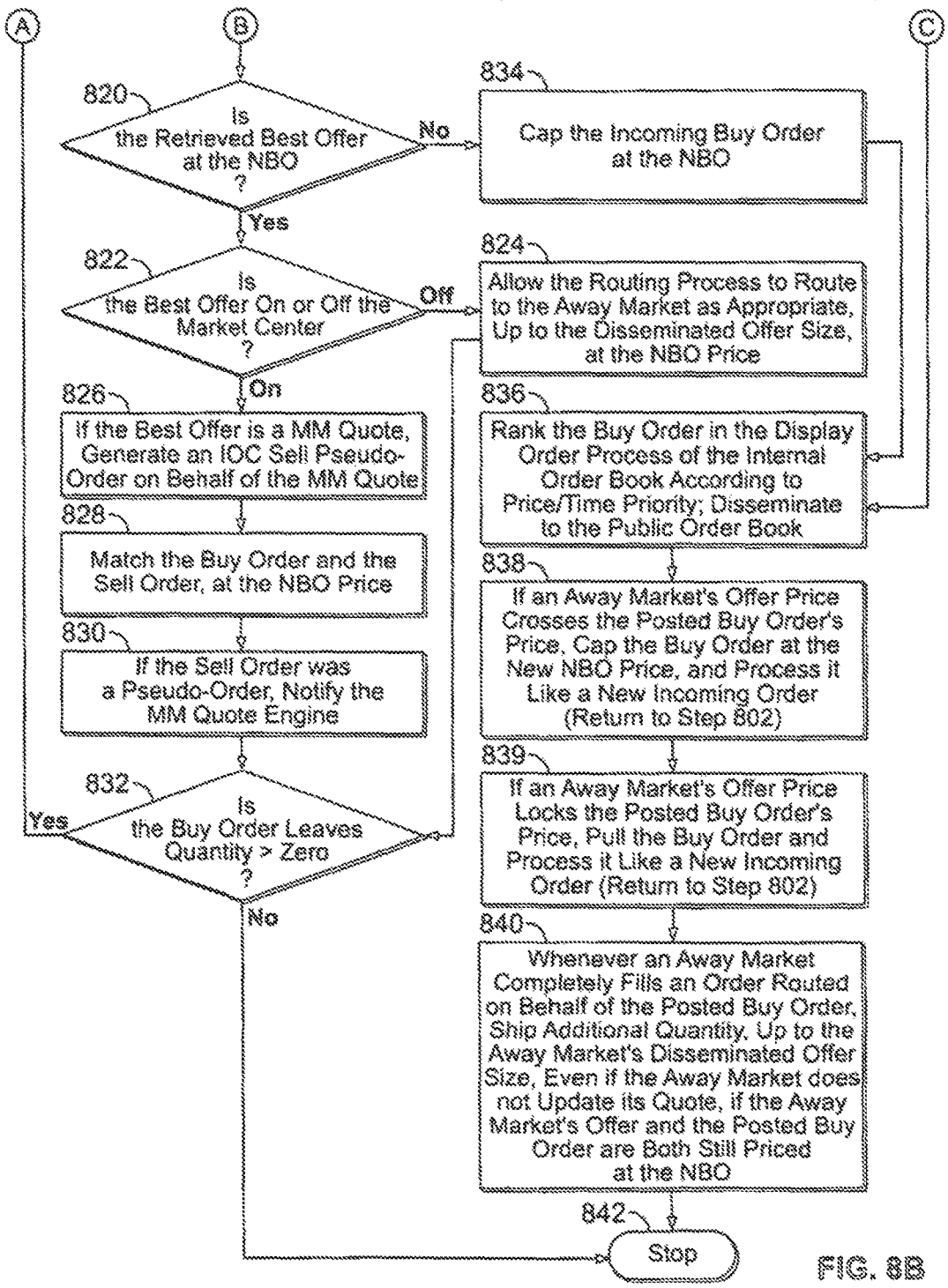

Referring now to FIGS. 8A-8B, the process is illustrated where the order matching engine 21 receives an incoming "Reprice-and-Ship" inside limit buy order. In this embodiment, a reprice-and-ship inside limit buy order is automatically capped (repriced) at the NBO whenever its price crosses the NBO, even when the cross is initiated by an away market center 24. Instead of standing its ground, the posted order ships to the away market that locked or crossed it, and continues to ship additional quantity as long as the away market continues to fill the routed orders and remains at the NBO.

In step 802, the process retrieves the NBO, and in step 804, the process determines if the incoming reprice-and-ship inside limit buy order is marketable. If the process determines that the incoming reprice-and-ship inside limit buy order is marketable, then the process continues to step 806, where it creates a virtual consolidated order and quote list for the option series.

The process continues to step 808, where it checks if the option series has any assigned market makers. If it does, then the process continues to step 810, where it checks if the incoming reprice-and-ship inside limit buy order is a directed order or not. If the incoming reprice-and-ship inside limit buy order is a directed order, then the process continues to step 814 where the "Directed Order Process" is initiated in step 2000 in FIG. 20A. If, however, the incoming reprice-and-ship inside limit buy order is not a directed order, then the process proceeds to step 812 where the "LMM Guaranteed Offer Process" is initiated instead in step 1900 in FIG. 19.

Regardless of whether the incoming reprice-and-ship inside limit buy order executes in the Directed Order Process, in the LMM Guaranteed Offer Process, or in neither process (if the applicable market maker is not quoting at the NBO and is therefore ineligible for a guaranteed entitlement, or else if the issue does not have any assigned market makers), if the incoming reprice-and-ship inside limit buy order still has quantity available to trade, then the process continues to step 816, where it retrieves the best offer in the virtual consolidated order and quote list, i.e., the sell order, market maker quote, or disseminated away market quote with the highest ranking. In step 818, the process checks if the incoming reprice-and-ship inside limit buy order is still marketable (by way of explanation, it is possible that it is no longer marketable if the quotes and orders at the NBO were exhausted).

If at step 818 the process determines that the incoming reprice-and-ship inside limit buy order is still marketable, then it continues to step 820, where it checks if the retrieved best offer is at the NBO. If the retrieved best offer is at the NBO, then the process continues to step 822, where it checks if the retrieved best offer is on or off the market center 20.

If the retrieved best offer is on the market center 20, then the process continues to step 826, where if the retrieved best offer is a market maker quote, the process automatically generates an IOC sell pseudo-order on behalf of the underlying market maker quote. The process continues to step 828, where it matches the incoming reprice-and-ship inside limit buy order against the retrieved sell order or the generated sell pseudo-order, at the NBO price. If the matched sell order is a pseudo-order, then in step 830, the process notifies the market maker quote engine 32b of the quantity that was executed so that the market maker quote engine 32b can decrement the underlying market maker quote.

The process continues to step 832, where it checks if the incoming reprice-and-ship inside limit buy order still has quantity available to trade. If it does not, then the process continues to step 842, where it terminates as indicated. If, however, the incoming reprice-and-ship inside limit buy order does still have remaining quantity, then the process returns to step 816, where it retrieves the next-best offer in the virtual consolidated order and quote list and continues to step 818, where it checks if the incoming reprice-and-ship inside limit buy order is still marketable. The process continues to execute the incoming reprice-and-ship inside limit buy order against all resident trading interest at the NBO as described above, until the incoming reprice-and-ship inside limit buy order is depleted, or else until the retrieved best offer is an away market quote, as described next.

Returning to step 822, if the retrieved best offer is an away market quote, then in step 824, the process releases the incoming reprice-and-ship inside limit buy order to the Routing Process, which routes to the highest-ranking away market as appropriate, up to its disseminated offer size, at the NBO price. After routing to the away market, the process continues to step 832, where it checks if the incoming reprice-and-ship inside limit buy order still has quantity available to trade. If the order is depleted, then the process terminates in step 842 as indicated. If, however, the order still has remaining quantity, then the process returns to step 816, where it retrieves the next best offer, and if the retrieved best offer is at the NBO, routes to the next-highest ranking away market according to the steps just described.

Returning to step 820, if, however, the retrieved best offer is not at the NBO, then the incoming order can execute no further, and the process continues to step 834 instead. In step 834, the process caps the incoming reprice-and-ship inside limit buy order's price at the NBO so that it locks, but does not cross, the market. The process then continues to step 836, where it ranks the capped order in the Display Order Process of the internal order book 29a according to the price/time priority of its capped price (the NBO). The process also disseminates the order to the public order book at its capped (NBO) price.

As indicated at step 838, while the reprice-and-ship inside limit buy order is posted, if an away market disseminates an offer whose price crosses the posted reprice-and-ship inside limit buy order's price, then the quote engine 23a notifies the order matching engine 21 of the cross. The process reprices the capped reprice-and-ship inside limit buy order less aggressively at the new NBO price. The repriced order loses its standing in the order book 29a, and is processed as if it were a new incoming order, but at the capped NBO price. The process returns to step 802 and attempts to execute the repriced buy order in the LMM Guarantee Offer Process, the Display Order Process, and the Working Order Process as described above in steps 802 through 822 before routing to the away market 24 that crossed the order and caused it to reprice. The process routes to the away market in step 824, up to the lesser of the away market's disseminated offer size and the remaining quantity of the reprice-and-ship inside limit buy order, at the new NBO price. Any remaining portion of the order is re-ranked in price/time priority according to its new NBO price in step 836.

As indicated at step 839, while the reprice-and-ship inside limit buy order is posted, if an away market disseminates an offer whose price locks the posted reprice-and-ship inside limit buy order's price, then the quote engine 23a notifies the order matching engine 21 of the lock. As the order does not need to be repriced, it could keep its standing in the internal order book 29a. However, to allow the order to execute further, the process pulls the posted reprice-and-ship inside limit buy order from the order book 29a, and treats it as if it were a new incoming order. The process returns to step 802 and attempts to execute the buy order in the LMM Guaranteed Offer Process, the Display Order Process, and the Working Order Process as described above in steps 802 through 822 before routing to the away market 24 that locked the order. The process routes to the away market in step 824, up to the lesser of the away market's disseminated offer size and the remaining quantity of the reprice-and-ship inside limit buy order. Any remaining portion of the reprice-and-ship inside limit buy order is re-ranked in price/time priority in step 836.

As indicated at step 840, whenever an away market fills the full quantity of an order routed on behalf of the posted reprice-and-ship inside limit buy order, the process ships additional quantity to the away market, up to its disseminated offer size, if the away market and the posted reprice-and-ship inside limit buy order are both still priced at the NBO. The process continues to route additional quantity to the away market as long as the away market continues to fill the routed orders, even if the away market does not update its disseminated offer. The process then terminates in step 842 as indicated.

Returning to step 804, if the incoming reprice-and-ship inside limit buy order was never marketable, then the process continues to steps 836 through 842 as described above.

Returning to step 818, if the incoming reprice-and-ship inside limit buy order is no longer marketable, then the process continues to steps 836 through 842 as described above.

Incoming Reprice-And-Ship Inside Limit Sell Order Received Process

Figure 9A:
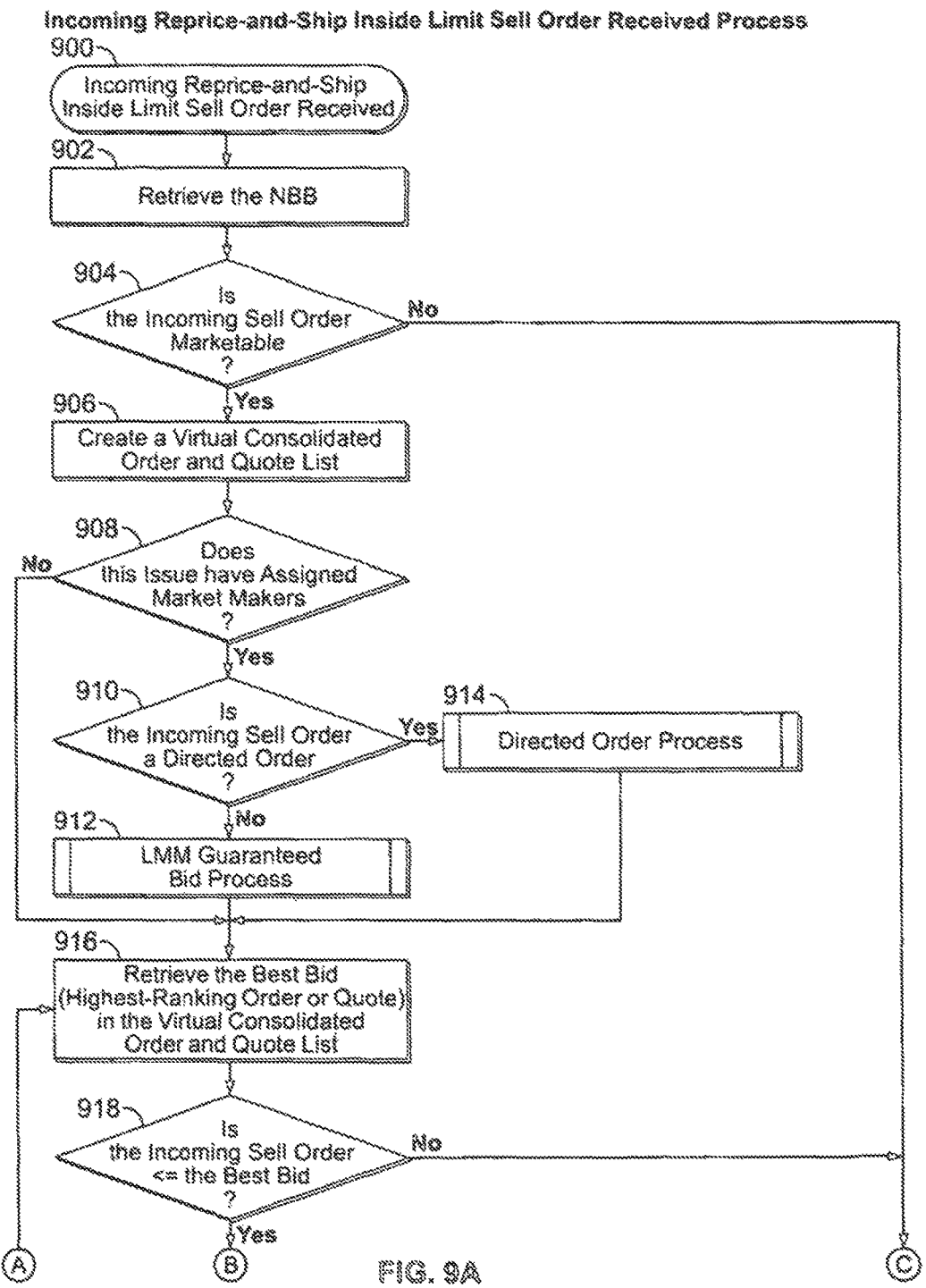
FIGS. 9A-9B are flow diagrams illustrating a process for receiving an incoming reprice-and-ship inside limit sell order in an embodiment of the present invention.
Figure 9B:
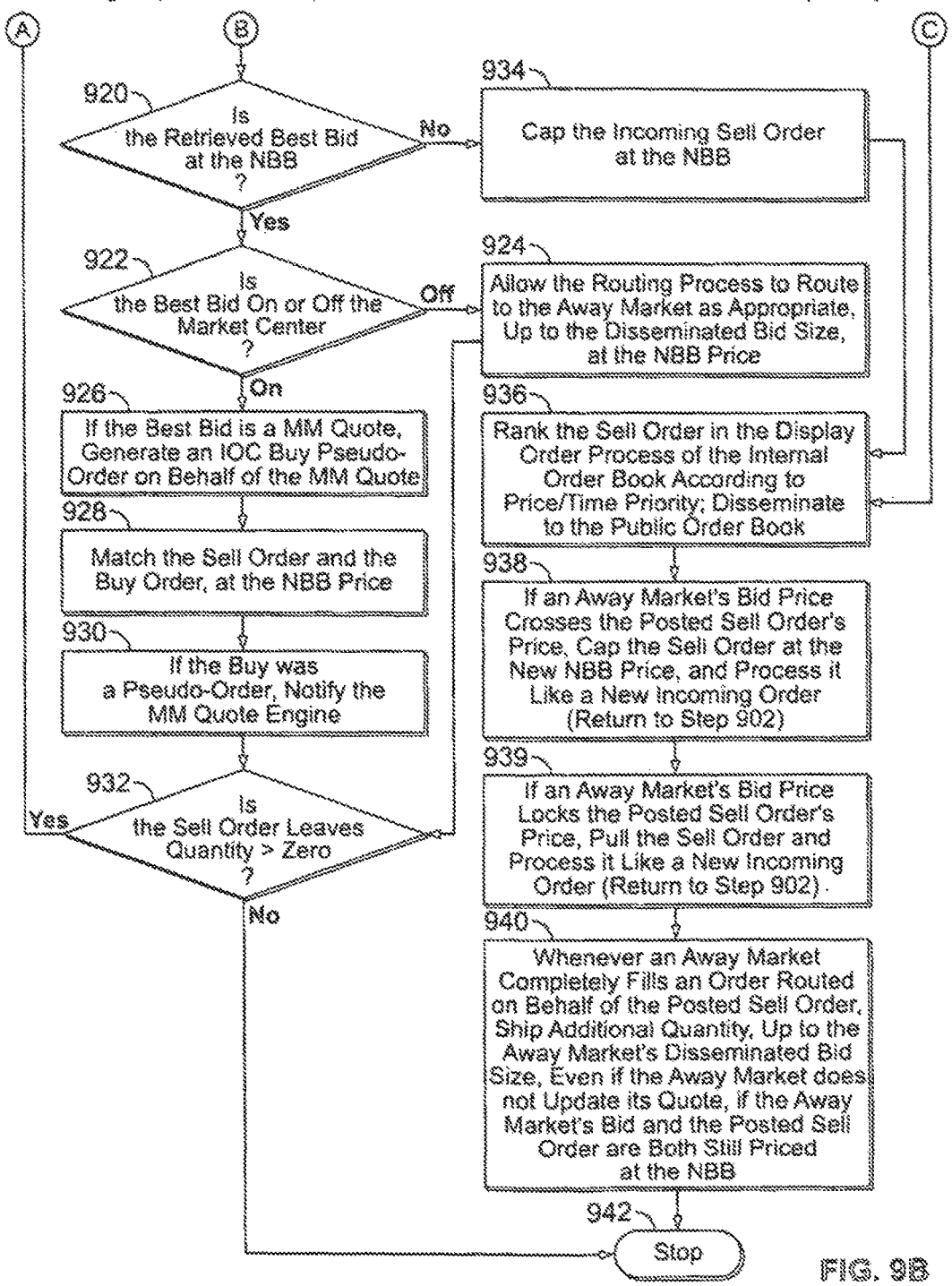

Referring now to FIGS. 9A-9B, the process is illustrated where the order matching engine 21 receives an incoming reprice-and-ship inside limit sell order. This routine is very similar to the process described above in FIGS. 8A-8B for receiving an incoming reprice-and-ship inside limit order buy order.

In step 902, the process retrieves the NBB, and in step 904, the process determines if the incoming reprice-and-ship inside, limit sell order is marketable. If the process determines that the incoming reprice-and-ship inside limit sell order is marketable, then the process continues to step 906, where it creates a virtual consolidated order and quote list for the option series.

The process continues to step 908, where it checks if the option series has any assigned market makers. If it does, then the process continues to step 910, where it checks if the incoming reprice-and-ship inside limit sell order is a directed order or not. If the incoming reprice-and-ship inside limit sell order is a directed order, then the process continues to step 914 where the "Directed Order Process" is initiated in step 2000 in FIG. 20A. If, however, the incoming reprice-and-ship inside limit sell order is not a directed order, then the process proceeds to step 912 where the "LMM Guaranteed Bid Process" is initiated instead in step 1800 in FIG. 18.

Regardless of whether the incoming reprice-and-ship inside limit sell order executes in the Directed Order Process, in the LMM Guaranteed Bid Process, or in neither process (if the applicable market maker is not quoting at the NBB and is therefore ineligible for a guaranteed entitlement, or else if the issue does not have any assigned market makers), if the incoming reprice-and-ship inside limit sell order still has quantity available to trade, then the process continues to step 916, where it retrieves the best bid in the virtual consolidated order and quote list, i.e., the buy order, market maker quote, or disseminated away market quote with the highest ranking. In step 918, the process checks if the incoming reprice-and-ship inside limit sell order is still marketable (by way of explanation, it is possible that it is no longer marketable if the quotes and orders at the NBB were exhausted).

If at step 918 the process determines that the incoming reprice-and-ship inside limit sell order is still marketable, then it continues to step 920, where it checks if the retrieved best bid is at the NBB. If the retrieved best bid is at the NBB, then the process continues to step 922, where it checks if the retrieved best bid is on or off the market center 20. If the retrieved best bid is on the market center 20, then the process continues to step 926, where if the retrieved best bid is a market maker quote, the process automatically generates an IOC buy pseudo-order on behalf of the underlying market maker quote. The process continues to step 928, where it matches the incoming reprice-and-ship inside limit sell order against the retrieved buy order or the generated buy pseudo-order, at the NBB price. If the matched buy order is a pseudo-order, then in step 930, the process notifies the market maker quote engine 32b of the quantity that was executed so that the market maker quote engine 32b can decrement the underlying market maker quote.

The process continues to step 932, where it checks if the incoming reprice-and-ship inside limit sell order still has quantity available to trade. If it does not, then the process continues to step 942, where it terminates as indicated. If, however, the incoming reprice-and-ship inside limit sell order does still have remaining quantity, then the process returns to step 916, where it retrieves the next-best bid in the virtual consolidated order and quote list and continues to step 918, where it checks if the incoming reprice-and-ship inside limit sell order is still marketable. The process continues to execute the incoming reprice-and-ship inside limit sell order against all resident trading interest at the NBB as described above, until the incoming reprice-and-ship inside limit sell order is depleted, or else until the retrieved best bid is an away market quote, as described next.

Returning to step 922, if the retrieved best bid is an away market quote, then in step 924, the process releases the incoming reprice-and-ship inside limit sell order to the Routing Process, which routes to the highest-ranking away market as appropriate, up to its disseminated Bid size, at the NBB price. After routing to the away market, the process continues to step 932, where it checks if the incoming reprice-and-ship inside limit sell order still has quantity available to trade. If the order is depleted, then the process terminates in step 942 as indicated. If, however, the order still has remaining quantity, then the process returns to step 916, where it retrieves the next best bid, and if the retrieved best bid is at the NBB, routes to the next-highest ranking away market according to the steps just described.

Returning to step 920, if, however, the retrieved best bid is not at the NBB, then the incoming order can execute no further, and the process continues to step 934 instead. In step 934, the process caps the incoming reprice-and-ship inside limit sell order's price at the NBB so that it locks, but does not cross, the market. The process then continues to step 936, where it ranks the capped order in the Display Order Process of the internal order book 29a according to the price/time priority of its capped price (the NBB). The process also disseminates the order to the public order book at its capped (NBB) price.

As indicated at step 938, while the reprice-and-ship inside limit sell order is posted, if an away market disseminates a bid whose price crosses the posted reprice-and-ship inside limit sell order's price, then the quote engine 23a notifies the order matching engine 21 of the cross. The process reprices the capped reprice-and-ship inside limit sell order less aggressively at the new NBB price. The repriced order loses its standing in the internal order book 29a, and is processed as if it were a new incoming order, but at the capped NBB price. The process returns to step 902 and attempts to execute the repriced sell order in the LMM Guarantee Bid Process, the Display Order Process, and the Working Order Process as described above in steps 902 through 922 before routing to the away market that crossed the order and caused it to reprice. The process routes to the away market in step 924, up to the lesser of the away market's disseminated Bid size and the remaining quantity of the reprice-and-ship inside limit sell order, at the new NBB price. Any remaining portion of the order is re-ranked in price/time priority according to its new NBB price in step 936.

As indicated at step 939, while the reprice-and-ship inside limit sell order is posted, if an away market disseminates a bid whose price locks the posted reprice-and-ship inside limit sell order's price, then the quote engine 23a notifies the order matching engine 21 of the lock. As the order does not need to be repriced, it could keep its standing in the internal order book 29a. However, to allow the order to execute further, the process pulls the posted reprice-and-ship inside limit sell order from the order book 29a, and treats it as if it were a new incoming order. The process returns to step 902 and attempts to execute the sell order in the LMM Guaranteed Bid Process, the Display Order Process, and the Working Order Process as described above in steps 902 through 922 before routing to the away market 24 that locked the order. The process routes to the away market in step 924, up to the lesser of the away market's disseminated bid size and the remaining quantity of the reprice-and-ship inside limit sell order. Any remaining portion of the reprice-and-ship inside limit sell order is re-ranked in price/time priority in step 936.

As indicated at step 940, whenever an away market fills the full quantity of an order routed on behalf of the posted reprice-and-ship inside limit sell order, the process ships additional quantity to the away market, up to its disseminated Bid size, if the away market and the posted reprice-and-ship inside limit sell order are both still priced at the NBB. The process continues to route additional quantity to the away market as long as the away market continues to fill the routed orders, even if the away market does not update its disseminated bid. The process then terminates in step 942 as indicated.

Returning to step 904, if the incoming reprice-and-ship inside limit sell order was never marketable, then the process continues to steps 936 through 942 as described above.

Returning to step 918, if the incoming reprice-and-ship inside limit sell order is no longer marketable, then the process continues to steps 936 through 942 as described above.

Reprice-And-Ship Inside Limit Order Trading Example

In this example, the issue has an assigned lead market maker (LMM) that is quoting at the NBO when a marketable incoming reprice-and-ship inside limit buy order is received. The reprice-and-ship inside limit buy order executes in the LMM Guaranteed Offer Process and the Display Order Process and then routes to the away markets at the NBBO. After routing at the NBO, the order is repriced less aggressively so that it locks, but does not cross, the NBO. When an away market fills the order routed to it, the posted reprice-and-ship inside limit order routes additional quantity to it. When an away market updates its offer price and the new offer price crosses the price of the posted reprice-and-ship inside limit order, the order is automatically repriced less aggressively once again so that it locks, but does not cross, the new NBO, and the posted order routes to the away market. When the NBO moves away from the posted reprice-and-ship inside limit order, the order remains at its current price, and no additional quantity is routed.

The NBBO is 2.50 to 2.60 (70×150).

The away market BBO book 25a looks like this:

| | Bids | | Offers |
|---|---|---|---|
| Away Market C: | Bid 30 @ 2.50 | Away Market A: | Offer 50 @ 2.60 |
| Away Market B: | Bid 40 @ 2.45 | Away Market B: | Offer 40 @ 2.60 |
| Away Market A: | Bid 50 @ 2.40 | Away Market C: | Offer 30 @ 2.65 |
| Away Market D: | Bid 20 @ 2.40 | Away Market D: | Offer 20 @ 2.70 |

The market maker quote book 33a looks like this:

| | Bids | | Offers |
|---|---|---|---|
| MM2: | Bid 30 @ 2.50 | LMM: | Offer 40 @ 2.60 |
| LMM: | Bid 40 @ 2.45 | MM2: | Offer 30 @ 2.70 |

The internal order book 29a looks like this. Order D is on behalf of a customer, whereas Order E is not:

| | Bids | | Offers |
|---|---|---|---|
| Order A: | Buy 10 @ 2.50 | Order D: | Sell 10 @ 2.60 |
| Order B: | Buy 10 @ 2.40 | Order E: | Sell 10 @ 2.60 |
| Order C: | Buy 10 @ 2.35 | Order F: | Sell 10 @ 2.65 |

The market center BBO is 2.50 to 2.60 (40×60)

The public order book looks like this:

| Bids | Offers |
|---|---|
| 40 @ 2.50 | 60 @ 2.60 |
| 40 @ 2.45 | 10 @ 2.65 |
| 10 @ 2.40 | 30 @ 2.70 |
| 10 @ 2.35 | |

Incoming Marketable Reprice-And-Ship Inside Limit Buy Order is Received

In step 800, the order matching engine 21 receives the following order:

Order H: Buy 250 @ 2.65, Reprice-and-Ship Inside Limit

In step 802, the process retrieves the NBO (2.60). In step 804, the process checks if incoming Buy Order H is marketable, i.e., is priced at or better than the NBO. As it is, the process continues to step 806, where it combines the away market BBO book 25*a*, the market maker quote book 33*a*, and the internal order book 29*a* together in a virtual consolidated order and quote list, which it ranks in price/display/time priority, but with a preference for resident interest over away market interest at the same price level. In this example, Sell Orders D and E were received before the LMM Offer was quoted.

The virtual consolidated order and quote list looks like this:

| | Bids | | Offers |
|---|---|---|---|
| MM2: | Bid 30 @ 2.50 | Order D: | Sell 10 @ 2.60 |
| Order A: | Buy 10 @ 2.50 | Order E: | Sell 10 @ 2.60 |
| Away Market C: | Bid 30 @ 2.50 | LMM: | Offer 40 @ 2.60 |
| LMM: | Bid 40 @ 2.45 | Away Market A: | Offer 50 @ 2.60 |
| Away Market B: | Bid 40 @ 2.45 | Away Market B: | Offer 40 @ 2.60 |
| Order B: | Buy 10 @ 2.40 | Order F: | Sell 10 @ 2.65 |
| Away Market A: | Bid 50 @ 2.40 | Away Market C: | Offer 30 @ 2.65 |
| Away Market D: | Bid 20 @ 2.40 | MM2: | Offer 30 @ 2.70 |
| Order C: | Buy 10 @ 2.35 | Away Market D: | Offer 20 @ 2.70 |

The process continues to step 808, where it checks if this issue has any assigned market makers. As it does, the process continues to step 810, where it checks if incoming Buy Order H is a directed order or not. As it is not a directed order, the process continues to step 812, where it initiates the "LMM Guaranteed Offer Process," and proceeds to step 1900 in FIG. 19.

LMM Guarantee Process is in Effect for this Issue

In step 1902, the process retrieves the LMM Offer (40 @ 2.60). In step 1904, it checks if the LMM Offer is at the NBO (2.60). As it is, the lead market maker is entitled to guaranteed participation with incoming Buy Order H, after any superior displayed customer orders are executed first. The process continues to step 1908, where it checks if incoming Buy Order H's order size (250) is greater than two contracts. As it is, the process continues to step 1914.

Incoming Reprice-And-Ship Inside Limit Buy Order Matches the Displayed Customer Sell Order with Time Priority Over the LMM Offer In step 1914, the process checks if there are any customer sell orders displayed at the NBO, and finds posted Sell Order D. The process continues to step 1916, where it stores the timestamp on the LMM Offer in the parameter "LMMOfferTimestamp." In step 1918, the process retrieves the earliest displayed customer sell order at the NBO, Sell Order D, and in step 1920, the process compares the timestamp of posted Sell Order D to the LMMOfferTimestamp. As posted Sell Order D was received earlier than the LMM Offer, the process continues to step 1922, where it matches 10 contracts of incoming Buy Order H with posted Sell Order D, completely depleting posted Sell Order D and removing it from the books.

The process continues to step 1924, where it checks if incoming Buy Order H still has quantity available to trade. As it still has 240 contracts remaining, the process continues to step 1928, where it checks if there are any additional customer sell orders at the NBO. As there are none (Sell Order E is not on behalf of a customer), the process continues to step 1932

Incoming Reprice-And-Ship Inside Limit Buy Order Matches the LMM Offer

In step 1932, the process retrieves the LMMGuaranteedPercent parameter, which is configured to 40% in this example. In step 1934, the process derives the LMMGuaranteedAllocation (96 contracts) by multiplying the LMMGuaranteedPercent (40%) by the remaining portion of incoming Buy Order H (240 contracts). The LMMGuaranteedAllocation is the maximum quantity of contracts that can execute in the LMM Guarantee Process.

In step 1938, the process matches 40 contracts of incoming Buy Order H against the LMM Offer, the lesser of the LMMGuaranteedAllocation (96 contracts) and the LMM Offer size (40 contracts), at the NBO price of 2.60. It does this by generating an IOC pseudo-order to Sell 40 @ 2.60 on behalf of the LMM Offer, and executing incoming Buy Order H against the sell pseudo-order. The LMM Offer at 2.60 is completely depleted, and is removed from the virtual consolidated order and quote list. The process notifies the market maker quote engine 32*b* to decrement the LMM Offer by the 40 contracts executed. The LMM Guaranteed Offer Process has completed.

The virtual consolidated order and quote list now looks like this:

| | Bids | | Offers |
|---|---|---|---|
| MM2: | Bid 30 @ 2.50 | Order E: | Sell 10 @ 2.60 |
| Order A: | Buy 10 @ 2.50 | Away Market A: | Offer 50 @ 2.60 |
| Away Market C: | Bid 30 @ 2.50 | Away Market B: | Offer 40 @ 2.60 |
| LMM: | Bid 40 @ 2.45 | Order F: | Sell 10 @ 2.65 |
| Away Market B: | Bid 40 @ 2.45 | Away Market C: | Offer 30 @ 2.65 |
| Order B: | Buy 10 @ 2.40 | MM2: | Offer 30 @ 2.70 |
| Away Market A: | Bid 50 @ 2.40 | Away Market D: | Offer 20 @ 2.70 |
| Away Market D: | Bid 20 @ 2.40 | | |
| Order C: | Buy 10 @ 2.35 | | |

The market maker quote engine 32*b* decrements the LMM Offer by the 40 contracts executed, completely depleting it. The market maker quote book 33*a* now looks like this (the lead market maker will manually replenish its offer, but this is not illustrated to simplify the example):

| | Bids | | Offers |
|---|---|---|---|
| MM2: | Bid 30 @ 2.50 | MM2: | Offer 30 @ 2.70 |
| LMM: | Bid 40 @ 2.45 | | |

The internal order book 29*a* now looks like this:

| | Bids | | Offers |
|---|---|---|---|
| Order A: | Buy 10 @ 2.50 | Order E: | Sell 10 @ 2.60 |
| Order B: | Buy 10 @ 2.40 | Order F: | Sell 10 @ 2.65 |
| Order C: | Buy 10 @ 2.35 | | |

The market center BBO is now 2.50 to 2.60 (40×10)
The public order book looks like this:

| Bids | Offers |
|---|---|
| 40 @ 2.50 | 10 @ 2.60 ← |
| 40 @ 2.45 | 10 @ 2.65 |
| 10 @ 2.40 | 30 @ 2.70 |
| 10 @ 2.35 | |

The process continues to step 1942, where it checks if incoming Buy Order H still has any quantity available to trade. As it still has 200 contracts remaining, the process continues to step 1946, where it returns to the step where the routine was originally invoked, back to step 812 of FIG. 8A.
Incoming Reprice-and-Ship Inside Limit Buy Order Matches the Non-Customer Sell Order The process continues to step 816, where it retrieves the best offer in the virtual consolidated order and quote list, which is posted Sell Order E. In step 818, the process checks if incoming Buy Order H's price (2.65) is greater than or equal to posted Sell Order E's price (2.60). As incoming Buy Order H's price is higher, the process continues to step 820, where it checks if posted Sell Order E's price (2.60) is at the NBO (2.60). As Sell Order E is at the NBO, the process continues to step 822, where it checks if posted Sell Order E is on or off the market center 20. As it is a resident book order, the process bypasses step 826 and continues to step 828, where it matches 10 contracts of incoming Buy Order H against posted Sell Order E, at the NBO price of 2.60. Posted Sell Order E is completely depleted and is removed from the books.

The NBBO is now 2.50 to 2.60 (70×90)
The virtual consolidated order and quote list now looks like this:

| Bids | | Offers | |
|---|---|---|---|
| MM2: | Bid 30 @ 2.50 | Away Market A: | Offer 50 @ 2.60 |
| Order A: | Buy 10 @ 2.50 | Away Market B: | Offer 40 @ 2.60 |
| Away Market C: | Bid 30 @ 2.50 | Order F: | Sell 10 @ 2.65 |
| LMM: | Bid 40 @ 2.45 | Away Market C: | Offer 30 @ 2.65 |
| Away Market B: | Bid 40 @ 2.45 | MM2: | Offer 30 @ 2.70 |
| Order B: | Buy 10 @ 2.40 | Away Market D: | Offer 20 @ 2.70 |
| Away Market A: | Bid 50 @ 2.40 | | |
| Away Market D: | Bid 20 @ 2.40 | | |
| Order C: | Buy 10 @ 2.35 | | |

The internal order book 29a now looks like this:

| Bids | | Offers | |
|---|---|---|---|
| Order A: | Buy 10 @ 2.50 | Order F: | Sell 10 @ 2.65 |
| Order B: | Buy 10 @ 2.40 | | |
| Order C: | Buy 10 @ 2.35 | | |

The market center BBO is now 2.50 to 2.65 (40×10)
The public order book looks like this:

| Bids | Offers |
|---|---|
| 40 @ 2.50 | 10 @ 2.65 ← |
| 40 @ 2.45 | 30 @ 2.70 |
| 10 @ 2.40 | |
| 10 @ 2.35 | |

The process bypasses step 830 and continues to step 832, where it checks if incoming Buy Order H still has any quantity available to trade. As it still has 190 contracts remaining, the process returns to step 816 and retrieves the best offer in the virtual consolidated order and quote list, which is Away Market A's offer. In step 818, the process checks if incoming Buy Order H's price (2.65) is greater than or equal to Away Market A's offer (2.60). As incoming Buy Order H's price is higher, the process continues to step 820, where it checks if Away Market A's offer (2.60) is at the NBO (2.60). As it is indeed at the NBO, the process continues to step 822, where it checks if Away Market A's offer is on or off the market center 20. As it is an away market quote, the process continues to step 824.
Incoming Reprice-And-Ship Inside Limit Buy Order Routes to the Best Away Market Offer The process continues to step 824, where it allows the Routing Process to determine the highest-ranking eligible away market at the NBO. In this example, the Routing Process determines that both Away Market A and Away Market B are eligible away markets, but Away Market A has a higher priority for routing. As no prior orders have been routed to Away Market A in this example, the process satisfies its full disseminated offer size by routing 50 contracts to Away Market A, at the NBO price of 2.60.

After routing to Away Market A, the process continues to step 832, where it checks if incoming Buy Order H has any quantity still available to trade. As it still has 140 contracts remaining, the process returns to step 816, where it retrieves the best offer in the virtual consolidated order and quote list. As Away Market A's offer has been completely satisfied, the best offer is now Away Market B's offer. In step 818, the process checks if incoming Buy Order H's price (2.65) is greater than or equal to Away Market B's offer (2.60). As incoming Buy Order H's price is higher, the process continues to step 820, where it checks if Away Market B's offer (2.60) is at the NBO (2.60). As it is indeed at the NBO, the process continues to step 822, where it checks if Away Market B's offer is on or off the market center 20. As it is an away market quote, the process continues to step 824.
Incoming Reprice-and-Ship Inside Limit Buy Order Routes to the Next-Best Away Market Offer The process continues to step 824, where the Routing Process determines that Away Market B is now eligible for routing. As no prior orders have been routed to Away Market B in this example, the process satisfies its full disseminated offer size by routing 40 contracts to Away Market B, at the NBO price of 2.60.

After routing to Away Market B, the process continues to step 832, where it checks if incoming Buy Order H has any quantity still available to trade. As it still has 100 contracts remaining, the process returns to step 816, where it retrieves the best offer in the virtual consolidated order and quote list, which is posted Sell Order F. In step 818, the process checks if incoming Buy Order H's price (2.65) is greater than or equal to posted Sell Order F's price (2.65). As the prices are equal, the process continues to step 820, where it checks if posted Sell Order F's price (2.65) is at the NBO (2.60). As Sell Order F's price is inferior to the NBO, incoming Buy Order H cannot execute against it, as inside limit orders can only execute at the NBBO by definition in this embodiment.
Incoming Reprice-And-Ship Inside Limit Buy Order is Capped at the NBO Price, and Posted The process continues to step 834, where it "caps" incoming Buy Order H, at the NBO price of 2.60. It does this by retaining incoming Buy Order H's original limit price (2.65) for audit purposes, but posting it at the NBO price (2.60) so that it locks, but does not cross, the NBO. The process continues to step 836, where it ranks Buy Order H in the Display Order Process of the internal order book 29a according to its "capped" price of 2.60, and disseminates Buy Order H to the public order book.

The NBBO is now 2.60 to 2.60 (100×90). The market is locked.
The virtual consolidated order and quote list now looks like this:

|           | Bids              |                   | Offers           |
|-----------|-------------------|-------------------|------------------|
| Order H:  | Buy 100 @ 2.60 ←  | Away Market A:    | Offer 50 @ 2.60  |
| MM2:      | Bid 30 @ 2.50     | Away Market B:    | Offer 40 @ 2.60  |
| Order A:  | Buy 10 @ 2.50     | Order F:          | Sell 10 @ 2.65   |
| Away Market C: | Bid 30 @ 2.50 | Away Market C:    | Offer 30 @ 2.65  |
| LMM:      | Bid 40 @ 2.45     | MM2:              | Offer 30 @ 2.70  |
| Away Market B: | Bid 40 @ 2.45 | Away Market D:    | Offer 20 @ 2.70  |
| Order B:  | Buy 10 @ 2.40     |                   |                  |
| Away Market A: | Bid 50 @ 2.40 |                  |                  |
| Away Market D: | Bid 20 @ 2.40 |                  |                  |
| Order C:  | Buy 10 @ 2.35     |                   |                  |

The internal order book 29a now looks like this:

|          | Bids             |          | Offers         |
|----------|------------------|----------|----------------|
| Order H: | Buy 100 @ 2.60 ← | Order F: | Sell 10 @ 2.65 |
| Order A: | Buy 10 @ 2.50    |          |                |
| Order B: | Buy 10 @ 2.40    |          |                |
| Order C: | Buy 10 @ 2.35    |          |                |

The market center BBO is now 2.60 to 2.65 (100×10)
The public order book looks like this:

| Bids         | Offers      |
|--------------|-------------|
| 100 @ 2.60 ← | 10 @ 2.65   |
| 40 @ 2.50    | 30 @ 2.70   |
| 40 @ 2.45    |             |
| 10 @ 2.40    |             |
| 10 @ 2.35    |             |

Away Market Fills the Routed Order, and the Posted Reprice-and-Ship Inside Limit Buy Order Ships Again
  Away Market A fills the 50 contracts routed to it, but does not refresh its offer
  The NBBO is still 2.60 to 2.60 (100×90). The market is still locked.
  As described in step 840, whenever an away market completely fills an order routed on behalf of a posted reprice-and-ship inside limit order, the process attempts to route to it again. As Away Market A completely filled the 50 contracts that were routed to it, the process checks that Away Market A's offer (2.60) is still at the NBO (2.60). As it is, the process checks that posted Buy Order H (2.60) is also still priced at the NBO (2.60). As it is, the process routes an additional 50 contracts to Away Market A, its full disseminated offer size, at the NBO price of 2.60. Buy Order H still has 50 contracts remaining.
  The NBBO is now 2.60 to 2.60 (50×90). The market is still locked.
  The virtual consolidated order and quote list now looks like this:

|          | Bids          |                | Offers          |
|----------|---------------|----------------|-----------------|
| Order H: | Buy 50 @ 2.60 ← | Away Market A: | Offer 50 @ 2.60 |
| MM2:     | Bid 30 @ 2.50 | Away Market B: | Offer 40 @ 2.60 |
| Order A: | Buy 10 @ 2.50 | Order F:       | Sell 10 @ 2.65  |
| Away Market C: | Bid 30 @ 2.50 | Away Market C: | Offer 30 @ 2.65 |
| LMM:     | Bid 40 @ 2.45 | MM2:           | Offer 30 @ 2.70 |
| Away Market B: | Bid 40 @ 2.45 | Away Market D: | Offer 20 @ 2.70 |
| Order B: | Buy 10 @ 2.40 |                |                 |
| Away Market A: | Bid 50 @ 2.40 |          |                 |
| Away Market D: | Bid 20 @ 2.40 |          |                 |
| Order C: | Buy 10 @ 2.35 |                |                 |

The internal order book 29a now looks like this:

|          | Bids            |          | Offers         |
|----------|-----------------|----------|----------------|
| Order H: | Buy 50 @ 2.60 ← | Order F: | Sell 10 @ 2.65 |
| Order A: | Buy 10 @ 2.50   |          |                |
| Order B: | Buy 10 @ 2.40   |          |                |
| Order C: | Buy 10 @ 2.35   |          |                |

The market center BBO is now 2.60 to 2.65 (50×10)
The public order book now looks like this:

| Bids        | Offers     |
|-------------|------------|
| 50 @ 2.60 ← | 10 @ 2.65  |
| 40 @ 2.50   | 30 @ 2.70  |
| 40 @ 2.45   |            |
| 10 @ 2.40   |            |
| 10 @ 2.35   |            |

Away Market Updates its Offer Price, Crossing the Posted Reprice-and-Ship Inside Limit Buy Order
  Away Market A changes its offer, crossing posted Buy Order H
  The NBBO is now 2.60 to 2.55 (50×30). The market is now crossed.
  The away market BBO book 25a looks like this:

|                | Bids          |                | Offers            |
|----------------|---------------|----------------|-------------------|
| Away Market C: | Bid 30 @ 2.50 | Away Market A: | Offer 30 @ 2.55 ← |
| Away Market B: | Bid 40 @ 2.45 | Away Market B: | Offer 40 @ 2.60   |
| Away Market A: | Bid 50 @ 2.40 | Away Market C: | Offer 30 @ 2.65   |
| Away Market D: | Bid 20 @ 2.40 | Away Market D: | Offer 20 @ 2.70   |

The quote engine 23a notifies the order matching engine 21 of the change to the NBO and to Away Market A's disseminated offer. As described in step 838, whenever an away market's offer price crosses a posted reprice-and-ship inside limit order buy order, the process reprices the posted reprice-and-ship inside limit order buy order at the new NBO price. Accordingly, Buy Order H is repriced at 2.55, and loses its standing in the internal order book 29a. Buy Order H is treated as if it were a new incoming order. The process returns to step 802, where it retrieves the NBO (2.55) and checks if Buy Order H is marketable. As it is, the process continues to step 806, where the order matching engine 21 evaluates its matching opportunities by combining the away market BBO book 25a, the market maker quote book 33a, and the internal order book 29a together in a virtual consolidated order and quote list, which it ranks in price/display/time priority, but with a preference for resident interest over away market interest at the same price level.

The virtual consolidated order and quote list looks like this:

|  | Bids |  | Offers |
|---|---|---|---|
| Order H: | Buy 50 @ 2.60 | Away Market A: | Offer 30 @ 2.55 ← |
| MM2: | Bid 30 @ 2.50 | Away Market B: | Offer 40 @ 2.60 |
| Order A: | Buy 10 @ 2.50 | Order F: | Sell 10 @ 2.65 |
| Away Market C: | Bid 30 @ 2.50 | Away Market C: | Offer 30 @ 2.65 |
| LMM: | Bid 40 @ 2.45 | MM2: | Offer 30 @ 2.70 |
| Away Market B: | Bid 40 @ 2.45 | Away Market D: | Offer 20 @ 2.70 |
| Order B: | Buy 10 @ 2.40 |  |  |
| Away Market A: | Bid 50 @ 2.40 |  |  |
| Away Market D: | Bid 20 @ 2.40 |  |  |
| Order C: | Buy 10 @ 2.35 |  |  |

The process continues to step 808, where it checks if this issue has any assigned market makers. As it does, the process continues to step 810, where it checks if "incoming" Buy Order H is a directed order or not. It should be noted that once an order is posted, it is never treated as a directed order again, even if it was originally sent as a directed order. As Buy Order H is not a directed order, the process continues to step 812, to initiate the "LMM Guaranteed Offer Process." However, as the LMM Offer is not replenished in any of the examples of this document for ease of illustration, the process continues to step 816 instead, where it retrieves Away Market A's offer. As Buy Order H's price is equal to Away Market A's offer, the process executes steps 818, 820, and 822 as previously described.

In step 824, the process routes 30 contracts to Away Market A, its full disseminated offer size, at the new NBO price of 2.55. In step 832, the process determines that Buy Order H still has 20 contracts remaining, and returns to step 816, where it retrieves the best offer in the virtual consolidated order and quote list, which is now Away Market B's offer. In step 818, the process checks if Buy Order H's price (2.55) is greater than or equal to Away Market B's offer (2.60). As Buy Order H has been repriced lower and can execute no further, the process continues to step 836, where it ranks Buy Order H in the Display Order Process of the internal order book 29a according to its new capped price (2.55). It also disseminates Buy Order H to the public order book at its new capped price.

The NBBO is now 2.55 to 2.55 (20×30). The market is now locked.

The virtual consolidated order and quote list now looks like this:

|  | Bids |  | Offers |
|---|---|---|---|
| Order H: | Buy 20 @ 2.55 ← | Away Market A: | Offer 30 @ 2.55 |
| MM2: | Bid 30 @ 2.50 | Away Market B: | Offer 40 @ 2.60 |
| Order A: | Buy 10 @ 2.50 | Order F: | Sell 10 @ 2.65 |
| Away Market C: | Bid 30 @ 2.50 | Away Market C: | Offer 30 @ 2.65 |
| LMM: | Bid 40 @ 2.45 | MM2: | Offer 30 @ 2.70 |
| Away Market B: | Bid 40 @ 2.45 | Away Market D: | Offer 20 @ 2.70 |
| Order B: | Buy 10 @ 2.40 |  |  |
| Away Market A: | Bid 50 @ 2.40 |  |  |
| Away Market D: | Bid 20 @ 2.40 |  |  |
| Order C: | Buy 10 @ 2.35 |  |  |

The internal order book 29a now looks like this:

|  | Bids |  | Offers |
|---|---|---|---|
| Order H: | Buy 20 @ 2.55 ← | Order F: | Sell 10 @ 2.65 |
| Order A: | Buy 10 @ 2.50 |  |  |
| Order B: | Buy 10 @ 2.40 |  |  |
| Order C: | Buy 10 @ 2.35 |  |  |

The market center BBO is now 2.55 to 2.65 (20×10)
The public order book now looks like this:

| Bids | Offers |
|---|---|
| 20 @ 2.55 ← | 10 @ 2.65 |
| 40 @ 2.50 | 30 @ 2.70 |
| 40 @ 2.45 |  |
| 10 @ 2.40 |  |
| 10 @ 2.35 |  |

Away Market Fills the Routed Order, but the Posted Reprice-and-Ship Inside Limit Buy Order Cannot Ship to it Again Away Market B fills the 40 contracts routed to it, but does not refresh its offer The NBBO is still 2.55 to 2.55 (20×30). The market is still locked.

As described in step 840, whenever an away market completely fills an order routed on behalf of a posted reprice-and-ship inside limit order, the process attempts to route to it again. As Away Market B completely filled the 40 contracts that were routed to it, the process checks if Away Market B's offer (2.60) is still at the NBO (2.55). As Away Market B's offer is no longer at the NBO, posted Buy Order H cannot route additional contracts to Away Market B.

Another Away Market Fills the Routed Order, but the Posted Reprice-and-Ship Inside Limit Buy Order Cannot Ship to it Again Away Market A fills the 30 additional contracts routed to it while contemporaneously fading its offer The NBBO is now 2.55 to 2.60 (20×70). The market is no longer locked.

The away market BBO book 25a now looks like this:

|  | Bids |  | Offers |
|---|---|---|---|
| Away Market C: | Bid 30 @ 2.50 | Away Market A: | Offer 30 @ 2.60 ← |
| Away Market B: | Bid 40 @ 2.45 | Away Market B: | Offer 40 @ 2.60 |
| Away Market A: | Bid 50 @ 2.40 | Away Market C: | Offer 30 @ 2.65 |
| Away Market D: | Bid 20 @ 2.40 | Away Market D: | Offer 20 @ 2.70 |

The quote engine 23a notifies the order matching engine 21 of the new NBO price. When the order matching engine 21 receives the notification from the quote engine 23a, it evaluates its matching opportunities by combining the away market BBO book 25a, the market maker quote book 33a, and the internal order book 29a together in a virtual consolidated order and quote list, which it ranks in price/display/time priority, but with a preference for resident interest over away market interest at the same price level.

The virtual consolidated order and quote list looks like this:

| | Bids | | Offers |
|---|---|---|---|
| Order H: | Buy 20 @ 2.55 | Away Market A: | Offer 30 @ 2.60 ← |
| MM2: | Bid 30 @ 2.50 | Away Market B: | Offer 40 @ 2.60 |
| Order A: | Buy 10 @ 2.50 | Order F: | Sell 10 @ 2.65 |
| Away Market C: | Bid 30 @ 2.50 | Away Market C: | Offer 30 @ 2.65 |
| LMM: | Bid 40 @ 2.45 | MM2: | Offer 30 @ 2.70 |
| Away Market B: | Bid 40 @ 2.45 | Away Market D: | Offer 20 @ 2.70 |
| Order B: | Buy 10 @ 2.40 | | |
| Away Market A: | Bid 50 @ 2.40 | | |
| Away Market D: | Bid 20 @ 2.40 | | |
| Order C: | Buy 10 @ 2.35 | | |

As described in step 840, whenever an away market completely fills an order routed on behalf of a posted reprice-and-ship inside limit order, the process, attempts to route to it again. As Away Market A completely filled the 30 contracts that were routed to it, the process checks that Away Market A's offer (2.60) is still at the NBO (2.60). As it is, the process checks if posted Buy Order H (2.55) is also still priced at the NBO (2.60). As posted Buy Order H is no longer at the NBO, it cannot route to Away Market A. As posted reprice-and-ship inside limit orders are only repriced less aggressively, and are not repriced more aggressively, Buy Order H remains posted at its current price. The virtual consolidated order and quote list is deleted from local memory.

Stand-Your-Ground Inside Limit Orders

Similar to a reprice-and-ship inside limit order, a stand-your-ground inside limit order is capped at the inside price, and will not execute at a price that is inferior to the NBBO. Accordingly, it can route to away markets only if they are quoting at the NBBO, and any remaining quantity cannot route to the next-best price level until all the quotes at the current NBBO are exhausted. For example, a stand-your-ground inside limit sell order that is priced at or better than the NBB would execute in the sequence shown below:

| Bid Side of the Virtual Consolidated Order and Quote List | | | | | |
|---|---|---|---|---|---|
| Price Point | Display Order Process | | Working Order Process | | Routing Process |
| Highest Price (NBB) | 1. Displayed orders and quotes | 2. Reserve order quantity | 3. Passive Liquidity Orders | 4. Discretionary Orders that can step up to the NBB | 5. Tracking Liquidity Orders | 6. Away Market Bids |

An incoming stand-your-ground inside limit order that cannot execute when it is received is immediately posted at its user-specified limit price. The nonmarketable stand-your-ground inside limit order is inserted in the internal order book 29a and ranked according to price/time priority in the Display Order Process. The order is also disseminated to the public order book. Posted customer stand-your-ground inside limit orders that are priced at the NBBO are eligible to execute against incoming marketable orders in the LMM Guarantee Process or the Directed Order Process, like any other displayed order type, if they have time priority over the eligible market maker quote.

An incoming stand-your-ground inside limit order that is marketable at the opposite side of the NBBO will participate in the LMM Guarantee Process if the lead market maker is quoting at the opposite side of the NBBO. Similarly, if the business rules of the market center 20 allow stand-your-ground inside limit orders to be directed to a specific market maker, then an incoming stand-your-ground inside limit order that is executable at the opposite side of the NBBO will participate in the Directed Order Process if the designated market maker is quoting at the opposite side of the NBBO.

Once posted, in this embodiment, the behavior of a stand-your-ground inside limit order is very different from a reprice-and-ship inside limit order. Although both order types may be automatically capped (repriced) to lock, but not cross, the NBBO, a posted reprice-and-ship inside limit order is only repriced less aggressively (i.e., when the NBBO moves into it) whereas a posted stand-your-ground inside limit order is only repriced more aggressively (i.e., when the NBBO moves away from it). Whereas a reprice-and-ship inside limit order does not stand its ground when locked or crossed by an away market 24 and ships to the locking/crossing away market 24, in contrast, a stand-your-ground inside limit order stands its ground when locked or crossed and does not ship. Whereas a reprice-and-ship inside limit order generally continues to ship additional contracts to an away market 24 as long as fills are received, in contrast, a stand-your-ground inside limit order only routes when initially locking an away market 24, and does not route additional contracts when fills are received.

If a stand-your-ground inside limit order's price would cross the NBBO if it were to be posted, it is automatically capped at the opposite side of the NBBO before it is posted, i.e., the order will lock the market but it will not cross the market. The remaining portion of the stand-your-ground inside limit order is inserted in the Display Order Process of the internal order book 29a and is ranked according to the price/time priority of its current (capped) displayed price. The order is also disseminated to the public order book at its current (capped) displayed price. The process stores the original user-specified price so that the order can subsequently be repriced more aggressively if the NBBO moves away. As in this embodiment, the quote engine 23a notifies the order matching engine 21 whenever a disseminated best bid or offer quote price touches any order price, whether displayed or not, and this may increase the processing overhead, stand-your-ground inside limit orders are subject to the check for excessive marketability when they are first received to ensure that their original prices are not too far through the NBBO.

If the NBBO moves away from the posted stand-your-ground inside limit order so that the market is no longer locked, then the process removes the cap, and allows the order to revert to its original user-specified limit price. The repriced order loses its standing in the internal order book 29*a* and is processed as if it were a new incoming order. After the stand-your-ground inside limit order can execute no further, if its price would still cross the market if it were to be posted, it is automatically capped at the opposite side of the new NBBO before it is posted, locking the market again. This process continues until the stand-your-ground inside limit order is depleted, or can be displayed at its original user-specified limit price without crossing the market. Once the stand-your-ground inside limit order is displayed at its original user-specified price, it is never capped again.

As described above, the unfilled portion of the stand-your-ground inside limit order is not routed to the next price level until all the quotes at the current NBBO are exhausted and the away markets fade their quotes. This behavior is referred to as "walking the book," as each price level must be cleared before proceeding to the next price level. As each price level is cleared, the stand-your-ground inside limit order can execute at an increasingly aggressive price.

In a different embodiment, a stand-your-ground inside limit order re-prices, re-ranks, and executes as described above, except that the order is not displayed to the marketplace until it becomes nonmarketable. Accordingly, in this alternative embodiment, the stand-your-ground inside limit order is queued rather than posted while it is in the process of "walking the book."

Incoming Stand-Your-Ground Inside Limit Buy Order Received Process

Figure 10B:
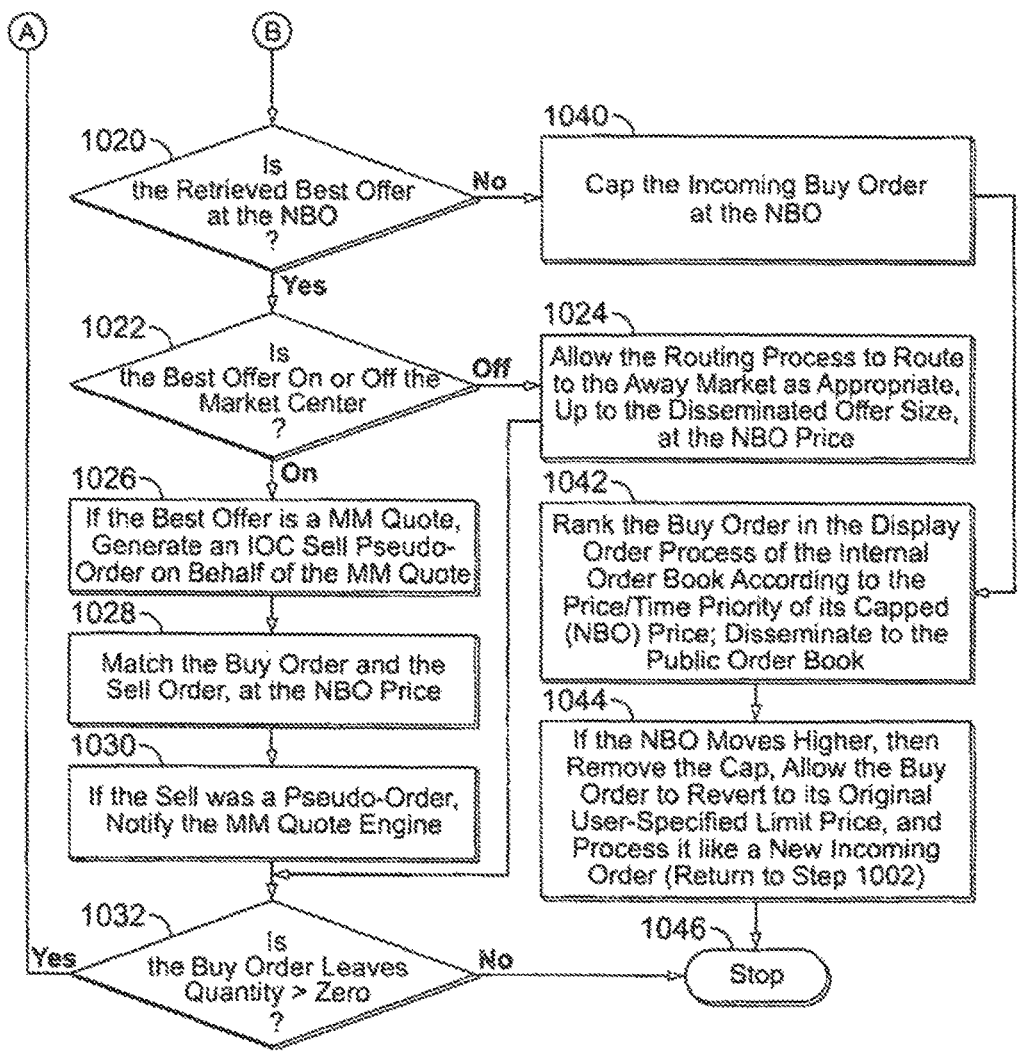

Referring now to FIGS. 10A-10B, the process is illustrated where the order matching engine 21 receives an incoming stand-your-ground inside limit buy order. In this embodiment, an incoming marketable stand-your-ground inside limit buy order routes to all away markets at the NBO and then any remaining portion of the order is capped (repriced) at the NBO and posted, locking the market. Once posted, the order neither reprices nor ships if locked or crossed by an away market quote. If the order has been capped and the NBO subsequently moves away from the order's capped price, then the cap is removed and the order is allowed to execute further at the new inside price.

In step 1002, the process retrieves the NBO, and in step 1004, the process determines if the incoming stand-your-ground inside limit buy order is marketable. If the incoming buy order is marketable, then the process continues to step 1005, where it initiates the "Too-Executable Buy Order Check Process," and proceeds to step 1600 in FIG. 16. If the incoming buy order is not canceled in the "Too-Executable Buy Order Check Process," i.e., it is not determined to be too executable, then the process continues to step 1006, where it creates a virtual consolidated order and quote list for the option series.

The process continues to step 1008, where it checks if the option series has any assigned market makers. If it does, then the process continues to step 1010, where it checks if the incoming stand-your-ground inside limit buy order is a directed order or not. If the incoming stand-your-ground inside limit buy order is a directed order, then the process continues to step 1014 where the "Directed Order Process" is initiated in step 2000 in FIG. 20A. If, however, the incoming stand-your-ground inside limit buy order is not a directed order, then the process proceeds to step 1012 where the "LMM Guaranteed Offer Process" is initiated instead in step 1900 in FIG. 19.

Regardless of whether the incoming stand-your-ground inside limit buy order executes in the Directed Order Process, in the LMM Guaranteed Offer Process, or in neither process (if the applicable market maker is not quoting at the NBO and is therefore ineligible for a guaranteed entitlement, or else if the issue does not have any assigned market makers), if the incoming stand-your-ground inside limit buy order still has quantity available to trade, then the process continues to step 1016, where it retrieves the best offer in the virtual consolidated order and quote list, i.e., the sell order, market maker quote, or disseminated away market quote with the highest ranking. In step 1018, the process checks if the incoming stand-your-ground inside limit buy order is still marketable (by way of explanation, it is possible that it is no longer marketable if the quotes and orders at the NBO were exhausted).

At step 1018, if the process determines that the incoming stand-your-ground inside limit buy order is still marketable, then it continues to step 1020, where it checks if the retrieved best offer is at the NBO. If the retrieved best offer is at the NBO, then the process continues to step 1022, where it checks if the retrieved best offer is on or off the market center 20. If the retrieved best offer is on the market center 20, then the process continues to step 1026, where if the retrieved best offer is a market maker quote, the process automatically generates an IOC sell pseudo-order on behalf of the underlying market maker quote. The process continues to step 1028, where it matches the incoming stand-your-ground inside limit buy order against the retrieved sell order or pseudo-order, at the NBO price. If the matched sell order is a pseudo-order, then in step 1030, the process notifies the market maker quote engine 32*b* of the quantity that was executed so that the market maker quote engine 32*b* can decrement the underlying market maker quote.

The process continues to step 1032, where it checks if the incoming stand-your-ground inside limit buy order still has quantity available to trade. If it does not, then the process continues to step 1046, where it terminates as indicated. If, however, the incoming stand-your-ground inside limit buy order does still have remaining quantity, then the process returns to step 1016, where it retrieves the next-best offer in the virtual consolidated order and quote list and continues to step 1018, where it checks if the incoming stand-your-ground inside limit buy order is still marketable. The process continues to execute the incoming stand-your-ground inside limit buy order against all resident trading interest at the NBO as described above, until the incoming stand-your-ground inside limit buy order is depleted, or else until the retrieved best offer is an away market quote, as described next.

Returning to step 1022, if the retrieved best offer is an away market quote, then the process releases the incoming stand-your-ground inside limit buy order to the Routing Process, which routes to the highest-ranking away market as appropriate, up to its disseminated offer size, at the NBO price. After routing to the away market, the process continues to step 1032, where it checks if the incoming stand-your-ground inside limit buy order still has quantity available to trade. If the order is depleted, then the process terminates in step 1046 as indicated. If, however, the order still has remaining quantity, then it returns to step 1016, where it retrieves the next best offer, and if the next best offer is also at the NBO, will proceed to route to the next-highest ranked away market quote as just described. The process repeats these steps until the incoming buy order is depleted, or until the retrieved best offer is no longer at the NBO, as described next.

Returning to step 1020, if, however, the retrieved best offer is inferior to the NBO, then the incoming buy order can execute no further at the present time, and the remaining quantity must be posted. The process continues to step 1040, where it caps the incoming stand-your-ground inside limit buy order at the NBO so that it locks, but does not cross, the market. In step 1042, the process ranks the capped stand-your-ground inside limit buy order in the Display Order Process of the internal order book 29a according to the price/time priority of its capped (NBO) price. The process also disseminates the order to the public order book at its capped (NBO) price.

Continuing to step 1044, if the NBO price should move higher than the posted stand-your-ground inside limit buy order's displayed price so that the market is no longer locked, then the process removes the cap, allows the stand-your-ground inside limit buy order to revert to its original user-specified limit price, and processes it as if it were a new incoming order. Accordingly, the process returns to step 1002, and the repriced stand-your-ground inside limit buy order is allowed to execute further at its more aggressive price. If the order has executed all interest at the new NBO but still has quantity remaining, then at step 1040, the process caps the order at the new NBO price, and posts it again at step 1042. This process is repeated until the stand-your-ground inside limit buy order is depleted, or else until the NBO moves away to the extent to which the order can be displayed at its original user-specified price without crossing the market. Once the order is displayed at its original user-specified limit price, it is never capped again. The process then terminates in step 1046 as indicated.

Returning to step 1004, if, however, the incoming stand-your-ground inside limit buy order was never marketable, then the process continues to step 1034, where it ranks the order at its user-specified price in the Display Order Process of the internal order book 29a according to price/time priority, and disseminates the order to the public order book. As the nonmarketable order is ranked at its original limit price, it is not affected when the NBO changes. The process then terminates in step 1036 as indicated.

Returning to step 1018, if, however, the incoming stand-your-ground inside limit buy order is no longer marketable, then the process continues to step 1034 and 1036 as just described.

Incoming Stand-Your-Ground Inside Limit Sell Order Received Process

Figure 11A:
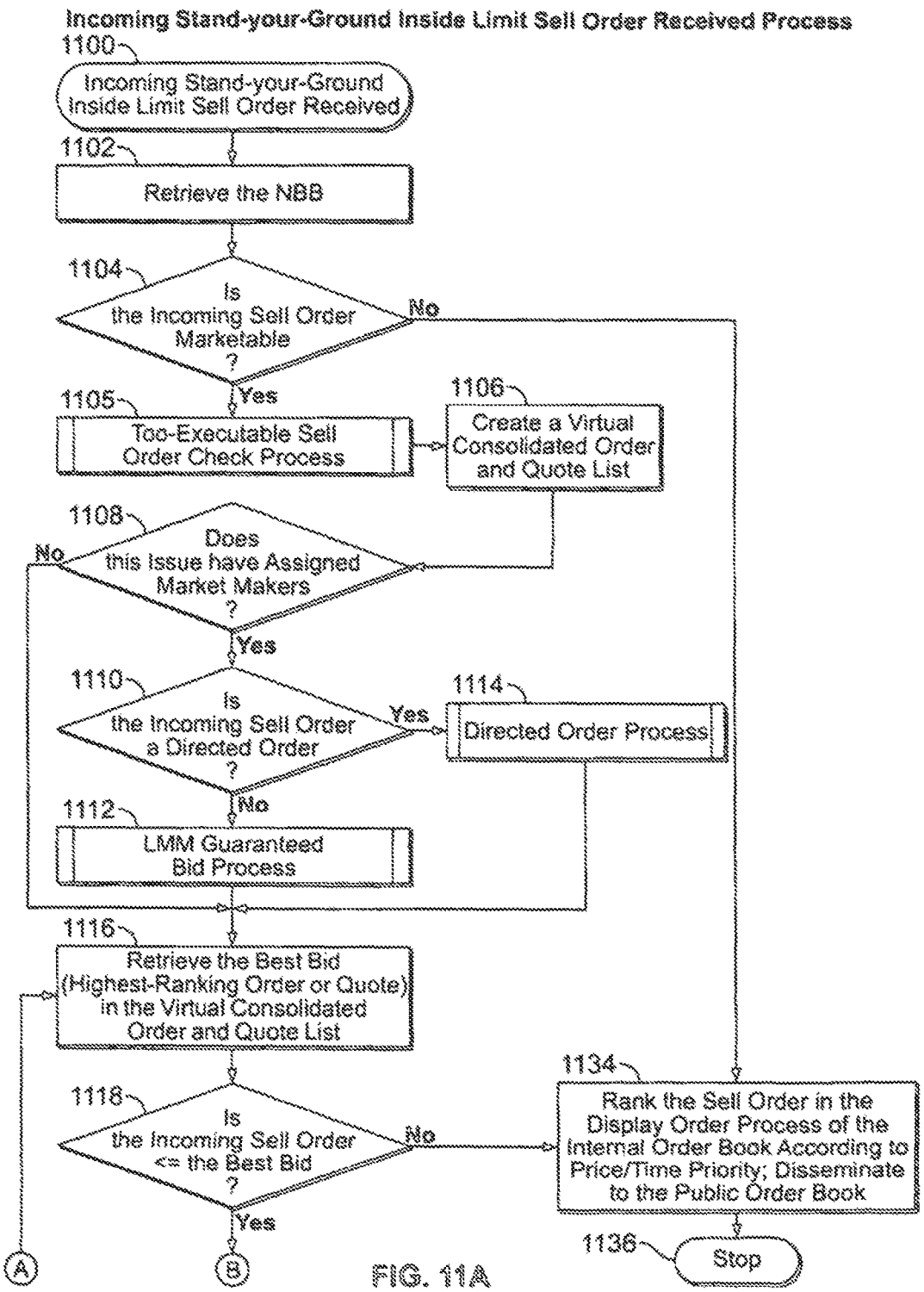
FIGS. 11A-11B are flow diagrams illustrating a process for receiving an incoming stand-your-ground inside limit sell order in an embodiment of the present invention.
Figure 11B:
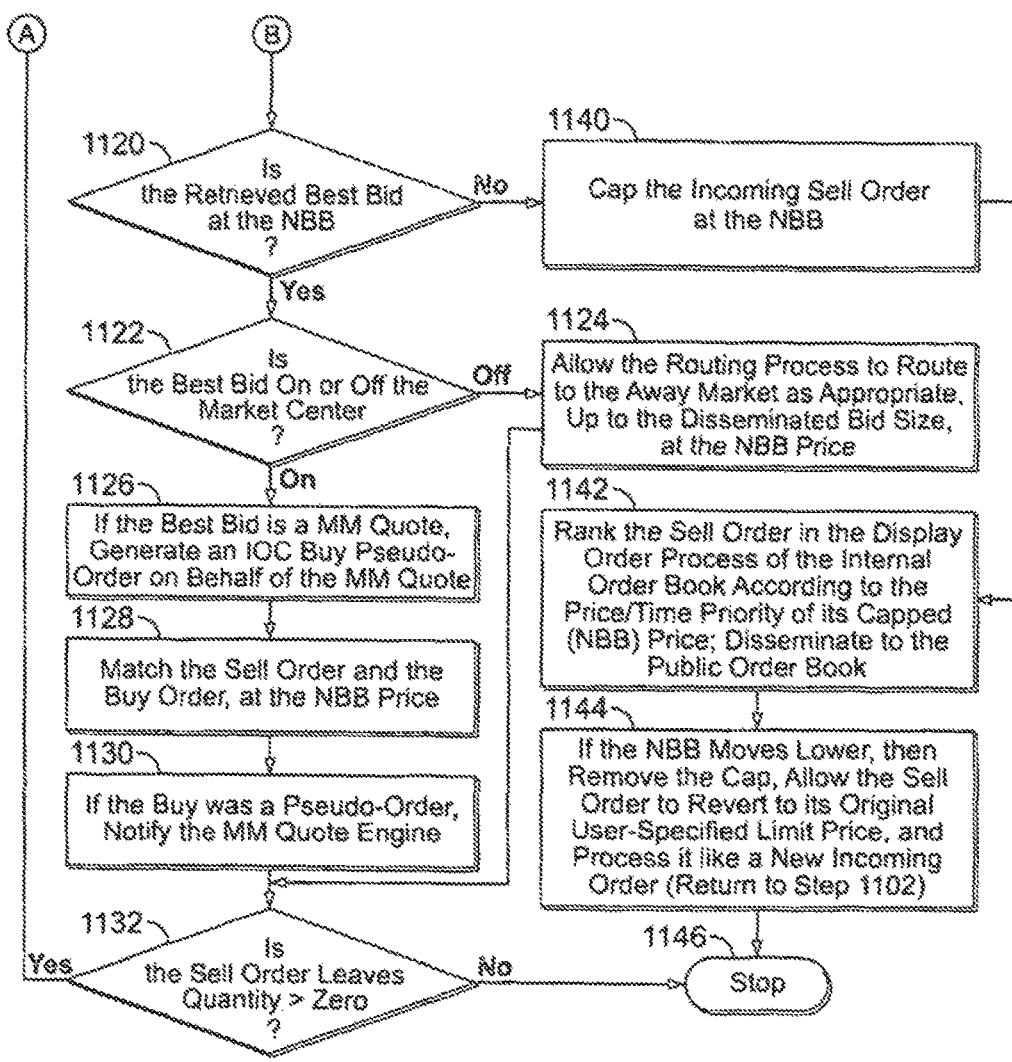

Referring now to FIGS. 11A-11B, the process is illustrated where the order matching engine 21 receives an incoming stand-your-ground inside limit sell order. This routine is very similar to the process described above in FIGS. 10A-10B for receiving an incoming stand-your-ground inside limit buy order.

In step 1102, the process retrieves the NBB, and in step 1104, the process determines if the incoming stand-your-ground inside limit sell order is marketable. If the incoming sell order is marketable, then the process continues to step 1105, initiates the "Too-Executable Sell Order Check Process," and proceeds to step 1700 in FIG. 17. If the incoming sell order is not canceled in the Too-Executable Sell Order Check Process, i.e., it is not determined to be too executable, then the process continues to step 1106, where it creates a virtual consolidated order and quote list for the option series.

The process continues to step 1108, where it checks if the option series has any assigned market makers. If it does, then the process continues to step 1110, where it checks if the incoming stand-your-ground inside limit sell order is a directed order or not. If the incoming stand-your-ground inside limit sell order is a directed order, then the process continues to step 1114 where the "Directed Order Process" is initiated in step 2000 in FIG. 20A. If, however, the incoming stand-your-ground inside limit sell order is not a directed order, then the process proceeds to step 1112 where the "LMM Guaranteed Bid Process" is initiated instead in step 1800 in FIG. 18.

Regardless of whether the incoming stand-your-ground inside limit sell order executes in the Directed Order Process, in the LMM Guaranteed Bid Process, or in neither process (if the applicable market maker is not quoting at the NBB and is therefore ineligible for a guaranteed entitlement, or else if the issue does not have any assigned market makers), if the incoming stand-your-ground inside limit sell order still has quantity available to trade, then the process continues to step 1116, where it retrieves the best bid in the virtual consolidated order and quote list, i.e., the buy order, market maker quote, or disseminated away market quote with the highest ranking. In step 1118, the process checks if the incoming stand-your-ground inside limit sell order is still marketable (by way of explanation, it is possible that it is no longer marketable if the quotes and orders at the NBB were exhausted).

At step 1118, if the process determines that the incoming stand-your-ground inside limit sell order is still marketable, then it continues to step 1120, where it checks if the retrieved best bid is at the NBB. If the retrieved best bid is at the NBB, then the process continues to step 1122, where it checks if the retrieved best bid is on or off the market center 20. If the retrieved best bid is on the market center 20, then the process continues to step 1126, where if the retrieved best bid is a market maker quote, the process automatically generates an IOC buy pseudo-order on behalf of the underlying market maker quote. The process continues to step 1128, where it matches the incoming stand-your-ground inside limit sell order against the retrieved buy order or pseudo-order, at the NBB price. If the matched buy order is a pseudo-order, then in step 1130, the process notifies the market maker quote engine 32b of the quantity that was executed so that the market maker quote engine 32b can decrement the underlying market maker quote.

The process continues to step 1132, where it checks if the incoming stand-your-ground inside limit sell order still has quantity available to trade. If it does not, then the process continues to step 1146, where it terminates as indicated. If, however, the incoming stand-your-ground inside limit sell order does still have remaining quantity, then the process returns to step 1116, where it retrieves the next-best bid in the virtual consolidated order and quote list and continues to step 1118, where it checks if the incoming stand-your-ground inside limit sell order is still marketable. The process continues to execute the incoming stand-your-ground inside limit sell order against all resident trading interest at the NBB as described above, until the incoming stand-your-ground inside limit sell order is depleted, or else until the retrieved best bid is an away market quote, as described next.

Returning to step 1122, if the retrieved best bid is an away market quote, then the process releases the incoming stand-your-ground inside limit sell order to the Routing Process, which routes to the highest-ranking away market as appropriate, up to its disseminated Bid size, at the NBB price.

After routing to the away market, the process continues to step 1132, where it checks if the incoming stand-your-ground inside limit sell order still has quantity available to trade. If the order is depleted, then the process terminates in step 1146 as indicated. If, however, the order still has remaining quantity, then it returns to step 1116, where it retrieves the next best bid, and if the next best bid is also at the NBB, will proceed to route to the next-highest ranked away market quote as just described. The process repeats these steps until the incoming sell order is depleted, or until the retrieved best bid is no longer at the NBB, as described next.

Returning to step 1120, if, however, the retrieved best bid is inferior to the NBB, then the incoming sell order can execute no further at the present time, and the remaining quantity must be posted. The process continues to step 1140, where it caps the incoming stand-your-ground inside limit sell order at the NBB so that it locks, but does not cross, the market. In step 1142, the process ranks the capped stand-your-ground inside limit sell order in the Display Order Process of the internal order book 29a according to the price/time priority of its capped (NBB) price. The process also disseminates the order to the public order book at its capped (NBB) price.

Continuing to step 1144, if the NBB price should move lower than the posted stand-your-ground inside limit sell order's displayed price so that the market is no longer locked, then the process removes the cap, allows the stand-your-ground inside limit sell order to revert to its original user-specified limit price, and processes it as if it were a new incoming order. Accordingly, the process returns to step 1102, and the repriced stand-your-ground inside limit sell order is allowed to execute further at its more aggressive price. If the order has executed all interest at the new NBB but still has quantity remaining, then at step 1140, the process caps the order at the new NBB price, and posts it again at step 1142. This process is repeated until the stand-your-ground inside limit sell order is depleted, or else until the NBB moves away to the extent to which the order can be displayed at its original user-specified price without crossing the market. Once the order is displayed at its original user-specified limit price, it is never capped again. The process then terminates in step 1146 as indicated.

Returning to step 1104, if, however, the incoming stand-your-ground inside limit sell order was never marketable, then the process continues to step 1134, where it ranks the order at its user-specified price in the Display Order Process of the internal order book 29a according to price/time priority, and disseminates the order to the public order book. As the nonmarketable order is ranked at its original limit price, it is not affected when the NBB changes. The process then terminates in step 1136 as indicated.

Returning to step 1118, if, however, the incoming stand-your-ground inside limit sell order is no longer marketable, then the process continues to step 1134 and 1136 as just described.

Stand-Your-Ground Inside Limit Order Trading Example

In this example, the issue has an assigned lead market maker (LMM) that is quoting at the NBO when a marketable incoming stand-your-ground inside limit buy order is received. The stand-your-ground inside limit buy order executes in the LMM Guaranteed Offer Process and the Display Order Process and then routes to the away markets at the NBO. After routing at the NBO, the order is repriced less aggressively so that it locks, but does not cross, the NBO. When the away markets fill the order routed to it, the posted stand-your-ground inside limit order does not route additional quantity to them. When an away market updates its offer price and the new offer price crosses the price of the posted stand-your-ground inside limit order, the order is not repriced and does not route. When the NBO moves away from the posted stand-your-ground inside limit order, the order reverts to its user-specified price, routes again, and is automatically repriced and posted at the new, more aggressive NBO price.

The NBBO is 2.50 to 2.60 (70×150).
The away market BBO book 25a looks like this:

| Bids | | Offers | |
|---|---|---|---|
| Away Market C: | Bid 30 @ 2.50 | Away Market A: | Offer 50 @ 2.60 |
| Away Market B: | Bid 40 @ 2.45 | Away Market B: | Offer 40 @ 2.60 |
| Away Market A: | Bid 50 @ 2.40 | Away Market C: | Offer 30 @ 2.65 |
| Away Market D: | Bid 20 @ 2.40 | Away Market D: | Offer 20 @ 2.70 |

The market maker quote book 33a looks like this:

| Bids | | Offers | |
|---|---|---|---|
| MM2: | Bid 30 @ 2.50 | LMM: | Offer 40 @ 2.60 |
| LMM: | Bid 40 @ 2.45 | MM2: | Offer 30 @ 2.70 |

The internal order book 29a looks like this. Order D is on behalf of a customer, whereas Order E is not:

| Bids | | Offers | |
|---|---|---|---|
| Order A: | Buy 10 @ 2.50 | Order D: | Sell 10 @ 2.60 |
| Order B: | Buy 10 @ 2.40 | Order E: | Sell 10 @ 2.60 |
| Order C: | Buy 10 @ 2.35 | Order F: | Sell 10 @ 2.65 |

The market center BBO is 2.50 to 2.60 (40×60)
The public order book looks like this:

| Bids | Offers |
|---|---|
| 40 @ 2.50 | 60 @ 2.60 |
| 40 @ 2.45 | 10 @ 2.65 |
| 10 @ 2.40 | 30 @ 2.70 |
| 10 @ 2.35 | |

Incoming Marketable Stand-Your-Ground Inside Limit Buy Order is Received

In step 1000, the order matching engine 21 receives the following order:

Order I: Buy 250 @ 2.70, Stand-your-Ground Inside Limit

In step 1002, the process retrieves the NBO (2.60). In step 1004, the process checks if incoming Buy Order I is marketable, i.e., is priced at or better than the NBO. As it is, the process continues to step 1005, where initiates the "Too-Executable Buy Order Check Process," and proceeds to step 1600 in FIG. 16.

In step 1602, the process checks if incoming Buy Order I's price (2.70) is higher than the NBO (2.60). As it is, the process continues to step 1604, where it checks if stand-your-ground inside limit orders should be checked for excessive marketability. As the check for excessive marketability is enabled for this order type in this embodiment, the process continues to step 1608, where it retrieves the "MaxPercent-OffNBBO" parameter, which is configured to 15% in this example. It should be noted that the minimum price increment (tick) for this issue is 0.05. In step 1610, the process computes the MaxPriceThruNBO by multiplying the NBO (2.60) by the MaxPercentOffNBBO (15%), deriving the MaxPriceThruNBO=0.35 (15% of 2.60=0.39, rounded down to 0.35, the nearest tick). In step 1612, the process computes the MaxBuyPrice by adding the derived MaxPriceThruNBO (0.35) to the NBO (2.60), deriving the MaxBuyPrice of 2.95 (2.60+0.35=2.95). Accordingly, the highest price allowable for incoming Buy Order I is 2.95. The process continues to step 1614, where it checks if incoming Buy Order I's price (2.70) is higher than the MaxBuyPrice (2.95). As it is not higher, incoming Buy Order I does not need to be repriced or canceled, and the process continues to step 1616, where it returns to the step where it was originally invoked, back to step 1005.

The process continues to 1006, where it creates a virtual consolidated order and quote list. In this example, Sell Orders D and E were received before the LMM Offer was quoted.

The virtual consolidated order and quote list looks like this:

| | Bids | | Offers |
|---|---|---|---|
| MM2: | Bid 30 @ 2.50 | Order D: | Sell 10 @ 2.60 |
| Order A: | Buy 10 @ 2.50 | Order E: | Sell 10 @ 2.60 |
| Away Market C: | Bid 30 @ 2.50 | LMM: | Offer 40 @ 2.60 |
| LMM: | Bid 40 @ 2.45 | Away Market A: | Offer 50 @ 2.60 |
| Away Market B: | Bid 40 @ 2.45 | Away Market B: | Offer 40 @ 2.60 |
| Order B: | Buy 10 @ 2.40 | Order F: | Sell 10 @ 2.65 |
| Away Market A: | Bid 50 @ 2.40 | Away Market C: | Offer 30 @ 2.65 |
| Away Market D: | Bid 20 @ 2.40 | MM2: | Offer 30 @ 2.70 |
| Order C: | Buy 10 @ 2.35 | Away Market D: | Offer 20 @ 2.70 |

The process continues to step 1008, where it checks if this issue has any assigned market makers. As it does, the process continues to step 1010, where it checks if incoming Buy Order I is a directed order or not. As it is not a directed order, the process continues to step 1012, where it initiates the "LMM Guaranteed Offer Process," and proceeds to step 1900 in FIG. 19.

LMM Guarantee Process is in Effect for this Issue

In step 1902, the process retrieves the LMM Offer (40 @ 2.60). In step 1904, it checks if the LMM Offer is at the NBO (2.60). As it is, the lead market maker is entitled to guaranteed participation with incoming Buy Order I, after any superior displayed customer orders are executed first. The process continues to step 1908, where it checks if incoming Buy Order I's order size (250) is greater than two contracts. As it is, the process continues to step 1914.

Incoming Stand-Your-Ground Inside Limit Buy Order Matches the Displayed Customer Sell Order with Time Priority Over the LMM Offer In step 1914, the process checks if there are any customer sell orders displayed at the NBO, and finds posted Sell Order D. The process continues to step 1916, where it stores the timestamp on the LMM Offer in the parameter "LMMOfferTimestamp." In step 1918, the process retrieves the earliest displayed customer sell order at the NBO, Sell Order D, and in step 1920, the process compares the timestamp of posted Sell Order D to the LMMOfferTimestamp. As posted Sell Order D was received earlier than the LMM Offer, the process continues to step 1922, where it matches 10 contracts of incoming Buy Order I with posted Sell Order D, completely depleting posted Sell Order D and removing it from the books.

The process continues to step 1924, where it checks if incoming Buy Order I still has quantity available to trade. As it still has 240 contracts remaining, the process continues to step 1928, where it checks if there are any additional customer sell orders at the NBO. As there are none (Sell Order E is not on behalf of a customer), the process continues to step 1932.

Incoming Stand-Your-Ground Inside Limit Buy Order Matches the LMM Offer

In step 1932, the process retrieves the LMMGuaranteedPercent parameter, which is configured to 40% in this example. In step 1934, the process derives the LMMGuaranteedAllocation (96 contracts) by multiplying the LMMGuaranteedPercent (40%) by the remaining portion of incoming Buy Order I (240 contracts). The LMMGuaranteedAllocation is the maximum quantity of contracts that can execute in the LMM Guarantee Process.

In step 1938, the process matches 40 contracts of incoming Buy Order I against the LMM Offer, the lesser of the LMMGuaranteedAllocation (96 contracts) and the LMM Offer size (40 contracts), at the NBO price of 2.60. It does this by generating an IOC pseudo-order to Sell 40 @ 2.60 on behalf of the LMM Offer, and executing incoming Buy Order I against the sell pseudo-order. The LMM Offer at 2.60 is completely depleted, and is removed from the virtual consolidated order and quote list. The process notifies the market maker quote engine 32b to decrement the LMM Offer by the 40 contracts executed. The LMM Guaranteed Offer Process has completed.

The virtual consolidated order and quote list now looks like this:

| | Bids | | Offers |
|---|---|---|---|
| MM2: | Bid 30 @ 2.50 | Order E: | Sell 10 @ 2.60 |
| Order A: | Buy 10 @ 2.50 | Away Market A: | Offer 50 @ 2.60 |
| Away Market C: | Bid 30 @ 2.50 | Away Market B: | Offer 40 @ 2.60 |
| LMM: | Bid 40 @ 2.45 | Order F: | Sell 10 @ 2.65 |
| Away Market B: | Bid 40 @ 2.45 | Away Market C: | Offer 30 @ 2.65 |
| Order B: | Buy 10 @ 2.40 | MM2: | Offer 30 @ 2.70 |
| Away Market A: | Bid 50 @ 2.40 | Away Market D: | Offer 20 @ 2.70 |
| Away Market D: | Bid 20 @ 2.40 | | |
| Order C: | Buy 10 @ 2.35 | | |

The market maker quote engine 32b decrements the LMM Offer by the 40 contracts executed, completely depleting it. The market maker quote book 33a now looks like this (the lead market maker will manually replenish its offer, but this is not illustrated to simplify the example):

| | Bids | | Offers |
|---|---|---|---|
| MM2: | Bid 30 @ 2.50 | MM2: | Offer 30 @ 2.70 |
| LMM: | Bid 40 @ 2.45 | | |

The internal order book 29a now looks like this:

| | Bids | | Offers |
|---|---|---|---|
| Order A: | Buy 10 @ 2.50 | Order E: | Sell 10 @ 2.60 |
| Order B: | Buy 10 @ 2.40 | Order F: | Sell 10 @ 2.65 |
| Order C: | Buy 10 @ 2.35 | | |

The market center BBO is now 2.50 to 2.60 (40×10)
The public order book looks like this:

| Bids | Offers |
|---|---|
| 40 @ 2.50 | 10 @ 2.60 ← |
| 40 @ 2.45 | 10 @ 2.65 |
| 10 @ 2.40 | 30 @ 2.70 |
| 10 @ 2.35 | |

The process continues to step 1942, where it checks if incoming Buy Order I still has any quantity available to trade. As it still has 200 contracts remaining, the process continues to step 1946, where it returns to the step where the routine was originally invoked, back to step 1012 of FIG. 10A.

Incoming Stand-Your-Ground Inside Limit Buy Order Matches the Non-Customer Sell Order The process continues to step 1016, where it retrieves the best offer in the virtual consolidated order and quote list, which is posted Sell Order E. In step 1018, the process checks if incoming Buy Order I's price (2.70) is greater than or equal to posted Sell Order E's price (2.60). As incoming Buy Order I's price is higher, the process continues to step 1020, where it checks if posted Sell Order E's price (2.60) is at the NBO (2.60). As Sell Order E is at the NBO, the process continues to step 1022, where it checks if posted Sell Order E is on or off the market center 20. As it is a resident book order, the process bypasses step 1026 and continues to step 1028, where it matches 10 contracts of incoming Buy Order I against posted Sell Order E, at the NBO price of 2.60. Posted Sell Order E is completely depleted and is removed from the books.

The NBBO is now 2.50 to 2.60 (70×90)
The virtual consolidated order and quote list now looks like this:

| | Bids | | Offers |
|---|---|---|---|
| MM2: | Bid 30 @ 2.50 | Away Market A: | Offer 50 @ 2.60 |
| Order A: | Buy 10 @ 2.50 | Away Market B: | Offer 40 @ 2.60 |
| Away Market C: | Bid 30 @ 2.50 | Order F: | Sell 10 @ 2.65 |
| LMM: | Bid 40 @ 2.45 | Away Market C: | Offer 30 @ 2.65 |
| Away Market B: | Bid 40 @ 2.45 | MM2: | Offer 30 @ 2.70 |
| Order B: | Buy 10 @ 2.40 | Away Market D: | Offer 20 @ 2.70 |
| Away Market A: | Bid 50 @ 2.40 | | |
| Away Market D: | Bid 20 @ 2.40 | | |
| Order C: | Buy 10 @ 2.35 | | |

The internal order book 29a now looks like this:

| | Bids | | Offers |
|---|---|---|---|
| Order A: | Buy 10 @ 2.50 | Order F: | Sell 10 @ 2.65 |
| Order B: | Buy 10 @ 2.40 | | |
| Order C: | Buy 10 @ 2.35 | | |

The market center BBO is now 2.50 to 2.65 (40×10)
The public order book looks like this:

| Bids | Offers |
|---|---|
| 40 @ 2.50 | 10 @ 2.65 ← |
| 40 @ 2.45 | 30 @ 2.70 |
| 10 @ 2.40 | |
| 10 @ 2.35 | |

The process bypasses step 1030 and continues to step 1032, where it checks if incoming Buy Order I still has any quantity available to trade. As it still has 190 contracts remaining, the process returns to step 1016 and retrieves the best offer in the virtual consolidated order and quote list, which is Away Market A's offer. In step 1018, the process checks if incoming Buy Order I's price (2.70) is greater than or equal to Away Market A's offer (2.60). As incoming Buy Order I's price is higher, the process continues to step 1020, where it checks if Away Market A's offer (2.60) is at the NBO (2.60). As it is indeed at the NBO, the process continues to step 1022, where it checks if Away Market A's offer is on or off the market center 20. As it is an away market quote, the process continues to step 1024.

Incoming Stand-Your-Ground Inside Limit Buy Order Routes to the Best Away Market Offer The process continues to step 1024, where it allows the Routing Process to determine the highest-ranking eligible away market at the NBO. In this example, the Routing Process determines that both Away Market A and Away Market B are eligible away markets, but Away Market A has a higher priority for routing. As no prior orders have been routed to Away Market A in this example, the process satisfies its full disseminated offer size by routing 50 contracts to Away Market A, at the NBO price of 2.60.

After routing to Away Market A, the process continues to step 1032, where it checks if incoming Buy Order I has any quantity still available to trade. As it still has 140 contracts remaining, the process returns to step 1016, where it retrieves the best offer in the virtual consolidated order and quote list. As Away Market A's offer has been completely satisfied, the best offer is now Away Market B's offer. In step 1018, the process checks if incoming Buy Order I's price (2.70) is greater than or equal to Away Market B's offer (2.60). As incoming Buy Order I's price is higher, the process continues to step 1020, where it checks if Away Market B's offer (2.60) is at the NBO (2.60). As it is indeed at the NBO, the process continues to step 1022, where it checks if Away Market B's offer is on or off the market center 20. As it is an away market quote, the process continues to step 1024.

Incoming Stand-Your-Ground Inside Limit Buy Order Routes to the Next-Best Away Market Offer The process continues to step 1024, where the Routing Process determines that Away Market B is now eligible for routing. As no prior orders have been routed to Away Market B in this example, the process satisfies its full disseminated offer size by routing 40 contracts to Away Market B, at the NBO price of 2.60.

After routing to Away Market B, the process continues to step 1032, where it checks if incoming Buy Order I has any quantity still available to trade. As it still has 100 contracts remaining, the process returns to step 1016, where it retrieves the best offer in the virtual consolidated order and quote list, which is posted Sell Order F. In step 1018, the process checks if incoming Buy Order I's price (2.70) is greater than or equal to posted Sell Order F's price (2.65). As incoming Buy Order I's price is higher, the process continues to step 1020, where it checks if posted Sell Order F's price (2.65) is at the NBO (2.60). As Sell Order F's price is inferior to the NBO, incoming Buy Order I cannot execute against it, as inside limit orders can only execute at the NBBO by definition in this embodiment.

Incoming Stand-Your-Ground Inside Limit Buy Order is Capped at the NBO and Posted The process continues to step 1040, where it "caps" incoming Buy Order I, at the NBO price of 2.60. It does this by retaining incoming Buy Order I's original limit price (2.70), but posting it at the NBO price (2.60) so that it locks, but does not cross, the NBO. The process continues to step 1042, where it ranks Buy Order I in the Display Order Process of the internal order book 29a according to its "capped" price of 2.60, and disseminates Buy Order I to the public order book.

The NBBO is now 2.60 to 2.60 (100×90). The market is locked.

The virtual consolidated order and quote list now looks like this:

|  | Bids |  | Offers |
|---|---|---|---|
| Order 1: | Buy 100 @ 2.60 ← Original price = 2.70 | Away Market A: | Offer 50 @ 2.60 |
| MM2: | Bid 30 @ 2.50 | Away Market B: | Offer 40 @ 2.60 |
| Order A: | Buy 10 @ 2.50 | Order F: | Sell 10 @ 2.65 |
| Away Market C: | Bid 30 @ 2.50 | Away Market C: | Offer 30 @ 2.65 |
| LMM: | Bid 40 @ 2.45 | MM2: | Offer 30 @ 2.70 |
| Away Market B: | Bid 40 @ 2.45 | Away Market D: | Offer 20 @ 2.70 |
| Order B: | Buy 10 @ 2.40 |  |  |
| Away Market A: | Bid 50 @ 2.40 |  |  |
| Away Market D: | Bid 20 @ 2.40 |  |  |
| Order C: | Buy 10 @ 2.35 |  |  |

The internal order book 29a now looks like this:

|  | Bids |  | Offers |
|---|---|---|---|
| Order I: | Buy 100 @ 2.60 ← Original price = 2.70 | Order F: | Sell 10 @ 2.65 |
| Order A: | Buy 10 @ 2.50 |  |  |
| Order B: | Buy 10 @ 2.40 |  |  |
| Order C: | Buy 10 @ 2.35 |  |  |

The market center BBO is now 2.60 to 2.65 (100×10)

The public order book looks like this:

| Bids | Offers |
|---|---|
| 100 @ 2.60 ← | 10 @ 2.65 |
| 40 @ 2.50 | 30 @ 2.70 |
| 40 @ 2.45 |  |
| 10 @ 2.40 |  |
| 10 @ 2.35 |  |

Away Markets Fill the Routed Orders, but the Posted Stand-Your-Ground Inside Limit Buy Order does not Ship Additional Quantity Away Market A fills the 50 contracts routed to it Unlike a reprice-and-ship inside limit order, which routes to an away market that fills it so long as the away market and the posted order are both still at the NBBO, in this embodiment, a stand-your-ground inside limit order does NOT ship additional contracts to an away market in response to a fill. Accordingly, posted Buy Order I does not ship to Away Market A.

Away Market B fills the 40 contracts routed to it

Just as posted Buy Order I did not ship to Away Market A, neither does it ship to Away Market B.

Away Market Fades its Offer Price, but the NBO Price Remains Unchanged

Away Market A fades its offer from the NBO

The NBBO is now 2.60 to 2.60 (100×40). The market is still locked.

The away market BBO book 25a looks like this:

|  | Bids |  | Offers |
|---|---|---|---|
| Away Market C: | Bid 30 @ 2.50 | Away Market B: | Offer 40 @ 2.60 |
| Away Market B: | Bid 40 @ 2.45 | Away Market C: | Offer 30 @ 2.65 |
| Away Market A: | Bid 50 @ 2.40 | Away Market A: | Offer 30 @ 2.65 ← |
| Away Market D: | Bid 20 @ 2.40 | Away Market D: | Offer 20 @ 2.70 |

The quote engine 23a notifies the order matching engine 21 of the change to Away Market A's offer price. As the NBO price is still 2.60, posted Buy Order I is not affected by Away Market A's new offer, as it only reduces the size at the current NBO price of 2.60.

Second Away Market Fades its Offer Price, and the NBO Moves Away from the Capped Stand-Your-Ground Inside Limit Buy Order Away Market B fades its offer from the NBO The NBBO is now 2.60 to 2.65 (100×90). The market is no longer locked.

The away market BBO book 25a looks like this:

|  | Bids |  | Offers |
|---|---|---|---|
| Away Market C: | Bid 30 @ 2.50 | Away Market C: | Offer 30 @ 2.65 |
| Away Market B: | Bid 40 @ 2.45 | Away Market A: | Offer 30 @ 2.65 |
| Away Market A: | Bid 50 @ 2.40 | Away Market B: | Offer 20 @ 2.65 ← |
| Away Market D: | Bid 20 @ 2.40 | Away Market D: | Offer 20 @ 2.70 |

The quote engine 23a notifies the order matching engine 21 of the change to Away Market B's offer price, and the change to the NBO price. As described in step 1044, as the NBO price has moved higher (it was previously 2.60, but is now 2.65), the process removes the cap from posted Buy Order I, allowing it to revert to its original order price of 2.70, and processes it as if it were a new incoming order, removing it from the books.

Posted Stand-Your-Ground Inside Limit Buy Order's Cap is Removed, and the Remaining Quantity is Processed Like a New Incoming Order In step 1002, the process retrieves the NBO (2.65). In step 1004, it checks if "incoming" Buy Order I's price (2.70, its original price) is marketable, i.e., is at or better than the NBO (2.65). As it is, the process continues to step 1005, where it initiates the "Too-Executable Buy Order Check Process," and proceeds to step 1600 in FIG. 16. Buy Order I is not "too executable," as the MaxBuyPrice is now 3.00 (NBO price of 2.65+0.35=3.00) The process then continues to step 1006, where it combines the away market BBO book 25a, the market maker quote book 33a, and the internal order book 29a together in a virtual consolidated order and quote list, which it ranks in price/display/time priority, but with a preference for resident interest over away market interest at the same price level.

The virtual consolidated order and quote list looks like this:

| | Bids | | Offers |
|---|---|---|---|
| MM2: | Bid 30 @ 2.50 | Order F: | Sell 10 @ 2.65 |
| Order A: | Buy 10 @ 2.50 | Away Market C: | Offer 30 @ 2.65 |
| Away Market C: | Bid 30 @ 2.50 | Away Market A: | Offer 30 @ 2.65 |
| LMM: | Bid 40 @ 2.45 | Away Market B: | Offer 20 @ 2.65 |
| Away Market B: | Bid 40 @ 2.45 | MM2: | Offer 30 @ 2.70 |
| Order B: | Buy 10 @ 2.40 | Away Market D: | Offer 20 @ 2.70 |
| Away Market A: | Bid 50 @ 2.40 | | |
| Away Market D: | Bid 20 @ 2.40 | | |
| Order C: | Buy 10 @ 2.35 | | |

The process continues to step 1008, where it checks if this issue has any assigned market makers. As it does, the process continues to step 1010, where it checks if "incoming" Buy Order I is a directed order or not. It should be noted that once an order is posted, it is never treated as a directed order again, even if it was originally sent as a directed order. As Buy Order I is not a directed order, the process continues to step 1012, to initiate the "LMM Guaranteed Offer Process." However, as the LMM Offer is not replenished in any of the examples of this document for ease of illustration, the process continues to step 1016 instead.

Uncapped Stand-Your-Ground Inside Limit Buy Order Matches Posted Sell Order

In step 1016, the process retrieves the best offer in the virtual consolidated order and quote list, which is posted Sell Order F. In step 1018, the process checks if "incoming" Buy Order I's price (2.70) is greater than or equal to posted Sell Order F's price (2.65). As Buy Order I's price is higher, the process continues to step 1020, where it checks if posted Sell Order F's price (2.65) is at the NBO (2.65). As Sell Order F is at the NBO, the process continues to step 1022, where it checks if posted Sell Order F is on or off the market center 20. As it is a resident book order, the process bypasses step 1026 and continues to step 1028, where it matches 10 contracts of Buy Order I against posted Sell Order F, at the NBO price of 2.65. Posted Sell Order F is completely depleted and is removed from the books.

The NBBO is now 2.50 to 2.65 (70×80)

The virtual consolidated order and quote list now looks like this:

| | Bids | | Offers |
|---|---|---|---|
| MM2: | Bid 30 @ 2.50 | Away Market C: | Offer 30 @ 2.65 |
| Order A: | Buy 10 @ 2.50 | Away Market A: | Offer 30 @ 2.65 |
| Away Market C: | Bid 30 @ 2.50 | Away Market B: | Offer 20 @ 2.65 |
| LMM: | Bid 40 @ 2.45 | MM2: | Offer 30 @ 2.70 |
| Away Market B: | Bid 40 @ 2.45 | Away Market D: | Offer 20 @ 2.70 |
| Order B: | Buy 10 @ 2.40 | | |
| Away Market A: | Bid 50 @ 2.40 | | |
| Away Market D: | Bid 20 @ 2.40 | | |
| Order C: | Buy 10 @ 2.35 | | |

The internal order book 29a now looks like this:

| | Bids | Offers |
|---|---|---|
| Order A: | Buy 10 @ 2.50 | |
| Order B: | Buy 10 @ 2.40 | |
| Order C: | Buy 10 @ 2.35 | |

The market center BBO is now 2.50 to 2.70 (40×30)
The public order book looks like this:

| Bids | Offers |
|---|---|
| 40 @ 2.50 | 30 @ 2.70 ← |
| 40 @ 2.45 | |
| 10 @ 2.40 | |
| 10 @ 2.35 | |

The process bypasses step 1030 and continues to step 1032, where it checks if incoming Buy Order I still has any quantity available to trade. As it still has 90 contracts remaining, the process returns to step 1016 and retrieves the best offer in the virtual consolidated order and quote list, which is Away Market C's offer. In step 1018, the process checks if incoming Buy Order I's price (2.70) is greater than or equal to Away Market C's offer (2.65). As incoming Buy Order I's price is higher, the process continues to step 1020, where it checks if Away Market C's offer (2.65) is at the NBO (2.65). As it is indeed at the NBO, the process continues to step 1022, where it checks if Away Market C's offer is on or off the market center 20. As it is an away market quote, the process continues to step 1024.

Uncapped Stand-Your-Ground Inside Limit Buy Order Routes to the Best Away Market Offer The process continues to step 1024, where it allows the Routing Process to determine the highest-ranking eligible away market at the NBO. In this example, the Routing Process determines that Away Markets A, B, and C are eligible away markets, but Away Market C has the highest priority for routing, Away Market A has the second-highest priority for routing, and Away Market B has the third-highest priority for routing. As no prior orders have been routed to Away Market C in this example, the process satisfies its full disseminated offer size by routing 30 contracts to Away Market C, at the NBO price of 2.65.

After routing to Away Market C, the process continues to step 1032, where it checks if incoming Buy Order I has any quantity still available to trade. As it still has 60 contracts remaining, the process returns to step 1016, where it retrieves the best offer in the virtual consolidated order and quote list. As Away Market C's offer has been completely satisfied, the best offer is now Away Market A's offer. In step 1018, the process checks if incoming Buy Order I's price (2.70) is greater than or equal to Away Market A's offer (2.65). As Buy Order I's price is higher, the process continues to step 1020, where it checks if Away Market A's offer (2.65) is at the NBO (2.65). As it is indeed at the NBO, the process continues to step 1022, where it checks if Away Market A's offer is on or off the market center 20. As it is an away market quote, the process continues to step 1024.

Uncapped Stand-Your-Ground Inside Limit Buy Order Routes to the Second-Best Away Market Offer The process continues to step 1024, where the Routing Process determines that Away Market A is now eligible for routing. As no prior orders have been routed to Away Market A since it faded its offer price, the process satisfies its full disseminated offer size by routing 30 contracts to Away Market A, at the NBO price of 2.65.

After routing to Away Market A, the process continues to step 1032, where it checks if incoming Buy Order I has any quantity still available to trade. As it still has 30 contracts remaining, the process returns to step 1016, where it retrieves the best offer in the virtual consolidated order and quote list, which is now Away Market B's offer. In step 1018, the process checks if Buy Order I's price (2.70) is greater than or equal to Away Market B's offer (2.65). As Buy Order I's price is higher, the process continues to step 1020, where it checks if Away Market B's offer (2.65) is at the NBO (2.65). As it is indeed at the NBO, the process continues to step 1022, where it checks if Away Market B's offer is on or off the market center 20. As it is an away market quote, the process continues to step 1024.

Uncapped Stand-Your-Ground Inside Limit Buy Order Routes to the Third-Best Away Market Offer The process continues to step 1024, where the Routing Process determines that Away Market B is now eligible for routing. As no prior orders have been routed to Away Market B since it faded its offer price, the process satisfies its full disseminated offer size by routing 20 contracts to Away Market B, at the NBO price of 2.65.

After routing to Away Market B, the process continues to step 1032, where it checks if incoming Buy Order I has any quantity still available to trade. As it still has 10 contracts remaining, the process returns to step 1016, where it retrieves the best offer in the virtual consolidated order and quote list, which is now the MM2 Offer. In step 1018, the process checks if Buy Order I's price (2.70) is greater than or equal to the MM2 Offer (2.70). As the prices are equal, the process continues to step 1020, where it checks if the MM2 Offer (2.70) is at the NBO (2.65). As the MM2 Offer price is inferior to the NBO, incoming Buy Order I cannot execute against it, as inside limit orders can only execute at the NBBO by definition in this embodiment.

Uncapped Stand-Your-Ground Inside Limit Buy Order is Canned at the New NBO, and Posted The process continues to step 1040, where it "caps" the remaining quantity of Buy Order I, at the NBO price of 2.65. As before, it does this by retaining incoming Buy Order I's original limit price (2.70), but posting it at the NBO price (2.65) so that it locks, but does not cross, the NBO. The process continues to step 1042, where it ranks Buy Order I in the Display Order Process of the internal order book 29a according to its "capped" price of 2.65, and disseminates Buy Order I to the public order book.

The NBBO is now 2.65 to 2.65 (10×80). The market is now locked.

The virtual consolidated order and quote list now looks like this:

| | Bids | | Offers |
|---|---|---|---|
| Order I: | Buy 10 @ 2.65 ←<br>Original<br>price = 2.70 | Away<br>Market C: | Offer 30 @ 2.65 |
| MM2: | Bid 30 @ 2.50 | Away<br>Market A: | Offer 30 @ 2.65 |
| Order A: | Buy 10 @ 2.50 | Away<br>Market B: | Offer 20 @ 2.65 |
| Away<br>Market C: | Bid 30 @ 2.50 | MM2: | Offer 30 @ 2.70 |
| LMM: | Bid 40 @ 2.45 | Away<br>Market D: | Offer 20 @ 2.70 |
| Away<br>Market B: | Bid 40 @ 2.45 | | |

-continued

| | Bids | Offers |
|---|---|---|
| Order B: | Buy 10 @ 2.40 | |
| Away<br>Market A: | Bid 50 @ 2.40 | |
| Away<br>Market D: | Bid 20 @ 2.40 | |
| Order C: | Buy 10 @ 2.35 | |

The internal order book 29a now looks like this:

| | Bids | Offers |
|---|---|---|
| Order I: | Buy 10 @ 2.65 ←<br>Original price = 2.70 | |
| Order A: | Buy 10 @ 2.50 | |
| Order B: | Buy 10 @ 2.40 | |
| Order C: | Buy 10 @ 2.35 | |

The market center BBO is now 2.65 to 2.70 (10×30)

The public order book now looks like this:

| Bids | Offers |
|---|---|
| 10 @ 2.65 ← | 30 @ 2.70 |
| 40 @ 2.50 | |
| 40 @ 2.45 | |
| 10 @ 2.40 | |
| 10 @ 2.35 | |

The virtual consolidated order and quote list is deleted from local memory.

Away Markets Fill the Routed Orders, but the Posted Stand-Your-Ground Inside Limit Buy Order does not Ship Away Markets C, A, and B fill the orders routed to them Posted Buy Order I does not route additional contracts to them. If the NBO moves away again (to the price of 2.70) before posted Buy Order I executes against an incoming marketable sell order, then the process will remove Buy Order I's cap once again and treat it as a new incoming order. The uncapped order will be allowed to execute at its original limit price of 2.70.

Sweep Limit Orders

A sweep limit order is similar to an inside limit order in that it cannot route to an away market off the NBBO. But unlike an inside limit order, in this embodiment, an incoming sweep limit order contemporaneously executes with book orders priced at one tick inferior to the NBBO, as allowed by marketplace rules (e.g., the trade-and-ship exception). If marketplace rules also allow market maker quotes to execute at one tick inferior to the NBBO, then an incoming sweep limit order will also execute with such market maker quotes. For example, an incoming sweep limit sell order that is priced better (lower) than the NBB would execute in the sequence shown below:

| Price Point | Display Order Process | Working Order Process | | | | Routing Process |
|---|---|---|---|---|---|---|
| | | Bid Side of the Virtual Consolidated Order and Quote List | | | | |
| Highest Price (NBB) | 1. Displayed orders and quotes at the NBB | 2. Reserve order quantity at the NBB | 3. Passive Liquidity Orders at the NBB | 4. Discretionary Orders that can step up to the NBB | 5. Tracking Liquidity Orders at the NBB | 6. Away Market Bids at the NBB |
| $2^{nd}$-highest price point (NBB less one tick) | 7. Displayed orders (and quotes, if allowed) at the NBB less one tick | 8. Reserve order quantity at the NBB less one tick | 9. Passive Liquidity Orders at the NBB less one tick | 10. Discretionary Orders that can step up to the NBB less one tick | | |

An incoming sweep limit order that cannot execute when it is received is immediately posted at its user-specified limit price. The nonmarketable sweep limit order is inserted in the internal order book 29a and ranked according to price/time priority in the Display Order Process. The order is also disseminated to the public order book. Posted customer sweep limit orders that are priced at the NBBO are eligible to execute against incoming marketable orders in the LMM Guarantee Process or the Directed Order Process, like any other displayed order type, if they have time priority over the eligible market maker quote.

An incoming sweep limit order that is marketable at the opposite side of the NBBO will participate in the LMM Guarantee Process if the lead market maker is quoting at the opposite side of the NBBO. Similarly, if the business rules of the market center 20 allow sweep limit orders to be directed to a specific market maker, then an incoming sweep limit order that is executable at the opposite side of the NBBO will participate in the Directed Order Process if the designated market maker is quoting at the opposite side of the NBBO.

After executing contemporaneously with orders (and market maker quotes, if allowed) priced at one tick inferior to the NBBO, if a sweep limit order's price would cross the NBBO if it were to be posted, it is automatically capped at the opposite side of the NBBO before it is posted, i.e., the order will lock the market but it will not cross the market. The remaining portion of the sweep limit order is inserted in the Display Order Process of the internal order book 29a and is ranked according to the price/time priority of its current (capped) displayed price. The order is also disseminated to the public order book at its current (capped) displayed price. The process stores the original user-specified price so that the order can subsequently be repriced more aggressively if the NBBO moves away. As the quote engine 23a notifies the order matching engine 21 whenever a disseminated best bid or offer quote price touches any order price, whether displayed or not, in this embodiment, and this may increase the processing overhead, sweep limit orders are subject to the check for excessive marketability when they are first received to ensure that their original prices are not too far through the NBBO.

Once posted, a sweep limit order behaves in a manner that is similar to a posted stand-your-ground inside limit order. A sweep limit order stands its ground if locked or crossed by an away market 24, and neither reprices nor ships. Only when the NBBO moves away from the posted sweep limit order does it reprice more aggressively to execute further.

If the NBBO moves away from the posted sweep limit order so that the market is no longer locked, then the process removes the cap, and allows the order to revert to its original user-specified limit price. The repriced order loses its standing in the internal order book 29a and is processed as if it were a new incoming order. The order is allowed to execute with all trading interest at the new NBBO price, and to execute with book orders (and market maker quotes, if allowed) at one tick inferior to the new NBBO price. After the sweep limit order can execute no further, if its price would still cross the market if it were to be posted, it is automatically capped at the opposite side of the new NBBO before it is posted, locking the market again. This process continues until the sweep limit order is depleted, or can be displayed at its original user-specified limit price without crossing the market. Once the sweep limit order is displayed at its original price, it is never capped again.

As described above, the unfilled portion of the sweep limit order is not routed to the next price level until all the quotes at the current NBBO are exhausted and the away markets fade their quotes. This behavior is referred to as "walking the book," as each price level must be cleared before routing to the next price level. As each price level is cleared, the sweep limit order can execute at an increasingly aggressive price.

Incoming Sweep Limit Buy Order Received Process

Figure 12A:
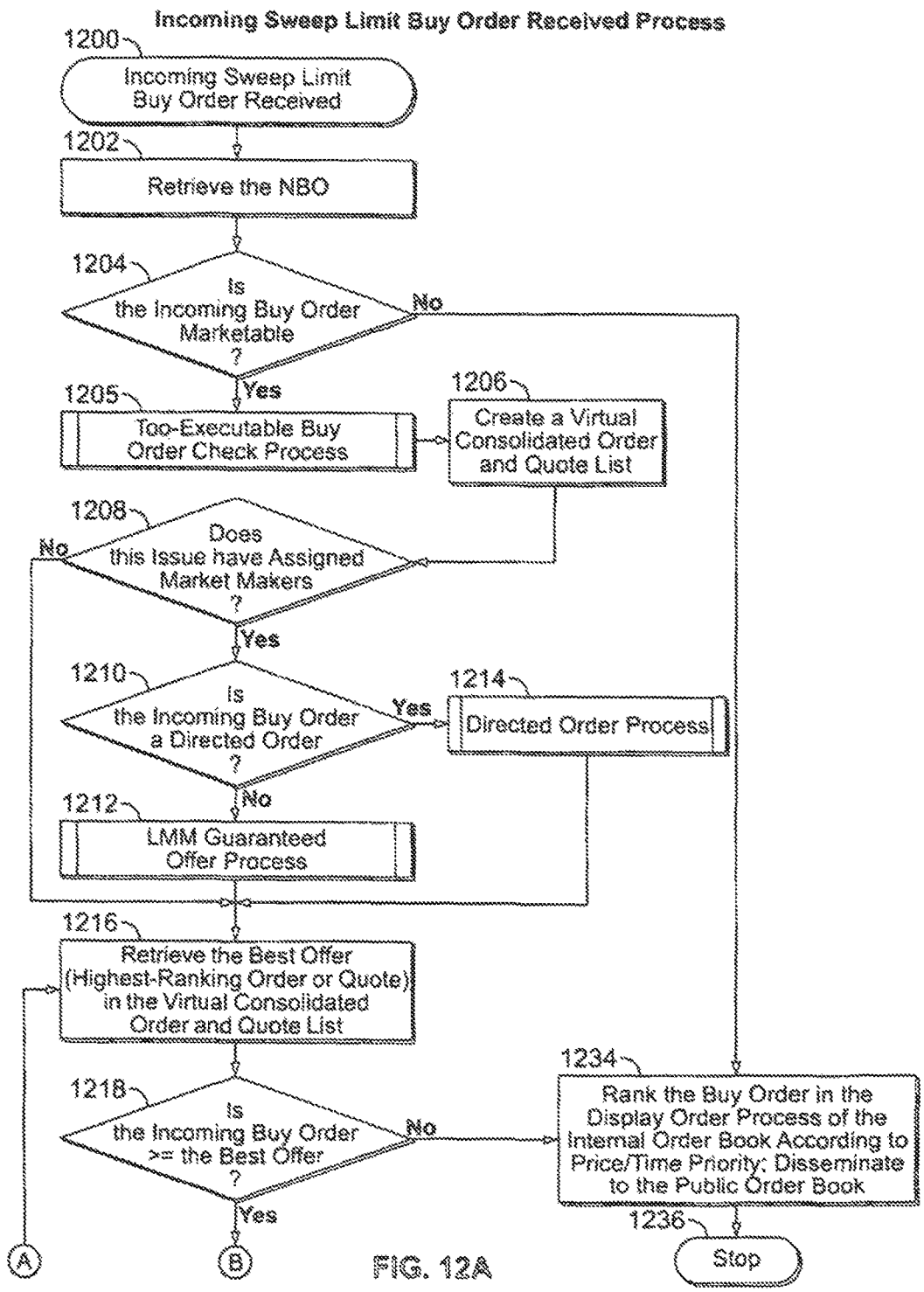
FIGS. 12A-12B are flow diagrams illustrating a process for receiving an incoming sweep limit buy order in an embodiment of the present invention.
Figure 12B:
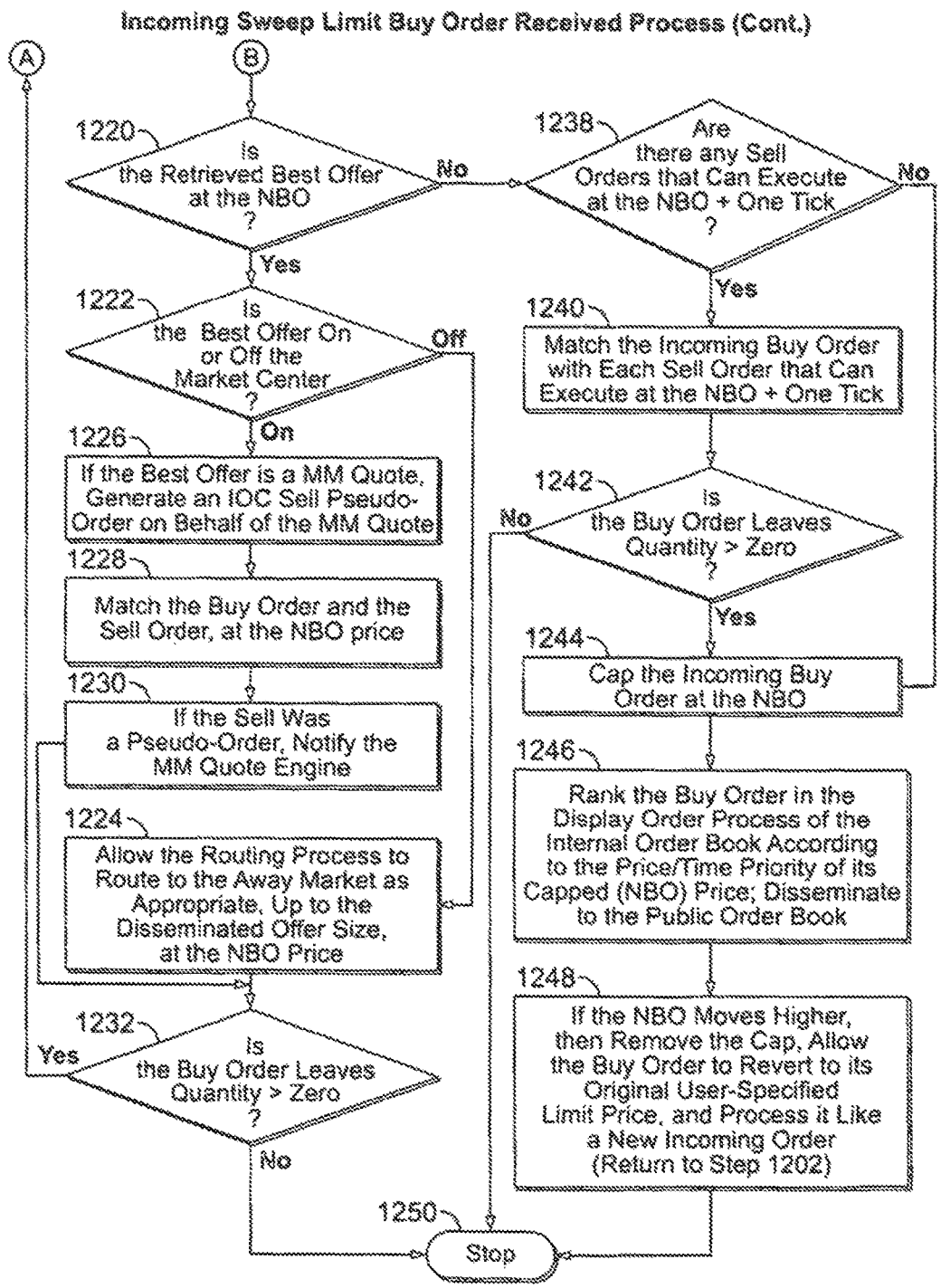

Referring now to FIGS. 12A-12B, the process is illustrated where the order matching engine 21 receives an incoming sweep limit buy order. In this embodiment, a sweep limit buy order can route to away markets only if they are quoting at the NBO, but can contemporaneously match book orders at a price that is one tick inferior to the NBO after all the away markets at the NBO have been satisfied. Any remaining portion of the order is capped (repriced) at the NBO and posted, locking the market. Once capped and posted, if the NBO subsequently moves away from the order's capped price, then the cap is removed and the order is allowed to execute further.

In step 1202, the process retrieves the NBO, and in step 1204, the process determines if the incoming sweep limit buy order is marketable. If the process determines that the incoming sweep limit buy order is marketable, then the process continues to step 1205, where it initiates the "Too-Executable Buy Order Check Process," and proceeds to step 1600 in FIG. 16. If the incoming buy order is not canceled in the Too-Executable Buy Order Check Process, i.e., it is not determined to be too executable, then the process continues to step 1206, where it creates a virtual consolidated order and quote list for the option series.

The process continues to step 1208, where it checks if the option series has any assigned market makers. If it does, then the process continues to step 1210, where it checks if the incoming sweep limit buy order is a directed order or not. If the incoming sweep limit buy order is a directed order, then the process continues to step 1214 where the "Directed Order Process" is initiated in step 2000 in FIG. 20A. If, however, the incoming sweep limit buy order is not a directed order, then the process proceeds to step 1212 where the "LMM Guaranteed Offer Process" is initiated instead in step 1900 in FIG. 19.

Regardless of whether the incoming sweep limit buy order executes in the Directed Order Process, in the LMM Guaranteed Offer Process, or in neither process (if the applicable market maker is not quoting at the NBO and is therefore ineligible for a guaranteed entitlement, or else if the issue does not have any assigned market makers), if the incoming sweep limit buy order still has quantity available to trade, then the process continues to step 1216, where it retrieves the best offer in the virtual consolidated order and quote list, i.e., the sell order, market maker quote, or disseminated away market quote with the highest ranking. In step 1218, the process checks if the incoming sweep limit buy order is still marketable (by way of explanation, it is possible that it is no longer marketable if the quotes and orders at the NBO were exhausted).

At step 1218, if the process determines that the incoming sweep limit buy order is still marketable, then it continues to step 1220, where it checks if the retrieved best offer is at the NBO. If the retrieved best offer is at the NBO, then the process continues to step 1222, where it checks if the retrieved best offer is on or off the market center 20. If the retrieved best offer is on the market center 20, then the process continues to step 1226, where if the retrieved best offer is a market maker quote, the process automatically generates an IOC sell pseudo-order on behalf of the underlying market maker quote. The process continues to step 1228, where it matches the incoming sweep limit buy order against the retrieved sell order or pseudo-order, at the NBO price. If the matched sell order is a pseudo-order, then in step 1230, the process notifies the market maker quote engine 32b of the quantity that was executed so that the market maker quote engine 32b can decrement the underlying market maker quote.

The process continues to step 1232, where it checks if the incoming sweep limit buy order still has quantity available to trade. If it does not, then the process continues to step 1250, where it terminates as indicated. If, however, the incoming sweep limit buy order does still have remaining quantity, then the process returns to step 1216, where it retrieves the next-best offer in the virtual consolidated order and quote list and continues to step 1218, where it checks if the incoming sweep limit buy order is still marketable. The process continues to execute the incoming sweep limit buy order against all resident trading interest at the NBO as described above, until the incoming sweep limit buy order is depleted, or else until the retrieved best offer is an away market quote, as described next.

Returning to step 1222, if, however, the retrieved best offer is an away market quote, then in step 1224, the process releases the incoming sweep limit buy order to the Routing Process, which routes to the highest-ranking away market as appropriate, up to its disseminated offer size, at the NBO price. After routing to the away market, the process continues to step 1232, where it checks if the incoming sweep limit buy order still has quantity available to trade. If the order is depleted, then the process terminates in step 1250 as indicated. If, however, the order still has remaining quantity, then the process returns to step 1216, where it retrieves the next best offer, and if the retrieved best offer is at the NBO, routes to the next-highest ranking away market according to the steps just described.

Returning to step 1220, if the retrieved best offer is inferior to the NBO, then the process continues to step 1238, where it checks if there are any resting sell orders that can execute at one tick inferior to the NBO. If there are sell orders that can execute at one tick inferior to the NBO, then in step 1240, the process executes the incoming sweep limit buy order against each resting sell order, in the sequence of their ranking in the virtual consolidated order and quote list. In step 1242, the process checks if the incoming sweep limit buy order still has quantity available to trade after matching all sell orders priced at one tick inferior to the NBO. If the incoming buy order was depleted, then the process terminates in step 1250 as indicated. If, however, the incoming sweep limit buy order still has quantity available to trade, then the process continues to step 1244.

In step 1244, the process caps the incoming sweep limit buy order's price at the NBO so that it locks, but does not cross, the market. The process then continues to step 1246, where it ranks the order in the Display Order Process of the internal order book 29a according to the price/time priority of its current price (the NBO), and disseminates the order to the public order book.

Continuing to step 1248, if the quote engine 23a notifies the order matching engine 21 that the NBO price has moved higher while the capped sweep limit buy order is posted, then the capped order can execute further. The process removes the cap, allows the sweep limit buy order to revert to its original user-specified limit price, and processes it as if it were a new incoming order. Accordingly, the process returns to step 1202, and the sweep limit buy order is allowed to execute further at its more aggressive price. After executing all trading interest at the new NBO price and the eligible sell orders priced at one tick inferior to the new NBO price, if the sweep limit buy order still has quantity remaining, then at step 1244, the process caps the order at the new NBO, and posts it at its new, more aggressive price in step 1246. This process is repeated until the sweep limit buy order is depleted, or else the NBO moves away to the extent to which the order can be posted at its original user-specified price. Once the order is posted at its original user-specified limit price, it is never capped again. The process then terminates in step 1250 as indicated.

Returning to step 1204, if, however, the incoming sweep limit buy order was never marketable, then the process continues to step 1234, where it ranks the order in the Display Order Process of the internal order book 29a according to price/time priority, and disseminates the order to the public order book. As the nonmarketable order is ranked at its original limit price, it is not affected when the NBO changes. The process then terminates in step 1236 as indicated.

Returning to step 1218, if, however, the incoming sweep limit buy order is no longer marketable, then the process continues to step 1234 and 1236 as just described.

Incoming Sweep Limit Sell Order Received Process

Figure 13A:
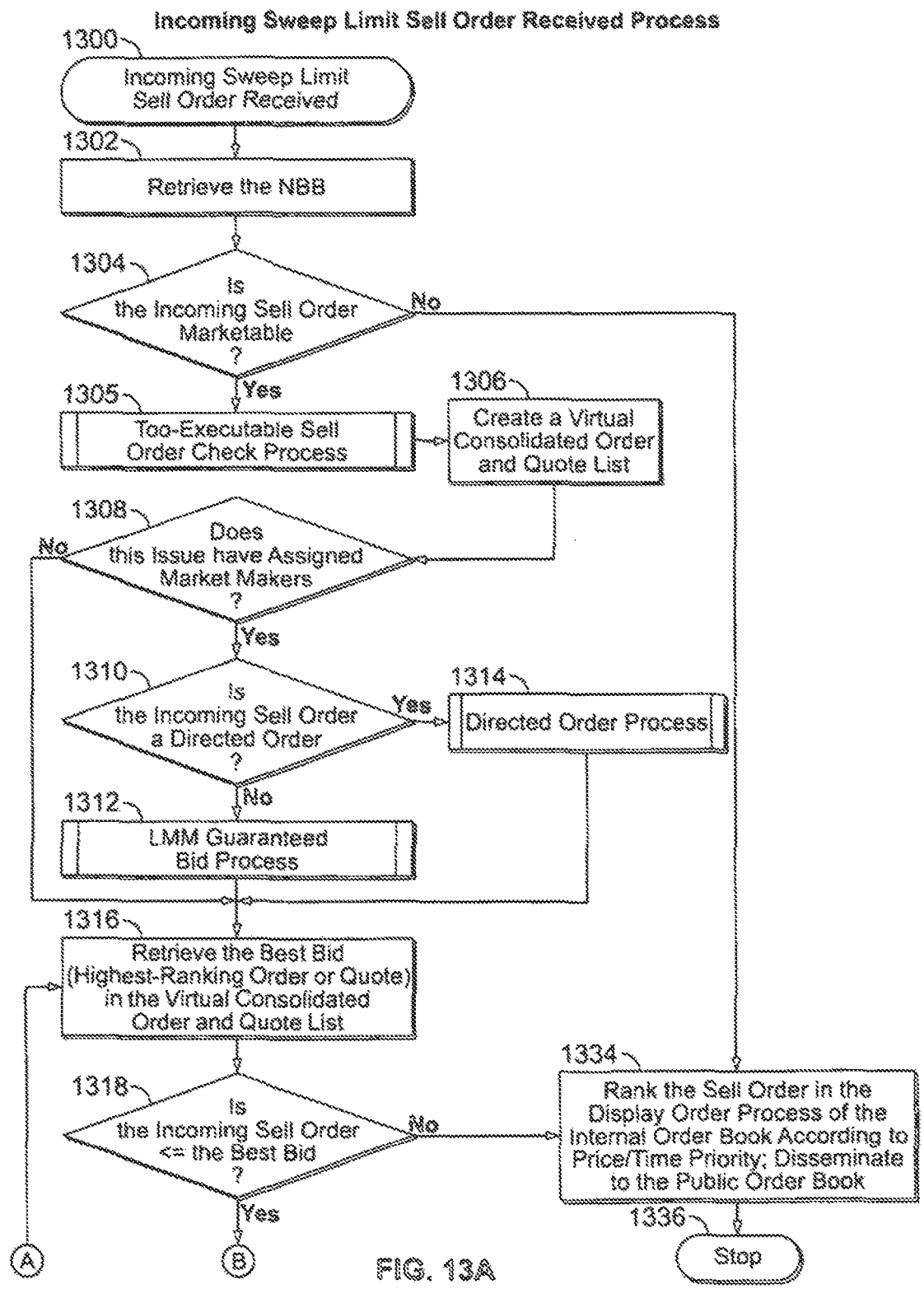
FIGS. 13A-13B are flow diagrams illustrating a process for receiving an incoming sweep limit sell order in an embodiment of the present invention.
Figure 13B:
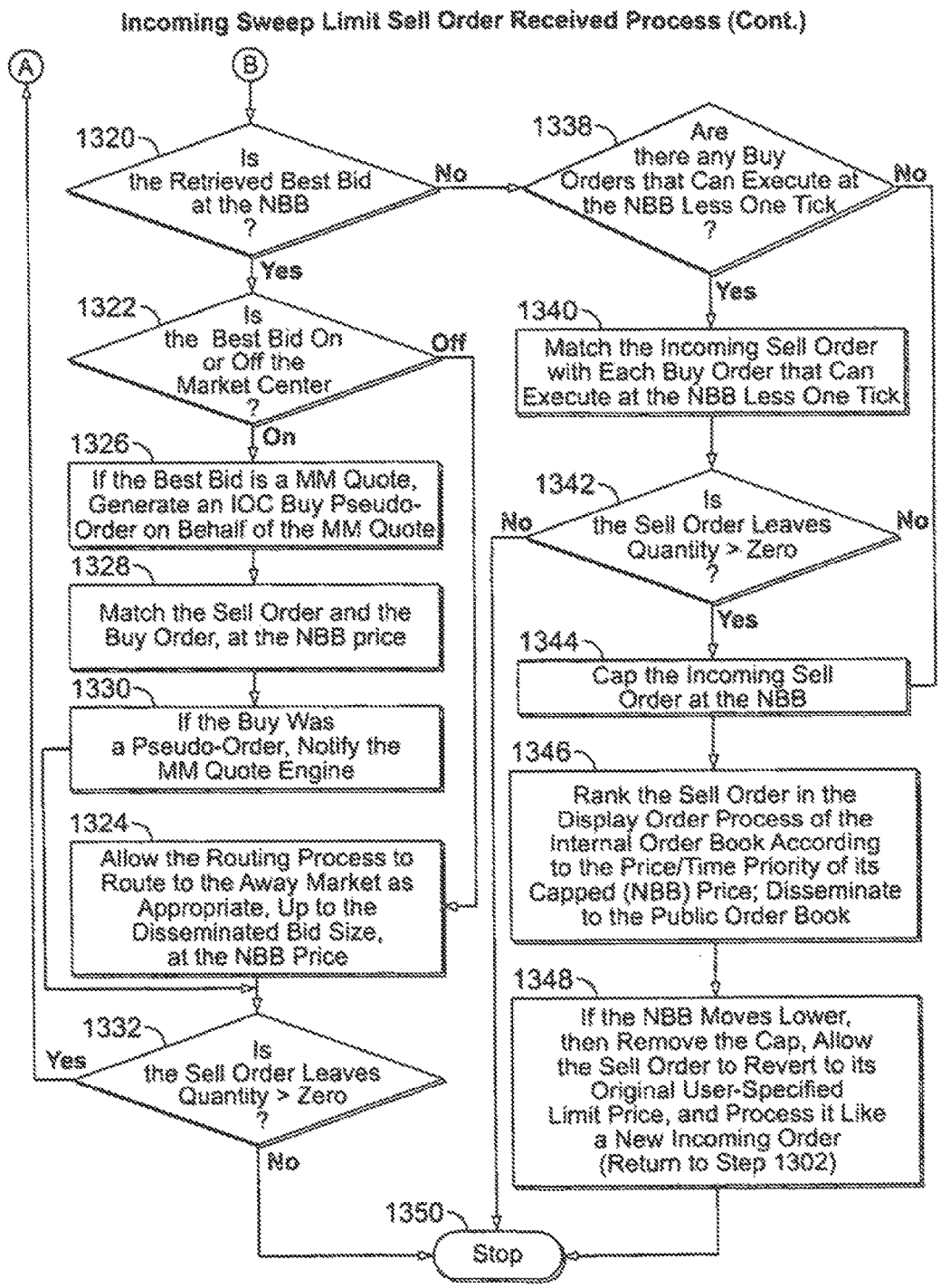

Referring now to FIGS. 13A-13B, the process is illustrated where the order matching engine 21 receives an incoming sweep limit sell order. This routine is very similar to the process described above in FIGS. 12A-12B for receiving an incoming sweep limit buy order.

In step 1302, the process retrieves the NBB, and in step 1304, the process determines if the incoming sweep limit sell order is marketable. If the process determines that the incoming sweep limit sell order is marketable, then the process continues to step 1305, where it initiates the "Too-Executable Sell Order Check Process," and proceeds to step 1700 in FIG. 17. If the incoming sell order is not canceled in the Too-Executable Sell Order Check Process, i.e., it is not determined to be too executable, the process continues to step 1306, where it creates a virtual consolidated order and quote list for the option series.

The process continues to step 1308, where it checks if the option series has any assigned market makers. If it does, then the process continues to step 1310, where it checks if the incoming sweep limit sell order is a directed order or not. If the incoming sweep limit sell order is a directed order, then the process continues to step 1314 where the "Directed Order Process" is initiated in step 2000 in FIG. 20A. If, however, the incoming sweep limit sell order is not a directed order, then the process proceeds to step 1312 where the "LMM Guaranteed Bid Process" is initiated instead in step 1800 in FIG. 18.

Regardless of whether the incoming sweep limit sell order executes in the Directed Order Process, in the LMM Guaranteed Bid Process, or in neither process (if the applicable market maker is not quoting at the NBB and is therefore ineligible for a guaranteed entitlement, or else if the issue does not have any assigned market makers), if the incoming sweep limit sell order still has quantity available to trade, then the process continues to step 1316, where it retrieves the best bid in the virtual consolidated order and quote list, i.e., the buy order, market maker quote, or disseminated away market quote with the highest ranking. In step 1318, the process checks if the incoming sweep limit sell order is still marketable (by way of explanation, it is possible that it is no longer marketable if the quotes and orders at the NBB were exhausted).

At step 1318, if the process determines that the incoming sweep limit sell order is still marketable, then it continues to step 1320, where it checks if the retrieved best bid is at the NBB. If the retrieved best bid is at the NBB, then the process continues to step 1322, where it checks if the retrieved best bid is on or off the market center 20. If the retrieved best bid is on the market center 20, then the process continues to step 1326, where if the retrieved best bid is a market maker quote, the process automatically generates an IOC buy pseudo-order on behalf of the underlying market maker quote. The process continues to step 1328, where it matches the incoming sweep limit sell order against the retrieved buy order or pseudo-order, at the NBB price. If the matched buy order is a pseudo-order, then in step 1330, the process notifies the market maker quote engine 32b of the quantity that was executed so that the market maker quote engine 32b can decrement the underlying market maker quote.

The process continues to step 1332, where it checks if the incoming sweep limit sell order still has quantity available to trade. If it does not, then the process continues to step 1350, where it terminates as indicated. If, however, the incoming sweep limit sell order does still have remaining quantity, then the process returns to step 1316, where it retrieves the next-best bid in the virtual consolidated order and quote list and continues to step 1318, where it checks if the incoming sweep limit sell order is still marketable. The process continues to execute the incoming sweep limit sell order against all resident trading interest at the NBB as described above, until the incoming sweep limit sell order is depleted, or else until the retrieved best bid is an away market quote, as described next.

Returning to step 1322, if, however, the retrieved best bid is an away market quote, then in step 1324, the process releases the incoming sweep limit sell order to the Routing Process, which routes to the highest-ranking away market as appropriate, up to its disseminated Bid size, at the NBB price. After routing to the away market, the process continues to step 1332, where it checks if the incoming sweep limit sell order still has quantity available to trade. If the order is depleted, then the process terminates in step 1350 as indicated. If, however, the order still has remaining quantity, then the process returns to step 1316, where it retrieves the next best bid, and if the retrieved best bid is at the NBB, routes to the next-highest ranking away market according to the steps just described.

Returning to step 1320, if the retrieved best bid is inferior to the NBB, then the process continues to step 1338, where it checks if there are any resting buy orders that can execute at one tick inferior to the NBB. If there are buy orders that can execute at one tick inferior to the NBB, then in step 1340, the process executes the incoming sweep limit sell order against each resting buy order, in the sequence of their ranking in the virtual consolidated order and quote list. In step 1342, the process checks if the incoming sweep limit sell order still has quantity available to trade after matching all buy orders priced at one tick inferior to the NBB. If the incoming sell order was depleted, then the process terminates in step 1350 as indicated. If, however, the incoming sweep limit sell order still has quantity available to trade, then the process continues to step 1344.

In step 1344, the process caps the incoming sweep limit sell order's price at the NBB so that it locks, but does not cross, the market. The process then continues to step 1346, where it ranks the order in the Display Order Process of the internal order book 29a according to the price/time priority of its current price (the NBB), and disseminates the order to the public order book.

Continuing to step 1348, if the quote engine 23a notifies the order matching engine 21 that the NBB price has moved lower while the capped sweep limit sell order is posted, then the capped order can execute further. The process removes the cap, allows the sweep limit sell order to revert to its original user-specified limit price, and processes it as if it were a new incoming order. Accordingly, the process returns to step 1302, and the sweep limit sell order is allowed to execute further at its more aggressive price. After executing all trading interest at the new NBB price and the eligible buy orders priced at one tick inferior to the new NBB price, if the sweep limit sell order still has quantity remaining, then at step 1344, the process caps the order at the new NBB, and posts it at its new, more aggressive price in step 1346. This process is repeated until the sweep limit sell order is depleted, or else the NBB moves away to the extent to which the order can be posted at its original user-specified price. Once the order is posted at its original user-specified limit price, it is never capped again. The process then terminates in step 1350 as indicated.

Returning to step 1304, if, however, the incoming sweep limit sell order was never marketable, then the process continues to step 1334, where it ranks the order in the Display Order Process of the internal order book 29a according to price/time priority, and disseminates the order to the public order book. As the nonmarketable order is ranked at its original limit price, it is not affected when the NBB changes. The process then terminates in step 1336 as indicated.

Returning to step 1318, if, however, the incoming sweep limit sell order is no longer marketable, then the process continues to step 1334 and 1336 as just described.

Sweep Limit Order Trading Example

In this example, the issue has an assigned lead market maker (LMM) that is quoting at the NBO when a marketable incoming sweep limit buy order is received. The sweep limit buy order executes in the LMM Guaranteed Offer Process and the Display Order Process and then routes to the away market at the NBO. After routing at the NBO, the order contemporaneously executes with a posted sell order whose price is one tick inferior to the NBO. The remaining portion of the sweep limit buy order is repriced less aggressively so that it locks, but does not cross, the NBO. When the NBO moves away from the posted sweep limit order, the order reverts to its user-specified price, routes again, executes contemporaneously with a posted sell order whose price is one tick inferior to the new NBO, and the remaining portion of the sweep limit buy order is automatically repriced and posted at the new, more aggressive NBO price.

The NBBO is 2.50 to 2.60 (70×110).

The away market BBO book 25a looks like this:

|  | Bids |  | Offers |
| --- | --- | --- | --- |
| Away Market C: | Bid 30 @ 2.50 | Away Market A: | Offer 50 @ 2.60 |
| Away Market B: | Bid 40 @ 2.45 | Away Market B: | Offer 40 @ 2.65 |
| Away Market A: | Bid 50 @ 2.40 | Away Market C: | Offer 30 @ 2.70 |
| Away Market D: | Bid 20 @ 2.40 | Away Market D: | Offer 20 @ 2.70 |

The market maker quote book 33a looks like this:

|  | Bids |  | Offers |
| --- | --- | --- | --- |
| MM2: | Bid 30 @ 2.50 | LMM: | Offer 40 @ 2.60 |
| LMM: | Bid 40 @ 2.45 | MM2: | Offer 30 @ 2.70 |

The internal order book 29a looks like this. Order D is on behalf of a customer, whereas Order E is not:

|  | Bids |  | Offers |
| --- | --- | --- | --- |
| Order A: | Buy 10 @ 2.50 | Order D: | Sell 10 @ 2.60 |
| Order B: | Buy 10 @ 2.40 | Order E: | Sell 10 @ 2.60 |
| Order C: | Buy 10 @ 2.35 | Order F: | Sell 10 @ 2.65 |
|  |  | Order X: | Sell 10 @ 2.70 |

The market center BBO is 2.50 to 2.60 (40×60)
The public order book looks like this:

| Bids | Offers |
| --- | --- |
| 40 @ 2.50 | 60 @ 2.60 |
| 40 @ 2.45 | 10 @ 2.65 |
| 10 @ 2.40 | 40 @ 2.70 |
| 10 @ 2.35 |  |

Incoming Marketable Sweep Limit Buy Order is Received

In step 1200, the order matching engine 21 receives the following order:
Order J: Buy 170 @ 2.70, Sweep Limit
In step 1202, the process retrieves the NBO (2.60). In step 1204, the process checks if incoming Buy Order J is marketable, i.e., is priced at or better than the NBO. As it is, the process continues to step 1205, where it initiates the "Too-Executable Buy Order Check Process," and proceeds to step 1600 in FIG. 16.

In step 1602, the process checks if incoming Buy Order J's price (2.70) is higher than the NBO (2.60). As it is, the process continues to step 1604, where it checks if sweep limit orders should be checked for excessive marketability. As the check for excessive marketability is enabled for sweep limit orders in this embodiment, the process continues to step 1608, where it retrieves the "MaxPercentOffN-BBO" parameter, which is configured to 15% in this example. In step 1610, the process computes the MaxPriceThruNBO by multiplying the NBO (2.60) by the MaxPercentOffNBBO (15%), deriving the MaxPriceThruNBO=0.39 (15% of 2.60=0.39). As the tick for this issue is 0.05, the process rounds the MaxPriceThruNBO down to 0.35. In step 1612, the process computes the MaxBuyPrice by adding the derived MaxPriceThruNBO (0.35) to the NBO (2.60), deriving the MaxBuyPrice of 2.95 (2.60+0.35=2.95). Accordingly, the highest price allowable for incoming Buy Order J is 2.95. The process continues to step 1614, where it checks if incoming Buy Order J's price (2.70) is higher than the MaxBuyPrice (2.95). As it is not higher, incoming Buy Order J does not need to be repriced or canceled, and the process continues to step 1616, where it returns to the step where it was originally invoked, back to step 1205.

The process continues to step 1206, where it combines the away market BBO book 25a, the market maker quote book 33a, and the internal order book 29a together in a virtual consolidated order and quote list, which it ranks in price/display/time priority, but with a preference for resident interest over away market interest at the same price level. In this example, Sell Orders D and E were received before the LMM Offer was quoted.

The virtual consolidated order and quote list looks like this:

|  | Bids |  | Offers |
| --- | --- | --- | --- |
| MM2: | Bid 30 @ 2.50 | Order D: | Sell 10 @ 2.60 |
| Order A: | Buy 10 @ 2.50 | Order E: | Sell 10 @ 2.60 |
| Away Market C: | Bid 30 @ 2.50 | LMM: | Offer 40 @ 2.60 |
| LMM: | Bid 40 @ 2.45 | Away Market A: | Offer 50 @ 2.60 |
| Away Market B: | Bid 40 @ 2.45 | Order F: | Sell 10 @ 2.65 |
| Order B: | Buy 10 @ 2.40 | Away Market B: | Offer 40 @ 2.65 |
| Away Market A: | Bid 50 @ 2.40 | MM2: | Offer 30 @ 2.70 |
| Away Market D: | Bid 20 @ 2.40 | Order X: | Sell 10 @ 2.70 |
| Order C: | Buy 10 @ 2.35 | Away Market C: | Offer 30 @ 2.70 |
|  |  | Away Market D: | Offer 20 @ 2.70 |

The process continues to step 1208, where it checks if this issue has any assigned market makers. As it does, the process continues to step 1210, where it checks if incoming Buy Order J is a directed order or not. As it is not a directed order, the process continues to step 1212, where it initiates the "LMM Guaranteed Offer Process," and proceeds to step 1900 in FIG. 19.

LMM Guarantee Process is in Effect for this Issue

In step 1902, the process retrieves the LMM Offer (40 @ 2.60). In step 1904, it checks if the LMM Offer is at the NBO (2.60). As it is, the lead market maker is entitled to guaranteed participation with incoming Buy Order J, after any superior displayed customer orders are executed first. The process continues to step 1908, where it checks if incoming Buy Order J's order size (170) is greater than two contracts. As it is, the process continues to step 1914.

Incoming Sweep Limit Buy Order Matches the Displayed Customer Sell Order with Time Priority Over the LMM Offer In step 1914, the process checks if there are any customer sell orders displayed at the NBO, and finds posted Sell Order D. The process continues to step 1916, where it stores the timestamp on the LMM Offer in the parameter "LMMOfferTimestamp." In step 1918, the process retrieves the earliest displayed customer sell order at the NBO, Sell Order D, and in step 1920, the process compares the timestamp of posted Sell Order D to the LMMOfferTimestamp. As posted Sell Order D was received earlier than the LMM Offer, the process continues to step 1922, where it matches 10 contracts of incoming Buy Order J with posted Sell Order D, completely depleting posted Sell Order D and removing it from the books.

The process continues to step 1924, where it checks if incoming Buy Order J still has quantity available to trade. As it still has 160 contracts remaining, the process continues to step 1928, where it checks if there are any additional customer sell orders at the NBO. As there are none (Sell Order E is not on behalf of a customer), the process continues to step 1932.

Incoming Sweep Limit Buy Order Matches the LMM Offer

In step 1932, the process retrieves the LMMGuaranteed-Percent parameter, which is configured to 40% in this example. In step 1934, the process derives the LMMGuaranteedAllocation (64 contracts) by multiplying the LMMGuaranteedPercent (40%) by the remaining portion of incoming Buy Order J (160 contracts). The LMMGuaranteedAllocation is the maximum quantity of contracts that can execute in the LMM Guarantee Process.

In step 1938, the process matches 40 contracts of incoming Buy Order J against the LMM Offer, the lesser of the LMMGuaranteedAllocation (64 contracts) and the LMM Offer size (40 contracts), at the NBO price of 2.60. It does this by generating an IOC pseudo-order to Sell 40 @ 2.60 on behalf of the LMM Offer, and executing incoming Buy Order J against the sell pseudo-order. The LMM Offer at 2.60 is completely depleted, and is removed from the virtual consolidated order and quote list. The process notifies the market maker quote engine 32b to decrement the LMM Offer by the 40 contracts executed. The LMM Guaranteed Offer Process has completed.

The virtual consolidated order and quote list now looks like this:

| | Bids | | Offers |
|---|---|---|---|
| MM2: | Bid 30 @ 2.50 | Order E: | Sell 10 @ 2.60 |
| Order A: | Buy 10 @ 2.50 | Away Market A: | Offer 50 @ 2.60 |
| Away Market C: | Bid 30 @ 2.50 | Order F: | Sell 10 @ 2.65 |
| LMM: | Bid 40 @ 2.45 | Away Market B: | Offer 40 @ 2.65 |
| Away Market B: | Bid 40 @ 2.45 | MM2: | Offer 30 @ 2.70 |
| Order B: | Buy 10 @ 2.40 | Order X: | Sell 10 @ 2.70 |
| Away Market A: | Bid 50 @ 2.40 | Away Market C: | Offer 30 @ 2.70 |
| Away Market D: | Bid 20 @ 2.40 | Away Market D: | Offer 20 @ 2.70 |
| Order C: | Buy 10 @ 2.35 | | |

The market maker quote engine 32b decrements the LMM Offer by the 40 contracts executed, completely depleting it. The market maker quote book 33a now looks like this (the lead market maker will manually replenish its offer, but this is not illustrated to simplify the example):

| | Bids | | Offers |
|---|---|---|---|
| MM2: | Bid 30 @ 2.50 | MM2: | Offer 30 @ 2.70 |
| LMM: | Bid 40 @ 2.45 | | |

The internal order book 29a now looks like this:

| | Bids | | Offers |
|---|---|---|---|
| Order A: | Buy 10 @ 2.50 | Order E: | Sell 10 @ 2.60 |
| Order B: | Buy 10 @ 2.40 | Order F: | Sell 10 @ 2.65 |
| Order C: | Buy 10 @ 2.35 | Order X: | Sell 10 @ 2.70 |

The market center BBO is now 2.50 to 2.60 (40×10)
The public order book looks like this:

| Bids | Offers |
|---|---|
| 40 @ 2.50 | 10 @ 2.60 ← |
| 40 @ 2.45 | 10 @ 2.65 |
| 10 @ 2.40 | 40 @ 2.70 |
| 10 @ 2.35 | |

The process continues to step 1942, where it checks if incoming Buy Order J still has any quantity available to trade. As it still has 120 contracts remaining, the process continues to step 1946, where it returns to the step where the routine was originally invoked, back to step 1212 of FIG. 12A.

Incoming Sweep Limit Buy Order Matches the Non-Customer Sell Order

The process continues to step 1216, where it retrieves the best offer in the virtual consolidated order and quote list, which is posted Sell Order E. In step 1218, the process checks if incoming Buy Order J's price (2.70) is greater than or equal to posted Sell Order E's price (2.60). As incoming Buy Order J's price is higher, the process continues to step 1220, where it checks if posted Sell Order E's price (2.60) is at the NBO (2.60). As Sell Order E is at the NBO, the process continues to step 1222, where it checks if posted Sell Order E is on or off the market center 20. As it is a resident book order, the process bypasses step 1226 and continues to step 1228, where it matches 10 contracts of incoming Buy Order J against posted Sell Order E, at the NBO price of 2.60. Posted Sell Order E is completely depleted and is removed from the books.

The NBBO is now 2.50 to 2.60 (70×50)

The virtual consolidated order and quote list now looks like this:

| | Bids | | Offers |
|---|---|---|---|
| MM2: | Bid 30 @ 2.50 | Away Market A: | Offer 50 @ 2.60 |
| Order A: | Buy 10 @ 2.50 | Order F: | Sell 10 @ 2.65 |
| Away Market C: | Bid 30 @ 2.50 | Away Market B: | Offer 40 @ 2.65 |
| LMM: | Bid 40 @ 2.45 | MM2: | Offer 30 @ 2.70 |
| Away Market B: | Bid 40 @ 2.45 | Order X: | Sell 10 @ 2.70 |
| Order B: | Buy 10 @ 2.40 | Away Market C: | Offer 30 @ 2.70 |
| Away Market A: | Bid 50 @ 2.40 | Away Market D: | Offer 20 @ 2.70 |
| Away Market D: | Bid 20 @ 2.40 | | |
| Order C: | Buy 10 @ 2.35 | | |

The internal order book 29a now looks like this:

| | Bids | | Offers |
|---|---|---|---|
| Order A: | Buy 10 @ 2.50 | Order F: | Sell 10 @ 2.65 |
| Order B: | Buy 10 @ 2.40 | Order X: | Sell 10 @ 2.70 |
| Order C: | Buy 10 @ 2.35 | | |

The market center BBO is now 2.50 to 2.65 (40×10)
The public order book looks like this:

| Bids | Offers |
|---|---|
| 40 @ 2.50 | 10 @ 2.65 ← |
| 40 @ 2.45 | 40 @ 2.70 |
| 10 @ 2.40 | |
| 10 @ 2.35 | |

The process bypasses step 1230 and continues to step 1232, where it checks if incoming Buy Order J still has any quantity available to trade. As it still has 110 contracts remaining, the process returns to step 1216 and retrieves the best offer in the virtual consolidated order and quote list, which is Away Market A's offer. In step 1218, the process checks if incoming Buy Order J's price (2.70) is greater than or equal to Away Market A's offer (2.60). As incoming Buy Order J's price is higher, the process continues to step 1220, where it checks if Away Market A's offer (2.60) is at the NBO (2.60). As it is indeed at the NBO, the process continues to step 1222, where it checks if Away Market A's offer is on or off the market center 20. As it is an away market quote, the process continues to step 1224.

Incoming Sweep Limit Buy Order Routes to the Best Away Market Offer

The process continues to step 1224, where it allows the Routing Process to determine the highest-ranking eligible away market at the NBO. Away Market A is alone at the NBO. As no prior orders have been routed to Away Market A in this example, the process satisfies its full disseminated offer size by routing 50 contracts to Away Market A, at the NBO price of 2.60.

After routing to Away Market A, the process continues to step 1232, where it checks if incoming Buy Order J has any quantity still available to trade. As it still has 60 contracts remaining, the process returns to step 1216, where it retrieves the best offer in the virtual consolidated order and quote list. As Away Market A's offer has been completely satisfied, the best offer is now posted Sell Order F. In step 1218, the process checks if incoming Buy Order J's price (2.70) is greater than or equal to Sell Order F's price (2.65). As Buy Order J's price is higher, the process continues to step 1220, where it checks if Sell Order F is at the NBO. Sell Order F's price (2.65) is inferior to the NBO (2.60).

Incoming Sweep Limit Buy Order Executes with Sell Order Priced at One Tick Inferior to the NBO The process continues to step 1238, where it checks if there are any sell orders that can execute at one tick inferior to the NBO (2.60). As Sell Order F's price (2.65) is one tick inferior, it is eligible to execute. In step 1240, the process matches 10 contracts of incoming Buy Order J against posted Sell Order F, at the price of 2.65, completely depleting Sell Order F and removing it from the books.

The NBBO is still 2.50 to 2.60 (70×50)
The virtual consolidated order and quote list now looks like this:

| | Bids | | Offers |
|---|---|---|---|
| MM2: | Bid 30 @ 2.50 | Away Market A: | Offer 50 @ 2.60 |
| Order A: | Buy 10 @ 2.50 | Away Market B: | Offer 40 @ 2.65 |
| Away Market C: | Bid 30 @ 2.50 | MM2: | Offer 30 @ 2.70 |
| LMM: | Bid 40 @ 2.45 | Order X: | Sell 10 @ 2.70 |
| Away Market B: | Bid 40 @ 2.45 | Away Market C: | Offer 30 @ 2.70 |
| Order B: | Buy 10 @ 2.40 | Away Market D: | Offer 20 @ 2.70 |
| Away Market A: | Bid 50 @ 2.40 | | |
| Away Market D: | Bid 20 @ 2.40 | | |
| Order C: | Buy 10 @ 2.35 | | |

The internal order book 29a now looks like this:

| | Bids | | Offers |
|---|---|---|---|
| Order A: | Buy 10 @ 2.50 | Order X: | Sell 10 @ 2.70 |
| Order B: | Buy 10 @ 2.40 | | |
| Order C: | Buy 10 @ 2.35 | | |

The market center BBO is now 2.50 to 2.70 (40×40)
The public order book looks like this:

| Bids | Offers |
|---|---|
| 40 @ 2.50 | 40 @ 2.70 ← |
| 40 @ 2.45 | |
| 10 @ 2.40 | |
| 10 @ 2.35 | |

As there are no additional sell orders that can execute at the price of 2.65, the process continues to step 1242, where it checks if incoming Buy Order J has any quantity available to trade. As it still has 50 contracts remaining, the process continues to step 1244.

Incoming Sweep Limit Buy Order's Price is Capped at the NBO and Posted

In step 1244, the process "caps" incoming Buy Order J, at the NBO price of 2.60. It does this by retaining incoming Buy Order J's original limit price (2.70), but posting it at the NBO price (2.60) so that it locks, but does not cross, the NBO. The process continues to step 1246, where it ranks Buy Order J in the Display Order Process of the internal order book 29a according to its "capped" price of 2.60, and disseminates Buy Order J to the public order book.

The NBBO is now 2.60 to 2.60 (50×90). The market is now locked.

The virtual consolidated order and quote list now looks like this:

| | Bids | | Offers |
|---|---|---|---|
| Order J: | Buy 50 @ 2.60 ← Original price = 2.70 | Away Market A: | Offer 50 @ 2.60 |
| MM2: | Bid 30 @ 2.50 | Away Market B: | Offer 40 @ 2.65 |
| Order A: | Buy 10 @ 2.50 | MM2: | Offer 30 @ 2.70 |
| Away Market C: | Bid 30 @ 2.50 | Order X: | Sell 10 @ 2.70 |
| LMM: | Bid 40 @ 2.45 | Away Market C: | Offer 30 @ 2.70 |
| Away Market B: | Bid 40 @ 2.45 | Away Market D: | Offer 20 @ 2.70 |
| Order B: | Buy 10 @ 2.40 | | |
| Away Market A: | Bid 50 @ 2.40 | | |

-continued

|  | Bids |  | Offers |
|---|---|---|---|
| Away Market D: | Bid 20 @ 2.40 |  |  |
| Order C: | Buy 10 @ 2.35 |  |  |

The internal order book 29a now looks like this:

|  | Bids |  | Offers |
|---|---|---|---|
| Order J: | Buy 50 @ 2.60 ← Original price = 2.70 | Order X: | Sell 10 @ 2.70 |
| Order A: | Buy 10 @ 2.50 |  |  |
| Order B: | Buy 10 @ 2.40 |  |  |
| Order C: | Buy 10 @ 2.35 |  |  |

The market center BBO is now 2.60 to 2.70 (50×40)
The public order book looks like this:

| Bids | Offers |
|---|---|
| 50 @ 2.60 ← | 40 @ 2.70 ← |
| 40 @ 2.50 |  |
| 40 @ 2.45 |  |
| 10 @ 2.40 |  |
| 10 @ 2.35 |  |

Away Market Fills the Routed Order, but the Posted Sweep Limit Buy Order does not Route Additional Quantity Away Market A fills the 50 contracts routed to it Unlike a reprice-and-ship inside limit order, which routes to an away market that fills it so long as the away market and the posted order are both still at the NBBO, in this embodiment, a sweep limit order does NOT ship additional contracts to an away market in response to a fill. Accordingly, posted Buy Order J does not ship to Away Market A.

Away Market Fades its Offer Off the NBO

Away Market A fades its offer from the NBO

The NBBO is now 2.60 to 2.65 (50×40). The market is no longer locked.

The away market BBO book 25a looks like this:

|  | Bids |  | Offers |
|---|---|---|---|
| Away Market C: | Bid 30 @ 2.50 | Away Market B: | Offer 40 @ 2.65 |
| Away Market B: | Bid 40 @ 2.45 | Away Market C: | Offer 30 @ 2.70 |
| Away Market A: | Bid 50 @ 2.40 | Away Market D: | Offer 20 @ 2.70 |
| Away Market D: | Bid 20 @ 2.40 | Away Market A: | Offer 50 @ 2.70 ← |

The quote engine 23a notifies the order matching engine 21 of the change to Away Market A's offer and the change to the NBO. As described in step 1248, as the NBO price has moved higher (it was previously 2.60, but is now 2.65), the process removes the cap from posted Buy Order J, allowing it to revert to its original order price of 2.70, and processes it as if it were a new incoming order, removing it from the books.

Posted Sweep Limit Buy Order's Cap is Removed, and the Remaining Quantity is Processed Like a New Incoming Order In step 1202, the process retrieves the NBO (2.65). In step 1204, it checks if "incoming" Buy Order J's price (2.70, its original price) is marketable, i.e., is at or better than the NBO (2.65). As it is, the process continues to step 1205, where it initiates the "Too-Executable Buy Order Check Process," and proceeds to step 1600 in FIG. 16. Buy Order J is not "too executable," as the MaxBuyPrice is now 3.00 (NBO price of 2.65+0.35=3.00). The process continues to step 1206, where it combines the away market BBO book 25a, the market maker quote book 33a, and the internal order book 29a together in a virtual consolidated order and quote list, which it ranks in price/display/time priority, but with a preference for resident interest over away market interest at the same price level.

The virtual consolidated order and quote list looks like this:

|  | Bids |  | Offers |
|---|---|---|---|
| MM2: | Bid 30 @ 2.50 | Away Market B: | Offer 40 @ 2.65 |
| Order A: | Buy 10 @ 2.50 | MM2: | Offer 30 @ 2.70 |
| Away Market C: | Bid 30 @ 2.50 | Order X: | Sell 10 @ 2.70 |
| LMM: | Bid 40 @ 2.45 | Away Market C: | Offer 30 @ 2.70 |
| Away Market B: | Bid 40 @ 2.45 | Away Market D: | Offer 20 @ 2.70 |
| Order B: | Buy 10 @ 2.40 | Away Market A: | Offer 50 @ 2.70 ← |
| Away Market A: | Bid 50 @ 2.40 |  |  |
| Away Market D: | Bid 20 @ 2.40 |  |  |
| Order C: | Buy 10 @ 2.35 |  |  |

The process continues to step 1208, where it checks if this issue has any assigned market makers. As it does, the process continues to step 1210, where it checks if "incoming" Buy Order J is a directed order or not. It should be noted that once an order is posted, it is never treated as a directed order again, even if it was originally sent as a directed order. As Buy Order J is not a directed order, the process continues to step 1212, to initiate the "LMM Guaranteed Offer Process." However, as the LMM Offer is not replenished in any of the examples of this document for ease of illustration, the process continues to step 1216 instead.

Uncapped Sweep Limit Buy Order Routes to an Away Market

In step 1216, the process retrieves the best offer in the virtual consolidated order and quote list, which is Away Market B's offer. In step 1218, the process checks if "incoming" Buy Order J's price (2.70) is greater than or equal to Away Market B's offer (2.65). As Buy Order J's price is higher, the process continues to step 1220, where it checks if Away Market B's offer (2.65) is at the NBO (2.65). As it is at the NBO, the process continues to step 1222, where it checks if Away Market B's offer is on or off the market center 20. As it is an away market quote, the process continues to step 1224, where it routes 40 contracts to Away Market B at the NBO price of 2.65.

The process then continues to step 1232, where it checks if Buy Order J still has any quantity available to trade. As it still has 10 contracts remaining, the process returns to step 1216, where it retrieves the best offer, which is now the MM2 Offer since Away Market B's offer was completely satisfied. In step 1218, the process checks if Buy Order J's price (2.70) is greater than or equal to the MM2 Offer price (2.70). In step 1220, if checks if the MM2 Offer is at the NBO. As the MM2 Offer (2.70) is inferior to the NBO (2.65), the process continues to step 1238.

Uncapped Sweep Limit Buy Order Executes With Sell Order Priced at One Tick Inferior to the NBO The process continues to step 1238, where it checks if there are any resting sell orders that can execute at the NBO (2.65) plus one tick. As Sell Order X (2.70) is priced at one tick inferior to the NBO, the process continues to step 1240, where it matches the remaining 10 contracts of Buy Order J against posted Sell Order X, at the price of 2.70, completely depleting both orders. Sell Order X is removed from the books.

The NBBO is still 2.50 to 2.65 (70×40)

The virtual consolidated order and quote list now looks like this:

| | Bids | | Offers |
|---|---|---|---|
| MM2: | Bid 30 @ 2.50 | Away Market B: | Offer 40 @ 2.65 |
| Order A: | Buy 10 @ 2.50 | MM2: | Offer 30 @ 2.70 |
| Away Market C: | Bid 30 @ 2.50 | Away Market C: | Offer 30 @ 2.70 |
| LMM: | Bid 40 @ 2.45 | Away Market D: | Offer 20 @ 2.70 |
| Away Market B: | Bid 40 @ 2.45 | Away Market A: | Offer 50 @ 2.70 |
| Order B: | Buy 10 @ 2.40 | | |
| Away Market A: | Bid 50 @ 2.40 | | |
| Away Market D: | Bid 20 @ 2.40 | | |
| Order C: | Buy 10 @ 2.35 | | |

The internal order book 29a now looks like this:

| | Bids | Offers |
|---|---|---|
| Order A: | Buy 10 @ 2.50 | |
| Order B: | Buy 10 @ 2.40 | |
| Order C: | Buy 10 @ 2.35 | |

The market center BBO is now 2.50 to 2.70 (40×30)
The public order book looks like this:

| Bids | Offers |
|---|---|
| 40 @ 2.50 | 30 @ 2.70 ← |
| 40 @ 2.45 | |
| 10 @ 2.40 | |
| 10 @ 2.35 | |

The process continues to step 1242, where it checks if incoming Buy Order J has any quantity available to trade. As it does not, the process terminates in step 1250 as indicated. The virtual consolidated order and quote list is deleted from local memory. Away Market B fills the 40 contracts routed to it. Buy Order J is completely matched.

It should be noted that if marketplace rules allow market maker quotes to contemporaneously execute at one tick inferior to the NBO, then the MM2 offer would have executed instead of Sell Order X, as it has time priority at the price of 2.70. The process would have generated a sell pseudo-order on behalf of the MM2 offer, executed incoming Buy Order J against the pseudo-order, and then notified the market maker quote engine 32b to decrement the MM2 offer by 10 contracts.

Intermarket Sweep Limit Orders

An intermarket sweep limit order will execute contemporaneously with all trading interest on and off the market center 20, routing to multiple away markets 24 at multiple price levels. Although the obligation to each price level must be satisfied before proceeding to the next-best price level, the process does not need to wait for the disseminated NBBO to move away before routing to inferior price levels. An intermarket sweep limit order will execute at as many price levels as are allowed by the rules of the order type and the marketplace.

If the marketplace allows intermarket sweeping but imposes a cap on the number of price levels that can be routed to contemporaneously, then the cap is stored as a parameter in the Routing Process. For example, if intermarket sweep limit orders are allowed to route up to two minimum price increments (ticks) inferior to the NBBO and the minimum price increment for the issue is a penny, then an incoming intermarket sweep limit buy order can contemporaneously route to away markets whose disseminated offers are as high as the NBO plus two cents, whereas an incoming intermarket sweep limit sell order can contemporaneously route to away markets whose disseminated bids are as low as the NBB less two cents. The incoming sweep limit order can execute with resident trading interest at as many price levels as possible, so long as the execution does not trade through an away market.

For example, an incoming intermarket sweep limit sell order that is priced through the NBB by four or more ticks would execute in the sequence shown below if intermarket sweeping is capped at two ticks inferior to the NBBO, and no away market is quoting at three ticks inferior to the NBBO:

| | | | Bid Side of the Virtual Consolidated Order and Quote List | | | |
|---|---|---|---|---|---|---|
| Price Point | Display Order Process | | Working Order Process | | | Routing Process |
| Highest Price (NBB) | 1. Displayed orders and quotes at the NBB | 2. Reserve order quantity at the NBB | 3. Passive Liquidity Orders at the NBB | 4. Discretionary Orders that can step up to the NBB | 5. Tracking Liquidity Orders at the NBB | 6. Away Market Bids at the NBB |
| 2nd- highest price point | 7. Displayed orders and quotes at the NBB less one tick | 8. Reserve order quantity at the NBB less one tick | 9. Passive Liquidity Orders at the NBB less one tick | 10. Discretionary Orders that can step up to the NBB less one tick | | 11. Away Market Bids at the NBB less one tick |
| 3rd- highest price point | 12. Displayed orders and quotes at the NBB less two tick | 13. Reserve order quantity at the NBB less two ticks | 14. Passive Liquidity Orders at the NBB less two ticks | 15. Discretionary Orders at step up to the NBB less two ticks | | 16. Away Market Bids at the NBB less two ticks |

-continued

| Bid Side of the Virtual Consolidated Order and Quote List | | | | | |
|---|---|---|---|---|---|
| Price Point | Display Order Process | | Working Order Process | | Routing Process |
| 4th-highest price point | 17. Displayed orders and quotes at the NBB less three ticks | 18. Reserve order quantity at the NBB less three ticks | 19. Passive Liquidity Orders at the NBB less three ticks | 20. Discretionary Orders that can step up to the NBB less three ticks | |
| 5th-highest price point | 21. Displayed orders and quotes at the NBB less four ticks | 22. Reserve order quantity at the NBB less four ticks | 23. Passive Liquidity Orders at the NBB less four ticks | 24. Discretionary Orders that can step up to the NBB less four ticks | |

If there is no cap on the number of price levels at which an intermarket sweep limit order can route to contemporaneously, then the process simply executes the order until it is no longer marketable. Any remaining nonmarketable portion of the order is displayed at its original user-specified limit price. If, however, a cap does exist on the number of price levels at which an intermarket sweep limit order can contemporaneously route, then the remaining quantity of the order is capped at the last (most aggressive) price at which it routed, if the order's price is superior to the last routed price. For example, if an intermarket sweep limit order is priced at four ticks through the NBBO but is only allowed to route up to two ticks beyond the NBBO, then its remaining portion is capped at two ticks inferior to the NBBO and displayed at that price. The order is inserted in the Display Order Process of the internal order book 29a and ranked according to the price/time priority of its capped price. The order is also disseminated to the public order book at its capped price. Accordingly, the posted order crosses the NBBO, but only to the extent to which it does not lock the price of any away market 24 that has not been fully satisfied.

Once posted, whether capped or not, an intermarket sweep limit order stands it ground and does not route when an away market 24 locks or crosses it. Similarly, once an intermarket sweep limit order has satisfied its obligation to an away market 24, it does not route additional contracts when the away market fills the routed order.

If, however, the NBBO moves away from a capped intermarket sweep limit order, then the process removes the cap, and allows the order to revert to its original user-specified limit price. The repriced order loses its standing in the internal order book 29a and is processed as if it were a new incoming order. After the intermarket sweep limit order can execute no further, if its price would still cross the market excessively, i.e., if it would lock the price of an away market that it has not fully satisfied, then it is automatically capped again at the last price at which it routed. This process continues until the intermarket sweep limit order is depleted, or else can be displayed at its original user-specified limit price without crossing the market excessively. Once the intermarket sweep limit order is displayed at its original user-specified price, it is never capped again.

Posted customer intermarket sweep limit orders that are priced at the NBBO (whether repriced or not) are eligible to execute against incoming marketable orders in the LMM Guarantee Process or the Directed Order Process, like any other displayed order type, if they have time priority over the eligible market maker quote.

An incoming intermarket sweep limit order that is executable at the opposite side of the NBBO will participate in the LMM Guarantee Process if the lead market maker is quoting at the opposite side of the NBBO. Similarly, if the business rules of the market center 20 allow intermarket sweep limit orders to be directed to a specific market maker, then an incoming intermarket sweep limit order that is executable at the opposite side of the NBBO will participate in the Directed Order Process if the designated market maker is quoting at the opposite side of the NBBO.

Incoming Intermarket Sweep Limit Buy Order Received Process

Figure 14A:
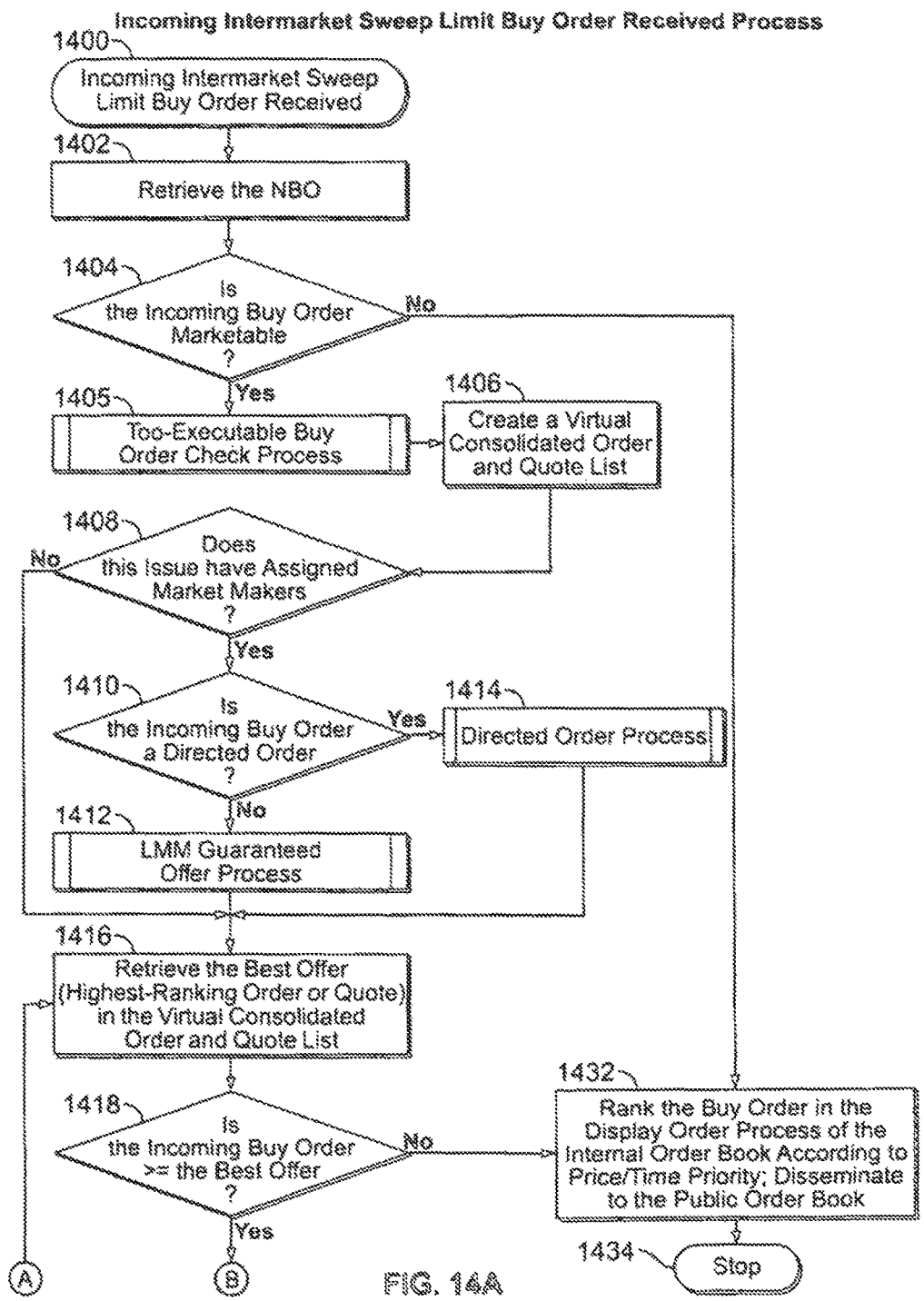
FIGS. 14A-14B are flow diagrams illustrating a process for receiving an incoming intermarket sweep limit buy order in an embodiment of the present invention.
Figure 14B:
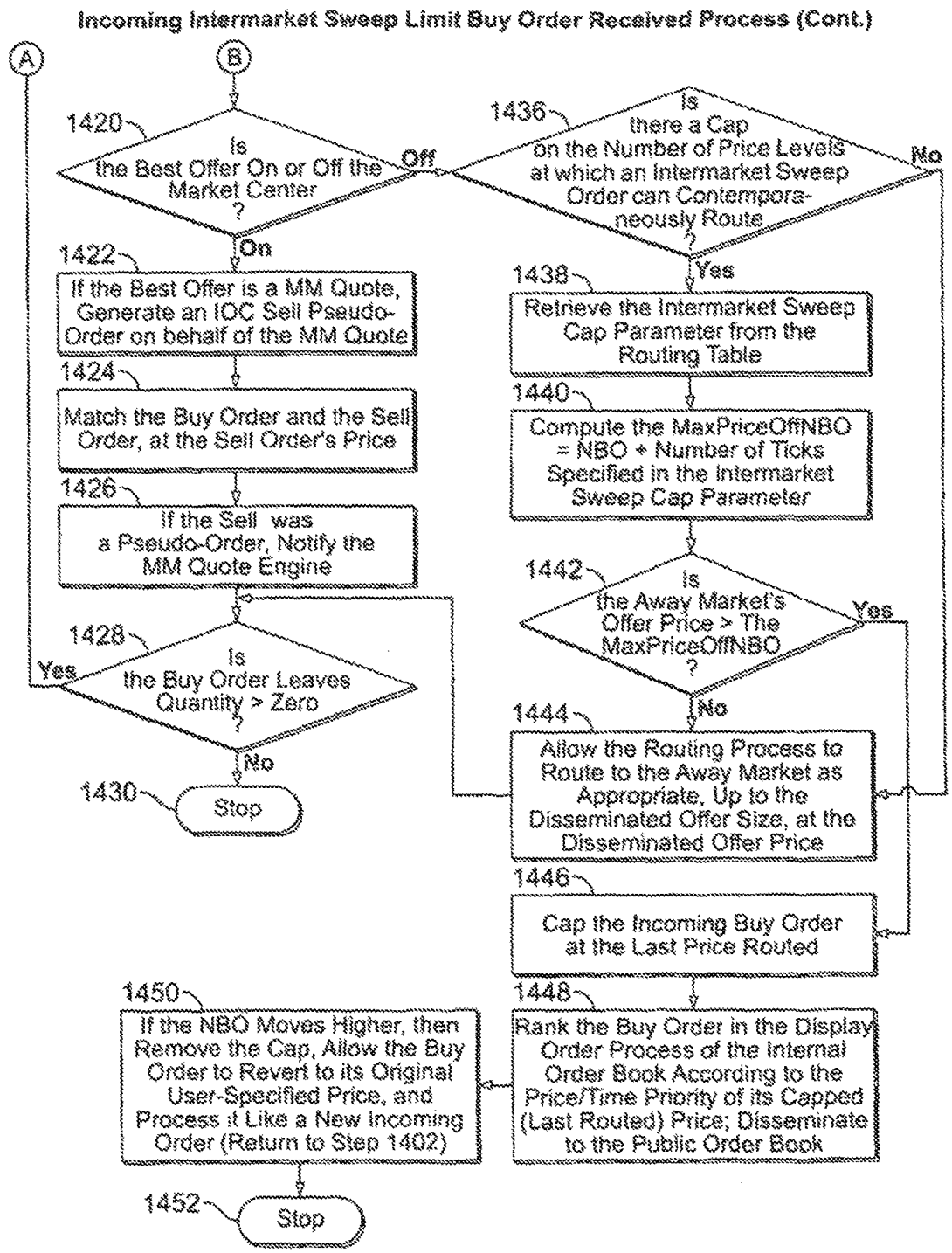

Referring now to FIGS. 14A-14B, the process is illustrated where the order matching engine 21 receives an incoming intermarket sweep limit buy order. In this embodiment, an intermarket sweep limit buy order can execute contemporaneously with as many price levels as are allowed according to the marketplace rules in effect. If there is a cap on the number of price levels at which the order can route, then after satisfying all away markets that are eligible to receive the routed order, any remaining quantity immediately crosses the NBO, capped at the last price at which it routed. Once capped and posted, if the NBO subsequently moves away to a higher price, then the cap is removed and the order is allowed to execute further.

In step 1402, the process retrieves the NBO, and in step 1404, the process determines if the incoming intermarket sweep limit buy order is marketable. If the process determines that the incoming intermarket sweep limit buy order is marketable, then the process continues to step 1405, where it initiates the "Too-Executable Buy Order Check Process," and proceeds to step 1600 in FIG. 16. If the incoming buy order is not canceled in the "Too-Executable Buy Order Check Process," i.e., it is not determined to be too executable, then the process continues to step 1406, where it creates a virtual consolidated order and quote list for the option series.

The process continues to step 1408, where it checks if the option series has any assigned market makers. If it does, then the process continues to step 1410, where it checks if the incoming intermarket sweep limit buy order is a directed order or not. If the incoming intermarket sweep limit buy order is a directed order, then the process continues to step 1414 where the "Directed Order Process" is initiated in step 2000 in FIG. 20A. If, however, the incoming intermarket sweep limit buy order is not a directed order, then the process proceeds to step 1412 where the "LMM Guaranteed Offer Process" is initiated instead in step 1900 in FIG. 19.

Regardless of whether the incoming intermarket sweep limit buy order executes in the Directed Order Process, in the LMM Guaranteed Offer Process, or in neither process (if the applicable market maker is not quoting at the NBO and is therefore ineligible for a guaranteed entitlement, or else if the issue does not have any assigned market makers), if the incoming intermarket sweep limit buy order still has quantity available to trade, then the process continues to step 1416, where it retrieves the best offer in the virtual consolidated order and quote list, i.e., the sell order, market maker quote, or disseminated away market quote with the highest ranking. In step 1418, the process checks if the incoming intermarket sweep limit buy order is still marketable (by way of explanation, it is possible that it is no longer marketable if the quotes and orders at the NBO were exhausted).

At step 1418, if the process determines that the incoming intermarket sweep limit buy order is still marketable, then it continues to step 1420, where it checks if the retrieved best offer is on or off the market center 20. If the retrieved best offer is on the market center 20, then the process continues to step 1422, where if the retrieved best offer is a market maker quote, the process automatically generates an IOC sell pseudo-order on behalf of the underlying market maker quote. The process continues to step 1424, where it matches the incoming intermarket sweep limit buy order against the retrieved sell order or pseudo-order, at the sell order's price. If the matched sell order is a pseudo-order, then in step 1426, the process notifies the market maker quote engine 32b of the quantity that was executed so that the market maker quote engine 32b can decrement the underlying market maker quote.

The process continues to step 1428, where it checks if the incoming intermarket sweep limit buy order still has quantity available to trade. If it does not, then the process continues to step 1430, where it terminates as indicated. If, however, the incoming intermarket sweep limit buy order does still have remaining quantity, then the process returns to step 1416, where it retrieves the next-best offer in the virtual consolidated order and quote list and continues to step 1418, where it checks if the incoming intermarket sweep limit buy order is still marketable. The process continues to execute the incoming intermarket sweep limit buy order against all resident trading interest at the NBO as described above, until the incoming intermarket sweep limit buy order is depleted, or else until the retrieved best offer is an away market quote, as described next.

Returning to step 1420, if the retrieved best offer is an away market quote, then the process continues to step 1436, where it checks if there is a cap on the number of price levels at which an intermarket sweep limit order can contemporaneously route. If such a restriction does exist, then the process continues to step 1438, where it retrieves the stored "Intermarket Sweep Cap" parameter from the Routing Process. In step 1440, the process computes the maximum price at which the intermarket sweep limit buy order can route ("MaxPriceOffNBO") by adding a price equivalent to the number of ticks specified in the retrieved "Intermarket Sweep Cap" parameter to the current NBO price. By way of example, if the minimum price increment for an issue is a nickel and the Intermarket Sweep Cap is set to '2,' then the MaxPriceOffNBO is the NBO plus ten cents. If the minimum price increment for an issue is a penny and the Intermarket Sweep Cap is set to '2,' then the MaxPriceOffNBO is the NBO plus two cents. In step 1442, the process checks if the retrieved away market offer price is higher than the derived MaxPriceOffNBO. If the away market offer price is less than or equal to the MaxPriceOffNBO, then it is eligible to receive a routed order, and the process continues to step 1444, where the process releases the incoming intermarket sweep limit buy order to the Routing Process, which routes to the highest-ranking away market as appropriate, up to its disseminated offer size, at the disseminated offer price.

Returning to step 1436, if, however, there is no cap on the number of price levels at which an intermarket sweep limit order can contemporaneously route, then the process also continues to step 1444.

After routing to the away market, the process continues to step 1428, where it checks if the incoming intermarket sweep limit buy order still has quantity available to trade. If the order is depleted, then the process terminates in step 1430 as indicated. If, however, the order still has remaining quantity, then it returns to step 1416, where it retrieves the next best offer, and if the incoming intermarket sweep limit buy order is marketable against the next best offer, will continue to match the resident order or quote or route to the away market quote, as just described.

At each price level, the incoming intermarket sweep limit buy order matches the displayed trading interest, then matches the nondisplayed ("Working") interest, then routes to the away market interest. Only after all away markets at the current price level have been satisfied does the incoming intermarket sweep limit buy order proceed to execute with the trading interest at the next-best price level. The process repeats these steps for each price level allowed, until the incoming intermarket sweep limit buy order is depleted, or until the retrieved best offer is inferior to the MaxPriceOffNBO, as described next.

Returning to step 1442, if the away market's offer price is higher than the MaxPriceOffNBO, then the incoming intermarket sweep limit buy order cannot route to it at the present time, and any remaining quantity must be posted. The process continues to step 1446, where it caps the incoming intermarket sweep limit buy order at the last price at which it routed. The last routed price will cross the NBO, but only to the extent to which it locks the disseminated offer prices of all the away markets that the intermarket sweep limit buy order satisfied. Specifically, the capped order will not lock the offer price of any away market where the obligation to the quote has not been fully satisfied. The process continues to step 1448, where it ranks the capped intermarket sweep limit buy order in the internal order book 29a in the Display Order Process according to the price/time priority of its capped price, i.e., the last price at which it routed. The process also disseminates the capped order to the public order book at its current (capped) price. The posted intermarket sweep limit buy order crosses the market.

Continuing to step 1450, if the NBO price should move higher, then the capped intermarket sweep limit buy order can execute further. The process removes the cap, and allows the intermarket sweep limit buy order to revert to its original user-specified limit price. The repriced order loses its standing in the internal order book 29a, and is processed as if it were a new incoming order. Accordingly, the process returns to step 1402, and the intermarket sweep limit buy order is allowed to execute further at its more aggressive price. If the order still has quantity remaining but once again can execute no further, then at step 1446, the process caps the order at the last price at which it routed, and posts it again at step 1448. This process is repeated until the intermarket sweep limit buy order is depleted, or else the NBO moves away to the extent to which the order can be posted at its original user-specified price. Once the order is posted at its original user-specified limit price, it is never capped again. The process then terminates in step 1452 as indicated.

Returning to step 1404, if, however, the incoming intermarket sweep limit buy order was never marketable, then the process continues to step 1432, where it ranks the order in the Display Order Process of the internal order book 29a according to price/time priority, and disseminates the order to the public order book. As the nonmarketable order is ranked at its original limit price, it is not affected when the NBO changes. The process then terminates in step 1434 as indicated.

Returning to step 1418, if, however, the incoming intermarket sweep limit buy order is no longer marketable, then the process continues to step 1432 and 1434 as just described.

Incoming Intermarket Sweep Limit Sell Order Received Process

Figure 15A:
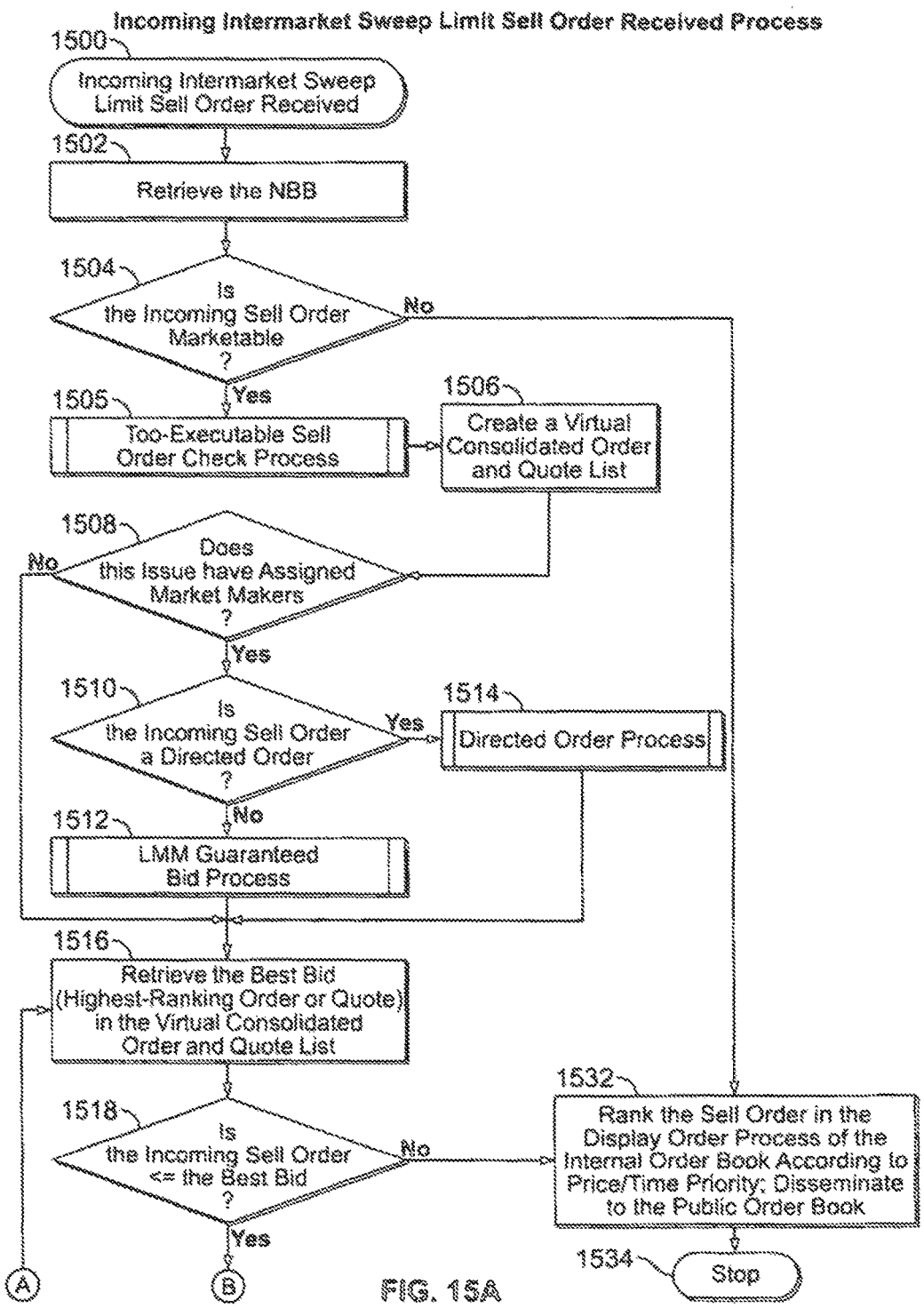
FIGS. 15A-15B are flow diagrams illustrating a process for receiving an incoming intermarket sweep limit sell order in an embodiment of the present invention.
Figure 15B:
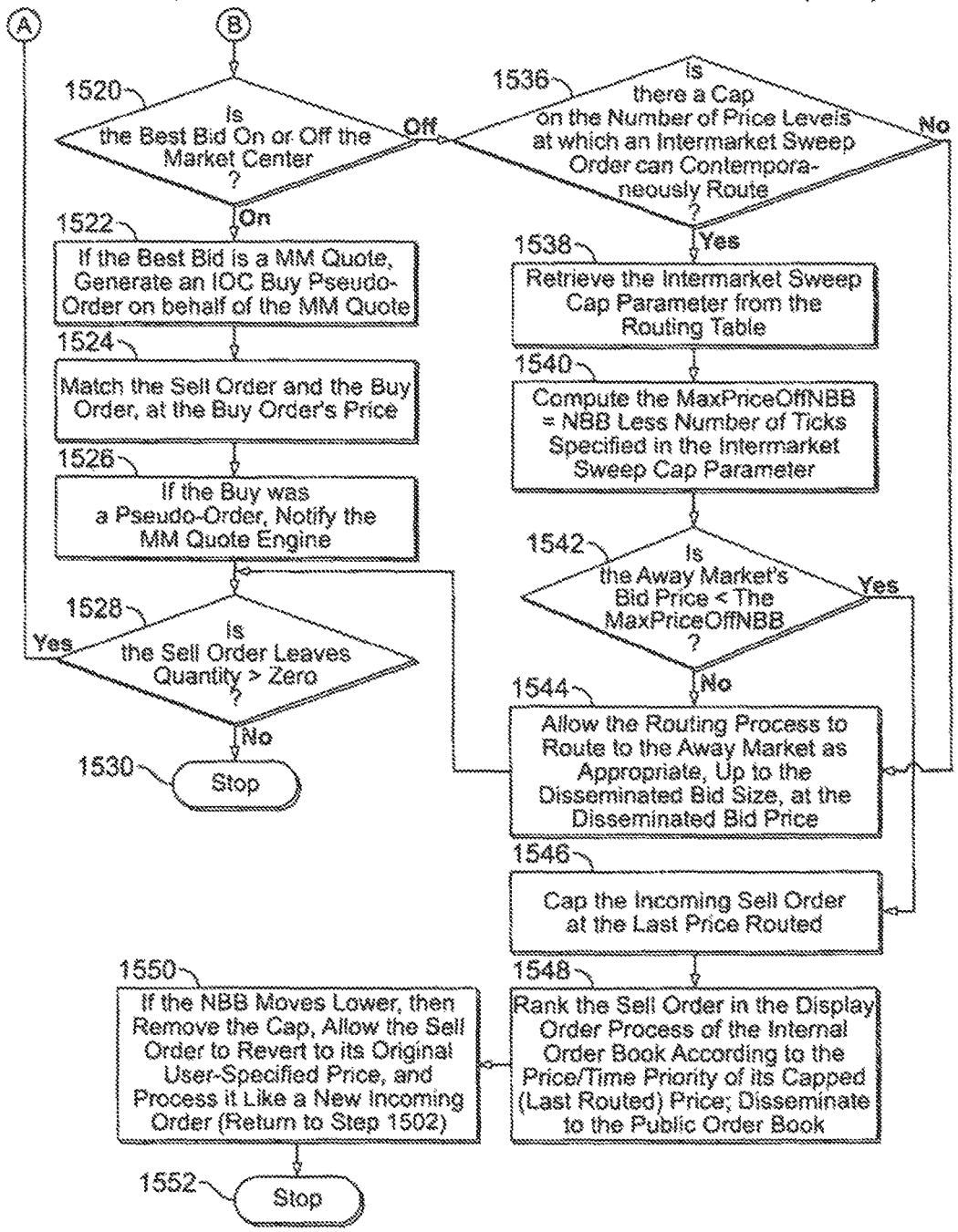

Referring now to FIGS. 15A-15B, the process is illustrated where the order matching engine 21 receives an incoming intermarket sweep limit sell order. This routine is very similar to the process described above in FIGS. 14A-14B for receiving an incoming intermarket sweep limit buy order.

In step 1502, the process retrieves the NBB, and in step 1504, the process determines if the incoming intermarket sweep limit sell order is marketable. If the process determines that the incoming intermarket sweep limit sell order is marketable, then the process continues to step 1505, initiates the "Too-Executable Sell Order Check Process," and proceeds to step 1700 in FIG. 17. If the incoming sell order is not canceled in the "Too-Executable Sell Order Check Process," i.e., it is not determined to be too executable, then the process continues to step 1506, where it creates a virtual consolidated order and quote list for the option series.

The process continues to step 1508, where it checks if the option series has any assigned market makers. If it does, then the process continues to step 1510, where it checks if the incoming intermarket sweep limit sell order is a directed order or not. If the incoming intermarket sweep limit sell order is a directed order, then the process continues to step 1514 where the "Directed Order Process" is initiated in step 2000 in FIG. 20A. If, however, the incoming intermarket sweep limit sell order is not a directed order, then the process proceeds to step 1512 where the "LMM Guaranteed Bid Process" is initiated instead in step 1800 in FIG. 18.

Regardless of whether the incoming intermarket sweep limit sell order executes in the Directed Order Process, in the LMM Guaranteed Bid Process, or in neither process (if the applicable market maker is not quoting at the NBB and is therefore ineligible for a guaranteed entitlement, or else if the issue does not have any assigned market makers), if the incoming intermarket sweep limit sell order still has quantity available to trade, then the process continues to step 1516, where it retrieves the best bid in the virtual consolidated order and quote list, i.e., the buy order, market maker quote, or disseminated away market quote with the highest ranking. In step 1518, the process checks if the incoming intermarket sweep limit sell order is still marketable (by way of explanation, it is possible that it is no longer marketable if the quotes and orders at the NBB were exhausted).

At step 1518, if the process determines that the incoming intermarket sweep limit sell order is still marketable, then it continues to step 1520, where it checks if the retrieved best bid is on or off the market center 20. If the retrieved best bid is on the market center 20, then the process continues to step 1522, where if the retrieved best bid is a market maker quote, the process automatically generates an IOC buy pseudo-order on behalf of the underlying market maker quote. The process continues to step 1524, where it matches the incoming intermarket sweep limit sell order against the retrieved buy order or pseudo-order, at the buy order's price. If the matched buy order is a pseudo-order, then in step 1526, the process notifies the market maker quote engine 32b of the quantity that was executed so that the market maker quote engine 32b can decrement the underlying market maker quote.

The process continues to step 1528, where it checks if the incoming intermarket sweep limit sell order still has quantity available to trade. If it does not, then the process continues to step 1530, where it terminates as indicated. If, however, the incoming intermarket sweep limit sell order does still have remaining quantity, then the process returns to step 1516, where it retrieves the next-best bid in the virtual consolidated order and quote list and continues to step 1518, where it checks if the incoming intermarket sweep limit sell order is still marketable. The process continues to execute the incoming intermarket sweep limit sell order against all resident trading interest at the NBB as described above, until the incoming intermarket sweep limit sell order is depleted, or else until the retrieved best bid is an away market quote, as described next.

Returning to step 1520, if the retrieved best bid is an away market quote, then the process continues to step 1536, where it checks if there is a cap on the number of price levels at which an intermarket sweep limit order can contemporaneously route. If such a restriction does exist, then the process continues to step 1538, where it retrieves the stored "Intermarket Sweep Cap" parameter from the Routing Process. In step 1540, the process computes the minimum price at which the intermarket sweep limit sell order can route ("MaxPriceOffNBB") by subtracting the price equivalent to the number of ticks specified in the retrieved "Intermarket Sweep Cap" parameter from the current NBB price. By way of example, if the minimum price increment for an issue is a nickel and the Intermarket Sweep Cap is set to '2,' then the MaxPriceOffNBB is the NBB less ten cents. If the minimum price increment for an issue is a penny and the Intermarket Sweep Cap is set to '2,' then the MaxPriceOffNBB is the NBB less two cents. In step 1542, the process checks if the retrieved away market Bid price is lower than the derived MaxPriceOffNBB. If the away market Bid price is greater than or equal to the MaxPriceOffNBB, then it is eligible to receive a routed order, and the process continues to step 1544, where the process releases the incoming intermarket sweep limit sell order to the Routing Process, which routes to the highest-ranking away market as appropriate, up to its disseminated bid size, at the disseminated bid price.

Returning to step 1536, if, however, there is no cap on the number of price levels at which an intermarket sweep limit order can contemporaneously route, then the process also continues to step 1544.

After routing to the away market, the process continues to step 1528, where it checks if the incoming intermarket sweep limit sell order still has quantity available to trade. If the order is depleted, then the process terminates in step 1530 as indicated. If, however, the order still has remaining quantity, then it returns to step 1516, where it retrieves the next best bid, and if the incoming intermarket sweep limit sell order is marketable against the next best bid, will continue to match the resident order or quote or route to the away market quote, as just described.

At each price level, the incoming intermarket sweep limit sell order matches the displayed trading interest, then matches the nondisplayed ("Working") interest, then routes to the away market interest. Only after all away markets at the current price level have been satisfied does the incoming intermarket sweep limit sell order proceed to execute with the trading interest at the next-best price level. The process repeats these steps for each price level allowed, until the incoming intermarket sweep limit sell order is depleted, or until the retrieved best bid is inferior to the MaxPriceOffNBB, as described next.

Returning to step 1542, if the away market's bid price is lower than the MaxPriceOffNBB, then the incoming intermarket sweep limit sell order cannot route to it at the present time, and any remaining quantity must be posted. The process continues to step 1546, where it caps the incoming intermarket sweep limit sell order at the last price at which it routed. The last routed price will cross the NBB, but only to the extent to which it locks the disseminated bid prices of all the away markets that the intermarket sweep limit sell order satisfied. Specifically, the capped order will not lock the bid price of any away market where the obligation to the quote has not been fully satisfied. The process continues to step 1548, where it ranks the capped intermarket sweep limit sell order in the internal order book 29a in the Display Order Process according to the price/time priority of its capped price, i.e., the last price at which it routed. The process also disseminates the capped order to the public order book at its current (capped) price. The posted intermarket sweep limit sell order crosses the market.

Continuing to step 1550, if the NBB price should move lower, then the capped intermarket sweep limit sell order can execute further. The process removes the cap, and allows the intermarket sweep limit sell order to revert to its original user-specified limit price. The repriced order loses its standing in the internal order book 29a, and is processed as if it were a new incoming order. Accordingly, the process returns to step 1502, and the intermarket sweep limit sell order is allowed to execute further at its more aggressive price. If the order still has quantity remaining but once again can execute no further, then at step 1546, the process caps the order at the last price at which it routed, and posts it again at step 1548. This process is repeated until the intermarket sweep limit sell order is depleted, or else the NBB moves away to the extent to which the order can be posted at its original user-specified price. Once the order is posted at its original user-specified limit price, it is never capped again. The process then terminates in step 1552 as indicated.

Returning to step 1504, if, however, the incoming intermarket sweep limit sell order was never marketable, then the process continues to step 1532, where it ranks the order in the Display Order Process of the internal order book 29a according to price/time priority, and disseminates the order to the public order book. As the nonmarketable order is ranked at its original limit price, it is not affected when the NBB changes. The process then terminates in step 1534 as indicated.

Returning to step 1518, if, however, the incoming intermarket sweep limit sell order is no longer marketable, then the process continues to step 1532 and 1534 as just described.

Intermarket Sweep Limit Order Trading Example

In this example, the issue has an assigned lead market maker (LMM) that is quoting at the NBO when a marketable incoming intermarket sweep limit buy order is received. In this example, intermarket sweep limit buy orders are allowed to route contemporaneously to all away markets priced up to two ticks inferior to the NBO. The intermarket sweep limit buy order executes in the LMM Guaranteed Offer Process and the Display Order Process and then routes to the away market at the NBO. After routing at the NBO, the incoming intermarket sweep limit buy order contemporaneously executes with a posted sell order whose price is one tick inferior to the NBO, routes to an away market whose offer is one tick inferior to the NBO, executes with a market maker quote priced at two ticks inferior to the NBO, routes to an away market whose offer is two ticks inferior to the NBO, and executes with a posted sell order whose price is three ticks inferior to the NBO. The remaining portion of the intermarket sweep limit buy order is capped at two ticks inferior to the NBO, the last price at which it routed. When the NBO moves away from the posted intermarket sweep limit buy order, the order reverts to its user-specified price, and routes again to an away market that is two ticks inferior to the new NBO. The remaining portion of the intermarket sweep limit buy order is automatically repriced and posted at two ticks inferior to the new NBO, the last price at which it routed.

The NBBO is 2.57 to 2.60 (70×110).

The away market BBO book 25a looks like this:

| Bids | | Offers | |
|---|---|---|---|
| Away Market C: | Bid 30 @ 2.57 | Away Market A: | Offer 50 @ 2.60 |
| Away Market B: | Bid 40 @ 2.56 | Away Market B: | Offer 40 @ 2.61 |
| Away Market A: | Bid 50 @ 2.55 | Away Market C: | Offer 30 @ 2.62 |
| Away Market D: | Bid 20 @ 2.55 | Away Market D: | Offer 20 @ 2.63 |

The market maker quote book 33a looks like this:

| Bids | | Offers | |
|---|---|---|---|
| MM2: | Bid 30 @ 2.57 | LMM: | Offer 40 @ 2.60 |
| LMM: | Bid 40 @ 2.56 | MM2: | Offer 30 @ 2.62 |

The internal order book 29a looks like this. Order D is on behalf of a customer, whereas Order E is not:

| Bids | | Offers | |
|---|---|---|---|
| Order A: | Buy 10 @ 2.57 | Order D: | Sell 10 @ 2.60 |
| Order B: | Buy 10 @ 2.55 | Order E: | Sell 10 @ 2.60 |
| Order C: | Buy 10 @ 2.52 | Order F: | Sell 10 @ 2.61 |
| | | Order X: | Sell 10 @ 2.63 |
| | | Order Z: | Sell 10 @ 2.65 |

The market center BBO is 2.57 to 2.60 (40×60)
The public order book looks like this:

| Bids | Offers |
|---|---|
| 40 @ 2.57 | 60 @ 2.60 |
| 40 @ 2.56 | 10 @ 2.61 |
| 10 @ 2.55 | 30 @ 2.62 |
| 10 @ 2.52 | 10 @ 2.63 |
| | 10 @ 2.65 |

Incoming Marketable Intermarket Sweep Limit Buy Order is Received

In step 1400, the order matching engine 21 receives the following order:

Order K: Buy 260 @ 2.65, Intermarket Sweep Limit

In step 1402, the process retrieves the NBO (2.60). In step 1404, the process checks if incoming Buy Order K is marketable, i.e., is priced at or better than the NBO. As it is, the process continues to step 1405, where it initiates the "Too-Executable Buy Order Check Process," and proceeds to step 1600 in FIG. 16.

In step 1602, the process checks if incoming Buy Order K's price (2.65) is higher than the NBO (2.60). As it is, the process continues to step 1604, where it checks if intermarket sweep limit orders should be checked for excessive marketability. As the check for excessive marketability is enabled for intermarket sweep limit orders in this embodiment, the process continues to step 1608, where it retrieves the "MaxPercentOffNBBO" parameter, which is configured to 15% in this example. It should be noted that the minimum price increment (tick) for this issue is 0.01. In step 1610, the process computes the MaxPriceThruNBO by multiplying the NBO (2.60) by the MaxPercentOffNBBO (15%), deriving the MaxPriceThruNBO=0.39 (15% of 2.60=0.39). In step 1612, the process computes the MaxBuyPrice by adding the derived MaxPriceThruNBO (0.39) to the NBO (2.60), deriving the MaxBuyPrice of 2.99 (2.60+0.39=2.99). Accordingly, the highest price allowable for incoming Buy Order K is 2.99. The process continues to step 1614, where it checks if incoming Buy Order K's price (2.65) is higher than the MaxBuyPrice (2.99). As it is not higher, incoming Buy Order K does not need to be repriced or canceled, and the process continues to step 1616, where it returns to the step where it was originally invoked, back to step 1405.

The process continues to step 1406, where it combines the away market BBO book 25a, the market maker quote book 33a, and the internal order book 29a together in a virtual consolidated order and quote list, which it ranks in price/display/time priority, but with a preference for resident interest over away market interest at the same price level. In this example, Sell Orders D and E were received before the LMM Offer was quoted.

The virtual consolidated order and quote list looks like this:

| Bids | | Offers | |
|---|---|---|---|
| MM2: | Bid 30 @ 2.57 | Order D: | Sell 10 @ 2.60 |
| Order A: | Buy 10 @ 2.57 | Order E: | Sell 10 @ 2.60 |
| Away Market C: | Bid 30 @ 2.57 | LMM: | Offer 40 @ 2.60 |
| LMM: | Bid 40 @ 2.56 | Away Market A: | Offer 50 @ 2.60 |
| Away Market B: | Bid 40 @ 2.56 | Order F: | Sell 10 @ 2.61 |
| Order B: | Buy 10 @ 2.55 | Away Market B: | Offer 40 @ 2.61 |
| Away Market A: | Bid 50 @ 2.55 | MM2: | Offer 30 @ 2.62 |
| Away Market D: | Bid 20 @ 2.55 | Away Market C: | Offer 30 @ 2.62 |
| Order C: | Buy 10 @ 2.52 | Order X: | Sell 10 @ 2.63 |
| | | Away Market D: | Offer 20 @ 2.63 |
| | | Order Z: | Sell 10 @ 2.65 |

The process continues to step 1408, where it checks if this issue has any assigned market makers. As it does, the process continues to step 1410, where it checks if incoming Buy Order K is a directed order or not. As it is not a directed order, the process continues to step 1412, where it initiates the "LMM Guaranteed Offer Process," and proceeds to step 1900 in FIG. 19.

LMM Guarantee Process is in Effect for this Issue

In step 1902, the process retrieves the LMM Offer (40 @ 2.60). In step 1904, it checks if the LMM Offer is at the NBO (2.60). As it is, the lead market maker is entitled to guaranteed participation with incoming Buy Order K, after any superior displayed customer orders are executed first. The process continues to step 1908, where it checks if incoming Buy Order K's order size (260) is greater than two contracts. As it is, the process continues to step 1914.

Incoming Intermarket Sweep Limit Buy Order Matches the Displayed Customer Sell Order with Time Priority Over the LMM Offer In step 1914, the process checks if there are any customer sell orders displayed at the NBO, and finds posted Sell Order D. The process continues to step 1916, where it stores the timestamp on the LMM Offer in the parameter "LMMOfferTimestamp." In step 1918, the process retrieves the earliest displayed customer sell order at the NBO, Sell Order D, and in step 1920, the process compares the timestamp of posted Sell Order D to the LMMOfferTimestamp. As posted Sell Order D was received earlier than the LMM Offer, the process continues to step 1922, where it matches 10 contracts of incoming Buy Order K with posted Sell Order D, completely depleting posted Sell Order D and removing it from the books.

The process continues to step 1924, where it checks if incoming Buy Order K still has quantity available to trade. As it still has 250 contracts remaining, the process continues to step 1928, where it checks if there are any additional customer sell orders at the NBO. As there are none (Sell Order E is not on behalf of a customer), the process continues to step 1932.

Incoming Intermarket Sweep Limit Buy Order Matches the LMM Offer

In step 1932, the process retrieves the LMMGuaranteedPercent parameter, which is configured to 40% in this example. In step 1934, the process derives the LMMGuaranteedAllocation (100 contracts) by multiplying the LMMGuaranteedPercent (40%) by the remaining portion of incoming Buy Order K (250 contracts). The LMMGuaranteedAllocation is the maximum quantity of contracts that can execute in the LMM Guarantee Process.

In step 1938, the process matches 40 contracts of incoming Buy Order K against the LMM Offer, the lesser of the LMMGuaranteedAllocation (100 contracts) and the LMM Offer size (40 contracts), at the NBO price of 2.60. It does this by generating an IOC pseudo-order to Sell 40 @ 2.60 on behalf of the LMM Offer, and executing incoming Buy Order K against the sell pseudo-order. The LMM Offer at 2.60 is completely depleted, and is removed from the virtual consolidated order and quote list. The process notifies the market maker quote engine 32b to decrement the LMM Offer by the 40 contracts executed. The LMM Guaranteed Offer Process has completed.

The virtual consolidated order and quote list now looks like this:

| Bids | | Offers | |
|---|---|---|---|
| MM2: | Bid 30 @ 2.57 | Order E: | Sell 10 @ 2.60 |
| Order A: | Buy 10 @ 2.57 | Away Market A: | Offer 50 @ 2.60 |
| Away Market C: | Bid 30 @ 2.57 | Order F: | Sell 10 @ 2.61 |
| LMM: | Bid 40 @ 2.56 | Away Market B: | Offer 40 @ 2.61 |
| Away Market B: | Bid 40 @ 2.56 | MM2: | Offer 30 @ 2.62 |
| Order B: | Buy 10 @ 2.55 | Away Market C: | Offer 30 @ 2.62 |
| Away Market A: | Bid 50 @ 2.55 | Order X: | Sell 10 @ 2.63 |
| Away Market D: | Bid 20 @ 2.55 | Away Market D: | Offer 20 @ 2.63 |
| Order C: | Buy 10 @ 2.52 | Order Z: | Sell 10 @ 2.65 |

The market maker quote engine 32b decrements the LMM Offer by the 40 contracts executed, completely depleting it. The market maker quote book 33a now looks like this (the lead market maker will manually replenish its offer, but this is not illustrated to simplify the example):

|  | Bids |  | Offers |
|---|---|---|---|
| MM2: | Bid 30 @ 2.57 | MM2: | Offer 30 @ 2.62 |
| LMM: | Bid 40 @ 2.56 |  |  |

The internal order book 29a now looks like this:

|  | Bids |  | Offers |
|---|---|---|---|
| Order A: | Buy 10 @ 2.57 | Order E: | Sell 10 @ 2.60 |
| Order B: | Buy 10 @ 2.55 | Order F: | Sell 10 @ 2.61 |
| Order C: | Buy 10 @ 2.52 | Order X: | Sell 10 @ 2.63 |
|  |  | Order Z: | Sell 10 @ 2.65 |

The market center BBO is now 2.57 to 2.60 (40×10)
The public order book looks like this:

| Bids | Offers |
|---|---|
| 40 @ 2.57 | 10 @ 2.60 ← |
| 40 @ 2.56 | 10 @ 2.61 |
| 10 @ 2.55 | 30 @ 2.62 |
| 10 @ 2.52 | 10 @ 2.63 |
|  | 10 @ 2.65 |

The process continues to step 1942, where it checks if incoming Buy Order K still has any quantity available to trade. As it still has 210 contracts remaining, the process continues to step 1946, where it returns to the step where the routine was originally invoked, back to step 1412 of FIG. 14A.

Incoming Intermarket Sweep Limit Buy Order Matches the Non-Customer Sell Order

The process continues to step 1416, where it retrieves the best offer in the virtual consolidated order and quote list, which is posted Sell Order E. In step 1418, the process checks if incoming Buy Order K's price (2.65) is greater than or equal to posted Sell Order E's price (2.60). As incoming Buy Order K's price is higher, the process continues to step 1420, where it checks if posted Sell Order E is on or off the market center 20. As it is a resident book order, the process bypasses step 1422 and continues to step 1424, where it matches 10 contracts of incoming Buy Order K against posted Sell Order E, at Sell Order E's price of 2.60. Posted Sell Order E is completely depleted and is removed from the books.

The NBBO is now 2.57 to 2.60 (70×50)

The virtual consolidated order and quote list now looks like this:

|  | Bids |  | Offers |
|---|---|---|---|
| MM2: | Bid 30 @ 2.57 | Away Market A: | Offer 50 @ 2.60 |
| Order A: | Buy 10 @ 2.57 | Order F: | Sell 10 @ 2.61 |
| Away Market C: | Bid 30 @ 2.57 | Away Market B: | Offer 40 @ 2.61 |
| LMM: | Bid 40 @ 2.56 | MM2: | Offer 30 @ 2.62 |
| Away Market B: | Bid 40 @ 2.56 | Away Market C: | Offer 30 @ 2.62 |
| Order B: | Buy 10 @ 2.55 | Order X: | Sell 10 @ 2.63 |
| Away Market A: | Bid 50 @ 2.55 | Away Market D: | Offer 20 @ 2.63 |
| Away Market D: | Bid 20 @ 2.55 | Order Z: | Sell 10 @ 2.65 |
| Order C: | Buy 10 @ 2.52 |  |  |

The internal order book 29a now looks like this:

|  | Bids |  | Offers |
|---|---|---|---|
| Order A: | Buy 10 @ 2.57 | Order F: | Sell 10 @ 2.61 |
| Order B: | Buy 10 @ 2.55 | Order X: | Sell 10 @ 2.63 |
| Order C: | Buy 10 @ 2.52 | Order Z: | Sell 10 @ 2.65 |

The market center BBO is now 2.57 to 2.61 (40×10)
The public order book looks like this:

| Bids | Offers |
|---|---|
| 40 @ 2.57 | 10 @ 2.61 ← |
| 40 @ 2.56 | 30 @ 2.62 |
| 10 @ 2.55 | 10 @ 2.63 |
| 10 @ 2.52 | 10 @ 2.65 |

The process bypasses step 1426 and continues to step 1428, where it checks if incoming Buy Order K still has any quantity available to trade. As it still has 200 contracts remaining, the process returns to step 1416 and retrieves the best offer in the virtual consolidated order and quote list, which is Away Market A's offer. In step 1418, the process checks if incoming Buy Order K's price (2.65) is greater than or equal to Away Market A's offer (2.60). As incoming Buy Order K's price is higher, the process continues to step 1422, where it checks if Away Market A's offer is on or off the market center 20. As it is an away market quote, the process continues to step 1436.

Determine the Number of Price Levels at which the Incoming Intermarket Sweep Limit Buy Order can Route Contemporaneously In step 1436, the process checks if there is a cap on the number of price levels at which an intermarket sweep limit order can contemporaneously route to. If there is no restriction on the number of price levels, then incoming Buy Order K would simply match every order and route to every offer in the virtual consolidated order and quote list, according to the ranked sequence shown above, until the incoming order is exhausted. However, this example illustrates how an intermarket sweep limit order behaves if there is a cap on routing to multiple away markets at multiple price levels. The process therefore retrieves the Intermarket Sweep Cap parameter, which is set to two ticks in this example, in step 1438. Accordingly, incoming Buy Order K can contemporaneously route to away markets at the NBO; at one tick inferior to the NBO; and at two ticks inferior to the NBO. However, it cannot route to away markets at three or more ticks inferior to the NBO.

Incoming Intermarket Sweep Limit Buy Order Routes to Away Market Offer at the NBO In step 1440, the process derives the highest price at which Buy Order K can route (i.e., the "MaxPriceOffNBO") by adding two ticks to the NBO. As the minimum price increment (tick) for this issue is a penny, the MaxPriceOffNBO is 2.62 (2.60+0.02). In step 1442, the process checks if Away Market A's offer (2.60) is greater than the derived MaxPriceOffNBO (2.62). As Away Market A's offer price is lower, the process continues to step 1444, where it allows the Routing Process to determine the highest-ranking eligible away market at the NBO. Away Market A is alone at the NBO. As no prior orders have been routed to Away Market A in this example, the process satisfies its full disseminated offer size by routing 50 contracts to Away Market A, at its disseminated offer price of 2.60.

After routing to Away Market A, the process returns to step 1428, where it checks if incoming Buy Order K has any quantity still available to trade. As it still has 150 contracts remaining, the process returns to step 1416, where it retrieves the best offer in the virtual consolidated order and quote list. As Away Market A's offer has been completely satisfied, the best offer is now posted Sell Order F. In step 1418, the process checks if incoming Buy Order K's price (2.65) is greater than or equal to Sell Order F's price (2.61). As Buy Order K's price is higher, the process continues to step 1420, where it checks if Sell Order F is on or off the market center 20.

Incoming Intermarket Sweep Limit Buy Order Executes Contemporaneously with Sell Order Priced at One Tick Inferior to the NBO As Sell Order F is a book order, the process bypasses step 1422 and continues to step 1424, where it matches 10 contracts of incoming Buy Order K against posted Sell Order F, at Sell Order F's price of 2.61, completely depleting Sell Order F and removing it from the books.

The NBBO is still 2.57 to 2.60 (70×50)

The virtual consolidated order and quote list now looks like this:

| | Bids | | Offers |
|---|---|---|---|
| MM2: | Bid 30 @ 2.57 | Away Market A: | Offer 50 @ 2.60 |
| Order A: | Buy 10 @ 2.57 | Away Market B: | Offer 40 @ 2.61 |
| Away Market C: | Bid 30 @ 2.57 | MM2: | Offer 30 @ 2.62 |
| LMM: | Bid 40 @ 2.56 | Away Market C: | Offer 30 @ 2.62 |
| Away Market B: | Bid 40 @ 2.56 | Order X: | Sell 10 @ 2.63 |
| Order B: | Buy 10 @ 2.55 | Away Market D: | Offer 20 @ 2.63 |
| Away Market A: | Bid 50 @ 2.55 | Order Z: | Sell 10 @ 2.65 |
| Away Market D: | Bid 20 @ 2.55 | | |
| Order C: | Buy 10 @ 2.52 | | |

The internal order book 29a now looks like this:

| | Bids | | Offers |
|---|---|---|---|
| Order A: | Buy 10 @ 2.57 | Order X: | Sell 10 @ 2.63 |
| Order B: | Buy 10 @ 2.55 | Order Z: | Sell 10 @ 2.65 |
| Order C: | Buy 10 @ 2.52 | | |

The market center BBO is now 2.57 to 2.62 (40×30)
The public order book looks like this:

| Bids | Offers |
|---|---|
| 40 @ 2.57 | 30 @ 2.62 ← |
| 40 @ 2.56 | 10 @ 2.63 |
| 10 @ 2.55 | 10 @ 2.65 |
| 10 @ 2.52 | |

The process bypasses step 1426 and continues to step 1428, where it checks if incoming Buy Order K still has any quantity available to trade. As it still has 140 contracts remaining, the process returns to step 1416, and retrieves the best offer in the virtual consolidated order and quote list. As Away Market A's offer has been fully satisfied, the best offer is Away Market B's offer. In step 1418, the process checks if incoming Buy Order K's price (2.65) is greater than or equal to Away Market B's offer (2.61). As incoming Buy Order K's price is higher, the process continues to step 1420, where it checks if Away Market B's offer is on or off the market center 20. As it is an away market quote, the process continues to step 1436. As before, the Intermarket Sweep Cap parameter of two ticks is retrieved at step 1438.

Incoming Intermarket Sweep Limit Buy Order Contemporaneously Routes to an Away Market Priced at One Tick Inferior to the NBO In step 1440, the process derives the highest price at which Buy Order K can route (i.e., the "MaxPriceOffNBO") by adding two ticks to the NBO. As the NBO is still 2.60, the MaxPriceOffNBO is still 2.62 (2.60+0.02). In step 1442, the process checks if Away Market B's offer (2.61) is greater than the derived MaxPriceOffNBO (2.62). As Away Market B's offer price is lower, the process continues to step 1444, where it allows the Routing Process to determine the highest-ranking eligible away market offering at the price of 2.61. Away Market B is alone at the price of 2.61. As no prior orders have been routed to Away Market B in this example, the process satisfies its full disseminated offer size by routing 40 contracts to Away Market B, at its disseminated offer price of 2.61.

After routing to Away Market B, the process returns to step 1428, where it checks if incoming Buy Order K has any quantity still available to trade. As it still has 100 contracts remaining, the process returns to step 1416, where it retrieves the best offer in the virtual consolidated order and quote list. As Away Market A's offer and Away Market B's offer have both been completely satisfied, the best offer is now the MM2 Offer. In step 1418, the process checks if incoming Buy Order K's price (2.65) is greater than or equal to the MM2 Offer price (2.62). As Buy Order K's price is higher, the process continues to step 1420, where it checks if the MM2 Offer is on or off the market center 20. As the offer is a resident market maker quote, the process continues to step 1422.

Incoming Intermarket Sweep Limit Buy Order Contemporaneously Executes with Market Maker Offer Priced at Two Ticks Inferior to the NBO In step 1422, the process generates an IOC pseudo-order to Sell 30 @ 2.62 on behalf of the underlying MM2 quote. In step 1424, the process matches 30 contracts of incoming Buy Order K against the sell pseudo-order, at the pseudo-order price of 2.62, completely depleting the pseudo-order. The process removes the depleted MM2 Offer from the virtual consolidated order and quote list. In step 1426, the process notifies the market maker quote engine 32b that 30 contracts of the MM2 Offer executed so that the market maker quote engine 32b can decrement the quote.

The NBBO is still 2.57 to 2.60 (70×50)

The virtual consolidated order and quote list now looks like this:

| | Bids | | Offers |
|---|---|---|---|
| MM2: | Bid 30 @ 2.57 | Away Market A: | Offer 50 @ 2.60 |
| Order A: | Buy 10 @ 2.57 | Away Market B: | Offer 40 @ 2.61 |
| Away Market C: | Bid 30 @ 2.57 | Away Market C: | Offer 30 @ 2.62 |
| LMM: | Bid 40 @ 2.56 | Order X: | Sell 10 @ 2.63 |
| Away Market B: | Bid 40 @ 2.56 | Awa Market D: | Offer 20 @ 2.63 |
| Order B: | Buy 10 @ 2.55 | Order Z: | Sell 10 @ 2.65 |
| Away Market A: | Bid 50 @ 2.55 | | |
| Away Market D: | Bid 20 @ 2.55 | | |
| Order C: | Buy 10 @ 2.52 | | |

The market maker quote engine 32b removes the depleted MM2 Offer. The market maker quote book 33a now looks like this (both the LMM and the MM2 will manually replenish their offers, but this is not illustrated to simplify the example):

|          | Bids          | Offers |
|----------|---------------|--------|
| MM2:     | Bid 30 @ 2.57 |        |
| LMM:     | Bid 40 @ 2.56 |        |

The market center BBO is now 2.57 to 2.63 (40×10)
The public order book looks like this:

| Bids      | Offers    |
|-----------|-----------|
| 40 @ 2.57 | 10 @ 2.63 ← |
| 40 @ 2.56 | 10 @ 2.65 |
| 10 @ 2.55 |           |
| 10 @ 2.52 |           |

The process continues to step 1428, where it checks if incoming Buy Order K still has any quantity available to trade. As it still has 70 contracts remaining, the process returns to step 1416, and retrieves the best offer in the virtual consolidated order and quote list. As Away Market A and Away Market B have both been fully satisfied, the best offer is Away Market C's offer. In step 1418, the process checks if incoming Buy Order K's price (2.65) is greater than or equal to Away Market C's offer (2.62). As incoming Buy Order K's price is higher, the process continues to step 1420, where it checks if Away Market C's offer is on or off the market center 20. As it is an away market quote, the process executes steps 1436 through 1440 as described above.

Incoming Intermarket Sweep Limit Buy Order Contemporaneously Routes to an Away Market Quote Priced at Two Ticks Inferior to the NBO In step 1442, the process checks if Away Market C's offer (2.62) is greater than the derived MaxPriceOffNBO (2.62). As Away Market C's offer price is equal to the MaxPriceOffNBO, the process continues to step 1444, where it allows the Routing Process to determine the highest-ranking eligible away market offering at 2.62. Away Market C is alone at the price of 2.62. As no prior orders have been routed to Away Market C in this example, the process satisfies its full disseminated offer size by routing 30 contracts to Away Market C, at its disseminated offer price of 2.62.

After routing to Away Market C, the process returns to step 1428, where it checks if incoming Buy Order K has any quantity still available to trade. As it still has 40 contracts remaining, the process returns to step 1416, where it retrieves the best offer in the virtual consolidated order and quote list. As Away Markets A, B, and C's offers have been completely satisfied, the best offer is now posted Sell Order X. In step 1418, the process checks if incoming Buy Order K's price (2.65) is greater than or equal to Sell Order X's price (2.63). As Buy Order K's price is higher, the process continues to step 1420, where it checks if Sell Order X is on or off the market center 20.

Incoming Intermarket Sweep Limit Buy Order Executes Contemporaneously with Sell Order Priced at Three Ticks Inferior to the NBO As Sell Order X is a book order, the process bypasses step 1422 and continues to step 1424, where it matches 10 contracts of incoming Buy Order K against posted Sell Order X, at Sell Order X's price of 2.63, completely depleting Sell Order X and removing it from the books.

The NBBO is still 2.57 to 2.60 (70×50)

The virtual consolidated order and quote list now looks like this:

|              | Bids          | Offers              |
|--------------|---------------|---------------------|
| MM2:         | Bid 30 @ 2.57 | Away Market A: Offer 50 @ 2.60 |
| Order A:     | Buy 10 @ 2.57 | Away Market B: Offer 40 @ 2.61 |
| Away Market C: | Bid 30 @ 2.57 | Away Market C: Offer 30 @ 2.62 |
| LMM:         | Bid 40 @ 2.56 | Away Market D: Offer 20 @ 2.63 |
| Away Market B: | Bid 40 @ 2.56 | Order Z: Sell 10 @ 2.65 |
| Order B:     | Buy 10 @ 2.55 |                     |
| Away Market A: | Bid 50 @ 2.55 |                   |
| Away Market D: | Bid 20 @ 2.55 |                   |
| Order C:     | Buy 10 @ 2.52 |                     |

The internal order book 29a now looks like this:

|          | Bids          |          | Offers        |
|----------|---------------|----------|---------------|
| Order A: | Buy 10 @ 2.57 | Order Z: | Sell 10 @ 2.65 |
| Order B: | Buy 10 @ 2.55 |          |               |
| Order C: | Buy 10 @ 2.52 |          |               |

The market center BBO is now 2.57 to 2.65 (40×10)
The public order book looks like this:

| Bids      | Offers      |
|-----------|-------------|
| 40 @ 2.57 | 10 @ 2.65 ← |
| 40 @ 2.56 |             |
| 10 @ 2.55 |             |
| 10 @ 2.52 |             |

The process bypasses step 1426 and continues to step 1428, where it checks if incoming Buy Order K still has any quantity available to trade. As it still has 30 contracts remaining, the process returns to step 1416, and retrieves the best offer in the virtual consolidated order and quote list. As Away Markets A, B, and C's offers have been fully satisfied, the best offer is Away Market D's offer. In step 1418, the process checks if incoming Buy Order K's price (2.65) is greater than or equal to Away Market D's offer (2.63). As incoming Buy Order K's price is higher, the process continues to step 1420, where it checks if Away Market D's offer is on or off the market center 20. As it is an away market quote, the process executes steps 1436 through 1440 as previously described. In step 1442, the process checks if Away Market D's offer price (2.63) is greater than the derived MaxPriceOffNBO (2.62). As Away Market D's offer price is indeed higher, incoming Buy Order K cannot route to Away Market D, as it is too far off the NBO.

Incoming Intermarket Sweep Limit Buy Order is Capped at the Last Price Routed. And is Posted The process continues to step 1446, where it caps incoming Buy Order K at the price of 2.62, which is the last price at which it routed (to Away Market C). It does this by retaining incoming Buy Order K's original limit price (2.65), but posting it at the last routed price (2.62) so that it crosses the NBO, but only to the extent to which it has fully satisfied the away markets whose offer prices are being locked. By way of explanation, incoming Buy Order K is allowed to lock Away Market A, B, and C's offer prices (2.60, 2.61, and 2.62 respectively) because it fully satisfied their quotes, but it is not allowed to lock Away Market D's offer price (2.63) because it has not routed to Away Market D, even though incoming Buy Order K executed against posted Sell Order X at the price of 2.63. As illustrated in this example, in this embodiment, intermarket sweep limit orders, if they are capped, are capped at the last price at which the order was routed, which is not necessarily the same as the last price at which the incoming order executed against the internal order book 29a. The process continues to step 1448, where it ranks the remaining 30 contracts of incoming Buy Order K in the Display Order Process of the internal order book 29a according to its capped price of 2.62, and disseminates Buy Order K to the public order book.

The NBBO is now 2.62 to 2.60 (30×50). The market is now crossed.

The virtual consolidated order and quote list now looks like this:

|  | Bids |  | Offers |
|---|---|---|---|
| Order K: | Buy 30 @ 2.62 ← Original price = 2.65 | Away Market A: | Offer 50 @ 2.60 |
| MM2: | Bid 30 @ 2.57 | Away Market B: | Offer 40 @ 2.61 |
| Order A: | Buy 10 @ 2.57 | Away Market C: | Offer 30 @ 2.62 |
| Away Market C: | Bid 30 @ 2.57 | Away Market D: | Offer 20 @ 2.63 |
| LMM: | Bid 40 @ 2.56 | Order Z: | Sell 10 @ 2.65 |

| Away Market B: | Bid 40 @ 2.56 |
| Order B: | Buy 10 @ 2.55 |
| Away Market A: | Bid 50 @ 2.55 |
| Away Market D: | Bid 20 @ 2.55 |
| Order C: | Buy 10 @ 2.52 |

The internal order book 29a now looks like this:

|  | Bids |  | Offers |
|---|---|---|---|
| Order K: | Buy 30 @ 2.62 ← Original price = 2.65 | Order Z: | Sell 10 @ 2.65 |
| Order A: | Buy 10 @ 2.57 |  |  |
| Order B: | Buy 10 @ 2.55 |  |  |
| Order C: | Buy 10 @ 2.52 |  |  |

The market center BBO is now 2.62 to 2.65 (30×10)

The public order book looks like this:

| Bids | Offers |
|---|---|
| 30 @ 2.62 ← | 10 @ 2.65 |
| 40 @ 2.57 |  |
| 40 @ 2.56 |  |
| 10 @ 2.55 |  |
| 10 @ 2.52 |  |

Away Markets Fill the Routed Orders, but the Posted Intermarket Sweep Limit Buy Order does not Ship Additional Quantity Away Market A fills the 50 contracts routed to it Away Market B fills the 40 contracts routed to it Away Market C fills the 30 contracts routed to it An intermarket sweep limit order does not ship to an away market in response to a fill. Accordingly, Buy Order K remains posted and does not ship additional quantity to Away Markets A, B or C.

Away Market Fades its Offer, Changing the NBO Price

Away Market A fades its offer from the NBO

The NBBO is now 2.62 to 2.61 (30×40). The market is still crossed.

The away market BBO book 25a looks like this:

| Bids |  | Offers |  |
|---|---|---|---|
| Away Market C: | Bid 30 @ 2.57 | Away Market B: | Offer 40 @ 2.61 |
| Away Market B: | Bid 40 @ 2.56 | Away Market C: | Offer 30 @ 2.62 |
| Away Market A: | Bid 50 @ 2.55 | Away Market D: | Offer 20 @ 2.63 |
| Away Market D: | Bid 20 @ 2.55 | Away Market A: | Offer 50 @ 2.64 ← |

The quote engine 23a notifies the order matching engine 21 of the change to Away Market A's offer and to the NBO. As described in step 1450, as the NBO price has moved higher (it was previously 2.60, but is now 2.61), the process removes the cap from posted Buy Order K, allowing it to revert to its original order price of 2.65, and processes it as if it were a new incoming order, removing it from the books.

Posted Intermarket Sweep Limit Buy Order's Cap is Removed, and the Remaining Quantity is Processed Like a New Incoming Order In step 1402, the process retrieves the new NBO (2.61). In step 1404, it checks if "incoming" uncapped Buy Order K's price (2.65, its original price) is marketable, i.e., is at or better than the NBO (2.61). As it is, the process continues to step 1405, where it initiates the "Too-Executable Buy Order Check Process," and proceeds to step 1600 in FIG. 16. Buy Order K is not "too executable," as the MaxBuyPrice is now 3.00 (NBO price of 2.61+0.39=3.00). The process continues to step 1406, where it creates a virtual consolidated order and quote list.

The virtual consolidated order and quote list looks like this:

|  | Bids |  | Offers |
|---|---|---|---|
| MM2: | Bid 30 @ 2.57 | Away Market B: | Offer 40 @ 2.61 |
| Order A: | Buy 10 @ 2.57 | Away Market C: | Offer 30 @ 2.62 |
| Away Market C: | Bid 30 @ 2.57 | Away Market D: | Offer 20 @ 2.63 |
| LMM: | Bid 40 @ 2.56 | Away Market A: | Offer 50 @ 2.64 ← |
| Away Market B: | Bid 40 @ 2.56 | Order Z: | Sell 10 @ 2.65 |
| Order B: | Buy 10 @ 2.55 |  |  |
| Away Market A: | Bid 50 @ 2.55 |  |  |
| Away Market D: | Bid 20 @ 2.55 |  |  |
| Order C: | Buy 10 @ 2.52 |  |  |

The process continues to step 1408, where it checks if this issue has any assigned market makers. As it does, the process continues to step 1410, where it checks if "incoming" uncapped Buy Order K is a directed order or not. It should be noted that once an order is posted, it is never treated as a directed order again, even if it was originally sent as a directed order. As it is not a directed order, the process continues to step 1412, to initiate the "LMM Guaranteed Offer Process." However, as the LMM Offer is not replenished in any of the examples of this document for ease of illustration, the process continues to step 1416 instead.

Best Retrieved Offer is an Away Market Quote

In step 1416, the process retrieves the best offer in the virtual consolidated order and quote list. As Away Market B's offer has been fully satisfied and Away Market C's offer has been fully satisfied and neither away market has updated its quote yet, accordingly, the best offer is Away Market D's offer. In step 1418, the process checks if "incoming" uncapped Buy Order K's price (2.65) is greater than or equal to Away Market D's offer (2.63). As Buy Order K's price is higher, the process continues to step 1420, where it checks if Away Market D's offer is on or off the market center 20. As it is an away market quote, the process continues to step 1436.

Uncapped Intermarket Sweep Limit Buy Order Routes to an Away Market Offer Priced at Two Ticks Inferior to the New NBO The process executes steps 1436 and step 1438 as described above. In step 1440, the process derives the highest price at which Buy Order K can now route (i.e., the "MaxPriceOffNBO") by adding two ticks to the new NBO. The newly derived MaxPriceOffNBO is 2.63 (2.61+0.02). In step 1442, the process checks if Away Market D's offer (2.63) is greater than the derived MaxPriceOffNBO (2.63). As Away Market D's offer price is equal to the MaxPriceOffNBO, the process continues to step 1444, where it allows the Routing Process to determine the highest-ranking eligible away market at the price of 2.63. Away Market D is alone at the price of 2.63. As no prior orders have been routed to Away Market D in this example, the process satisfies its full disseminated offer size by routing 20 contracts to Away Market D, at its disseminated offer price of 2.63.

After routing to Away Market D, the process returns to step 1428, where it checks if Buy Order K has any quantity still available to trade. As it still has 10 contracts remaining, the process returns to step 1416, where it retrieves the best offer in the virtual consolidated order and quote list. As Away Markets B, C and D's offers have been completely satisfied, the best offer is now Away Market A's offer.

In step 1418, the process checks if uncapped Buy Order K's price (2.65) is greater than or equal to Away Market A's offer (2.64). As Buy Order K's price is higher, the process continues to step 1420, where it checks if Away Market A's offer is on or off the market center 20. As it is an away market quote, the process executes steps 1436 through 1440 as previously described. In step 1442, the process checks if Away Market A's offer price (2.64) is greater than the derived MaxPriceOffNBO (2.63). As Away Market A's offer price is indeed higher, Buy Order K cannot route to Away Market A, as it is too far off the NBO.

Intermarket Sweep Limit Bu Order is Capped Again at the Last Price Routed and is Posted The process continues to step 1446, where it once again caps Buy Order K, this time at the price of 2.63, which is the last price at which it routed (to Away Market D). It does this by retaining Buy Order K's original limit price (2.65), but posting it at the last routed price (2.63) so that it crosses the NBO, but only to the extent to which it has fully satisfied the away markets whose offer prices are being locked. The process continues to step 1448, where it ranks the remaining 10 contracts of Buy Order K in the Display Order Process of the internal order book 29a according to its newly capped price of 2.63, and disseminates Buy Order K to the public order book.

The NBBO is now 2.63 to 2.61 (10×40). The market is still crossed.

The virtual consolidated order and quote list now looks like this:

| Bids | | Offers | |
|---|---|---|---|
| Order K: | Buy 10 @ 2.63 ← Original price = 2.65 | Away Market B: | Offer 40 @ 2.61 |
| MM2: | Bid 30 @ 2.57 | Away Market C: | Offer 30 @ 2.62 |
| Order A: | Buy 10 @ 2.57 | Away Market D: | Offer 20 @ 2.63 |
| Away Market C: | Bid 30 @ 2.57 | Away Market A: | Offer 50 @ 2.64 |
| LMM: | Bid 40 @ 2.56 | Order Z: | Sell 10 @ 2.65 |
| Away Market B: | Bid 40 @ 2.56 | | |
| Order B: | Buy 10 @ 2.55 | | |
| Away Market A: | Bid 50 @ 2.55 | | |
| Away Market D: | Bid 20 @ 2.55 | | |
| Order C: | Buy 10 @ 2.52 | | |

The internal order book 29a now looks like this:

| Bids | | Offers | |
|---|---|---|---|
| Order K: | Buy 10 @ 2.63 ← Original price = 2.65 | Order Z: | Sell 10 @ 2.65 |
| Order A: | Buy 10 @ 2.57 | | |
| Order B: | Buy 10 @ 2.55 | | |
| Order C: | Buy 10 @ 2.52 | | |

The market center BBO is now 2.63 to 2.65 (10×10)
The public order book looks like this:

| Bids | Offers |
|---|---|
| 10 @ 2.63 ← | 10 @ 2.65 |
| 40 @ 2.57 | |
| 40 @ 2.56 | |
| 10 @ 2.55 | |
| 10 @ 2.52 | |

Incoming Sell Order Executes with Canned Intermarket Sweep Limit Buy Order at its Posted Price The order matching engine 21 receives the following incoming order:

Order K2: Sell 10 @ Market

When the order matching engine 21 receives a marketable incoming order, it creates a new virtual consolidated order and quote list by combining the books as previously described. As there have been no changes to the books in the interim, they look exactly as they did at the conclusion of the prior step. As the LMM's Bid (2.56) is inferior to the NBB (2.57), incoming Sell Order K2 does not participate in the LMM Guaranteed Bid Process. Instead, incoming Sell Order K2 matches posted Buy Order K at its capped price of 2.63, completely depleting both orders.

The NBBO is now 2.57 to 2.61 (70×40). The market is no longer crossed.

The virtual consolidated order and quote list now looks like this:

| Bids | | Offers | |
|---|---|---|---|
| MM2: | Bid 30 @ 2.57 | Away Market B: | Offer 40 @ 2.61 |
| Order A: | Buy 10 @ 2.57 | Away Market C: | Offer 30 @ 2.62 |
| Away Market C: | Bid 30 @ 2.57 | Away Market D: | Offer 20 @ 2.63 |
| LMM: | Bid 40 @ 2.56 | Away Market A: | Offer 50 @ 2.64 |
| Away Market B: | Bid 40 @ 2.56 | Order Z: | Sell 10 @ 2.65 |

-continued

| Bids | Offers |
| --- | --- |
| Order B: Buy 10 @ 2.55 | |
| Away Market A: Bid 50 @ 2.55 | |
| Away Market D: Bid 20 @ 2.55 | |
| Order C: Buy 10 @ 2.52 | |

The internal order book 29a now looks like this:

| Bids | Offers |
| --- | --- |
| Order A: Buy 10 @ 2.57 | Order Z: Sell 10 @ 2.65 |
| Order B: Buy 10 @ 2.55 | |
| Order C: Buy 10 @ 2.52 | |

The market center BBO is now 2.57 to 2.65 (40×10)
The public order book looks like this:

| Bids | Offers |
| --- | --- |
| 40 @ 2.57 ← | 10 @ 2.65 |
| 40 @ 2.56 | |
| 10 @ 2.55 | |
| 10 @ 2.52 | |

Away Market D fills the 20 contracts routed to it. Buy Order K is completely filled. The virtual consolidated order and quote list is deleted from local memory.

Routines Common to the Incoming Order Types

The section that follows includes the detailed descriptions of the processing routines initiated by some or all of the different order types of this embodiment. Incoming marketable stand-your-ground inside limit buy orders, sweep limit buy orders, and intermarket sweep limit buy orders all initiate the "Too-Executable Buy Order Check Process" described below in FIG. 16. Similarly, incoming marketable stand-your-ground inside limit sell orders, sweep limit sell orders, and intermarket sweep limit sell orders all initiate the "Too-Executable Sell Order Check Process" described below in FIG. 17.

The business rules of the market center 20 determine if a given order type may be directed to a specific market maker or not. All incoming marketable directed buy order types initiate the "Directed Order Process" of FIG. 20A below and the "DMM Guaranteed Offer Process" of FIG. 22 below if the incoming buy order is a directed order, and if the order cannot execute as a directed order, initiate the "LMM Guaranteed Offer Process" of FIG. 19 below instead. Similarly, all incoming marketable directed sell order types initiate the "Directed Order Process" of FIG. 20A below and the "DMM Guaranteed Bid Process" of FIG. 21 below if the incoming sell order is a directed order, and if the order cannot execute as a directed order, initiate the "LMM Guaranteed Bid Process" of FIG. 18 below instead.

Too-Executable Buy Order Check Process

Figure 16:
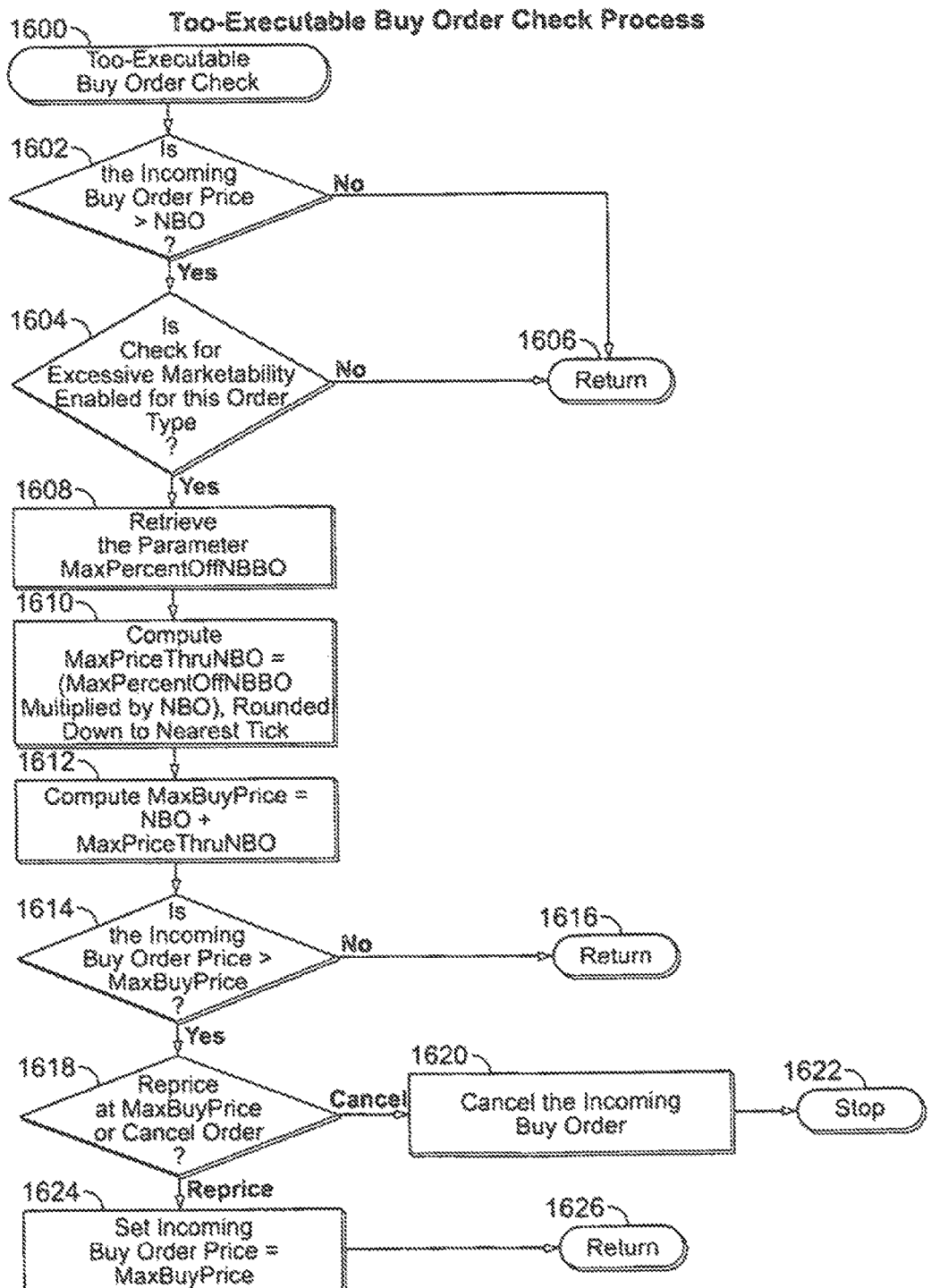
FIG. 16 is a flow diagram illustrating a process for checking if an incoming buy order is too-executable.

Referring now to FIG. 16, the "Too-Executable Buy Order Check Process" is illustrated. The "Too-Executable Buy Order Check Process" determines if an incoming buy order is "too executable," i.e., is priced so aggressively that it exceeds a predefined allowable percentage through the published NBO quotation. In the preferred embodiment, the predefined percentage is stored as a configurable parameter "MaxPercentOffNBBO," which caps the highest limit price allowed for an incoming buy order based on the current NBO.

In step 1600, the "Too-Executable Buy Order Check Process" is initiated when the order matching engine 21 receives an incoming buy order that is marketable. In step 1602, the process compares the incoming buy order's price to the NBO. If the incoming buy order's price is not greater than the NBO, then the process continues to step 1606, where it returns to the step where the procedure was originally invoked, and the process terminates because the incoming buy order is not "too executable." If, however, in step 1602, the process determines that the incoming buy order's price is greater than the NBO, then the process continues to step 1604 instead.

In step 1604, the process checks if the check for excessive marketability is enabled for the incoming buy order type. If the incoming buy order type is not subject to the check for excessive marketability, then the process also continues to step 1606, where it returns to the step where the procedure was originally invoked, and the process terminates because the incoming buy order is not evaluated as to whether it is "too executable."

Returning to step 1604, if the process determines that the incoming buy order is subject to the check for excessive marketability, then it continues to step 1608, where it retrieves the parameter "MaxPercentOffNBBO." Then, in step 1610, the process computes the price interval allowed beyond the NBO for an incoming buy order (the "MaxPriceThruNBO" parameter) by multiplying the current NBO price by the MaxPercentOffNBBO. Accordingly, the MaxPriceThruNBO parameter is computed as the stored percentage parameter times the NBO price, rounded down to the nearest tick if necessary. For example, if the NBO is 2.10 and the MaxPercentOffNBBO is 15%, then the MaxPriceThruNBO parameter is 0.315, which would be rounded down to 0.30 if the tick is a nickel at this price level. If the issue trades in pennies, then it would be rounded down to 0.31 instead. In step 1612, the process adds the computed MaxPriceThruNBO parameter to the current NBO to derive the highest valid price for the incoming buy order, i.e., the "MaxBuyPrice."

In step 1614, the process compares the price of the incoming buy order to the derived MaxBuyPrice parameter. If the incoming buy order's price is not higher than the MaxBuyPrice parameter, then the incoming buy order is not "too executable," and is eligible for further processing. In this case, the process continues to step 1616, where it returns to the step where the procedure was originally initiated, as the process has determined that the incoming buy order is not "too executable."

Returning to step 1614, if, however, the incoming buy order's price is higher than the derived MaxBuyPrice parameter, then the incoming buy order is presently "too executable," i.e., is priced too far through the NBO. Accordingly, the incoming buy order is not allowed to execute at this price, and must either be canceled or repriced depending on the business rules of the market center 20. In step 1618, if the rules determine that the order must be canceled, then the process continues to step 1620, where it cancels the incoming buy order and terminates in step 1622, as indicated. If, however, in step 1618 the business rules of the market center 20 determine that the incoming buy order should be repriced less aggressively instead of being canceled, then the process continues to step 1624, where it caps the price of the incoming buy order at the derived MaxBuyPrice parameter. The process continues to step 1626, where it returns to the step where it was originally initiated, and the process terminates because the repriced buy order is no longer "too executable."

Too-Executable Sell Order Check Process

Figure 17:
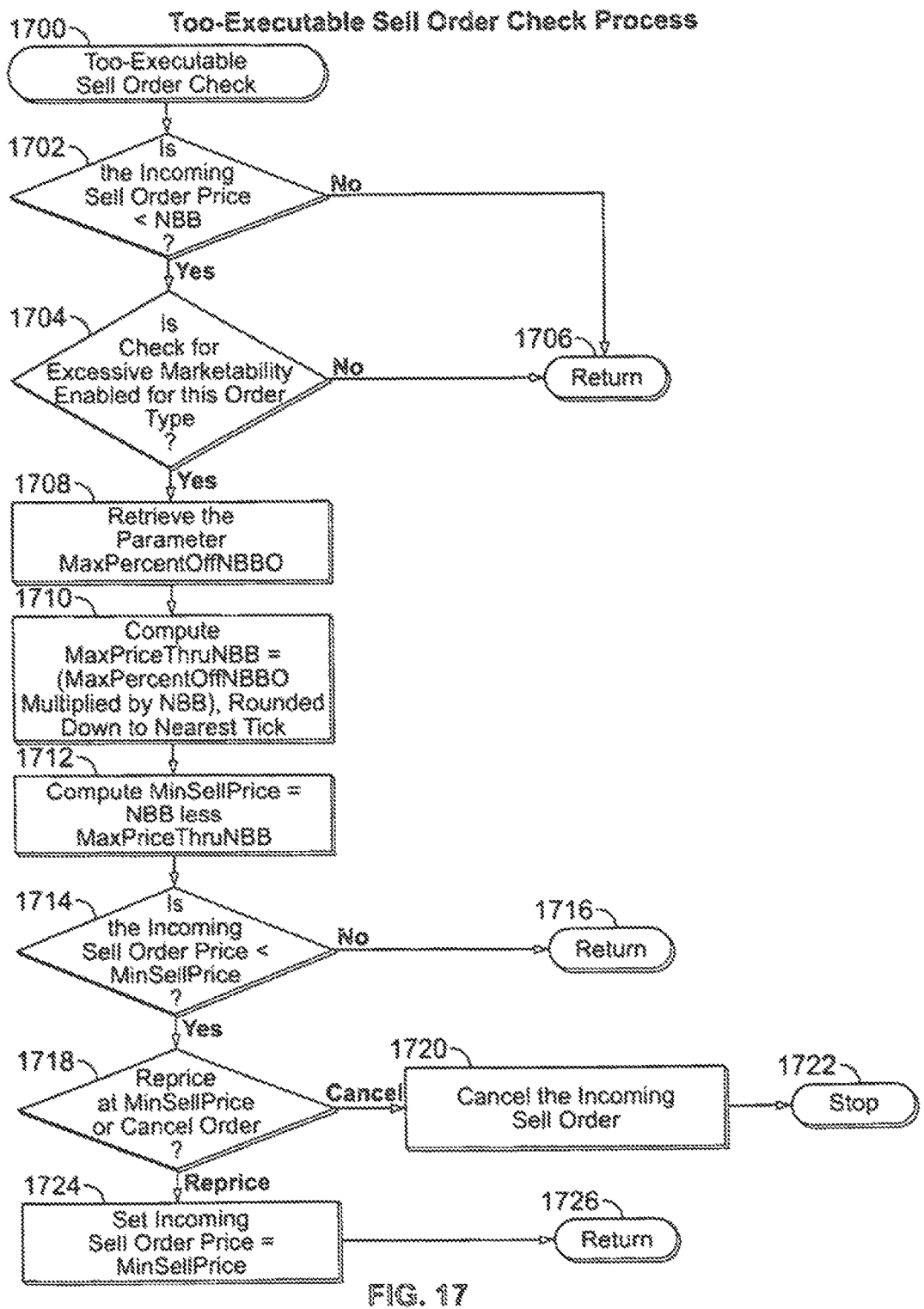
FIG. 17 is a flow diagram illustrating a process for checking if an incoming sell order is too-executable.

Referring now to FIG. 17, the "Too-Executable Sell Order Check Process" is illustrated. The "Too-Executable Sell Order Check Process" determines if an incoming sell order is "too executable," i.e., is priced so aggressively that it exceeds a predefined allowable percentage through the published NBB quotation. In the preferred embodiment, the predefined percentage is stored as a configurable parameter "MaxPercentOffNBBO," which caps the lowest limit price allowed for an incoming sell order based on the current NBB.

In step 1700, the "Too-Executable Sell Order Check Process" is initiated when the order matching engine 21 receives an incoming sell order that is marketable. In step 1702, the process compares the incoming sell order's price to the NBB. If the incoming sell order's price is not lower than the NBB, then the process continues to step 1706, where it returns to the step where the procedure was originally invoked, and the process terminates because the incoming sell order is not "too executable." If, however, in step 1702, the process determines that the incoming sell order's price is lower than the NBB, then the process continues to step 1704 instead.

In step 1704, the process checks if the check for excessive marketability is enabled for the incoming sell order type. If the incoming sell order type is not subject to the check for excessive marketability, then the process also continues to step 1706, where it returns to the step where the procedure was originally invoked, and the process terminates because the incoming sell order is not evaluated as to whether it is "too executable."

Returning to step 1704, if the process determines that the incoming sell order is subject to the check for excessive marketability, then it continues to step 1708, where it retrieves the parameter "MaxPercentOffNBBO." Then, in step 1710, the process computes the price interval allowed beyond the NBB for an incoming sell order (the "MaxPriceThruNBB" parameter) by multiplying the current NBB price by the MaxPercentOffNBBO. Accordingly, the MaxPriceThruNBB parameter is computed as the stored percentage parameter times the NBB price, rounded down to the nearest tick if necessary. For example, if the NBB is 1.90 and the MaxPercentOffNBBO is 15%, then the MaxPriceThruNBB parameter is 0.285, which would be rounded down to 0.25 if the tick is a nickel at this price level. If the issue trades in pennies, then it would be rounded down to 0.28 instead. In step 1712, the process subtracts the computed MaxPriceThruNBB parameter from the current NBB to derive the lowest valid price for the incoming sell order, i.e., the "MinSellPrice."

In step 1714, the process compares the price of the incoming sell order to the derived MinSellPrice parameter. If the incoming sell order's price is not lower than the MinSellPrice parameter, then the incoming sell order is not "too executable," and is eligible for further processing. In this case, the process continues to step 1716, where it returns to the step where the procedure was originally initiated, as the process has determined that the incoming sell order is not "too executable."

Returning to step 1714, if, however, the incoming sell order's price is lower than the derived MinSellPrice parameter, then the incoming sell order is presently "too executable," i.e., is priced too far through the NBB. Accordingly, the incoming sell order is not allowed to execute at this price, and must either be canceled or repriced depending on the business rules of the market center 20. In step 1718, if the rules determine that the order must be canceled, then the process continues to step 1720, where it cancels the incoming sell order and terminates in step 1722, as indicated. If, however, in step 1718 the business rules of the market center 20 determine that the incoming sell order should be repriced less aggressively instead of being canceled, then the process continues to step 1724, where it caps the price of the incoming sell order at the derived MinSellPrice parameter. The process continues to step 1726, where it returns to the step where it was originally initiated, and the process terminates because the repriced sell order is no longer "too executable."

The LMM Guaranteed Bid Process

Figure 18:
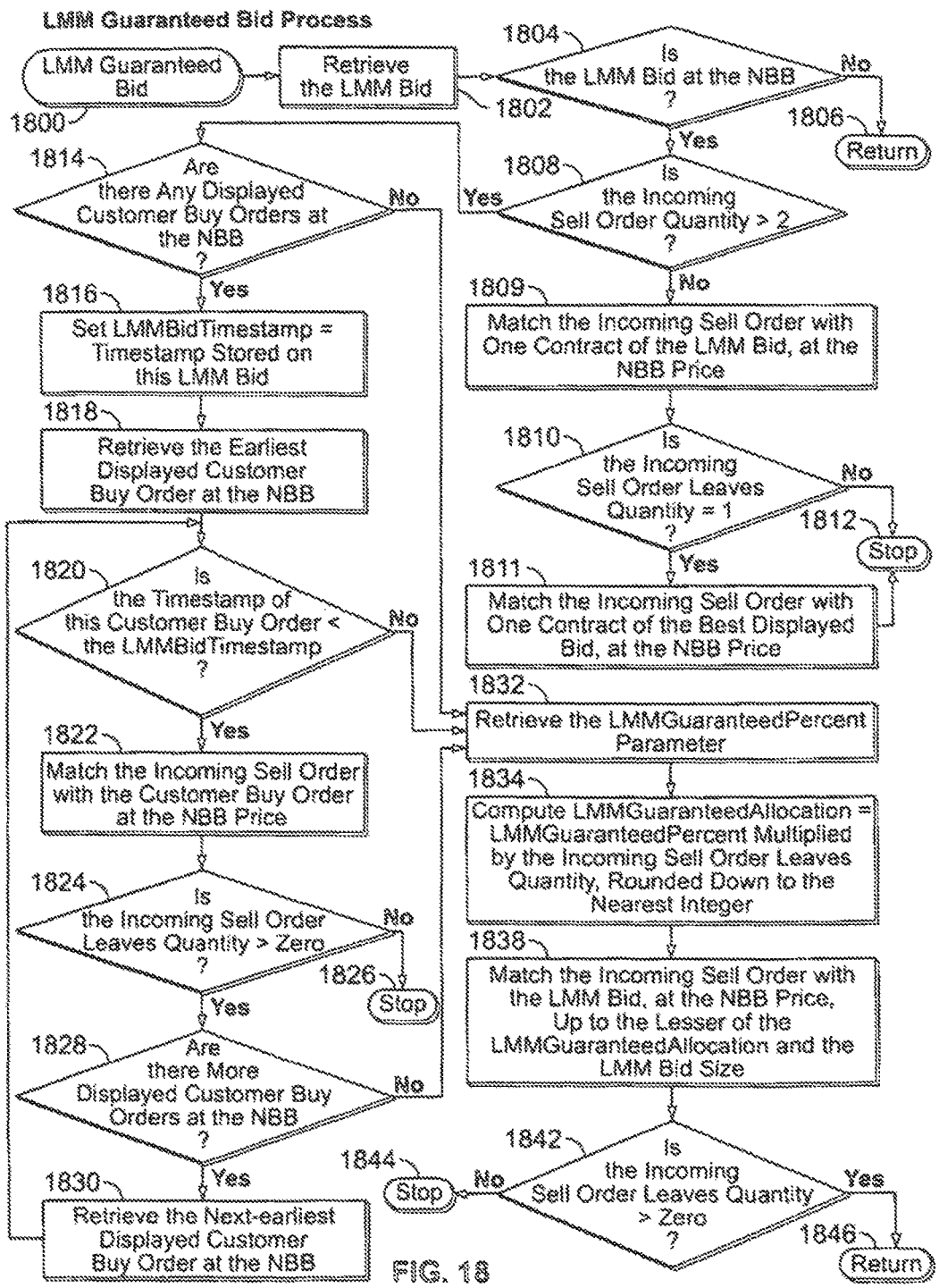
FIG. 18 is a flow diagram illustrating a process for handling lead market maker guaranteed bid entitlements in an embodiment of the present invention.

Referring now to FIG. 18, the LMM Guaranteed Bid Process is illustrated. At step 1800, the process is initiated. At step 1802, the process retrieves the lead market maker's bid. In step 1804, the process checks if the lead market maker's bid is at the NBB price. If the lead market maker's bid is inferior to the NBB, then the lead market maker is not entitled to guaranteed participation with the incoming sell order, and the process continues to step 1806, where it returns to the step where it was originally invoked.

Returning to step 1804, if, however, the lead market maker's bid is at the NBB, then the lead market maker is entitled to guaranteed participation with the incoming sell order. The process proceeds to step 1808, where it checks if the incoming sell order's size is greater than two contracts. If it is less than or equal to two contracts, then the process continues to step 1809, where it matches the incoming sell order with one contract of the lead market's bid, at the NBB price. It does this by generating an immediate or cancel ("IOC") buy pseudo-order on behalf of the underlying lead market maker bid, and executing the incoming sell order against the buy pseudo-order. After executing the buy pseudo-order, the order matching engine notifies the market maker quote engine 32b of the quantity of contracts that executed (one contract) so that it can decrement the lead market maker's bid.

Then at step 1810, the process checks if the incoming sell order still has one contract available to trade. If it does not, then the process terminates in step 1812 as indicated. If it does, then the process continues to step 1811, where it matches the single remaining contract of the incoming sell order with one contract of the best displayed bid. The best displayed bid is the buy order or quote with the highest ranking in the Display Order Process according to price/time priority. The process terminates in step 1812 as indicated.

Returning to step 1808, if, however, the incoming sell order has more than two contracts available to execute, then the process, in this embodiment, determines if there are any customer orders that are eligible to execute ahead of the lead market maker's bid. Accordingly, the process proceeds to step 1814, where it checks if there are any displayed customer buy orders at the NBB.

If there are no displayed customer buy orders at the NBB, then the lead market maker is entitled to participate immediately with the incoming sell order. The process proceeds to step 1832, where it retrieves a stored, configurable guaranteed allocation parameter determined by the market center's business rules ("LMMGuaranteedPercent"). At step 1834, the process computes the maximum quantity of contracts that the lead market maker is guaranteed for execution ("LMMGuaranteedAllocation") by multiplying the remaining ("Leaves") quantity of the incoming sell order by the LMMGuaranteedPercent parameter, and rounding the result down to the nearest integer value if necessary. In step 1838, the process matches the incoming sell order with the lead market maker's bid, at the NBB price, up to the lesser of the computed LMMGuaranteedAllocation size and the lead marker maker bid size. It does this by generating an IOC buy pseudo-order on behalf of the underlying lead market maker bid, and executing the incoming sell order against the buy pseudo-order. After executing the buy pseudo-order, the order matching engine notifies the market maker quote engine 32*b* of the quantity of contracts that executed so that it can decrement the lead market maker's bid.

In step 1842, the process checks if the incoming sell order still has any contracts available to trade. If the incoming sell order has been completely executed, then the process terminates in step 1844 as indicated. However, if the incoming sell order still has contracts available to trade, then the process returns to the step where it was originally invoked, so that the incoming sell order can continue to execute against other bids if possible. The LMM Guaranteed Bid Process is completed, and any remaining quantity of the incoming sell order is released to the Display Order Process.

Returning to step 1814, if, however, there are displayed customer buy orders at the NBB, then the process continues to step 1816, where it retrieves the timestamp assigned to the lead market maker's bid (the time assigned by the market maker quote engine 32*b*) and stores it in the parameter "LMMBidTimestamp." In step 1818, the process retrieves the earliest displayed customer buy order at the NBB. In step 1820, the process compares the timestamp of the retrieved customer buy order with the LMMBidTimestamp parameter, and if the customer buy order preceded the lead market maker's bid, then the process continues to step 1822, where it matches the incoming sell order with the retrieved customer buy order at the NBB price.

In step 1824, the process checks if the incoming sell order still has contracts available to trade. If it does not, then the process terminates in step 1826 as indicated. If it does, then the process continues to step 1828, where it checks if there are any additional displayed customer buy orders priced at the NBB. If there are additional customer orders, then in step 1830, the process retrieves the next earliest displayed customer buy order at the NBB and returns to step 1820, where it checks if the newly-retrieved customer buy order was received prior to the lead market maker's bid. It repeats this process until all customer buy orders with price/time priority over the lead market maker's bid have been matched, unless the incoming sell order is exhausted first.

Returning to step 1820, if, however, the timestamp of the retrieved customer buy order is not lower than the LMMBidTimestamp, then the customer order was not received prior to the lead market maker's bid, and is therefore not eligible to execute in the LMM Guaranteed Bid Process. In this case, the process proceeds to step 1832, and executes the lead market maker guaranteed allocation according to steps 1832 through 1844 (or 1846) as described above.

Returning to step 1828, if, however, there are no additional displayed customer buy orders at the NBB, then the process also proceeds to step 1832 at this point, and executes the lead market maker guaranteed allocation according to steps 1832 through 1844 (or 1846) as described above.

The LMM Guaranteed Offer Process

Figure 19:
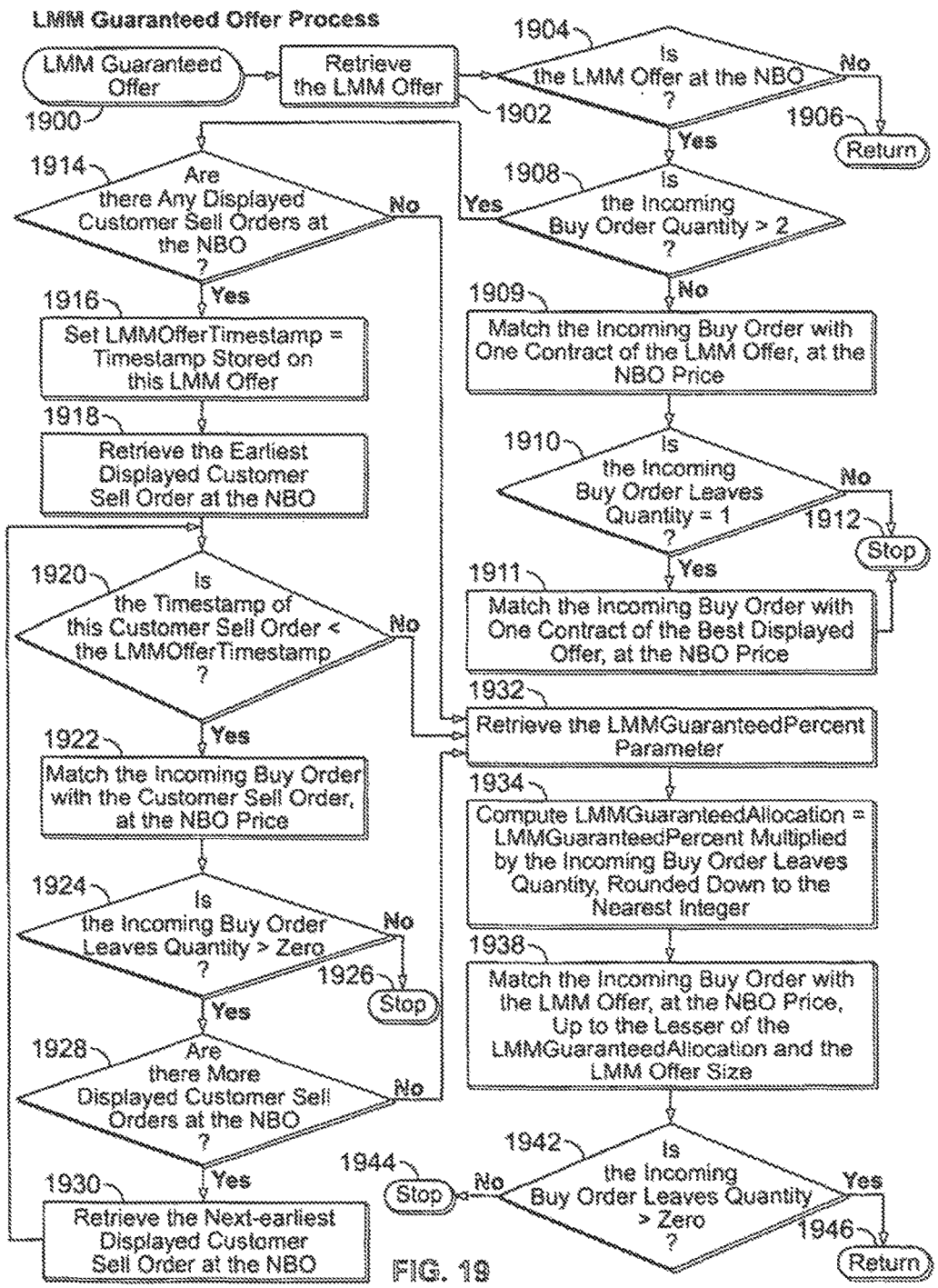
FIG. 19 is a flow diagram illustrating a process for handling lead market maker guaranteed offer entitlements in an embodiment of the present invention.

Referring now to FIG. 19, the LMM Guaranteed Order Process is illustrated. At step 1900, the process is initiated. At step 1902, the process retrieves the lead market maker's offer. In step 1904, the process checks if the lead market maker's offer is at the NBO price. If the lead market maker's offer is inferior to the NBO, then the lead market maker is not entitled to guaranteed participation with the incoming buy order, and the process continues to step 1906, where it returns to the step where it was originally invoked.

Returning to step 1904, if, however, the lead market maker's offer is at the NBO, then the lead market maker is entitled to guaranteed participation with the incoming buy order. The process proceeds to step 1908, where it checks if the incoming buy order's size is greater than two contracts. If it is less than or equal to two contracts, then the process continues to step 1909, where it matches the incoming buy order with one contract of the lead market offer, at the NBO price. It does this by generating an immediate or cancel ("IOC") sell pseudo-order on behalf of the underlying lead market maker offer, and executing the incoming buy order against the sell pseudo-order. After executing the sell pseudo-order, the order matching engine notifies the market maker quote engine 32*b* of the quantity of contracts that executed (one contract) so that it can decrement the lead market maker's offer.

Then at step 1910, the process checks if the incoming buy order still has one contract available to trade. If it does not, then the process terminates in step 1912 as indicated. If it does, then the process continues to step 1911, where it matches the single remaining contract of the incoming buy order with one contract of the best displayed offer. The best displayed offer is the sell order or quote with the highest ranking in the Display Order Process according to price/time priority. The process terminates in step 1912 as indicated.

Returning to step 1908, if, however, the incoming buy order has more than two contracts available to execute, then the process, in this embodiment, determines if there are any customer orders that are eligible to execute ahead of the lead market maker's offer. Accordingly, the process proceeds to step 1914, where it checks if there are any displayed customer sell orders at the NBO.

If there are no displayed customer sell orders at the NBO, then the lead market maker is entitled to participate immediately with the incoming buy order. The process proceeds to step 1932, where it retrieves a stored, configurable guaranteed allocation parameter determined by the market center's business rules ("LMMGuaranteedPercent"). At step 1934, the process computes the maximum quantity of contracts that the lead market maker is guaranteed for execution ("LMMGuaranteedAllocation") by multiplying the remaining ("Leaves") quantity of the incoming buy order by the LMMGuaranteedPercent parameter, and rounding the result down to the nearest integer value if necessary. In step 1938, the process matches the incoming buy order with the lead market maker's offer, at the NBO price, up to the lesser of the computed LMMGuaranteedAllocation size and the lead marker maker offer size. It does this by generating an IOC sell pseudo-order on behalf of the underlying lead market maker offer, and executing the incoming buy order against the sell pseudo-order. After executing the sell pseudo-order, the order matching engine notifies the market maker quote engine 32*b* of the quantity of contracts that executed so that it can decrement the lead market maker's offer.

In step 1942, the process checks if the incoming buy order still has any contracts available to trade. If the incoming buy order has been completely executed, then the process terminates in step 1944 as indicated. However, if the incoming buy order still has contracts available to trade, then the process returns to the step where it was originally invoked, so that the incoming buy order can continue to execute against other offers if possible. The LMM Guaranteed Offer Process is completed, and any remaining quantity of the incoming buy order is released to the Display Order Process.

Returning to step 1914, if, however, there are displayed customer sell orders at the NBO, then the process continues to step 1916, where it retrieves the timestamp assigned to the lead market maker's offer (the time assigned by the market maker quote engine 32*b*) and stores it in the parameter "LMMOfferTimestamp." In step 1918, the process retrieves the earliest displayed customer sell order at the NBO. In step 1920, the process compares the timestamp of the retrieved customer sell order with the LMMOfferTimestamp parameter, and if the customer sell order preceded the lead market maker's offer, then the process continues to step 1922, where it matches the incoming buy order with the retrieved customer sell order at the NBO price.

In step 1924, the process checks if the incoming buy order still has contracts available to trade. If it does not, then the process terminates in step 1926 as indicated. If it does, then the process continues to step 1928, where it checks if there are any additional displayed customer sell orders priced at the NBO. If there are additional customer orders, then in step 1930, the process retrieves the next earliest displayed customer sell order at the NBO and returns to step 1920, where it checks if the newly-retrieved customer sell order was received prior to the lead market maker's offer. It repeats this process until all customer sell orders with price/time priority over the lead market maker's offer have been matched, unless the incoming buy order is exhausted first.

Returning to step 1920, if, however, the timestamp of the retrieved customer sell order is not lower than the LMMOfferTimestamp, then the customer order was not received prior to the lead market maker's offer, and is therefore not eligible to execute in the LMM Guaranteed Offer Process. In this case, the process proceeds to step 1932, and executes the lead market maker guaranteed allocation according to steps 1932 through 1944 (or 1946) as described above.

Returning to step 1928, if, however, there are no additional displayed customer sell orders at the NBO, then the process also proceeds to step 1932 at this point, and executes the lead market maker guaranteed allocation according to steps 1932 through 1944 (or 1946) as described above.

The Directed Order Process

Figure 20A:
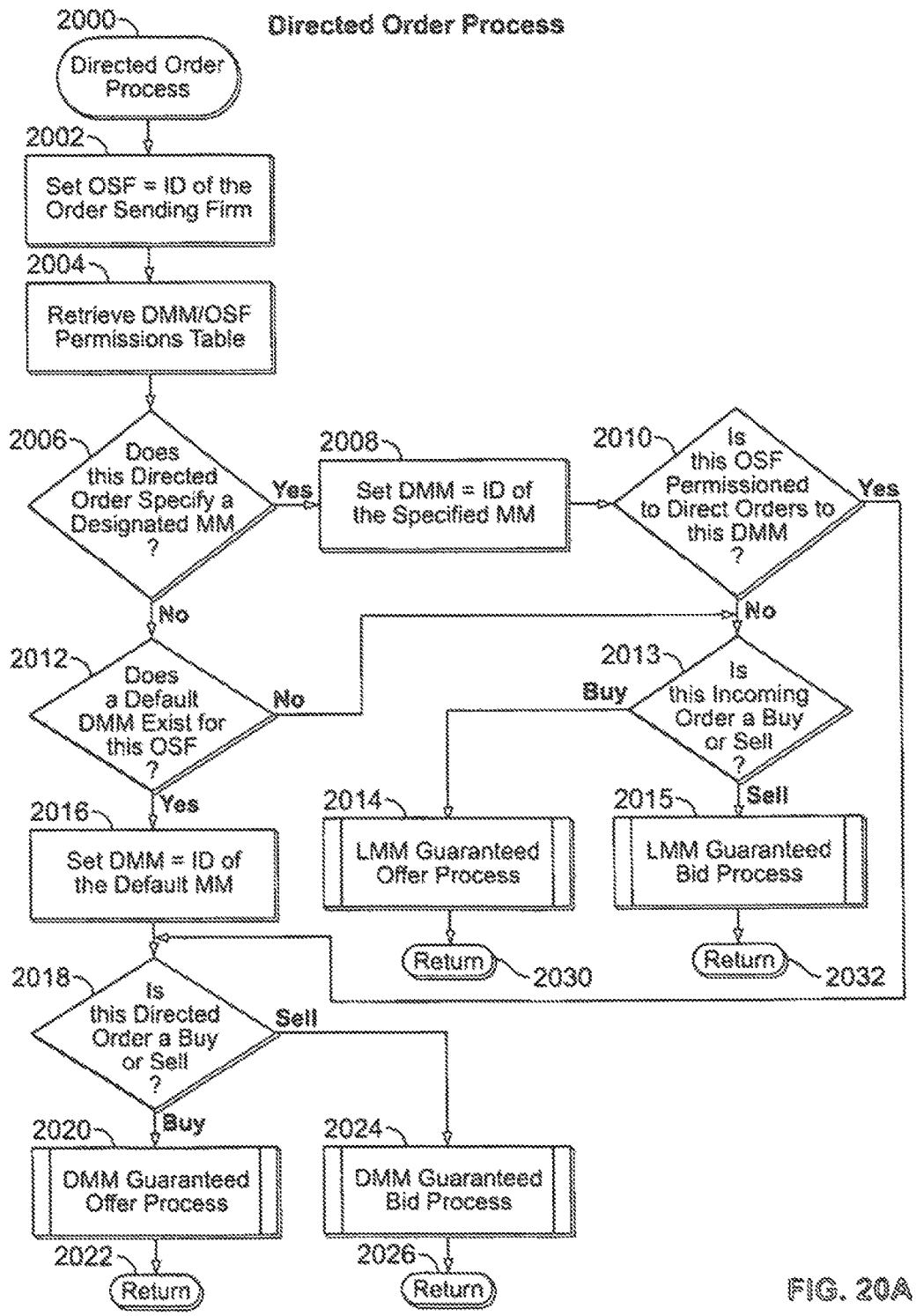
FIG. 20A is a flow diagram illustrating a process for handling directed orders in an embodiment of the present invention.

Referring now to FIGS. 20A-20B, the Directed Order Process is illustrated. When the market center 20 receives a directed order, it must first determine if the order sending firm 26 is permissioned to direct orders to the designated market maker firm 31. At step 2000, the process is initiated. At step 2002, the process sets the parameter designated as "OSF" to the order sending firm identification ("ID") included on the incoming directed order. Then, at step 2004, the process retrieves a designated market maker/order sending firm ("DMM/OSF") permissions table, similar to the exemplary one depicted in FIG. 20B.

At step 2006, the process checks if the incoming directed order includes the ID of a designated market maker, i.e., a specific market maker firm that is the intended recipient of this directed order. If a designated market maker is not specified, then the process continues to step 2012, where it consults the DMM/OSF permissions table to see if a default designated market maker has been established for this order sending firm. If no default market maker has been established in the DMM/OSF permissions table, then the incoming order cannot execute in the Directed Order Process, but it may be able to execute in one of the LMM Guarantee Processes instead. Accordingly, the process continues to step 2013, where it checks if the incoming order is a buy or sell. If the incoming order is a buy order, then the process continues to step 2014, where it initiates the LMM Guaranteed Offer Process. After the LMM Guaranteed Offer Process is complete, the process then continues to step 2030, where it returns to the step where the routine was originally initiated. If, however, the incoming order is a sell order, then the process continues to step 2015, where it initiates the LMM Guaranteed Bid Process. After the LMM Guaranteed Bid Process is complete, the process then continues to step 2032, where it returns to the step where the routine was originally initiated.

Referring again to step 2006, if the directed order includes the ID of a designated market maker, then the process, at step 2008, assigns the designated market maker ID to the parameter "DMM." At step 2010, the process consults the DMM/OSF permissions table to determine if a rule exists for this DMM/OSF pair. If a rule does not exist, then this order sending firm 26 is not permissioned to send directed orders to this designated market maker. In this case, the incoming order cannot execute in the Directed Order Process, but it may be able to execute in a LMM Guarantee Process instead. Accordingly, the process continues to step 2013 where it checks if the incoming order is a buy order or a sell order and then proceeds as described in the steps above.

Referring again to step 2010, however, if a rule does exist for the DMM/OSF pair, then this order sending firm 26 is permissioned to send directed orders to the designated market maker 31. That being the case, the process continues to step 2018, where it checks if the incoming directed order is a buy order or a sell order.

Figure 21:
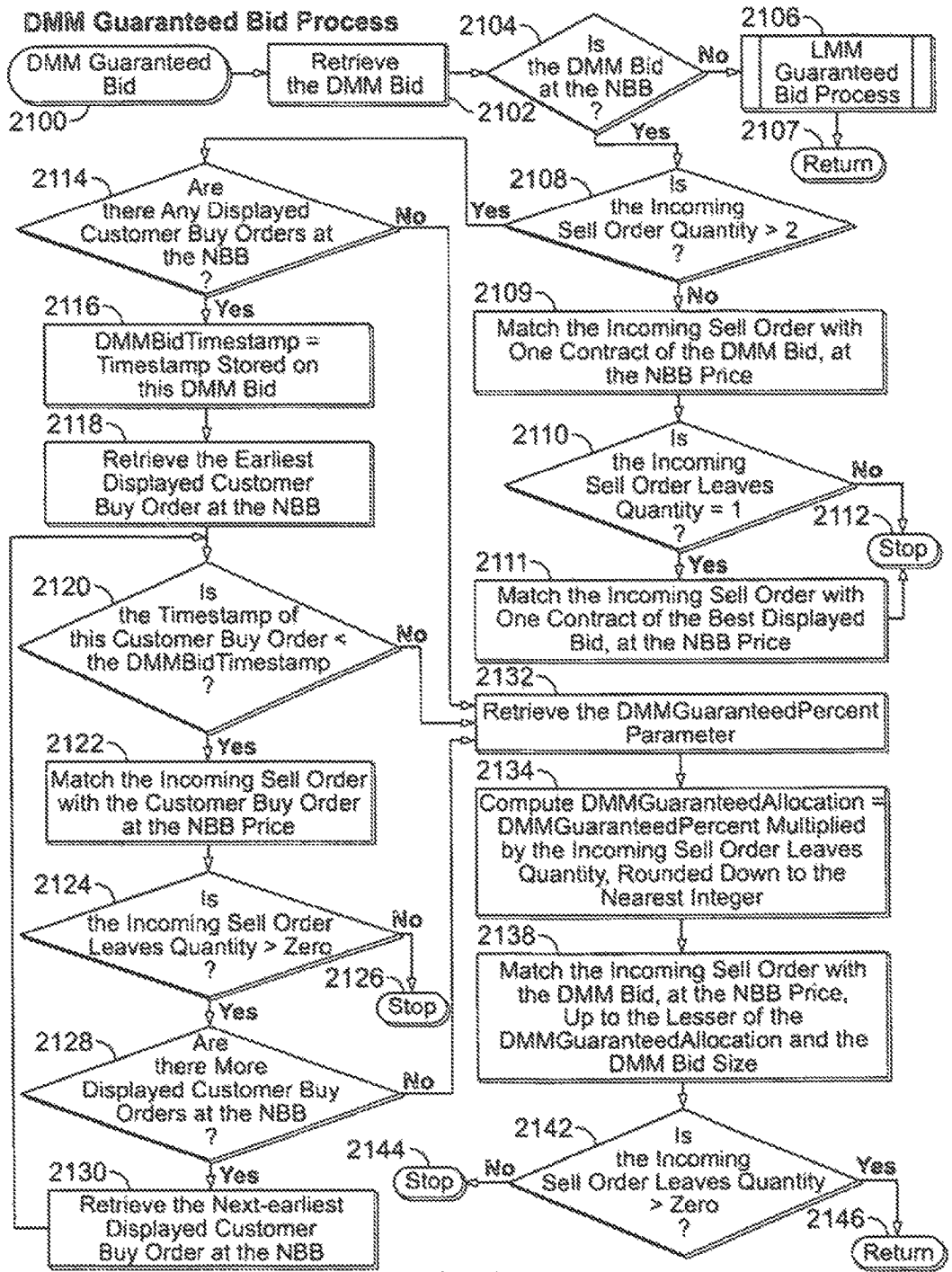
FIG. 21 is a flow diagram illustrating a process for handling designated market maker guaranteed bid entitlements in an embodiment of the present invention.
Figure 22:
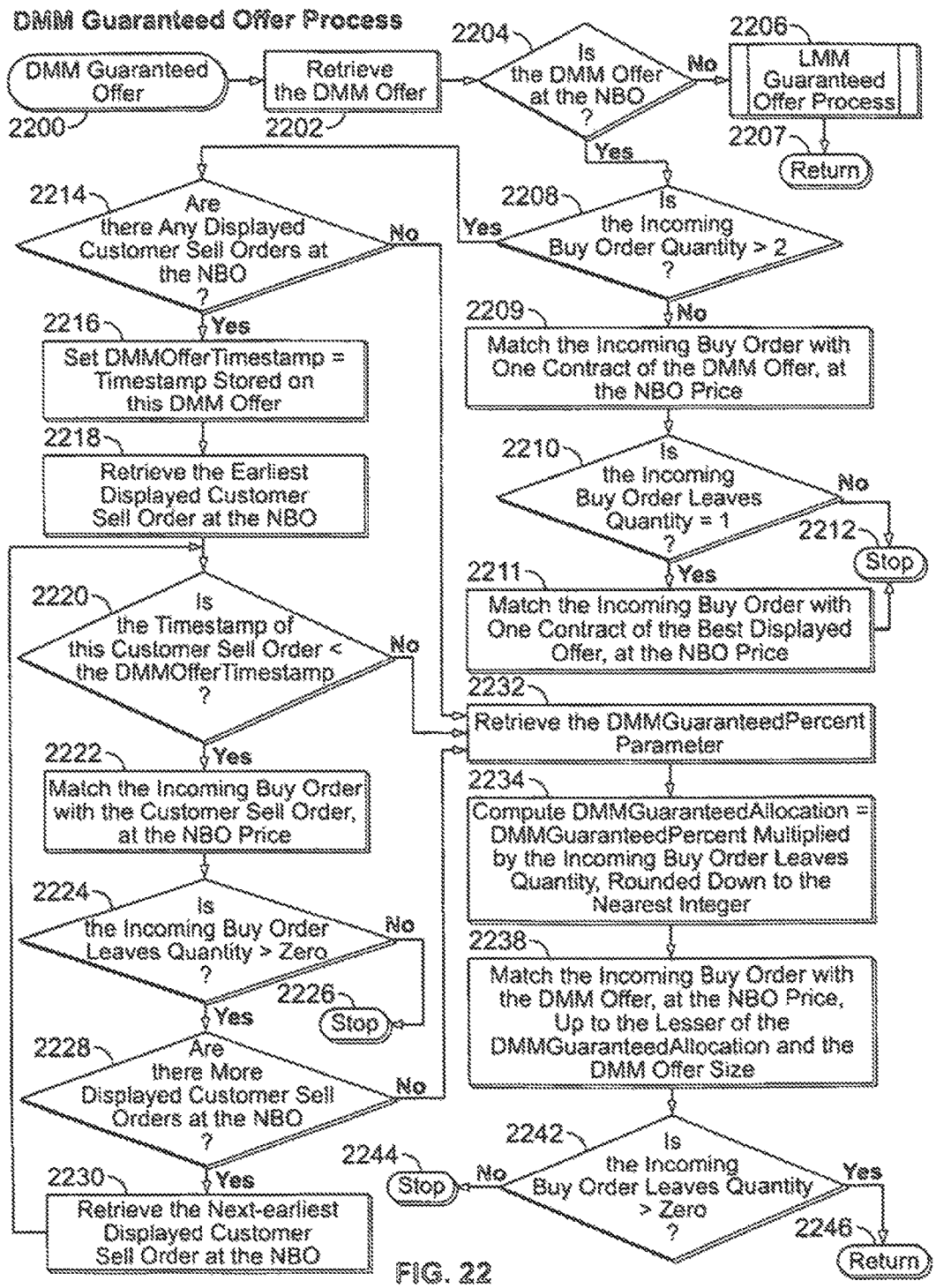
FIG. 22 is a flow diagram illustrating a process for handling designated market maker guaranteed offer entitlements in an embodiment of the present invention.

Referring again to step 2012, if the process determines that a default designated market maker exists for the order sending firm sending the order, then the process, at step 2016 sets the parameter designated as "DMM" to the default market maker ID and continues to step 2018. At step 2018, the process determines whether the incoming directed order is a buy order or a sell order. If the directed order is a buy order, then the process proceeds to step 2020, where the DMM Guaranteed Offer Process is initiated, and the process proceeds to step 2200 (FIG. 22). After the DMM Guaranteed Offer Process is complete, the process proceeds to step 2022 where it returns to the step where the routine was originally initiated. If, on the other hand, the directed order is a sell order, then the process proceeds to step 2024, where the DMM Guaranteed Bid Process is initiated, and the process proceeds to step 2100 (FIG. 21). After the DMM Guaranteed Bid Process is complete, the process proceeds to step 2026 where it returns to the step where the routine was originally initiated.

The DMM Guaranteed Bid Process

Where the process has determined that an incoming sell order was sent by an order sending firm 26 that is permissioned to send directed orders to a market maker firm 31, the DMM Guaranteed Bid Process is activated as indicated at step 2100 (FIG. 21). FIG. 21 illustrates a routine wherein the order matching engine 21 executes the incoming directed sell order in the Directed Order Process, but only if the designated market maker's bid is at the NBB. The DMM Guaranteed Bid Process is very similar to the previously described LMM Guaranteed Bid Process, as the designated market maker in this situation receives the same privileges as the lead market maker for the purpose of executing with the incoming directed order.

At step 2102, the process retrieves the designated market maker's bid. In step 2104, the process checks if the designated market maker's bid is at the NBB price. If the designated market maker's bid is inferior to the NBB, then the designated market maker is not entitled to guaranteed participation with the incoming directed sell order. However, the lead market maker may still be entitled to participate with the incoming order instead. Accordingly, the process continues to step 2106, where the LMM Guaranteed Bid Process is activated.

Returning to step 2104, if, however, the designated market maker's bid is at the NBB, then the designated market maker is entitled to guaranteed participation with the incoming order. The process proceeds to step 2108, where, in this embodiment, it checks if the incoming directed sell order's size is greater than two contracts. If it is less than or equal to two contracts, then the process continues to step 2109, where it matches the incoming sell order with one contract of the designated market maker's bid, at the NBB price. It does this by generating an IOC buy pseudo-order on behalf of the underlying designated market maker bid, and executing the incoming sell order against the buy pseudo-order. After executing the buy pseudo-order, the order matching engine notifies the market maker quote engine 32b of the quantity of contracts that executed (one contract) so that it can decrement the designated market maker's bid.

In step 2110, the process checks if the incoming sell order still has one contract available to trade. If it does not, then the process terminates in step 2112 as indicated. If it does, then the process continues to step 2111, where it matches the single remaining contract of the incoming sell order with one contract of the best displayed bid. The best displayed bid is the buy order or quote with the highest ranking in the Display Order Process according to price/time priority. The process terminates in step 2112 as indicated.

Returning to step 2108, if, however, the incoming directed sell order has more than two contracts available to execute, then the process must determine if there are any customer orders that are eligible to execute ahead of the designated market maker's bid. Accordingly, it proceeds to step 2114, where it checks if there are any displayed customer buy orders at the NBB.

If there are no displayed customer buy orders at the NBB, then the designated market maker is entitled to participate immediately with the incoming directed sell order. The process proceeds to step 2132, where it retrieves a stored, configurable guaranteed allocation parameter determined by the market center's business rules ("DMMGuaranteedPercent"). In step 2134, the process computes the maximum quantity of contracts that the designated market maker is guaranteed for execution ("DMMGuaranteedAllocation") by multiplying the remaining ("Leaves") quantity of the incoming directed sell order by the DMMGuaranteedPercent parameter, and rounding the result down to the nearest integer value if necessary. In step 2138, the process matches the incoming sell order with the designated market maker bid, at the NBB price, up to the lesser of the computed DMMGuaranteedAllocation size and the designated market maker bid size. It does this by generating an IOC buy pseudo-order on behalf of the underlying designated market maker bid, and executing the incoming sell order against the buy pseudo-order. After executing the buy pseudo-order, the order matching engine notifies the market maker quote engine 32b of the quantity of contracts that executed so that it can decrement the designated market maker's bid.

In step 2142, the process checks if the incoming directed sell order still has any contracts available to trade. If the incoming directed sell order has been completely executed, then the process terminates in step 2144 as indicated. However, if the incoming directed sell order still has contracts available to trade, then the process continues to step 2146, where it returns to the step where it was originally initiated, so that the incoming sell order (no longer directed) can continue to execute against other bids if possible. The DMM Guaranteed Bid Process is completed, and any remaining quantity of the incoming sell order is released to the Display Order Process.

Returning to step 2114, if, however, there are displayed customer buy orders at the NBB, then the process continues to step 2116, where it retrieves the timestamp assigned to the designated market maker's bid (the time assigned by the market maker quote engine 32b) and stores it in the parameter "DMMBidTimestamp." In step 2118, the process retrieves the earliest displayed customer buy order at the NBB. In step 2120, the process compares the timestamp of the retrieved customer buy order with the DMMBidTimestamp parameter, and if the customer buy order preceded the designated market maker bid, then the process continues to step 2122, where it matches the incoming directed sell order with the retrieved customer buy order at the NBB price.

In step 2124, the process checks if the incoming directed sell order still has contracts available to trade. If it does not, then the process terminates in step 2126 as indicated. If it does, then the process continues to step 2128, where it checks if there are any additional displayed customer buy orders priced at the NBB. If there are additional customer orders, then in step 2130, the process retrieves the next earliest displayed customer buy order at the NBB and returns to step 2120, where it checks if the newly-retrieved customer buy order was received prior to the designated market maker's bid. It repeats this process until all customer buy orders with price/time priority over the designated market maker's bid have been matched, unless the incoming directed sell order is exhausted first.

Returning to step 2120, if, however, the timestamp of the retrieved customer buy order is not lower than the DMMBidTimestamp, then the customer order was not received prior to the designated market makers bid, and is therefore not eligible to execute in the Directed Order Process. In this case, the process proceeds to step 2132, and executes the designated market maker guaranteed allocation according to steps 2132 through 2144 (or 2146) as described above.

Returning to step 2128, if, however, there are no additional displayed customer buy orders at the NBB, then the process also proceeds to step 2132, and executes the designated market maker guaranteed allocation according to steps 2132 through 2144 (or 2146) as described above.

The DMM Guaranteed Offer Process

Where the process has determined that an incoming buy order was sent by an order sending firm 26 that is permissioned to send directed orders to a market maker firm 31, the DMM Guaranteed Offer Process is activated as indicated at step 2200 (FIG. 22).

FIG. 22 illustrates a routine wherein the order matching engine 21 executes the incoming directed buy order in the Directed Order Process, but only if the designated market maker's offer is at the NBO. The DMM Guaranteed Offer Process is very similar to the previously described LMM Guaranteed Offer Process, as the designated market maker in this situation receives the same privileges as the lead market maker for the purpose of executing with the incoming directed order.

At step 2202, the process retrieves the designated market maker's offer. In step 2204, the process checks if the designated market maker's offer is at the NBO price. If the designated market maker's offer is inferior to the NBO, then the designated market maker is not entitled to guaranteed participation with the incoming directed buy order. However, the lead market maker may still be entitled to participate with the incoming order instead. Accordingly, the process continues to step 2206, where the LMM Guaranteed Offer Process is activated.

Returning to step 2204, if, however, the designated market maker's offer is at the NBO, then the designated market maker is entitled to guaranteed participation with the incoming order. The process proceeds to step 2208, where, in this embodiment, it checks if the incoming directed buy order's size is greater than two contracts. If it is less than or equal to two contracts, then the process continues to step 2209, where it matches the incoming buy order with one contract of the designated market maker's offer, at the NBO price. It does this by generating an IOC sell pseudo-order on behalf of the underlying designated market maker offer, and executing the incoming buy order against the sell pseudo-order. After executing the sell pseudo-order, the order matching engine notifies the market maker quote engine 32*b* of the quantity of contracts that executed (one contract) so that it can decrement the designated market maker's offer.

In step 2210, the process checks if the incoming buy order still has one contract available to trade. If it does not, then the process terminates in step 2212 as indicated. If it does, then the process continues to step 2211, where it matches the single remaining contract of the incoming buy order with one contract of the best displayed offer. The best displayed offer is the sell order or quote with the highest ranking in the Display Order Process according to price/time priority. The process terminates in step 2212 as indicated.

Returning to step 2208, if, however, the incoming directed buy order has more than two contracts available to execute, then the process must determine if there are any customer orders that are eligible to execute ahead of the designated market maker's offer. Accordingly, it proceeds to step 2214, where it checks if there are any displayed customer sell orders at the NBO.

If there are no displayed customer sell orders at the NBO, then the designated market maker is entitled to participate immediately with the incoming directed buy order. The process proceeds to step 2232, where it retrieves a stored, configurable guaranteed allocation parameter determined by the market center's business rules ("DMMGuaranteedPercent"). In step 2234, the process computes the maximum quantity of contracts that the designated market maker is guaranteed for execution ("DMMGuaranteedAllocation") by multiplying the remaining ("Leaves") quantity of the incoming directed buy order by the DMMGuaranteedPercent parameter, and rounding the result down to the nearest integer value if necessary. In step 2238, the process matches the incoming buy order with the designated market maker's offer, at the NBO price, up to the lesser of the computed DMMGuaranteedAllocation size and the designated market maker offer size. It does this by generating an IOC sell pseudo-order on behalf of the underlying designated market maker offer, and executing the incoming buy order against the sell pseudo-order. After executing the sell pseudo-order, the order matching engine notifies the market maker quote engine 32*b* of the quantity of contracts that executed so that it can decrement the designated market maker's offer.

In step 2242, the process checks if the incoming directed buy order still has any contracts available to trade. If the incoming directed buy order has been completely executed, then the process terminates in step 2244 as indicated. However, if the incoming directed buy order still has contracts available to trade, then the process continues to step 2246, where it returns to the step where it was originally initiated, so that the incoming buy order (no longer directed) can continue to execute against other offers if possible. The DMM Guaranteed Offer Process is completed, and any remaining quantity of the incoming buy order is released to the Display Order Process.

Returning to step 2214, if, however, there are displayed customer sell orders at the NBO, then the process continues to step 2216, where it retrieves the timestamp assigned to the designated market maker's offer (the time assigned by the market maker quote engine 32*b*) and stores it in the parameter "DMMOfferTimestamp." In step 2218, the process retrieves the earliest displayed customer sell order at the NBO. In step 2220, the process compares the timestamp of the retrieved customer sell order with the DMMOfferTimestamp parameter, and if the customer sell order preceded the designated market maker's offer, then the process continues to step 2222, where it matches the incoming directed buy order with the retrieved customer sell order at the NBO price.

In step 2224, the process checks if the incoming directed buy order still has contracts available to trade. If it does not, then the process terminates in step 2226 as indicated. If it does, then the process continues to step 2228, where it checks if there are any additional displayed customer sell orders priced at the NBO. If there are additional customer orders, then in step 2230, the process retrieves the next earliest displayed customer sell order at the NBO and returns to step 2220, where it checks if the newly-retrieved customer sell order was received prior to the designated market maker's offer. It repeats this process until all customer sell orders with price/time priority over the designated market maker's offer have been matched, unless the incoming directed buy order is exhausted first.

Returning to step 2220, if, however, the timestamp of the retrieved customer sell order is not lower than the DMMOfferTimestamp, then the customer order was not received prior to the designated market maker's offer, and is therefore not eligible to execute in the Directed Order Process. In this case, the process proceeds to step 2232, and executes the designated market maker guaranteed allocation according to steps 2232 through 2244 (or 2246) as described above.

Returning to step 2228, if, however, there are no additional displayed customer sell orders at the NBO, then the process also proceeds to step 2232, and executes the designated market maker guaranteed allocation according to steps 2232 through 2244 (or 2246) as described above.

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

What is claimed is:

1. A market center computing system which lists a plurality of options series and handles automatically repriceable orders, comprising:
    (a) one or more data structures defining an order book for each option series and a market maker quote book for each options series which are maintained by an order matching engine;
    (b) one or more data structures defining an away market best bid and offer book that is separate from the order book and the market maker quote book and is maintained by an away market quote engine;
    (c) at least a first interface for receiving orders, a second interface for receiving quotes and a third interface for receiving a top-of-book best bid and offer disseminated quotation from a plurality of away market centers for each option series;
    (d) a market center memory for storing code for analyzing and processing orders and quotes;

(e) a processor for interacting with the interfaces, the order matching engine and the away market quote engine and executing the code for analyzing and processing orders and quotes, wherein the code, when executed:
- (e)(i) automatically activates the third interface to receive an away market quote from an away market center for a specified option series on the market center computing system;
- (e)(ii) automatically activates the away market quote engine to analyze the received away market quote to determine whether the away market quote has moved away from a price of an automatically repriceable order on an opposite side of the order book;
- (e)(iii) responsive to the away market quote engine determining that the away market quote has moved away from the price of an automatically repriceable order on the opposite side of the order book:
  - (e)(iii)(A) causes the away market quote engine to automatically send a notification to the order matching engine;
  - (e)(iii)(B) activates the order matching engine, upon receipt of the notification from the away market quote, to automatically evaluate the automatically repriceable order to determine whether the automatically repriceable order can be repriced more aggressively; and
  - (e)(iii)(C) causes the order matching engine to automatically reprice the automatically repriceable order to a more aggressive price when it is determined that the evaluated automatically repriceable order can be repriced more aggressively,
- wherein the order matching engine evaluates and reprices the automatically repriceable order in response to and only upon receiving the notification from the away market quote engine.

2. The market center computing system of claim 1, wherein the automatically repriceable order is a stand-your-ground inside limit order.

3. The market center computing system of claim 2, wherein the market center computing system includes a lead market maker guarantee entitlement process, a display order process, a working order process, a routing process, and wherein the stand-your-ground inside limit order attempts to execute in the lead market maker guarantee entitlement process, the display order process, the working order process, and the routing process, and any remaining portion of the stand-your-ground inside limit order is posted to the order book at the more aggressive price.

4. The market center computing system of claim 1, wherein the automatically repriceable order is a sweep limit order.

5. The market center computing system of claim 4, wherein the market center computing system includes a lead market maker guarantee entitlement process, a display order process, a working order process, a routing process, and wherein the sweep limit order attempts to execute in the lead market maker guarantee entitlement process, the display order process, the working order process, and the routing process, and any remaining portion of the sweep limit order is posted to the order book at the more aggressive price.

6. The market center computing system of claim 1, wherein the automatically repriceable order is an intermarket sweep limit order.

7. The market center computing system of claim 6, wherein the market center computing system includes a lead market maker guarantee entitlement process, a display order process, a working order process, a routing process, and wherein the intermarket sweep limit order attempts to execute in the lead market maker guarantee entitlement process, the display order process, the working order process, and the routing process, and any remaining portion of the intermarket sweep limit order is posted to the order book at the more aggressive price.

8. The market center computing system of claim 1, wherein the away market quote engine does not send a notification to the order matching engine when the away market quote engine determines that the away market quote has not moved away from the price of an automatically repriceable order on the opposite side of the order book.

9. A market center computing system which lists a plurality of options series and handles automatically repriceable orders, comprising:
- (a) one or more data structures defining an order book for each option series and a market maker quote book for each option series which are maintained by an order matching engine;
- (b) one or more data structures defining an away market best bid and offer book that is separate from the order book and the market maker quote book and is maintained by an away market quote engine;
- (c) at least a first interface for receiving orders, a second interface for receiving quotes and a third interface for receiving a top-of-book best bid and offer disseminated quotation from a plurality of away market centers for each option series;
- (d) a market center memory for storing code for analyzing and processing orders and quotes;
- (e) a processor for interacting with the interfaces, the order matching engine and the away market quote engine and executing the code for analyzing and processing orders and quotes, wherein the code, when executed:
  - (e)(i) automatically activates the third interface to receive an away market quote from an away market center for a specified option series on the market center computing system;
  - (e)(ii) automatically activates the away market quote engine to analyze the away market quote to determine whether the away market quote has moved into the price of an automatically priced order on an opposite side of the order book;
  - (e)(iii) responsive to the away market quote engine determining that the away market quote has moved into the price of an automatically repriceable order on the opposite side of the order book:
    - (e)(iii)(A) causes the away market quote engine to automatically send a notification to the order matching engine;
    - (e)(iii)(B) activates the order matching engine, upon receipt of the notification from the away market quote engine, to automatically evaluate the automatically repriceable order on the order book to determine whether the automatically repriceable order needs to be repriced less aggressively; and
    - (e)(iii)(C) causes the order matching engine to automatically reprice the automatically repriceable order to a less aggressive price when it is determined that the evaluated automatically repriceable order needs to be repriced less aggressively,
  - wherein the order matching engine evaluates and reprices the automatically repriceable order in response to and only upon receiving the notification from the away market quote engine.

10. The market center computing system of claim 9, wherein the automatically repriceable order is reprice-and-ship inside limit order.

11. The market center computing system of claim 10, wherein the market center computing system further comprises a lead market maker guarantee entitlement process, wherein the reprice-and-ship inside limit order attempts to execute in the lead market maker guarantee entitlement process and then routes to the away market quote that moved into its display price.

12. The market center computing system of claim 9, wherein the away market quote engine does not send a notification to the order matching engine when the away market quote engine determines that the away market quote has not moved into the price of an automatically repriceable order on the opposite side of the order book.

* * * * *